United States Patent [19]

Mittelman et al.

[11] 4,181,955
[45] Jan. 1, 1980

[54] APPARATUS FOR PRODUCING PHOTOGRAPHIC SLIDES

[75] Inventors: Phillip S. Mittelman, Somers; Leon Malin, Port Chester; John K. Heyl, Shrub Oak, all of N.Y.

[73] Assignee: Mathematical Applications Group, Inc., Elmsford, N.Y.

[21] Appl. No.: 911,802

[22] Filed: Jun. 2, 1978

[51] Int. Cl.$^2$ .......................................... G06K 15/18
[52] U.S. Cl. ................................... 364/521; 340/705; 346/110 R; 364/120; 364/515
[58] Field of Search ............... 364/514, 515, 518, 521, 364/523, 525, 900, 488, 120; 340/705, 711; 346/33 ME, 33 R, 110 R; 352/50

[56] References Cited

U.S. PATENT DOCUMENTS

| | | | |
|---|---|---|---|
| 3,693,178 | 9/1972 | Braun et al. | 346/33 ME |
| 3,716,705 | 2/1973 | Newell | 364/518 |
| 3,781,846 | 12/1973 | Eichelberger et al. | 340/705 |
| 3,811,113 | 5/1974 | Saito et al. | 340/711 |
| 3,879,722 | 4/1975 | Knowlton | 340/705 |
| 3,918,039 | 11/1975 | Clark | 340/711 |
| 4,026,555 | 5/1977 | Kirschner et al. | 340/711 |

OTHER PUBLICATIONS

"Graphically Speaking-A Complete Plotting Capability From National CSS"; Norwalk, Conn.; Jul. 1977.
"The Dicomed D48 Multipurpose Precision Graphic COM System: Creating Exciting New Dimensions in Visual Communication"; May 1978, DICOMED Corp.
Stefanides; "Interactive Computer System Generates Graphic Art"; Design News; Nov. 22, 1976.
Gilroy, H.; "Magic As The Midas Touch"; Personal Computing; Jan/Feb. 1977.
"Computer Graphics—A Powerful Tool"-Megatek Corp.; San Diego, Calif.
"Intercolor 8051 Desk Top Computer"-Intelligent Systems Corp.; Norcross, Georgia; Feb. 1977.

*Primary Examiner*—Errol A. Krass
*Attorney, Agent, or Firm*—Spellman, Joel & Pelton

[57] ABSTRACT

Apparatus for automatically generating photographic pictures, such as 35 mm slides, includes a number of microcomputer terminals at scattered locations, a central computer at a location remote from these terminals and a picture producing device for creating photographic pictures from computer generated data. The microcomputer terminals are each provided with a color display and input keyboards for enabling the user to enter data. The terminals are programmed to generate and display in color a number of standard graphical representations having certain variable characteristics. A particular representation and its characteristics are entered by users through the terminal input as answers to questions presented by the terminal. The terminals are capable of modifying the display of a graphical representation in response to user entries which change the answers to the questions so as to create a final set of answers. When a graphical representation is complete, to the satisfaction of the user, data representing the user's final answers are transmitted from the terminal to the central computer. The central computer is programmed to generate data defining the raster points for the standard graphical representations based on the data representing the user's final answers. These raster points define a graphical representation with enhanced resolution over that generated and displayed by the terminal. Finally, the picture producing device creates photographic pictures (slides) from the higher resolution raster point data generated by the central computer.

58 Claims, 57 Drawing Figures

GENERAL ORGANIZATION OF TERMINAL PROGRAMS

FIG. 3

ORGANIZATION CHART DATA FORMAT

FINAL DELIMITER

TELEPHONE LIST

| NAME | EXTENSION |
|---|---|
| ELIN, LARRY | 236 |
| EPSTEIN, ARDYTH | 205 |
| EVERETT, PAULETTE | 0 |
| ESPOSITO, MARIA | 207 |
| FENNEL, RON | 239 |
| FORTE, JOHN | 238 |

| WORD: | 1 | 2 | 3 | 4 | 5 | 6 | 7 | 8 | 9 | 10 |
|---|---|---|---|---|---|---|---|---|---|---|
| | TITLE | LENTH | IX | IY | IYD | IAREA1 | IAREA2 | IXD | UNUSED | |
| 11 | 12 | | |
|---|---|---|---|
| ISTART | IEND | ------ | ------ |
| | | 10+LENTH/2-1 | 10+LENTH/2 |
|---|---|---|---|
| ------ | ------ | ISTART | IEND |
| 10+LENTH/2+1 | 10+LENTH/2+52 |
|---|---|
| KERNING DATA | |
FIG. 18
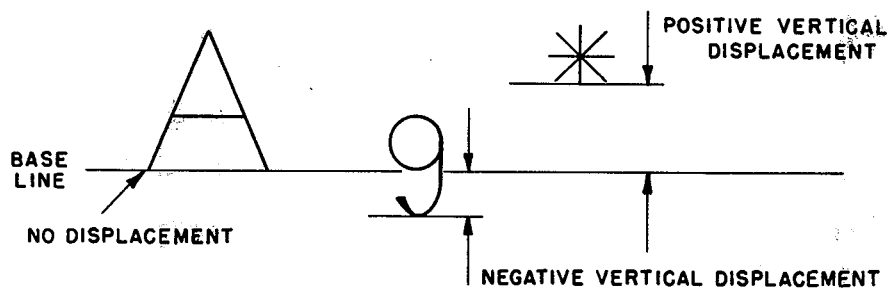
FIG. 19
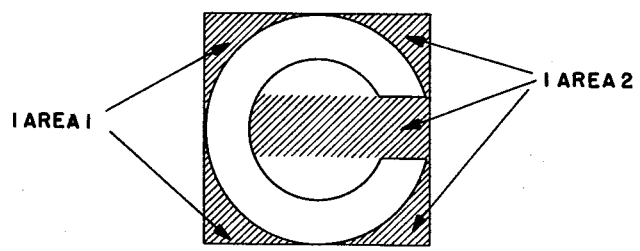
FIG. 20

OUTPUT

APPARATUS FOR PRODUCING PHOTOGRAPHIC SLIDES

BACKGROUND OF THE INVENTION

The present invention concerns apparatus for automatically generating photographic pictures, such as 35 mm slides, containing text and/or graphics arranged in one of a number of standard formats. Such pictures (slides) are useful, for example, as visual aids in presentations at business conferences and the like.

The conventional technique for producing a 35 mm slide containing text and artwork is to create a "mechanical" or mockup of the slide on a board using typeset or rub-on characters for text and manually produced graphics such as organization charts, pie charts, line graphics and the like. Such mechanicals are made by artists who may work in an independent graphic arts company, or in an art department within a large corporation. After the first mechanical is produced in accordance with the instructions of the slide "customer"—the person requesting the slide who is normally one and the same as the person who will use the slide at a presentation - a proof copy of the slide is shown to the customer and normally modified in some way to more exactly meet his specific requirements and taste. When the mechanical, as modified, has been approved by the customer, it is photographed and one or more 35 mm slides are produced.

This conventional mode of producing a slide requires a considerable amount of the time of a skilled artist, even with the various tools of the trade at his disposal. For a typical slide made in this manner, an artist may take an average of 35 minutes to produce the mechanical. Thereafter, it is necessary to transport the proof copy to the slide customer one or more times for his revision and eventual approval so that the entire process, from the time a customer makes his initial request to the time the mechanical is approved, may take several days.

A number of systems have been devised to automate this process of producing business graphics which are then photographed to produce 35 mm slides. For example, software "modules" have been written for time-sharing systems to produce line drawings. In a typical time-sharing system, teletypewriters are used as remote input/output devices for a large central computer which calls up and executes a number of programs "on line" for several users on a time-sharing basis. The teletypewriters may also be used purely as input devices to supply data and instructions to the central computer.

One known service for producing graphical representations in a time-sharing system is marketed by National CSS, 542 Westport Avenue, Norwalk, Conn. 06851. This service, called "Graphics/CSS", is capable of producing black and white line-drawn plots ranging from bar charts, pie charts, line graphs and the like of the type used in business presentations to complex three-dimensional functions, such as are used in mathematics, product design and cartography. The graphs and charts for business presentations, which may include text, are produced using a software package called "Tel-A-Graph" which is designed for the non-programmer. Tel-A-Graph operates in the interactive mode, asking questions of the user at a remote teletypewriter. The answers to these questions, which are entered by the user, define the particular graphical representation with selected characteristics.

The Tel-A-Graph graphic producing facility does not permit the user to see the graphics until the final product is generated and imaged at the central computer. It produces a line drawing which is not in color. In addition, it requires an extended two-way transmission over telephone lines since the questions originate at the central computer.

Another system for automatically producing 35 mm slides, called "Genigraphics", has been developed by General Electric Company, Court Street Plant, Syracuse, N.Y. 13201. The Genigraphics system includes a dedicated minicomputer with a disk drive connected to a "console" comprising a low resolution color CRT and manual controls permitting a skilled operator to compose a picture. The console displays the exact picture (or any blown-up portion thereof) to be produced as a slide (i.e., with identical type size, fonts, and colors) but with reduced resolution. Once the picture is composed to the satisfaction of the operator, the raster data contained on the disk file is applied to a high-resolution CRT and photographic station where the picture is imaged and photographed to create the 35 mm slide. If desired, this raster data may be transmitted over telephone lines to a Genigraphics system at another location, so that the slide may be produced and picked up at that location.

So far as is known, the Genigraphics minicomputer is capable of supporting the operation of only one console at a time so that an entire machine is "tied up" by a single operator who is capable of producing an average of perhaps one picture every ten minutes. Since the console is relatively complex, and since the data defining the picture is generally entered directly by the operator using analog controls, rather than as answers to questions in an interactive mode, the Genigraphics operator must receive extensive training prior to using the machine. Furthermore, the machine is expensive to purchase so that its cost may only be justified in large graphic arts facilities which have sufficient volume to keep the machine in operation throughout the day.

SUMMARY OF THE INVENTION

It is an object of the present invention to provide a computer-based system for producing photographic pictures, such as 35 mm slides, (1) which is capable of generating an instant proof or mock-up of the picture (slide) without expensive specialized equipment (as in the Genigraphics system) and (2) which is capable of producing high resolution pictures (slides) in rapid succession without the requirement of extensive two-way dialog with a large-scale computer (as in the "Graphics/CSS" system).

This object, as well as further objects which will become apparent from the discussion that follows, are achieved, according to the present invention, by means of a system comprising a number of microcomputer terminals at scattered locations, a central computer at a location remote from these terminals and picture producing means for creating photographic pictures from computer generated data. The microcomputer terminals are each provided with a color display and input means for enabling the user to enter data. The terminals are programmed to generate and display in color a number of standard graphical representations having certain variable characteristics. A particular representation and its characteristics are entered by users through the terminal input as answers to questions presented by the terminal. The terminals are capable of modifying the display of a graphical representation in response to user entries which change the prior answers to the questions so as to create a set of final answers. When a graphical representation is complete, to the satisfaction of the user, data representing the user's final answers are transmitted from the terminals to the central computer. The central computer is programmed to generate data defining the raster from the information for a color CRT data representing the user's final answers. This raster data defines a graphical representation with enhanced resolution over that generated and displayed by the terminal. Finally, the picture producing means creates photographic pictures (slides) from the higher resolution raster point data generated by the central computer.

As used hereinafter, the term "slide" is intended to refer specifically to 35 mm photographic slides and, in general, to other types of photographic pictures, including prints, which may be photographically processed or developed from a latent image or negative.

BRIEF DESCRIPTION OF THE DRAWINGS

The foregoing and other features of the present invention will be more readily apparent from the following detailed description and drawings of an illustrative embodiment of the invention in which:

FIG. 3 is a layout for a box chart;

FIG. 18 illustrates the data format used to define a single symbol;

FIG. 19 is a diagram showing three typical symbols positioned in relation to a base line;

FIG. 20 is a diagram showing the character "C" arranged in a character space;

DESCRIPTION OF THE PREFERRED EMBODIMENTS

The preferred embodiments of the photographic picture generating apparatus according to the present invention will now be described in connection with FIGS. 1–46 of the drawings. In order to simplify this description, and to facilitate access to any specific item of information, the subject matter has been organized into numbered titles and sub-titles; these are set forth in the "Table of Contents" below:

| TABLE OF CONTENTS | |
|---|---|
| 1. | GENERAL SYSTEM DESCRIPTION |
| 1.1 | Microcomputer Display Terminals |
| 1.2 | Data Communication |
| 1.3 | Slide Production |
| 2. | MICROCOMPUTER DISPLAY TERMINAL OPERATION |
| 2.1 | Capabilities of the Terminal |
| 2.2 | General Program for the Terminal |
| 2.3 | Outline of a Box Chart Program |
| 2.4 | A specific Box Chart Program |
| 2.4.1 | Initialization Section |
| 2.4.2 | Create Section |
| 2.4.3 | Display Section |
| 2.4.4 | Modify Section |
| 2.4.5 | Identify Section |
| 2.4.6 | Color Tabulate Section |
| 2.4.7 | Slide Data Save Section |
| 2.4.8 | Get Slide Data Section |
| 3. | DATA TRANSMISSION |
| 3.1 | Slide Input |
| 3.1.1 | Slide Identification (Part 1) |
| 3.1.2 | Slide Specification (Part 2) |
| 3.1.3 | Printer Picture Specification (Part 3) |
| 3.1.4 | End Card (Part 4) |
| 4. | COMPUTER GENERATION OF DIGITIZED PICTURES |
| 4.1 | Symbol Data Processing |
| 4.2 | Symbol Library Format |
| 4.3 | Symbol Data Format |
| 4.3.1 | "TITLE" |
| 4.3.2 | "LENTH" |
| 4.3.3 | "IX" |
| 4.3.4 | "IY" |
| 4.3.5 | "IYD" |
| 4.3.6 | "IAREA1", IAREA2" |
| 4.3.7 | "IXD" |
| 4.3.8 | "Run-Length Encoded Data" |
| 4.3.9 | Kerning Data |
| 4.4 | Slide Computation |
| 4.4.1 | "INITIALIZATION" |
| 4.4.2 | "INPUT" |
| 4.4.3 | "TYPE-SET" |
| 4.4.4 | "PROCESS" |
| 4.4.5 | "OUTPUT" |
| 5. | PICTURE DISPLAY AND PHOTOGRAPHY |
| 5.1 | General Description of Hardware |
| 6. | APPENDIX |
| 6.1 | Box Chart Microcomputer Variables and Arrays |
| 6.2 | Representative Microcomputer Program |
| 6.3 | Representation Slide Computation Program |

1. GENERAL SYSTEM DESCRIPTION

The slide producing apparatus according to the present invention may comprise components which are specifically "hard wired" or otherwise dedicated, for example by means of firmware, to the specific tasks assigned to them. Preferably, however, each of the components of the system is an "off the shelf" commercially available unit which may be leased or purchased, programmed to carry out the desired functions, and connected together in the manner hereinafter described. In this way, these individual units may be utilized for purposes other than as components of the system according to the present invention, when they are not needed for use in the system.

1.1 Microcomputer Display Terminals

Figure 1:
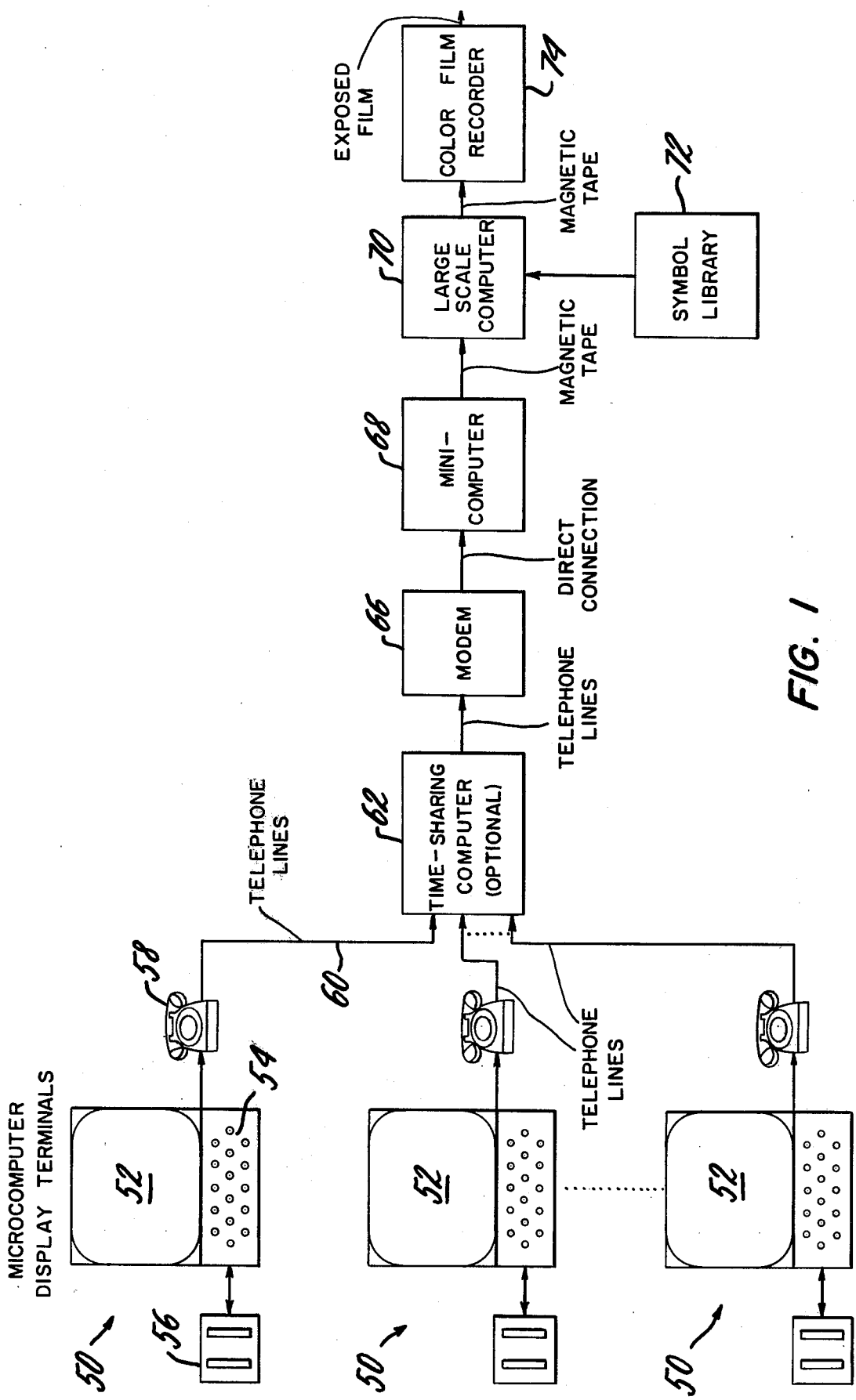
FIG. 1 is a block diagram of the overall system.

FIG. 1 shows the preferred embodiment of the system according to the present invention, in which each of the components or elements of the system are currently commercially available. The system comprises a number of microcomputer display terminals 50 each having a color display 52 and an input means such as a keyboard 54 and a floppy mini-diskette read/write unit 56.

A microcomputer display terminal suitable for use in this system is manufactured by Intelligent Systems Corp., 5965 Peachtree Corners E., Norcross, Georgia 30071. This machine is called the "Intecolor 8051 Desk Top Computer" and comes with a variety of options. In the configuration used in the system, it has a "dual floppy mini-diskette", two additional 8K RAM boards and a special keyboard with individual color keys. The machine comes equipped with operating system software provided by ISC and is capable of being programmed, in accordance with the present invention, to generate and display in color a plurality of standard graphical representations or "types" of slides which may be produced by the system. Because of the limited memory space in the terminal, there is a separate program for every type of slide. Some of the preferred types of slides frequently used in business presentations are as follows:

(1) Organizational charts and flow charts;
(2) Various kinds of text formats;
(3) Vertical bar charts;
(4) Horizontal bar charts;

(5) X-Y graphs showing line functions or areas;
(6) Tabular text charts;
(7) Pie charts.

As numerous other types of slides will occur to persons skilled in the art, the invention is not limited to any specific type or set of types.

Each separate program for a specific type of slide is stored on a floppy mini-diskette. When a user wishes to create a slide, he selects the diskette containing the program for the type of slide he desires, inserts it into one slot of the read/write unit 56, and reads the entire program into the microcomputer memory. Before commencing, the user also places a blank mini-diskette into the other slot of the read/write unit. However, it is also possible to use a single mini-diskette if the program is small enough to permit the output to be written on the same mini-diskette.

The microcomputer display terminal is now programmed to generate and display in color the selected standard graphical representation or "type" of slide.

The user then proceeds to interactively create a "slide specification" which will become the input data for the actual picture computation at a later time. When complete, the slide specification is written onto the blank mini-diskette to form a compact data file. The microcomputer terminal uses the slide specification to generate a coarse raster display which corresponds closely in appearance to a finished slide.

Each of the programs used to produce the various standard graphical representations initiates a question and answer exchange with the user which produces initial slide specification data such as the position of lines in a chart; the identity, font and size of text; colors, etc. Thereafter, the terminal generates a display from the current slide specification and permits the user to change individual attributes thereof. For example, after seeing the initial display, the user may wish to change the type size or color of certain text to improve the appearance of the picture. This modification effectively changes the answers to the questions presented by the terminal to create a final slide specification. Some of the features of the slide are invariable during its initial creation, but can be changed during the modification procedure, e.g., drop shadows, insets, etc.

1.2 Data Communication:

Once the slide specification data representing the user's final answers has been written onto a mini-diskette, this data must be transmitted in some way to a central computer for generation of the fine picture raster data required to produce the slide. A number of communication techniques may be used for this purpose:

(1) The mini-diskette may be mailed or delivered by messenger to the location of the central computer.

(2) The data may be transmitted over regular telephone lines directly to the location of the central computer.

(3) The data may be transmitted over telephone lines in a time-sharing network and stored in a time-sharing computer. At periodic intervals the time-sharing computer may be polled and all the accumulated data sent over telephone lines to the location of the central computer.

The last type of system is illustrated in FIG. 1. In this configuration, the microcomputer terminals 50 supply data to standard telephones 58 at relatively slow speed (300 Baud). This data is transmitted over telephone lines 60 of a time-sharing network to the large scale computer 62 of the time-sharing system. This computer simply serves as a temporary storage facility so that data from various terminals may be collected and subsequently retransmitted in batches to the slide producing facility. The time-sharing computer may contain a formating program to convert data to a different format, if desired, and a clerical program to keep track of the time-sharing system activity and maintain a record or file of the slide specifications received. Upon request, or at specified times during the day, the time-sharing computer sends the accumulated data at high speed (4,800 Baud) over regular telephone lines 64 to the slide producing facility.

Existing well-known time-sharing systems, suitable for use with the system of the present invention, are Boeing Computer Services, Inc. (BSC), National CSS and University Computing (UCC).

Whether the data is transmitted by the time-sharing system, or transmitted directly over regular telephone lines, this data is received by a sender/receiver modem 66 and passed to a minicomputer 68. A modem suitable for use in the system is available from General Data Communications, Kennedy Avenue, Danbury, Connecticut 06810. A suitable minicomputer is available from Minicomputer Systems, 525 Executive Boulevard, Elmsford, N.Y. 10523 under the tradename "Micos-Mini". The modem and minicomputer are plug compatible and may be connected directly together. It is also possible, however, to go directly to a large scale computer that receives the data, makes the necessary calculations and drives a color slide recorder.

1.3 Slide Production

The purposes of the minicomputer are (1) to collect and store the slide specification data on a disk file, (2) to convert the data to a format acceptable to the particular computer which is used for generating the high resolution picture raster data, and (3) to write this converted data onto a magnetic tape. The minicomputer may also contain a clerical program which creates and maintains a file for accounting purposes.

The magnetic tape, which may contain the slide specifications for hundreds of slides, is read by a large scale computer 70 such as an IBM 360/75. This computer performs the detailed computation necessary to generate the data defining the picture raster points for each slide. Alphanumeric characters and other useful symbols such as logos and the like are accessed by the computer, as needed, from a symbol library 72 maintained on a disk file. The computer composes the picture by placing the selected characters, boxes, bars and the like in their respective proper positions; computes the raster data for each successive horizontal scan line and writes this data, in run-length encoded format, onto a magnetic tape. In the preferred embodiment, the picture raster is 1344 elements high by 2016 elements wide. This raster has a height to width ratio of ⅔ which is the same as that for a slide.

Finally, the magnetic tape generated by the computer 70 is supplied to a digital color recorder 74 to produce the slide. This device comprises a high resolution CRT, a color wheel containing red, green and blue filters, and a photographic camera arranged to view the CRT screen through the filters. The raster data contained on the magnetic tape is used to control the CRT and color wheel for each color picture taken by the camera. After a sequence of pictures are taken by the camera the exposed film is removed and processed photographically to produce the color slides.

A picture imaging and photography unit suitable for use in the system according to the present invention is available from Constantine Electronics Company, 70 Constantine Drive, Mahwah, N.J. 07430 under the model designation "Celco CFR 2000".

2. MICROCOMPUTER DISPLAY TERMINAL OPERATION

2.1 Capabilities of the Terminal

The microcomputer display terminals 50 may be any type of microcomputer with a color display, but the preferred terminal is the Intecolor 8051 Desk Top Computer with a dual floppy mini-diskette drive 56, two additional 8K random access memory (RAM) boards and a special keyboard 54 with individual color keys. The Intecolor computer has several internal PLOT programs that allow for the display of graphic information on the CRT display 52 with a resolution of $160 \times 192$ elements. These PLOT programs are firmware programs in the sense that they are stored in read only memories (ROM's) and are used with the programs that create and display a rough approximation of a slide on the CRT.

For each basic type of slide there is a separate program. Examples of these basic slides and programs are as follows:

| Program Name | Type of Slide |
|---|---|
| 1. BOX | Organization charts or flow charts (Fig. 8) |
| 2. WORD | Various kinds of text slides (Fig. 9) |
| 3. V BAR | Vertical bar chart (Fig. 10) |
| 4. H BAR | Horizontal bar chart (Fig. 11) |
| 5. AREA | Line graphs or area charts (Fig. 12) |
| 6. TAB | Tabular text charts (Fig. 13) |
| 7. PIE | Pie charts (Fig. 14) |

Figure 2:
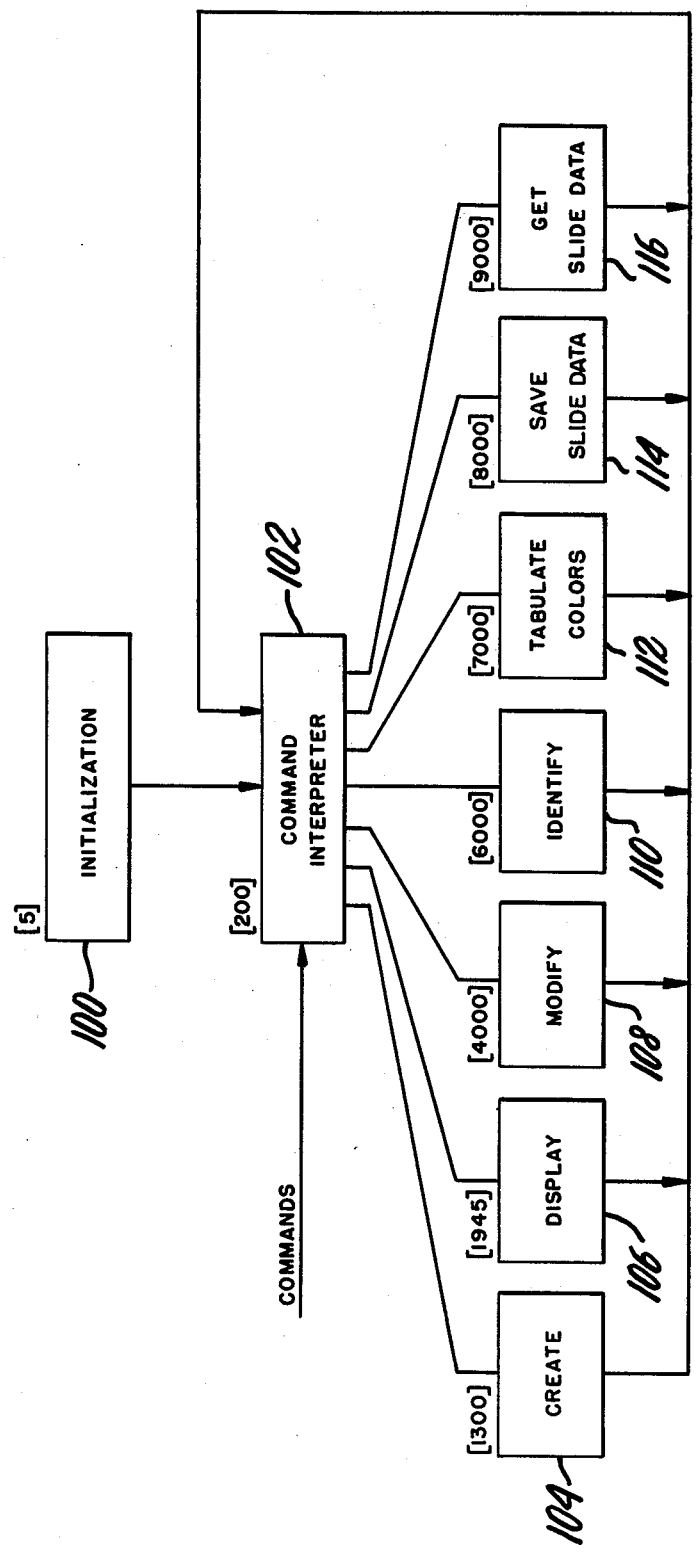
FIG. 2 is a flow chart for the program used in the slide generating terminal.

The programs themselves all have the form shown in FIG. 2. A program arrangement of this sort operates in an interactive manner; i.e., the program will ask for a command or the answer to a question and will complete some operation in response to the answer. It will then ask for the next command or ask the next question. Because of the interaction, the system is easy to use and the results are easily modified.

2.2. General Program For the Terminal

In operation the first part of the terminal programs is an initialization section 100, which initializes the system by setting the values of certain constant parameters. This data will depend on the basic slide program chosen. After initialization the program moves to a command interpreter section 102. In this section the computer will ask the user what he wants to do. This is done by the computer printing a question on the CRT display in one color and waiting for the user to type in the answer on the keyboard. The user's answer is displayed on the CRT in a different color. The colors chosen for this are set up during the initialization steps.

At this point the user can type in the code "CRE" for a create section 104 of the program that allows for the creation of a new slide. Alternatively, the user could call up the slide specification data of a previously generated slide that is stored on one of the disks. This is done with the command "GET" which accesses a "get slide data" portion 116 of the program. The create section of the program asks the user a series of questions about the slide he wants. Once this has been completed the program returns to the command interpreter section 102 and asks for the next command. In order to get a rough idea of what the finished slide will look like, whether it is newly created or retrieved from a disk file, the user can type in the command "DIS" and the program will branch to a display section 106. The routine in section 106 uses the internal PLOT functions in the Intecolor computer and the answers to the questions in the create section or the retrieved slide data to plot an approximation of the slide on the CRT display. Once the display is completed the program again returns to the interpreter section for a new command.

It is likely that the user would not be satisfied with the first arrangement selected for the slide. To make the desired changes he would type in "MOD" which directs the computer to a modify section 108 of the program. This section is like the create section 104 in that it asks the user a series of questions concerning the modifications he would like. Also, like the create section, this section returns to the command interpreter section once it has been completed. By again typing in the display code, i.e., DIS, a modified approximation to the finished slide is displayed.

A system of identifying the user and the slide makes use of an identify section 110 of the program that is addressed with the command "IDE". This section is interactive and questions the user about his identity and the designation of the slide. A color tabulate section 112 of the program allows the user to assign any one of the 64 colors available in the high resolution slide making device 74 of FIG. 1 to any one of the 8 colors available at the terminal. The 64 colors have a code number associated with them and program section 112 requests that the user supply a code number for each of the 8 basic colors used at the terminal.

Figure 7:
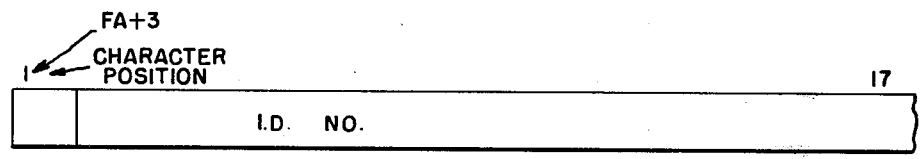
FIG. 7 is a table showing the organization of the slide specification data generated by the slide terminal.
Figure 7:
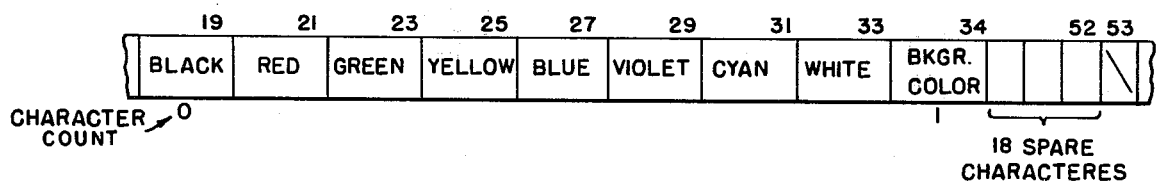
Figure 7:
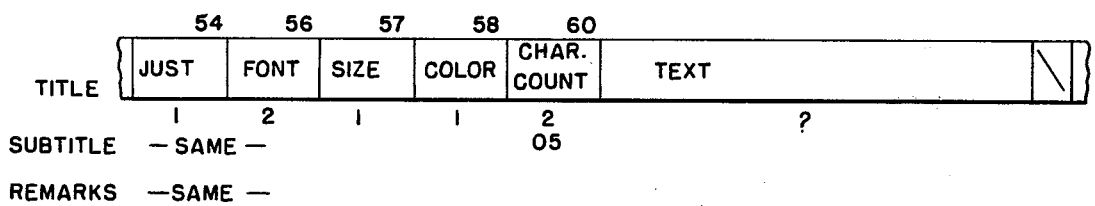
Figure 7:
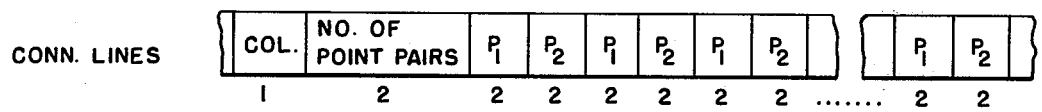
Figure 7:
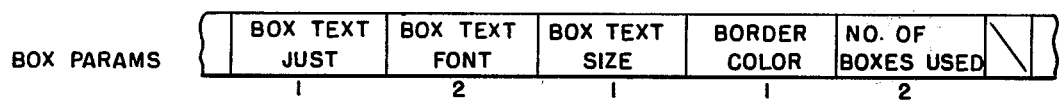
Figure 7:
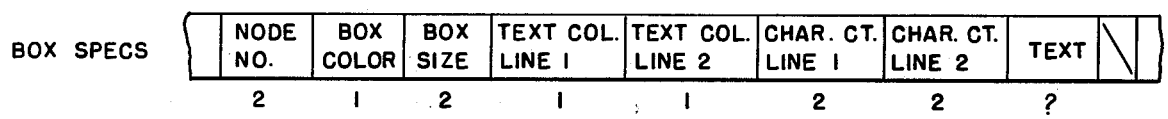
Figure 7:

If the last version of the slide is acceptable the user can enter a save code, "SAV", which will send the program to a "save slide data" section 114 of the program. This program section stores the data specifying the slide on one of the disk files. The slide specification data is in compressed form and appears in the arrangement shown in FIG. 7. This data is all that is needed to control the creation of a high resolution slide. Typically the data file of FIG. 7 has 400–500 characters with each character transmitted as an 8 bit binary word, i.e., a typical complete slide specification has 4,000 bits of data. However, the final high resolution slide machine creates a picture with $1344 \times 2016$ picture elements having any one of 64 colors (6 binary bits) thus representing 16,257,024 binary data bits. Hence it can be seen that the data of FIG. 7 represents a significant compaction of the slide data. As a result there is very little time used in transmitting this data over a time-sharing system and, consequently, there is a cost savings to the user. Also it should be noted that no time-sharing facilities are used during the creation of the slide data.

2.3 Outline Of A Box Chart Program

Any of the various basic slides shown in FIGS. 8–14 and others, can be generated by using programs of the type shown in FIG. 2. Creation of such programs is well within the ability of a programmer skilled in the art if the manual supplied with the Intecolor computer is used and the flow chart of FIG. 2 is studied. Nevertheless, by way of example a typical program for generating an organization chart will be explained with reference to the flow charts of FIGS. 2 and 4-6 along with the variable and array identification of Appendix 6.1, and the program listing of Appendix 6.2.

Figure 3:
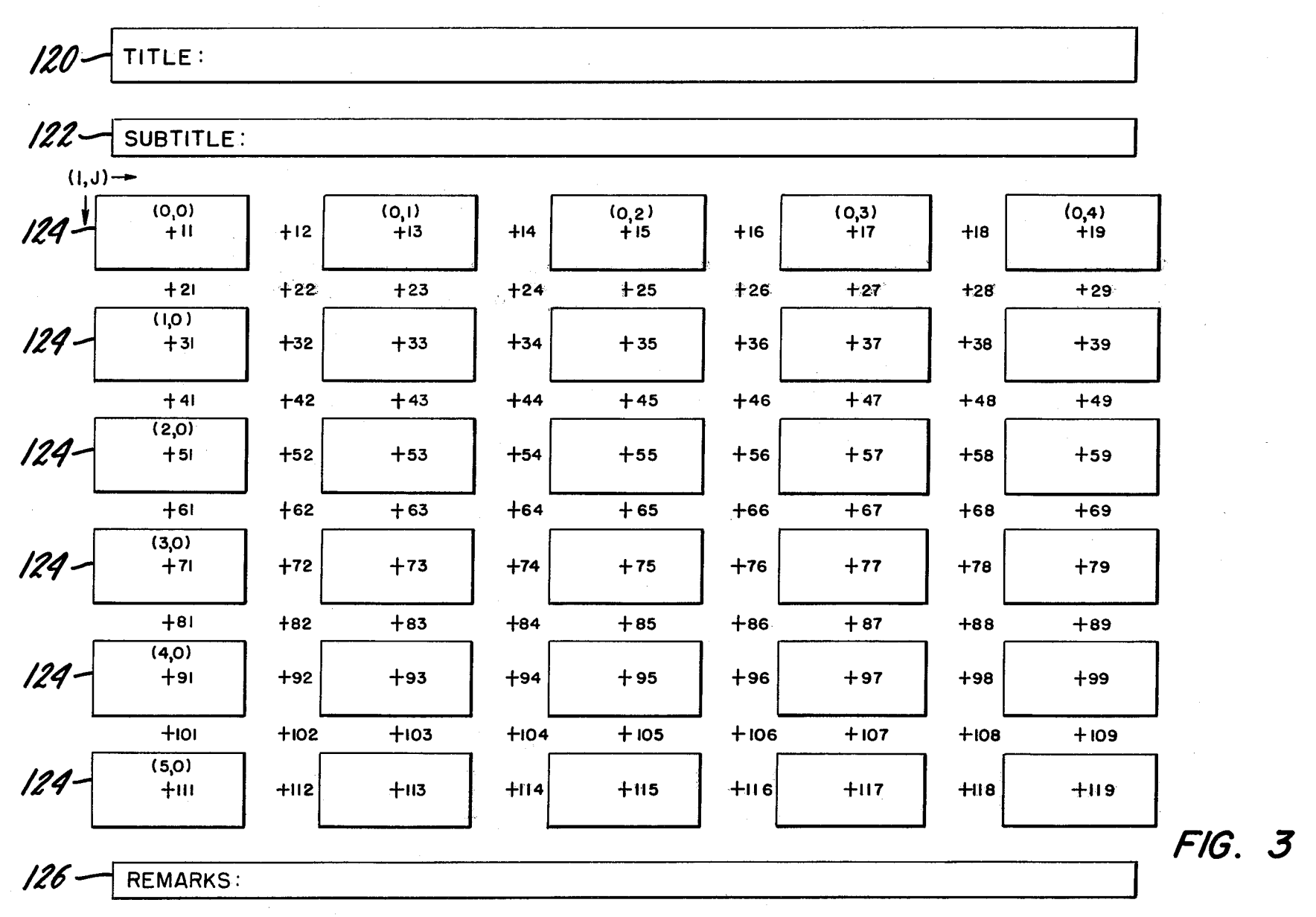

FIG. 3 shows a layout for a box chart that can be used to plan organization or flow charts. A space 120 at the top is provided for the title, while space 122 below it is provided for the subtitle. Below the subtitle there is an arry (I,J) of boxes 124. In this example there are six rows (I) and five columns (J) making a total of 30 available boxes. Each box is assigned an identifying number and points intermediate the boxes are also given numbers. At the very bottom there is a space 126 for remarks. The grid on which this arrangement is laid out corresponds to a portion of the 160×192 element grid of the terminal CRT.

The program for this basic type of slide would ask the user for the title, its color, its font, its size and its justification (i.e., left, center or right). The same questions would be asked about the subtitle and the remarks. The boxes for the flow chart would be designated by entering their number. The program then changes the box number into a row and column code (I, J). The color of the box, the text in the box, the color of the text in the box and the justification of this text are then entered. Connecting lines, showing lines of authority or flow paths in a process, are next specified by naming box numbers or intermediate points at the beginning and end of the connecting lines.

The program has equations in it that specify where the title space is to go depending on its size and justification. The same applies to the subtitle and remarks. The box locations and dimensions are also set by equations in the program depending on the (I, J) code. From this it can be seen that any basic slide can be established by using a layout such as FIG. 3 and by using equations in the program to create a display according to the layout. For example, a vertical bar chart program could have an arrangement similar to FIG. 3. A particular number and arrangement of bars could be given along with identifying numbers. The program would have equations that would define the bars in terms of their position and height. Text could also be positioned as a title and subtitle. In addition text could be arranged to identify the bars. This shows that modifications within the skill of an ordinary programmer would allow the basic concept of the box chart program to be changed to represent vertical bar charts, horizontal bar charts, etc. However, it should be understood that the present invention resides in a unique combination of programmed data processing equipment and not in any particular program used to operate part of that combination.

2.4. A Specific Box Chart Program

2.4.1 Initialization Section

The specific box chart program of Appendix 6.2 corresponds to the flow chart of FIG. 2 and is capable of generating the slide of FIG. 8. The main initialization section 100 of this program begins on line [5] of the program listing as indicated in square bracket in FIG. 2. During this portion of the program standard values for the program, e.g., title and subtitle size, are loaded. Also the colors are set in which the questions and answers are displayed. Some of this data is later used by utility subroutines in the program, i.e., lines [2000] to [65009]. Once the initialization has been completed the program drops into the command interpreter section 102 that begins at line [200]. The user may then type in a command and its first three letters are checked to see if they represent a valid command. If not, the display prints "TRY AGAIN" and lists the allowable commands. Near the end of this routine there are safety steps to make sure that a command to cancel or finish was really intended.

2.4.2 Create Section

Figure 4:
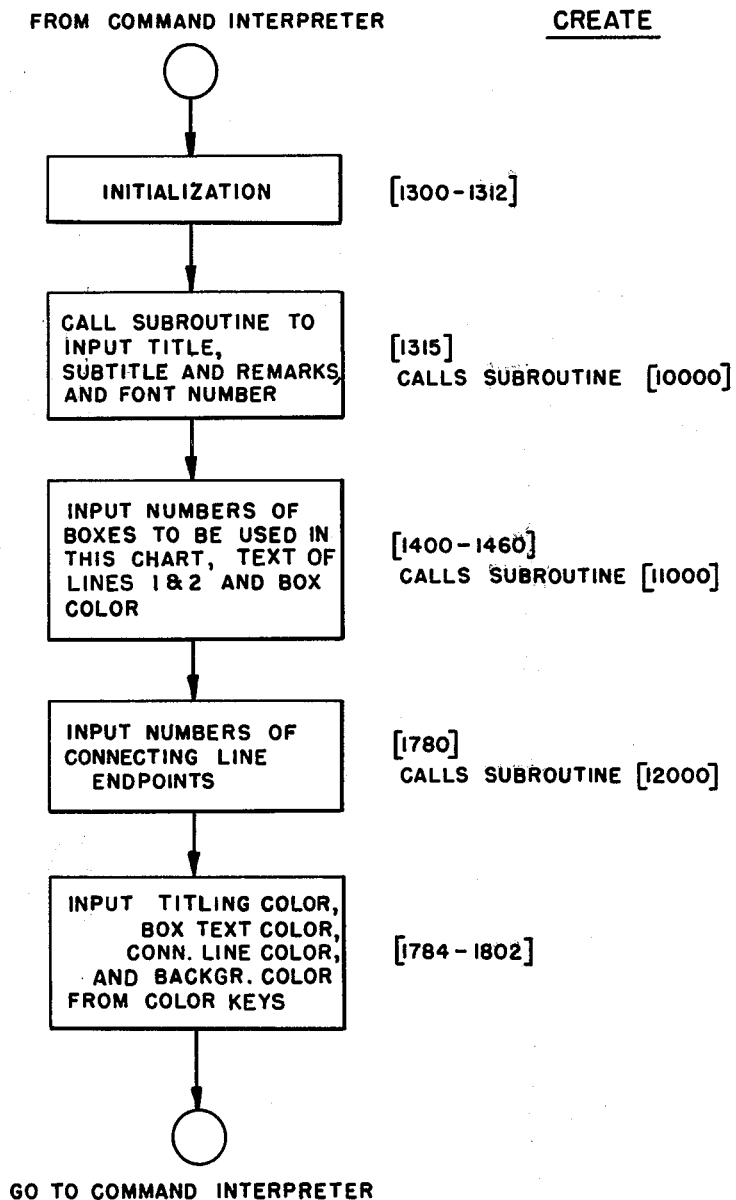
FIG. 4 is a flow chart of the create section of the flow chart of FIG. 2 for a box chart program.

If the procedure set forth in section 2.2 of this application (i.e., "General Program For The Terminal") is followed, the user would type in "CRE" and the program would branch to the create section 104 which begins on line [1300] of the program. A flow chart of the create section is shown in FIG. 4. As can be seen from the flow chart, this section is generally straightforward, although it utilizes a number of subroutines. Lines [1300] to [1312] of the program initialize variables used in this section and inform a user trying to create a chart if he has already done so. Once this has been completed line [1315] calls up a Title Input subroutine located at line [10,000]. This routine asks the user to type in the title. The questions are asked in one color and the response is displayed in another color because the Two-Color Text Inputter subroutine at line [20,000] is called in this routine [See line 10020]. Also the text is checked to see if there is an illegal character by the Illegal Character routine located at line [20600]. If there is an illegal character this subroutine prints "ILLEGAL CHARACTER. TRY AGAIN". After a valid title has been entered the Title Input routine skips from line [10040] to line [10250]. The intervening steps are used in the modify section 108 of the program. The remainder of this subroutine requests the font number or style and checks to see if it is available. The program then increments the variable TV (I) to request the same information for the subtitle (space 122 of FIG. 3) and then the remarks (space 126). it should be noted that the font size, justification and color of this textural information was set during initialization. However, during a modification procedure these sections of the title input routine are reached and these values can be changed. Once the title, subtitle and remarks have been specified the subroutine directs the computer to line [1400] of the create section of the program.

Beginning at line [1400] as shown in FIG. 4 the program interacts with the user to specify the boxes required from those available in FIG. 3. At line [1420] the program displays "BOXES USED (INPUT O WHEN DONE)". At this point the program calls the Box Input subroutine located at line [11,000]. The user then begins to type in the number of boxes he wishes to use in respone to a "BOX NO." question from the computer. For example to create the chart of FIG. 8 the user would begin by typing in 13 to designate the box at (I, J) coordinates (0, 1). Lines [11215] to [11260] of the Box Input subroutine check the box number typed in by the user to see if it is a legal number and then convert it into (I, J) coordinates. Next the computer asks "BOX COLOR (TO DELETE A BOX, TYPE /D/ INSTEAD". The user enters the color and then lines [11345] to [11410] of the program check to make sure it is a legal color. If not, the program states "TRY AGAIN". These steps also keep track of the number of boxes designated. The remainder of the Box Input subroutine asks the user for the text of the first and second lines in the box and informs the user that he can enter only 11 characters. In the example of FIG. 8 the user would type in "model" for the 1 and "definition" for line 2. This process repeats until the user has specified the location, color and text of all the boxes he wishes to use. In the example of FIG. 8 this would be boxes 13, 17, 35, 75 and 115 of FIG. 3. By typing in an "0" the computer is directed to line [1780] of the create section 104 of the program. From this step the computer branches to the Connecting Line Input subroutine at line [12,000] of the program. In another interactive process the computer asks the user to enter "CONNECTING LINES (ENTER 0 WHEN DONE)", "FROM" and "TO". By typing in the beginning and ending points for the connecting lines, they are specified. Referring to FIG. 3 the points of the connecting lines for FIG. 8 are (13, 33), (33, 37), (17, 37), (35, 75), (74, 76), (74, 114), (76, 116) and (114, 116). Even though the connecting lines are drawn into and through some boxes this will not appear in the final version because the background color for the box will cover any connecting line within a box, thus making it appear to end at the edge of the box. Lines [12140] to [1220] of the program check to see if the point pairs are legal; diagonal lines are not permitted. This subroutine repeats until "0" is typed or fifty lines are specified. Then control returns to the create section of the program at line [1784]. From this step the end of the create section the computer asks for the color of the titles, box text, connecting lines and background. Once these have been specified by the hitting of the color keys on keyboard 54 the program control returns to the command interpreter section 102 of the program (FIG. 2) at step [200].

2.4.3 Display Section

All of the steps required to create the slide at this point have been performed with the microcomputer and there has been no use of the time-sharing system. As a result there is a considerable savings in the cost of creating the slide. Normally at this point the user wants to see a rough approximation such as FIG. 8A, to the final slide he has specified. This is done by entering the command "DIS".

Figure 5:
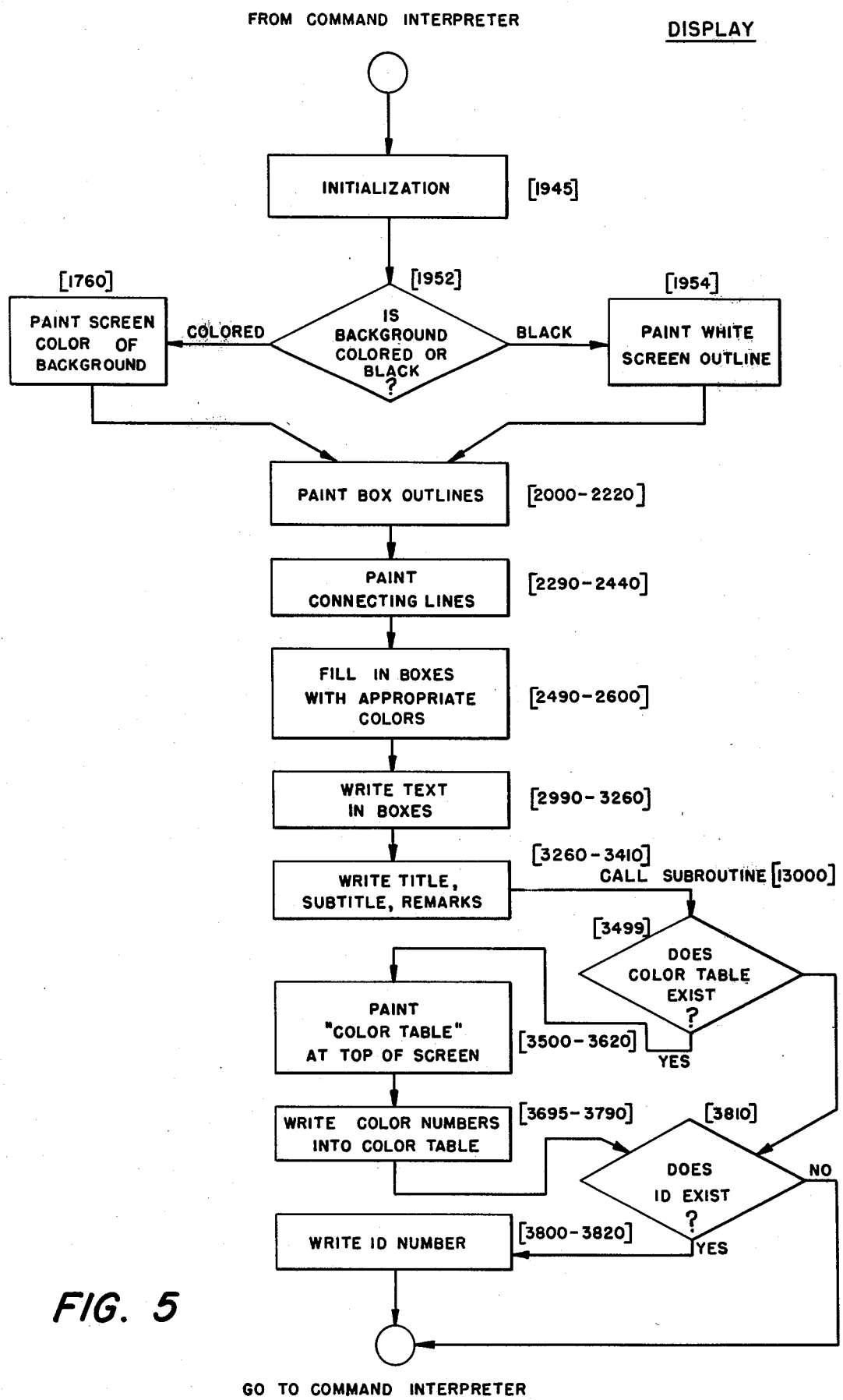
FIG. 5 is a flow chart of the display section of the flow chart of FIG. 2 for a box chart program.

As can be seen at line [224] of the program listing in Appendix 6.2 the "DIS" command causes a branch to line [1945] which is the display section 106 of the program. A flow chart of this section is shown in FIG. 5. The program first initializes the computer by setting the terminal in page mode, setting the background color, and erasing the display screen. Also, a decision is made (line [1952]) about whether to paint a white outline showing the area of the slide. This is done only if the background is black. If the background is some color the extent of the background color will show the limits of the slide. The horizontal lines for the boxes are drawn by program steps [2000] to [2105]. The vertical sides of each box are drawn by the program steps [2120] to [2220]. Next the program adds the connecting lines in step [2290] to [2440]. Program steps [2490] to [2600] fill in the middle of the boxes with the colors specified by the user. Lines [2990] to [3410] of the program, through the use of a Title Display subroutine beginning at line [13,000], act to position and display the text in the box, the title, subtitle and remarks, all in the appropriate colors.

The remainder of the display section of the program checks to see if a color table has been specified [line 3499], adds a color table to the top of the slide and displays the color numbers selected for each color displayed, if the color table exists. This part of the program also checks to see if the user's identification number has been specified line [3810] and, if it has, it prints the user's identification number. These functions will be discussed in more detail in connection with sections 110 and 112 of the program.

At the end of the display section of the program, control is returned to step [200] of the command interpreter section 102.

Figure 8A:
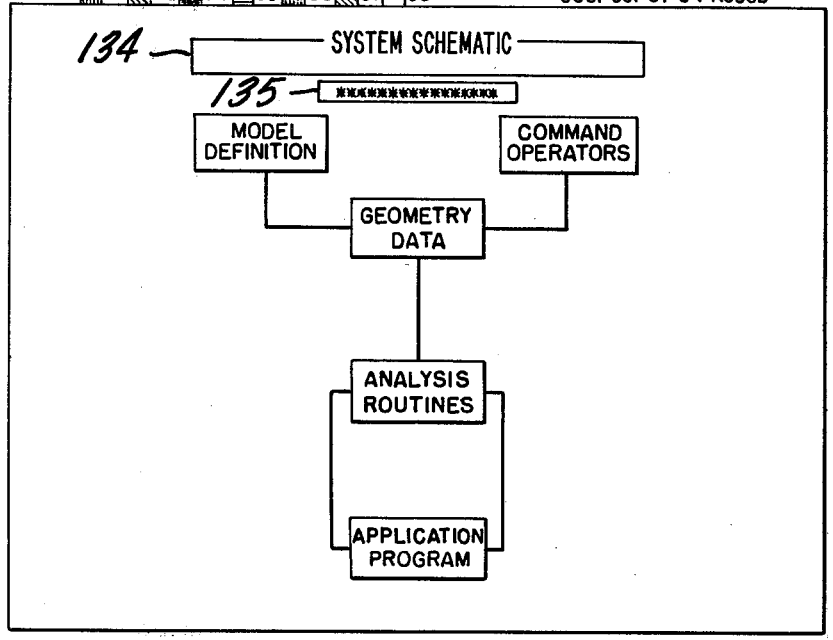
FIGS. 8A and 8B are box chart slides created according to the invention as displayed at the terminal and as a finished slide, respectively.
Figure 8B:
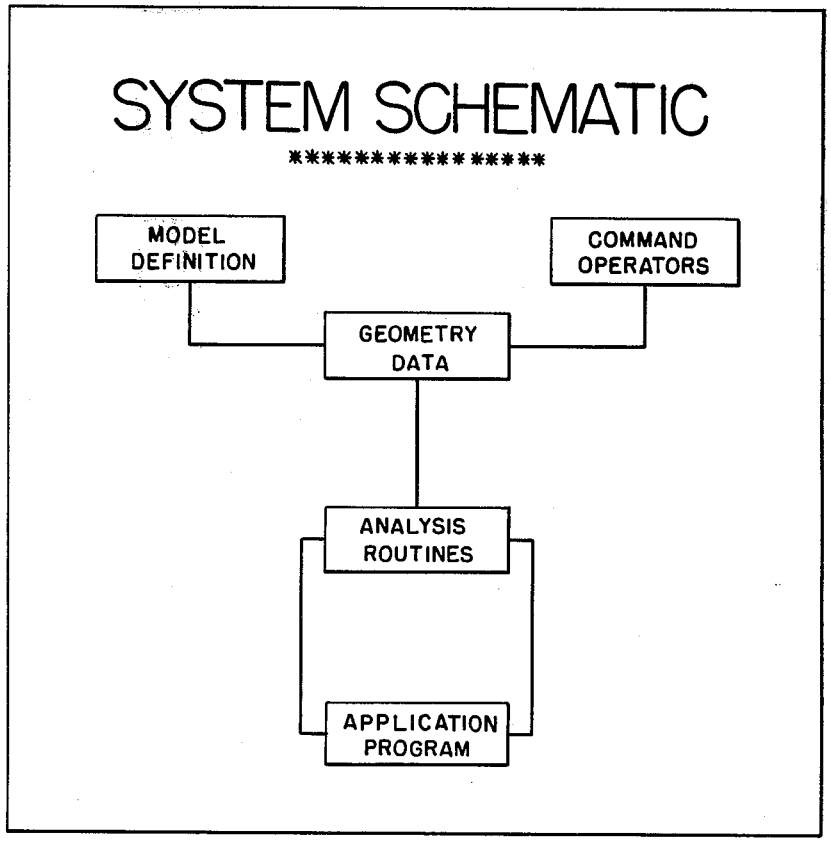
Figure 9:
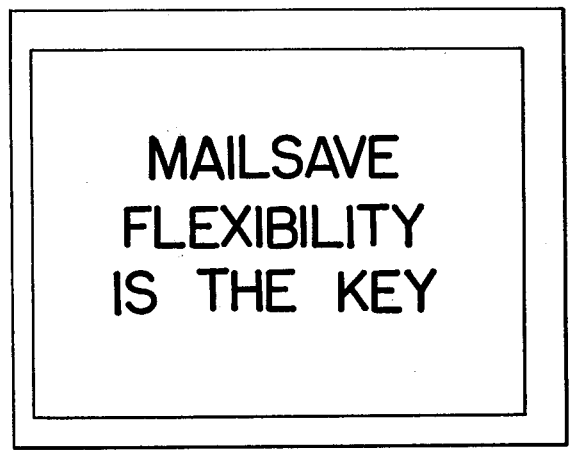
FIG. 9 is a text slide created according to the invention.
Figure 10:
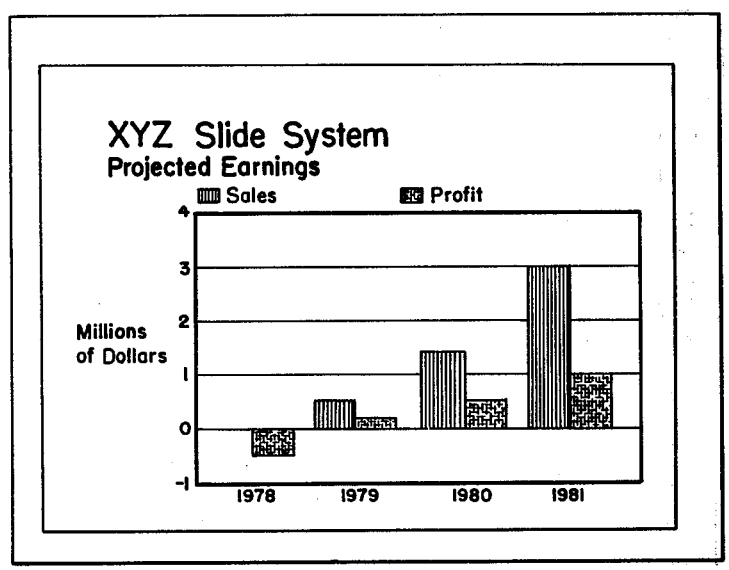
FIG. 10 is a vertical bar chart slide created according to the invention.
Figure 11:
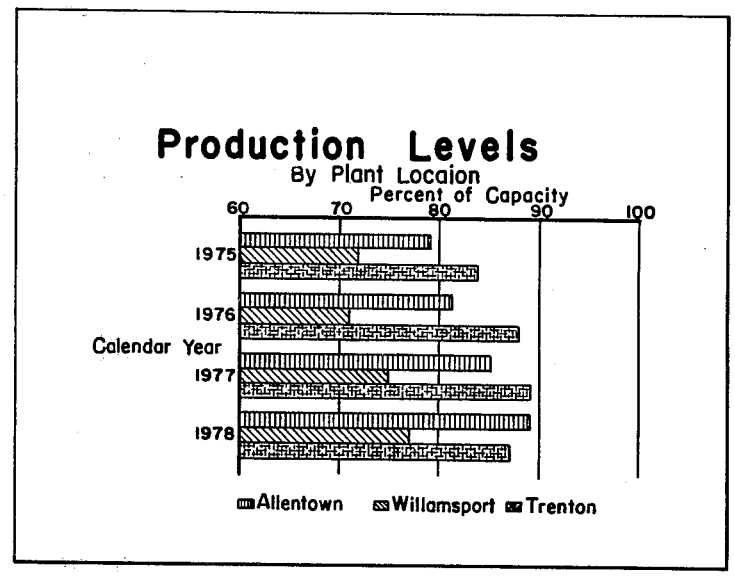
FIG. 11 is a horizontal bar chart slide created according to the invention.
Figure 12:
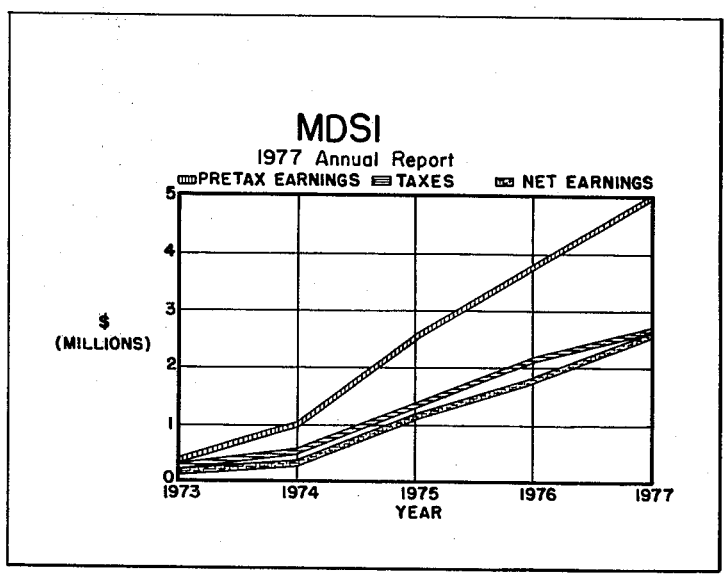
FIG. 12 is a line graph slide created according to the invention.
Figures 13, 14:
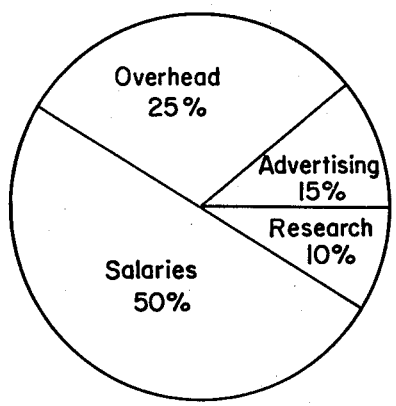
FIG. 13 is a tabular text chart slide created according to the invention.
FIG.14 is a pie chart slide created according to the invention.

Since up to this point there had been no input under the identify section 110 and the tabulate colors section 112 of the program, the resulting display on the CRT screen will not show this information. If it had been added the identification code 130 would appear at the upper right corner of the display and the color table 132 would be at the upper left corner as shown in FIG. 8A. In any case the user will see the boxes he selected in the appropriate locations and connected with the correct connecting lines. The titles, subtitles and remarks will be in a standard size and font, not the final form as shown in FIG. 8B, as will the text in the boxes. Rectangular areas 134 and 135 will be outlined to show the space that will be taken up in the finished slide by the actual title and subtitle (compare FIG. 8B). If there were remarks in the slide of FIG. 8 a rectangular area further would be displayed also. All of the colors selected will be used in their correct location.

2.4.4 Modify Section

Figure 6A:
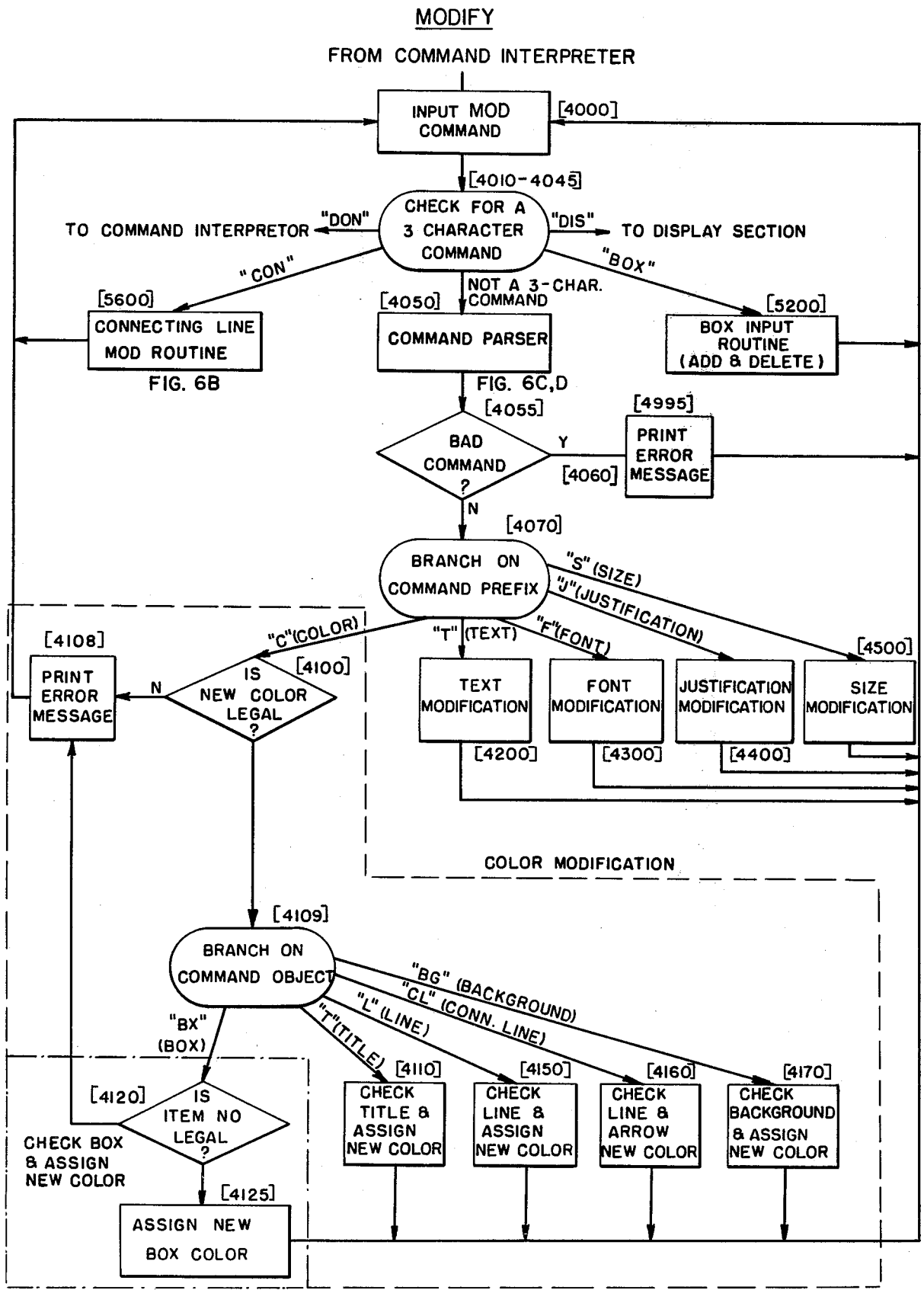
FIGS. 6A, 6B, 6C and 6D are flow charts of the modify section of the flow chart of FIG. 2 for a box chart program.

It may be that the user is not satisfied with the slide and wishes to modify it. This is done by typing in the command "MOD" which causes the program to branch at line [228] to the modify section 108 of the program located at line [4000]. An overall flow chart of the modify section is shown in FIG. 6A.

In the modify section of the program the user is requested to "ENTER MODIFICATION" in one color and his response is displayed in another color because of the utility subroutine at line [20,000]. Depending on the command entered the program branches in several directions. If the command is "BOX" the program control goes to line [5200] which is the start of the Box Input subroutine located at step [11,000] as discussed in the create section. With this subroutine the user can add or delete boxes that were specified in the create section. Once this has been completed control is returned to step [4,000] for the next command.

Figure 6B:
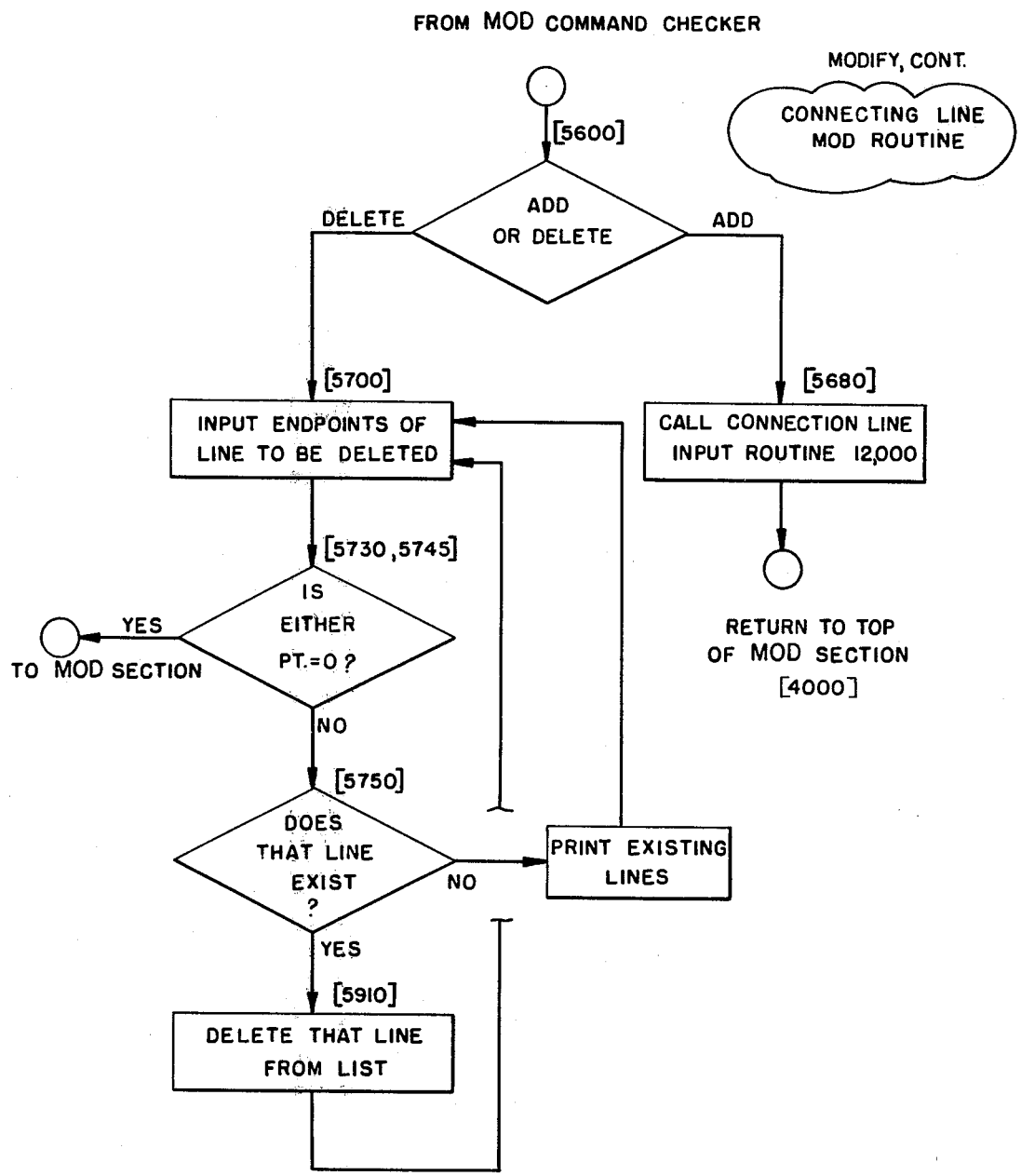

A command "CON" causes the modify section of the program to branch to step [5600] which begins an interactive subroutine shown in FIG. 6B that permits the deletion or addition of connecting lines. Steps [5600] to [5690] add new connecting lines and steps [5700] to [5994] delete lines. The decision so to what is to be done is made by the user by typing in an "A" or a "D" so as to branch the program to either the add or delete section of the program. The adding of lines is under the control of the Connecting Line Input subroutine at line [12,000], which subroutine was discussed in the create section. When all the lines have been added or deleted the user types in an "0" and the program returns to step [4000]. The delete section first requests the "LINES TO BE DELETED, FROM, TO". If either the "from point" or the "to point" is zero the program returns to line [4000], i.e., the beginning of the modify section 108. If neither point is zero the program checks at line [5750] to see if there is any such pair. If there is no such pair the program notifies the user and lists the lines that have been selected so that a proper choice can be made. Then the program asks for a new selection. In the situation where the choice of points does represent an existing line the program deletes that line in a series of steps beginning on line [5910]. After the line is deleted the program returns to line [5700] and asks for the next pair of points defining a line to be deleted. When all of the lines have been deleted the user can return to the command interpreter section of the program by typing in a "0".

A command "DON" (FIG. 6A) indicates there are no further modifications and the program returns to the command interpreter section. Alternatively, the user can type the command "DIS" which will send the program to display section 106 without going through the command interpreter section.

Besides the special commands (i.e., BOX, CON, DON, and DIS) the modify section can also operate on general commands of the form: XY=Z. The X is a single character prefix that specifies the characteristics to be changed, i.e., "C" for color, "T" for text, "F" for font, "J" for justification and "S" for size. The Y represents several characters indicating the object and item to be changed, such as BX15L2 for line 2, box 15. The other objects are "T" for title, "L" for line, "CL" for connecting line and "BG" for background. In the command, Z represents the new value of the object and item. Therefore, the general command "TBX13L1=SAMPLE" would change the first text line of box 13 from "Model Definition" to "Sample Definition". (See FIG. 8A).

Figure 6C:
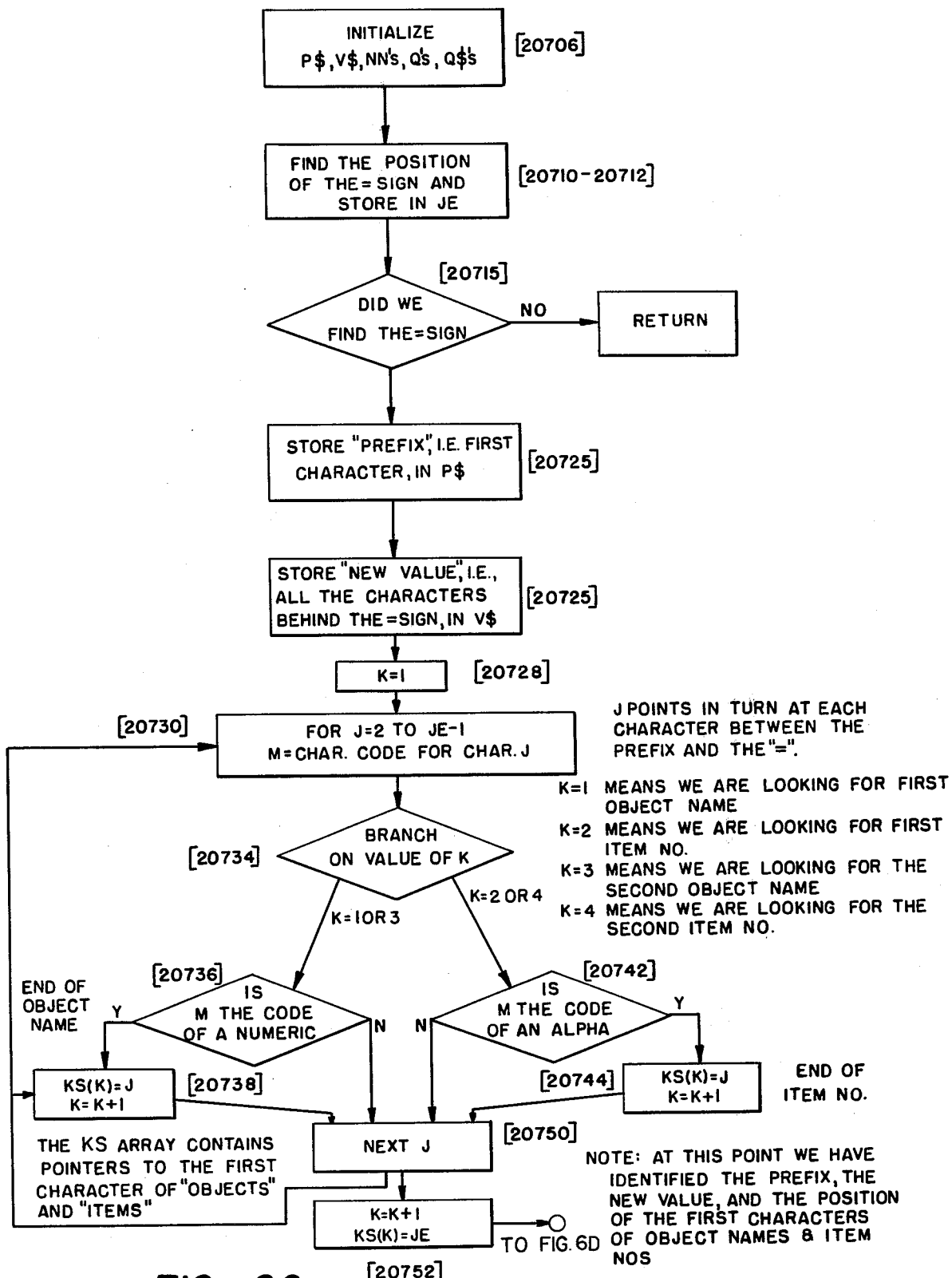
Figure 6D:
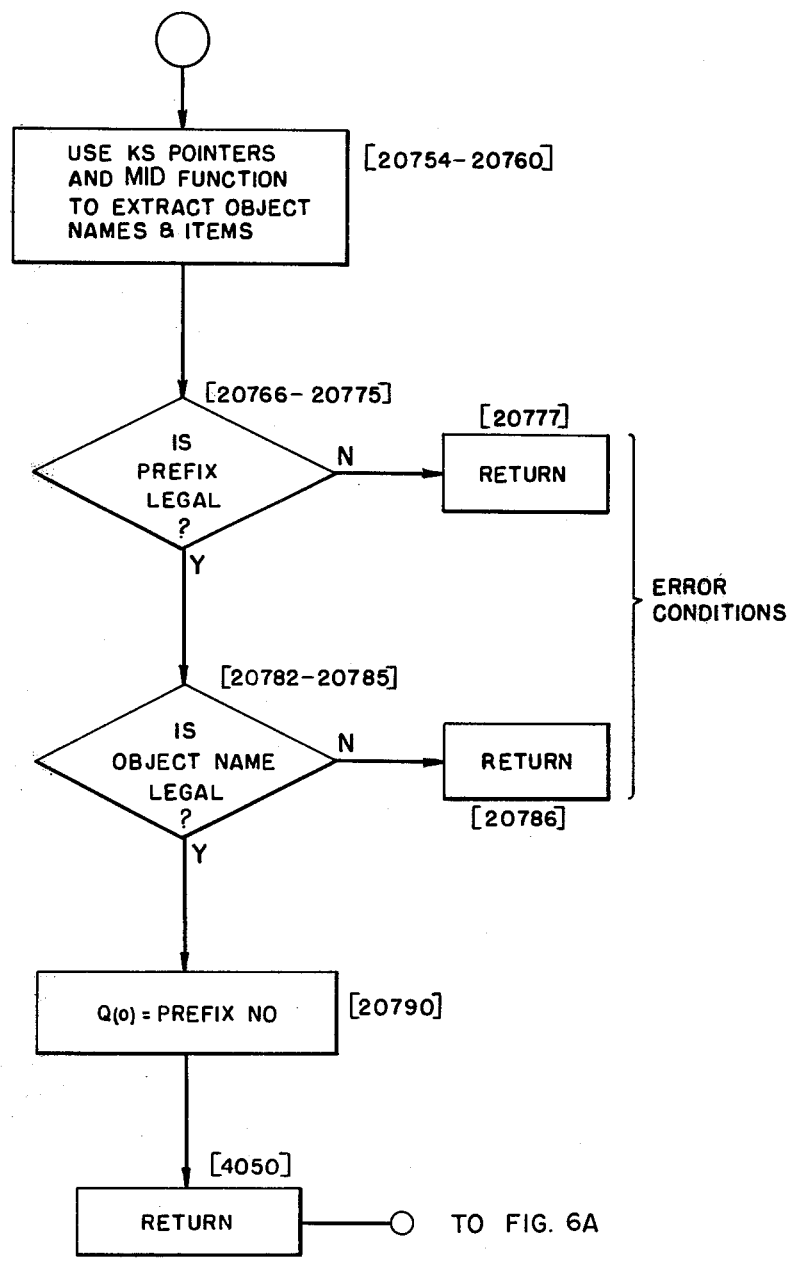

When a general command is typed in, the modify section of the program calls Change Command Parser utility routine that begins at line [20,700] and ends at line [20790]. This subroutine, which is shown in FIGS. 6C and 6D first initializes certain variables and then checks for the existance of the "=" sign at line [20715]. If it does not exist the routine ends; if it does exist the prefix and the new value are stored. In essence this subroutine disassembles the command into its component parts through the use of a variable J and branch instructions on lines [20734], [20736] and [20742]. The variable J successively represents each character of the command before the "=" sign. This J is checked to see if it is an alphabetic symbol or a number and whether it is the end of the code. As a result, the prefix, the object and the item are identified. Then in the part of the routine shown in FIG. 6D the parts of the command are separated at lines [20754] to [20760]. The validity of the prefix and object name are tested by the part of the routine at lines [20766-20775] and [20782-20785], respectively. However, the validity of the item number is not checked at this point. From this routine the program goes to step [4050] (FIG. 6A) which checks to see if the command has been found to be valid. If it has not, the program branches to line [4060] and then to line [4995] which prints the error message "NO SUCH OBJECT!TRY AGAIN" and returns to the beginning of the modify section. If the command is valid the program proceeds to line [4070] where a branch instruction controlled by the prefix is located.

In FIG. 6A the routine after a branch instruction for a "C" prefix is illustrated. The others are similar and return the program control to step [4000] when they are complete. In particular a "T" (i.e., text) branches the routine as the text modification section at line [4200], "F" (font) goes to the font section of line [4300], "J" (justification) to line [4400] and "S" (size) to the size modification section at line [4500]. The "C" prefix branches the program to line [4100] where a decision is made as to whether the new color is legal. If it is not, the error message at line [4108] is printed and the program returns to step [4000]. When the color is legal the program moves to line [4109] which is a branch command on the object, i.e., depending on the object the program control branches to different parts of the program. As an example the program branches to step [4120] if the object is a box, i.e., a command containing BX. This part of the program checks to see if the item number is legal and then assigns the new color to the box at step [4125]. Then the program cycles back to the input modify command line [4000].

The other branches from line [4109] work in a similar manner and return the program to line [4000] once a command has been completed. If the user types in "DON" or "0" the program returns to the command interpreter section 102 (FIG. 2) and awaits a new command.

Since the slide has been modified the user will probably want to see the results and will type in the command DIS which will cause the modified slide to be displayed on the CRT screen as described previously. If the user is now satisfied he can make the final preparations for sending the data to a remote slide making facility.

2.4.5 Identify Section

To insure proper identification at the slide making facility, the user can enter an identifying code. This code will appear on the slide, but will normally be in such a position that it will not appear on the screen when the slide is viewed with a standard slide projector. In order to enter this information the user types in the code "IDE" which causes the program to branch to the identify section 110 (FIG. 2) which begins at line [6000]. This is a straightforward interactive routine that requests the "CUSTOMER ID", the "CUSTOMER SEQ. NO.", the "SLIDE TYPE NO." and the "FILE NAME". Conventions can be established by the slide making facility for the type of response needed in answer to each of these questions. However, the important thing is that this identifying information becomes part of the data format shown in FIG. 7 which specifies the entire slide.

2.4.6 Tabulate Colors Section

Since the microcomputer is capable of displaying only 8 colors and the high resolution CRT of the slide facility 74 (FIG. 1) can display 64 colors, the user may choose to have any one or all of the colors displayed on CRT 52, appear as a different color in the final slide. In order to accomplish this the user enters the command "TAB" which sends the computer to the tabulate colors section 112 of the program at line [7000]. The program at line [7005] then asks the user if he wants the standard color set, i.e., the colors available on the minicomputer and identified as colors 1-8. If he types in anything other than "Y" or "N" the program repeats the question. If the user indicates that he wants the standard colors the colors 1 to 8 are assigned at line [7015]. In the situation where the standard colors are not desired, the program branches to line [7021] and requests that the user "TYPE IN COLOR NUMBER FOR EACH COLOR KEY". For each color in the standard set on the terminal keyboard the user then types in a number from 1 to 64 and that standard color will appear in the final slide with the color specified. To remind the user of the selection he has made there will appear a color table with small swatches of the standard colors followed by the number the user has selected whenever the slide is displayed on the CRT. It should be noted that the user is not limited to changing one of the standard colors to a different shade of that color. He can change it to a completely different color. Thus, the system has some added flexibility in that a color change can be made without going into the modify section of the program.

2.4.7 Slide Data Save Section

Once all the values for the slide are entered the data, such as that in FIG. 7, can be saved, i.e., stored on a floppy diskette with a command "SAV". This command branches the program to the save section 114 at line [8000]. Initially this section of the program checks the data to make sure a complete slide has been specified. Next it calculates the length of the data string specifying the slide and prints the result. The program that converts the data into "ASCII numeric" code and stores it in a portion of memory used as a data buffer. This is accomplished with an instruction of the microcomputer called "POKE", which is a store command. These POKE commands are in the form (address, value to be stored). The address is specified in this program section as the variable J [line 8105] which points to the next available storage location. Once the data is stored it is transferred from the buffer to the diskette at line [8460] and control returns to the program interpreter section at line [200]. If the information is to be transmitted from the microcomputer to the time sharing system and then to the remote slide making facility, two other programs, i.e., PREP and SENDER, are used. These are programs of the microcomputer and are not shown. The PREP program asks the user questions about his location and what slide specifications are to be sent. The SENDER program reads the data from the disk, translates it and sends it over the network.

2.4.8 Get Slide Data Section

The slide created and saved according to the foregoing discussion is available to the user thereafter. He may obtain the slide data by entering the command "GET" which branches the program to line [9000], the beginning of the "get slide data" section 116 of the program. At the beginning of this routine the user is asked for the FILE NAME and VERSION NO. of the data file he wants. The program then checks the disk to see if it is available. If it is, the microcomputer uses an instruction of the form: A=PEEK (address). This is a read instruction that loads the incformation from the disk into the active memory of the microcomputer. Once it has been loaded, it can be displayed and/or modified and then restored on the disk.

The compact data of FIG. 7 gives the user identification number in the first 17 characters. Each of these characters is in a six bit binary code. Characters 18-33 are used to specify the colors selected in the color tabulate section of the program. The background color of the slide follows this color table information. In the next three sections the justification, font, size, color, character count and text for the title, subtitle and remarks are given. The color of the connecting lines and the point pairs defining them are specified in the following section. The box parameters, i.e., the box test justification, font and size along with the border color and the number of boxes, are then set forth. The specifications for each box then follow, these specifications include the node number for the box, the box color, the box size, the character count for the text and the text itself. The end of the transmission is indicated by a final delimiter.

At this point it should be noted that the slide displayed on the terminal CRT (FIG. 8A) will differ from the final slide in a number of respects. In particular, the picture element resolution of the final slide is much greater than that at the terminal. Also, it will have a greater variety of colors, fonts and sizes. In addition, aids such as rectangles 134 and 135 of FIG. 8A, which show the approximate size of the finished title and subtitle, do not appear on the final slide. Thus, when it is stated in this application that the final slide has a "higher" or "enhanced" resolution over the terminal display it is intended to imply that not only are more picture elements (raster points) present, but that more character styles and sizes, and more colors are present in the final slide.

3. DATA TRANSMISSION

As described above in connection with FIG. 1, slide specification data may be conveyed from the microcomputer display terminals 50 to the large scale central computer 70 by a variety of ways and means. In the preferred embodiment an IBM "batch" computer system is used for the slide computation, so that the data must also be translated from the format generated at the microcomputer display terminals into a format acceptable to this computer. In particular, all records supplied to the IBM computer must be reformatted into IBM "card images"; i.e., they must be fixed length records with 80 characters (bytes) per record in EBCDIC code.

Consequently, in ether the time-sharing computer 62 or the minicomputer 68 (FIG. 1) the data must be translated into the format described hereinbelow. Since this translation requires merely a reorganization of the bits defining each character, and the characters defining the data, the creation of a computer program to carry out this translation is well within the skill of the average programmer.

3.1 Slide Input

Figure 15:
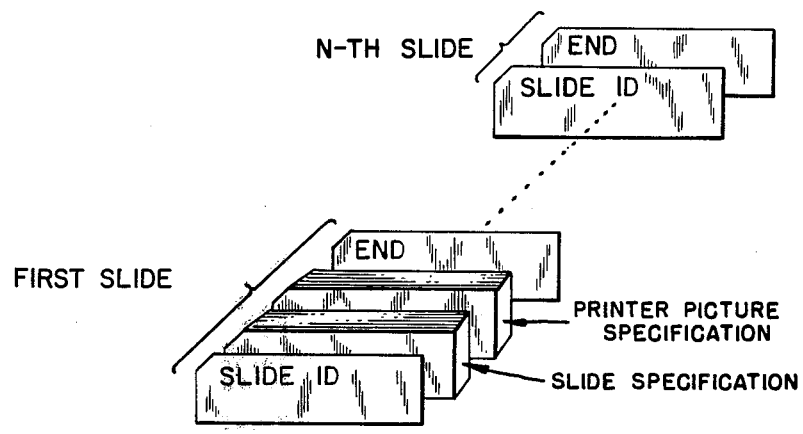
FIG. 15 is a diagram showing the card image input for a number of slides.

Each input file to the IBM computer, be it a card deck, paper tape or a magnetic tape file, consists of one or more "slide inputs". In the case of multiple slide inputs, they are simply ordered one after another as shown in FIG. 15.

Each slide input has four parts, namely:
(1) a slide identification (ID);
(2) a slide specification (SS);
(3) a printer picture specification (optional); and
(4) an END card.

These four parts are described in detail in the following sections using a box chart as an example.

3.1.1 Slide Identification (Part 1)

This part has only one card. It contains the slide type number, the background color, number of copies, the picture window limits and accounting information. This card appears first in the slide input.

More particularly, the format of the slide ID card is:

---

ITYPE, KLBKGD, NCUPY, LMTX1, LMTX2, LMTY1, LMTY2
IHEAD, (3I5,5X,4I5,4φA)

ITYPE - The type number for this slide; for example,
01 means a box chart with 5 -10

| ITYPE, KLBKGD, NCUPY, LMTX1, LMTX2, LMTY1, LMTY2 IHEAD, (3I5,5X,4I5,4φA) |
|---| boxes of only one color arranged in two rows or levels. Table 1, below, contains a sample listing of slide type numbers for a box chart.
KLBKGD - The color number for the background; it can be any number from 1 to 64.
NCOPY - The number of copies for this slide. The default (blank) is 1 copy.
LMTX1, - Defines the left, right, bottom and top raster
LMTX2, point limits for this slide. The default
LMTY1, limits are 73,1944,49, and 1296 raster points.
LMTY2 By properly adjusting these limits, the user has the capability, within the 2016 X 1344 raster points frame, to relocate and rescale the slide.
IHEAD - The accounting information for this slide, up to 40 characters including blanks. This information can include the identity of the microcomputer display terminal that generated the slide specification.

TABLE 1

| ITYPE (Slide Type) | No. Boxes | Description |
|---|---|---|
| 1 Box chart | 5-10 | Two levels, one color |
| 2 Box chart | 5-10 | Two levels, two colors |
| 3 Box chart | 15-20 | 3-4 levels, one color |
| 4 Box chart | 15-20 | 3-4 levels, two colors |
| 5 Box chart | 25-30 | 5 levels, one color |
| 6 Box chart | 25-30 | 5 levels, two colors |
| 7 Box chart | Etc. | |
| 8 Box chart | | |
| 9 Box chart | | |

3.1.2 Slide Specification (Part 2)

This input part specifies the details of this current slide: positions, colors, texts, etc. Since different types of slides have different input data, the nature of the slide specification will depend upon the ITYPE number. Table 2 shows all slide types with their corresponding ITYPE number.

TABLE 2

| Slide Type | ITYPE No. |
|---|---|
| Box Charts | 1-9 |
| Vertical Bar Charts | 10-19 |
| | 30-39 |
| Horizontal Bar Charts | 20-29 |
| Graph Charts, | 40-49 |
| Area Charts | |
| Pie Charts | 50-55 |
| Word Slides | 56-69 |
| | 80-89 |
| Tabular Charts | 90-99 |

For a box chart (i.e., with the ITYPE on the slide ID card between 1 and 9), the following input cards comprise the slide specification:

Card No. 1: Title Card
    ICLR, IFNT, ISIZ, KOLOR, NSTRNG, ITEXT (5I3, 3X, 62A1)
        ICLR - A parameter to indicate the title is to be left, or right justified or to be centered.
            ICLR = 1 left justified
                = 2 centered
                = 3 right justified
            Default is ICLR = 2
        IFNT - Font type of characters in this title text string.

For example:
        IFNT = 1 Helvetica Medium
                = 2 Helvetica Slim
                = 3 Helvetica Bold
    Default is IFNT = 1
    ISIZ - Size of characters in this title text string. ISIZ can be any size between 1 and 8. Default is ISIZ = 6 (4 out of 48 screen lines). Table 4, below, gives the full description of all 8 sizes).
    KOLOR - Color number for the title: any number between 1 and 64.
    NSTRNG - Number of text strings in the title (must be 1). No default value.
    ITEXT - Text string for the title; no more than 60 characters. This text string must be started and ended by a "delimiter". The delimiter is defined as the first character in this string. For example, the following text string:
    /This is an example /, means the title would be:
    "This is an example"
(total of 21 characters), where /(slash) is defined as the delimiter.
The default is a blank line.

Card No. 2: Subtitle Card
    ICLR, IFNT, ISIZ, KOLOR, NSTRNG, ITEXT (5I3,3X, 62A1)
        ICLR - This parameter is ignored for the subtitle. The program internally sets this parameter equal to the corresponding parameter of the title. In other words, if the title is centered (or left/right justified) so is the subtitle.
        IFNT - Font type for the subtitle. Any number between 1 and 3. Default is the font type for title.
        ISIZ - Character size for the subtitle: any number between 1 and 8. Default is 4 (2 out of 48 screen lines).
        KOLOR - Color for subtitle: any number between 1 to 64. Default is color for title.
        NSTRNG - Number of text strings for subtitle (must be 1). No default value.
        ITEXT - Text string for the subtitle; no more than 60 characters.

Card No. 3 : Remark Card
    ICLR, IFNT, ISIZ, KOLOR, NSTRNG, ITEXT (5I3, 3X, 62A1)
        ICLR - Ignored for the remark. The value is set to be the same as for the title.
        IFNT - Font type for remark. Any number which designates a font. Default is the font type for the subtitle.
        ISIZ - Size for the remark: any number between 1 and 8. Default is 1 (1 out of 48 screen lines).
        KOLOR - Color for the remark: any number between 1 and 64. Default is the color for the subtitle.
        NSTRNG - Number of text strings for the remark (must be 1).
        ITEXT -Text string for the remark; no more than 60 characters.

Card No. 4: Font, size of box texts, color of connection lines and box border lines.
    LFNT, LSIZ, LCOL (3I10)
        LFNT - Font type of text strings in all boxes; can be any number which designates a font. Default is the font type for the remark.

LSIZ - Character size for text strings in all boxes; can be any number between 1 and 8. Default is 1.
LCOL - Color number for connection lines and box border lines; can be any number between 1 and 64. Default is the color for the remark.

Card No. 5: Connection lines (KLINE(1,K), KLINE(2,K), K=1,4) (8Z10)

KLINE (1,K), KLINE (2,K) —Specifies the starting and ending node points for the connection lines.

Each card can have 4 connection lines (2 numbers for each connection line). This card is repeated as many times as necessary. The data is terminated by a blank connection line (i.e., leaving 2 consecutive entries blank).

Card No. 6: Box ID, Box color, Text color, Text.

IDBOX, KLBOX, NLINE,(KLIBOX(I),I = 1,2),ITEXT (Z3, 4I3,3X,25A1)

IDBOX  -Node number of the box. (See Fig. 3.)
KLBOX  -Color of the box; can be any number between 1 and 64. Default is the background color.
NLINE  -Number of text lines in this box (1 or 2). Default is 1.
(KLIBOX(I),I = 1,2) -Color of text line 1 and text line 2 (if any); any number between 1 and 64. Default for line 1 is connection line color. Default for line 2 is color for line 1.
ITEXT  -Text for this box, either 1 or 2 strings. Each string is to be enclosed by the delimiter. Default is blank.

This card is repeated as many times as necessary. A blank card terminates the slide specification.

3.1.3 Printer Picture Specification (Part 3)

This input part provides the user the option of getting line-printer "pictures" of this slide. The user specifies the viewing area of this printer picture on a given slide. He can get as many printer pictures as he likes from different areas of that slide.

The data format for each printer picture is:
IX1, IX2, IY1, IY2 (4I10)
IX1, IX2—Specifies the left and right boundary of the viewing area.
IY1, IY2—Specifies the lower and upper boundary.

The units for all boundaries are raster point units. For example, the following card:

| 1 | 2016 | 1 | 1344 |
|---|---|---|---| shows the entire slide on the printer. However, since one printer picture only has 96×64 points, the printer prints only every 2016/96=21 points.

Another example—this card:

| 1008 | 2016 | 672 | 1344 |
|---|---|---|---| shows the upper right quarter of this slide, for this printer picture. It prints every 1008/96=10 points.

The user can specify any viewing area as many times as he likes (by repeating this card). This input part is terminated by a blank card.

Figure 16:
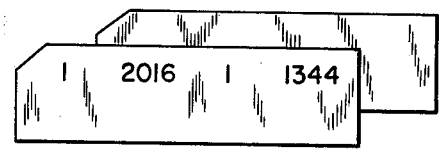
FIG. 16 is a diagram showing a portion of the card image input for a slide.

A typical example is shown in FIG. 16. The first card specifies a printer picture covering the viewing area from 1 to 2016 (left to right) and from 1 to 1344 (from bottom to top). The second card (blank card) terminates this input part.

Notice that if the user doesn't want any printer picture, he still needs one black card to terminate this input part.

3.1.4 End Card (Part 4)

This input part indicates the end of the slide input for the current slide. It has only one card with "END" written in columns 1 to 3. The data format for this card is

1END (A4)

Immediately following this card should be the slide ID card of the next slide.

4. COMPUTER GENERATION OF DIGITIZED PICTURES

An IBM 360/75 computer is used to compute the color of each raster point of the picture to form the slide. As stated above, this picture has a resolution of 1344 raster units in height and 2016 raster units in width. The computer produces an output tape on which is stored the intensity of each raster point for three primary colors; red, green and blue, respectively. The computer receives the slide input, in the format described above, and accesses, as needed, digitally encoded data defining each character or symbol to be included in the slide. This encoded data is maintained in a "symbol library" on a disk file, for ready access by the computer. While any known scheme may be used for generating and encoding the symbol data (some known encoding schemes are disclosed in the U.S. Pat. Nos. 3,305,841; 3,471,848 and 4,029,947) the preferred technique for producing the symbol library is set forth below.

4.1 Symbol Data Processing

Figure 17:
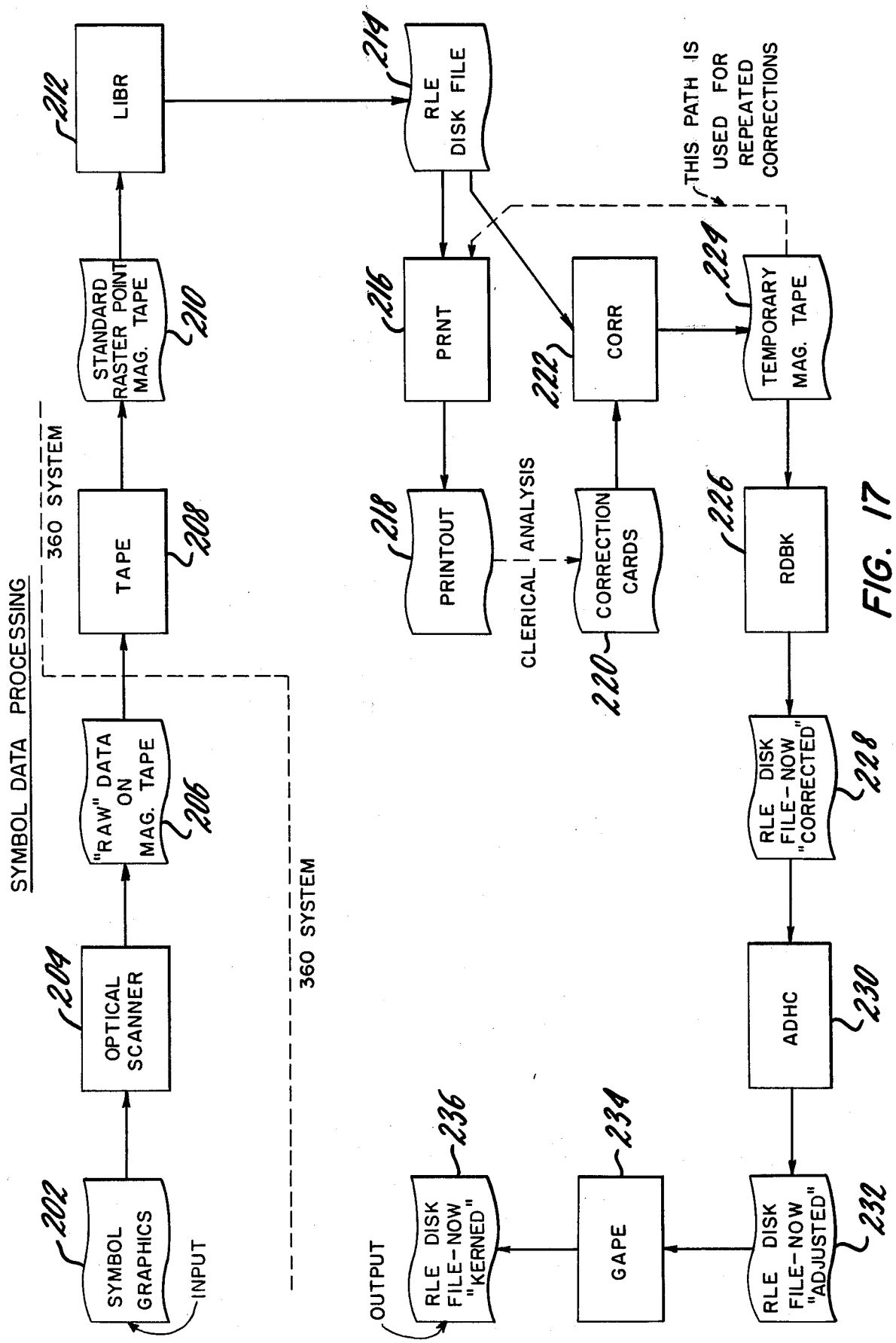
FIG. 17 is a flow chart showing the process used in creating a font library.

FIG. 17 shows the steps required to digitally encode each character or symbol. The data for all characters or symbols is stored on the disk file 214 so that file is referred to as a "symbol library".

In order to generate a symbol library, an actual picture of each symbol on hard copy, i.e., "symbol graphics" 202, is scanned by an optical scanner 204 to produce "raw" data on a magnetic tape 206. This magnetic tape is read by the IBM computer and processed by a software routine 208 called "TAPE" to convert the scanner data into a standard raster point format. Each point in the image is represented by one data item; i.e., present or absent (1 or 0). The standard raster point data is written onto magnetic tape 210 and then reprocessed by a software routine 212 called "LIBR". LIBR compresses the data by grouping adjacent points on a line which have the same characteristics (i.e. either present or absent). This is a common technique known as "run-length encoding". The precis format of this data is described hereinafter. The run-length encoded "RLE" data is then written onto a disk file 214.

Subsequently, each symbol on the disk file is printed out by means of a software routine 216 called "PRNT" on a line printer 218 to permit clerical analysis of the data. If correction is required, correction cards 220 are prepared and supplied to the machine. A software routine 222 called "CORR" accepts the correction cards and modifies the RLE data for the specified symbol. The output is to a temporary magnetic tape 224. In actual practice, the user now reruns PRNT and repeats the correction cycle until the symbol is correctly coded.

A software routine 226 called "RDBK" now reads the magnetic tape 224 and updates the disk file to produce a "corrected" disk file 228. Another routine "ADHC" 230 reads the disk file and permits arbitrary adjustment of character width and position. These width and position parameters are designated "IX" and "IYD" in the RLE data to be described below. This adjusted RLE data is restored on a disk to form an adjusted disk file 232.

Finally, a software routine 234 called "GAPE" adds kerning data to the RLE encoded symbol data and returns the symbol, now kerned, to the disk file 236, which has the final "symbol library".

Once the RLE data format is known, all of the software routines used in font data processing are straightforward and well within the skill of the average programmer.

4.2 Symbol Library Format

The symbol library is a disk file on an IBM 2314 disk and is called "RANDDS". This file contains the run-length encoded (RLE) data of all symbols (a symbol can be a letter, a number, a special sumbol, company logo, . . . etc.).

In order to allow the slide program to have quick access to the disk file, the symbol library is constructed as a direct-access file; i.e., it occupies contiguous blocks in the RANDDS disk. As an example, three fonts may be stored in 350 records with 2240 bytes per record.

The symbol library is referred to by the slide program as "unit 2". Using IBM JCL, it can be specified as:
//GO.FT$\phi$2F$\phi\phi$1  DD  UNIT=DISK,VOL=(-PRIVATE,RETAIN,SER=RANDDS),
//DISP=OLD,DCB=BLKSIZE=224$\phi$ In a FORTRAN program, the font library is referred to by using:
DEFINE FILE 2(35$\phi$,224$\phi$,L,LOC)
READ(2'LOC) IBUF
WRITE(2'LOC) IBUF where IBUF is an array of 224$\phi$ bytes.

Three typical fonts which may be stored in the symbol library are Helvetica medium, Helvetica slim and Helvetica bold. Each font has 86 symbols: 26 upper case letters, 26 lower case letters, 10 numbers and 24 special symbols.

The RLE data of each symbol occupies one or more records, but each record cannot be shared by more than one symbol. Every sumbol is assigned a unique ID number and a decimal value. It may be called by looking up its location in the disk file (disk record number) from a table.

4.3 Symbol Data Format

The structure of each symbol is illustrated in FIG. 18. Everything described in this section has a 2-byte word format (therefore, each record has 1120 words).

There are eight pieces of data for each symbol. They are described individually in the following sub-sections.

4.3.1 "TITLE"

TITLE is a literal description of the symbol. It occupies the first two words (4 bytes). For example, the TITLE for Helvetica medium upper case A is "UA01" (upper-case A, font type 1).

4.3.2 "LENTH"

LENTH is the number of bytes used for RLE data to describe this symbol. LENTH occupies the third word of the symbol.

4.3.3. "IX"

IX is the width of this symbol in raster point units. It occupies the fourth word of the symbol.

Normally, IX is measured from the left-most border of this symbol to the right-most border. For example, the slash sign "/" has IX measured from the lower-left tip to the upper-right tip. However, there are exceptions; for example, the width of 1 is narrower than the width of 9, but since all numbers preferably have the same width (so that they can be aligned in columns) the width of 1 is artificially expanded to match the widest width of all numbers (which happens to be the width of "0"). In fact, the widths of all numbers from 0 to 9 are expanded to match the widest width.

4.3.4 "IY"

IY is the height of this symbol in raster point units. It occupies the fifth word of the symbol.

IY is measured between the top and bottom of this symbol; for example, IY of "j" is measured from the top of the dot to the bottom of the tail.

4.3.5 "IYD"

IYD is the vertical displacement of this symbol in raster point units. It occupies the sixth word of the symbol.

Normally, IYD is zero; that is, no vertical displacement. When IYD is positive, it means move upward. When IYD is negative, it means move downward. For example, the IYD of "A" is zero (no vertical movement). The IYD of "g" is a negative number, since the bottom of g should lie below the base line (see FIG. 19). The IYD of "*" is a positive number because it lies above the base line.

4.3.6 "IAREA1", "IAREA2"

IAREA1, IAREA2 are the left and right blank areas of this symbol, respectively (See FIG. 20). They are intended to be used for kerning to evaluate the "white space" between symbols, but the program does not need to use them if the spacing between letters is made constant.

IAREA1, IAREA2 occupy the seventh and eighth words, respectively, of the symbol.

4.3.7 "IXD"

IXD is the horizontal displacement in raster point units. It occupies the ninth word of the symbol.

In section 4.3.3. we noted that the actual width of some symbols is expanded to a pseudo-width. In this case, we also apply a horizontal displacement in order to keep this symbol in the middle. Suppose $IX_0$ is the actual width and $IX_1$ is the expanded width. The IXD is calculated as $(IX_1-IX_0)/2$.

4.3.8 "Run-Length Encoded Data"

String-format data starts at the eleventh word of this symbol and ends at the (10+LENTH/2)-th word. It consists of many pairs of words. Each pair (ISTART, IEND) represents the starting location and the ending location of a visible line segment.

Figure 21:
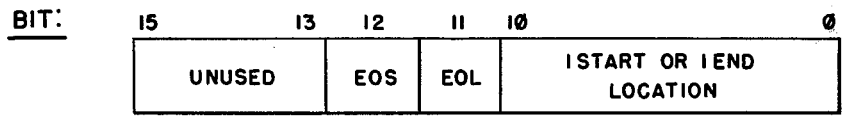
FIG. 21 shows a two-byte word used in the string-format data defining a symbol.

As shown in FIG. 21, the first 11 bits of each word contains the location (for either ISTART or IEND). For IEND, if the twelfth bit is set, it means end-of-line. If the thirteenth bit is set, it means end-of-symbol.

Figure 22:
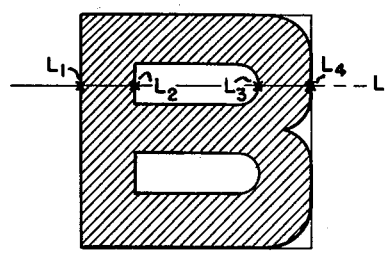
FIG. 22 shows the character "B" arranged in a character space which is scanned at line L.
Figure 23:
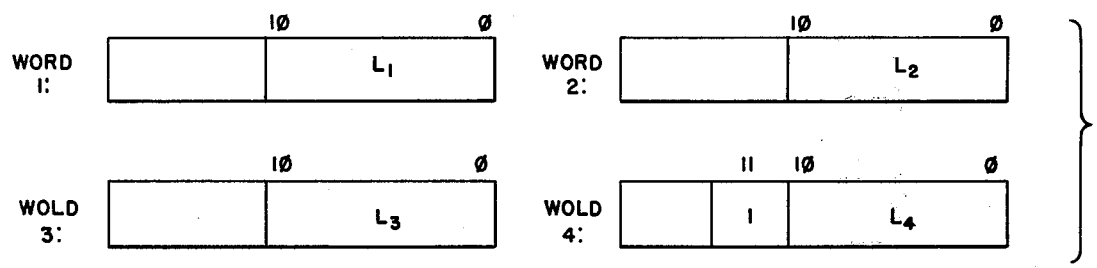
FIG. 23 shows four words of string-format data defining the symbol segments on scan line L of FIG. 22.
Figure 24:
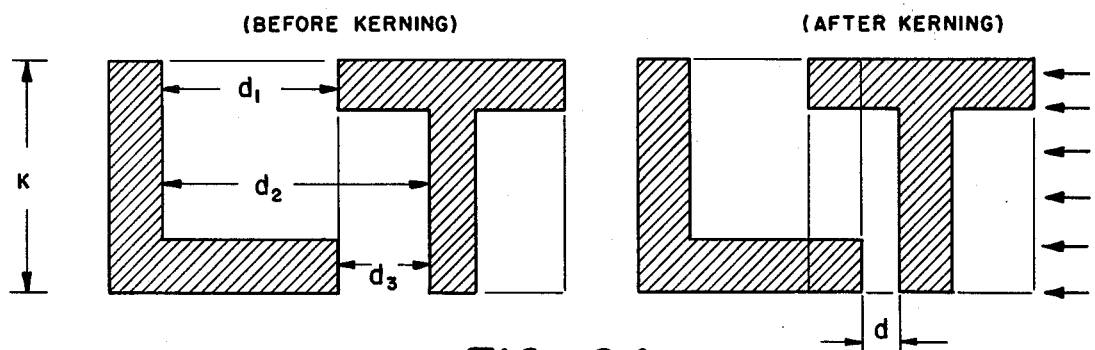
FIG. 24 illustrates the manner in which two characters "L" and "T" are kerned.

For example, in FIG. 22 there are two pairs of words at line L to represent two visible line segments. These four words are illustrated in FIG. 23. Note that the twelfth bit (bit $-11$) in word 4 is set to represent the end-of-line.

In case of a blank line within the symbol, as is found just below the "dot" in the lower-case "i", ISTART is assigned to be 1 and IEND is assigned to be 2048 (which means locations 0 and end-of-line).

4.3.9 Kerning Data

Kerning data is used by the slide program to overlap two letters. It starts at the (10+LENTH/2+1)-th word and ends at the (10+LENTH/2+52)-th word.

The definition of the kerning data is the adjustment required to cause the adjacent letters to touch. For example, in FIG. 24, we can see the adjustment causing contact between L and T, denoted as $d_3$. After kerning (if any) another adjustment is made to establish a constant minimum distance for the given symbol size. This is denoted as d in FIG. 24.

In general, for a given letter i there are 52 numbers corresponding to the kerning data between this letter and the other 52 letters. Thus, the kerning data $D_{ij}$ between the letters i and j is given by:

$$D_{ij} = \underset{K}{MIN}(D_{ijk}) \quad i = 1, \ldots, 52 \quad j = 1, \ldots, 52$$

where K covers the heights of letter i and letter j. This distance $D_{ij}$ for the pair of letters i and j is stored for each of the other 52 letters.

4.4 Slide Computation

Figure 25:
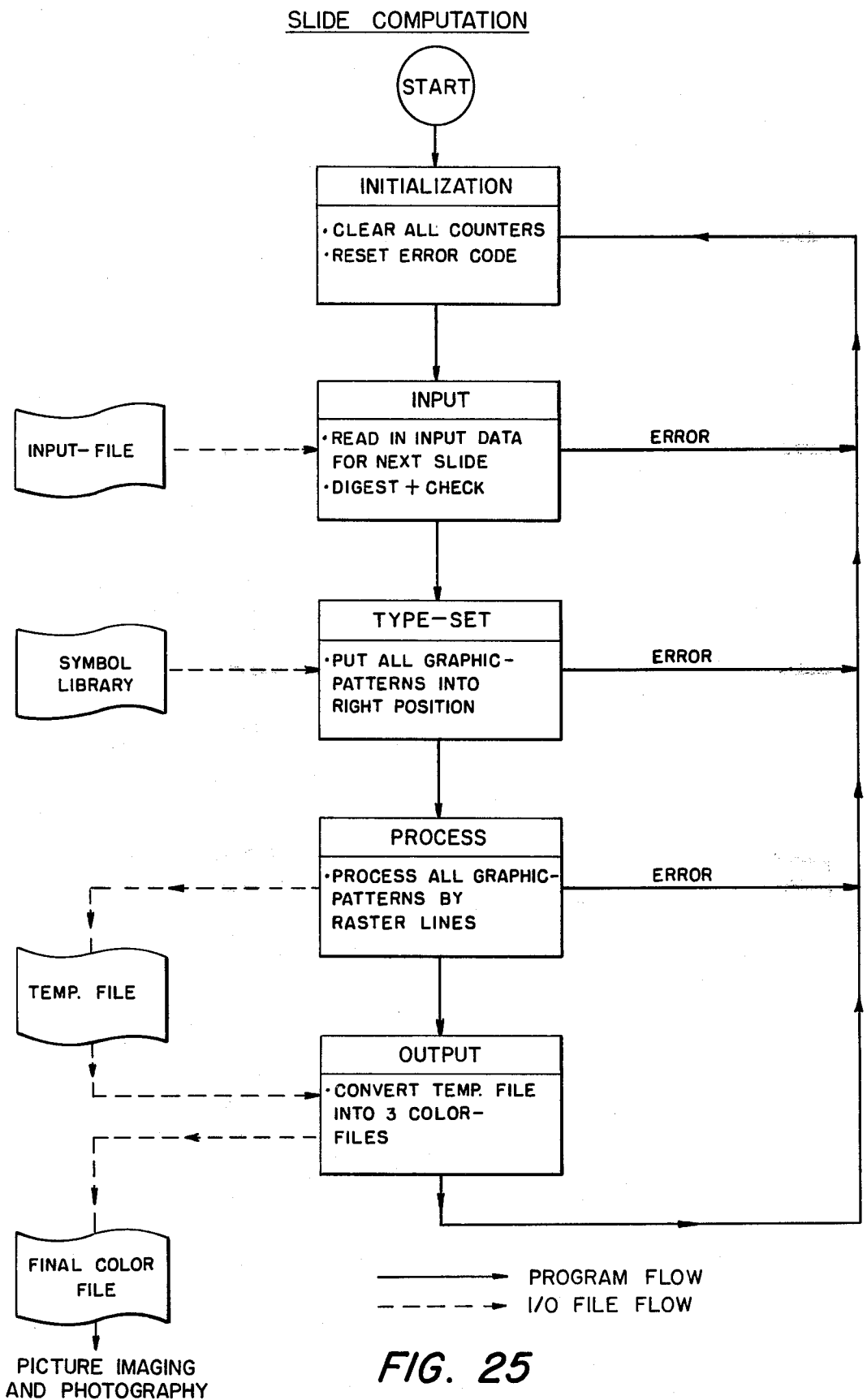
FIG. 25 is a flow chart showing the program modules in the slide computation.

The program structure for the slide computation is shown in FIG. 25. The slide computation is performed by five program "modules" which are stored on the disk file and successively "swapped" in and out of the computer core memory as they are needed. A control program called "MAIN" permanently resident in core memory calls in the appropriate program module at the appropriate time. To compute the raster data for each slide, all five program modules must be run in the computer in proper sequence.

The first program module, called "INITIALIZATION", initializes the common block in the computer core memory which will contain the data for the next slide specification. All the counters used in the slide computation are cleared and an "error code" is reset to zero. The error code will be set to a non-zero number if an error condition is found when running any of the subsequent modules. Upon detection of an error, computation of the current slide is terminated and the program returns to INITIALIZATION to process the next slide.

The next program module, called "INPUT", inputs the slide type from the first card image and then calls an appropriate subroutine to input the rest of the data for the slide. For example, if the slide type is a box chart, a subroutine is called to receive and store in the common block the particular slide specification for this type of slide. The data is also checked for validity and if an error is found, the error code is set to a non-zero number. The first module, INITIALIZATION, is then called to immediately commence processing the next slide.

The third program module, called "TYPE-SET", composes the slide using a special-purpose subroutine for each slide type. This composition entails placing all specified graphic patterns into specified locations in the common block for subsequent processing. As needed and called for by the slide specification, symbol data is accessed from the symbol library and placed in the common block. If an error occurs when TYPE-SET is run, the error code is set to a non-zero number and INITIALIZATION is called to commence processing the next slide.

The fourth program module, called "PROCESS", converts the graphic patterns stored in the common block into raster line data in run-length encoded "RLE" format. This RLE data is temporarily stored on the computer disk file. Again, if an error is detected when this module is run, the error code is set to a non-zero number and INITIALIZATION is called to commence processing the next slide.

The fifth program module, called "OUTPUT", reads the temporary disk file three times to generate output data defining a red image, a green image, and a blue image in RLE format. The final color file, so generated, is written on magnetic tape.

When the module OUTPUT has been run, the control program MAIN calls INITIALIZATION to commence processing the next slide.

With the IBM 360/75 computer, a single slide computation takes approximately 30 seconds. The INITIALIZATION and INPUT modules together take a second or less to run; TYPE-SET requires approximately 45% of the total slide computation time or 13 seconds. PROCESS takes approximately 20% of the time (6 seconds) and OUTPUT the remaining 35% of the time (10 seconds).

Set forth below is a detailed description of each of the five program modules used in the slide computation.

4.4.1 "INITIALIZATION"

Figure 26:
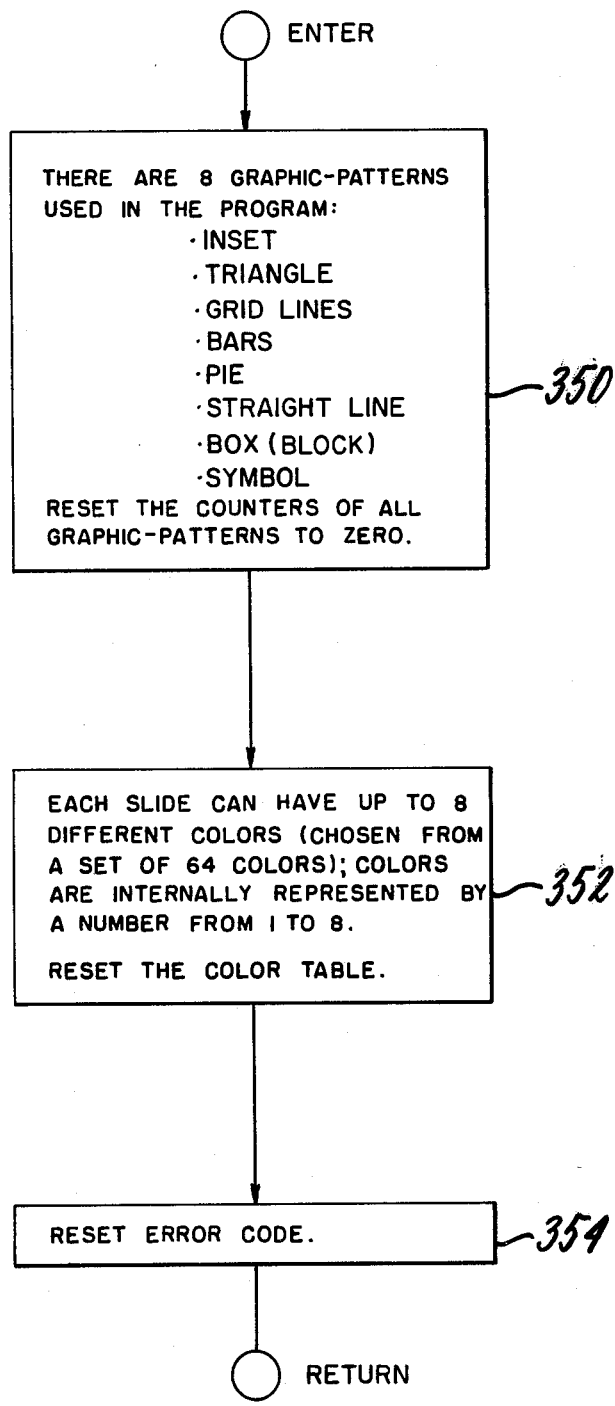
FIG. 26 is a flow chart for the program module "INITIALIZATION"

The purpose of INITIALIZATION is to reset all the counters, the color table and the error code in the computer memory common block. There are thus essentially three steps which are illustrated in FIG. 26.

Figure 27:
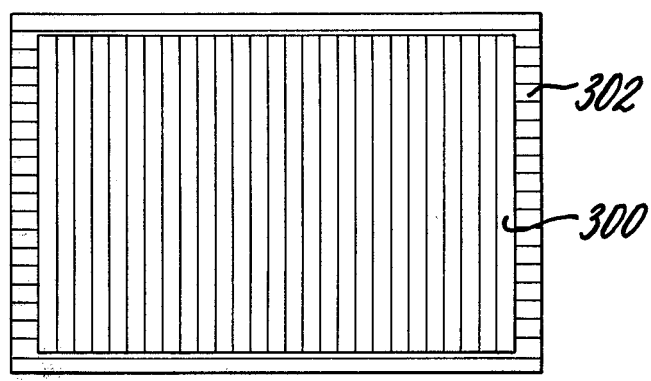
FIG. 27 is an illustration of an inset graphic pattern.

The slide computation program is capable of generating eight distinct graphic patterns for a slide. The particular graphic patterns in a given slide will be superimposed, one on top of another in a prescribed heirarchy by the program module PROCESS when a raster line is processed. These graphic patterns or shapes are as follows:

(1) Inset: Inset is a rectangular shape of a prescribed size which may have one of ten different colors specified by the user. FIG. 27 shows a typical inset 300 of one color arranged on a backbound 302 of another color.

Figure 28:
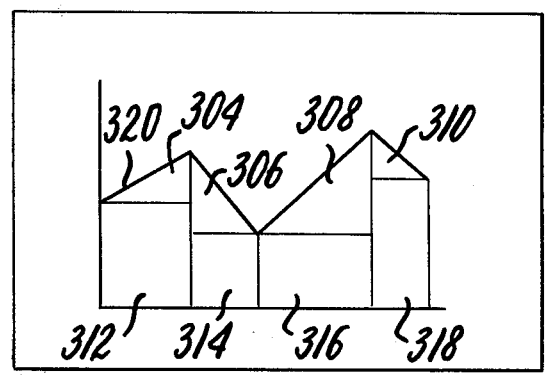
FIG. 28 is an illustration of triangular graphic patterns.

(2) Triangular Area: This graphic pattern is a triangular shape having a horizontal base which is used for processing the area under a sawtooth-type function on a graph. FIG. 28 illustrates how several triangles 304–310 are used together with bar shapes 312-318 to define the area under a function 320.

Figure 29:
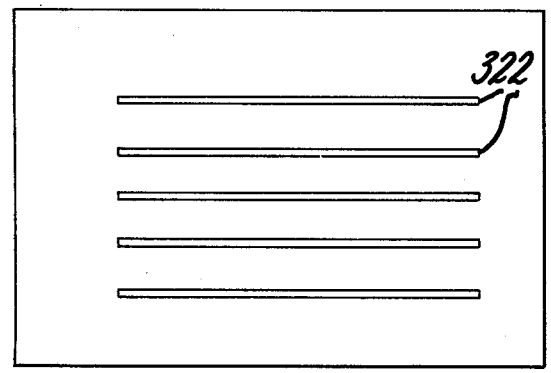
FIG. 29 is an illustration of grid line graphic patterns.

(3) Grid Lines: Grid lines are rectangular shapes of specified thickness and color which may be called to provide horizontal or vertical reference lines on a graph, or to create connecting lines in a box chart. FIG. 29 shows a number of horizontal grid lines 322.

Figure 30:
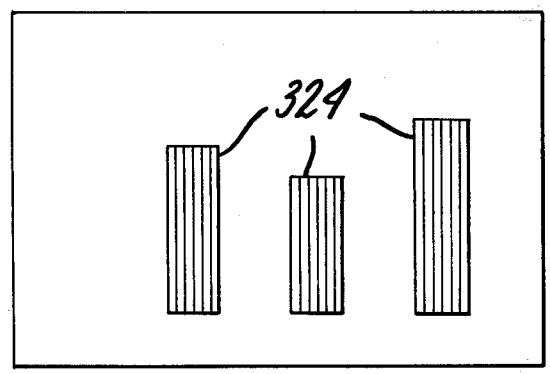
FIG. 30 is an illustration of bar graphic patterns.

(4) Bars: Bars are a rectangular shape of a specified thickness and color which may be used in a bar chart, or in any other situation where an arbitrary rectangular shape is required. FIG. 30 illustrates three typical bars 324 of different height in a bar chart; FIG. 28 shows bars 312-318.

Figure 31:
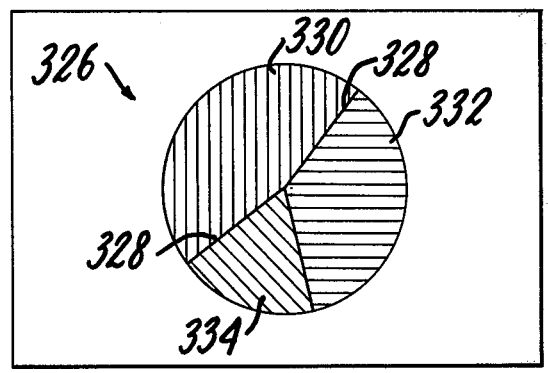
FIG. 31 is an illustration of a circular pie graphic pattern.

(5) Circular Pie: Pie is a circular graphic pattern which is used for a pie chart. FIG. 31 shows a typical pie shape 326 divided into three colored sections 330, 332, and 334. The borders 328 between sections may be defined by straight line segments.

Figure 32:
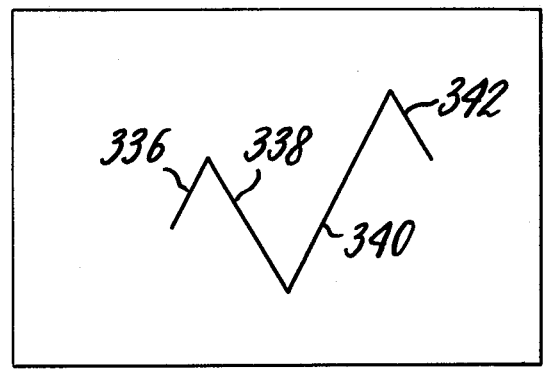
FIG. 32 is an illustration of a slide containing straight line segments.

(6) Straight Line Segment: A straight line segment is a line of a specified thickness and color which may extend in any direction on a graph. FIG. 32 shows how line segments 336-342 are used in a line chart to represent one graphic function.

Figure 33:
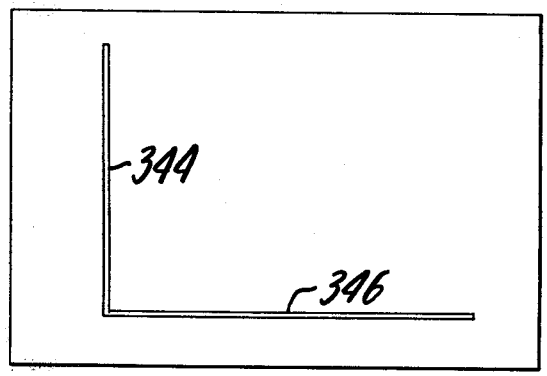
FIG. 33 is an illustration of a slide containing grid axes.

(7) Grid Axis: A grid axis, also called a "box", is a rectangular shape of a prescribed thickness and color which is arranged vertically or horizontally on a graph to form an axis. FIG. 33 shows vertical and horizontal axes 344 and 346.

Figure 34:
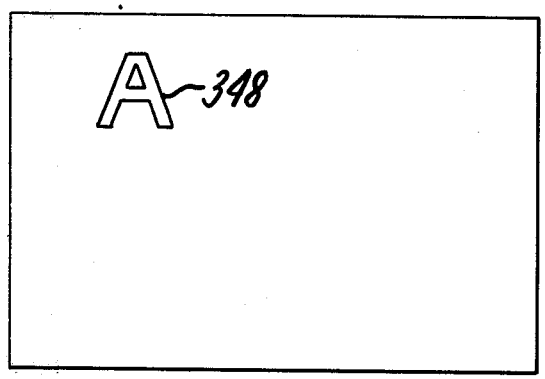
FIG. 34 is an illustration of a slide containing a symbol.

(8) Symbol: A symbol is a specific pattern which is always used in its entirety, although its size and position on the slide may vary. Data defining the symbols are stored in the symbol library. FIG. 34 shows a typical symbol "A" 348 arranged in a slide.

Figure 35:
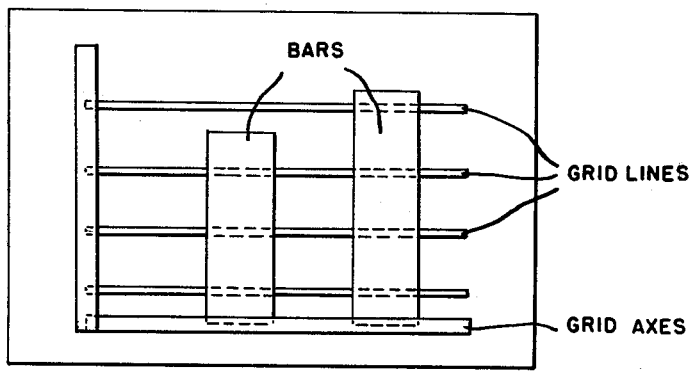
FIG. 35 is an illustration of a slide containing grid lines, bars and grid axes.

As mentioned above, the eight graphic patterns are called by PROCESS in a fixed priority: namely, the priority (1)-(8) given above. Thus, for example, when a bar chart is processed the grid lines are laid down first, the bars are superimposed thereon and finally the grid axes are superimposed on the bars and grid lines as is indicated in FIG. 35. Prior to considering any of the graphic patterns, PROCESS sets the background of the slide to the background color. Therefore, the background may be viewed as having the first priority although it is not considered a graphic pattern.

PROCESS operates by checking counters in the computer memory common block to determine whether a first type of graphic pattern (inset) intersects the current raster line. If so, the color of the respective raster points are set. If not, or after the raster points are set, PROCESS checks and counters in the common block to determine whether any second types of graphic patterns (triangles) intersect the current raster line, etc. This procedure continues until all eight types of shapes are processed for the line. Consequently, PROCESS needs to know if any graphic patterns of a specific type are required for a given slide and, if so, how many there are. For the purpose of this determination, one counter is provided in the common block for each of the eight graphic patterns. It is these counters which INITIALIZATION sets to zero during the first step 350 shown in FIG. 26.

The second step 352 of INITIALIZATION is to reset the "color table" to zero. Although there are 64 different colors to choose from, only eight of these colors may be used for a given slide. This permits the color information for a slide to be defined in three bits, once a color table is set up establishing the correspondence between the original eight (or less) choices of color and this three-bit code. Thus, for example, if a user specified only five colors for a given slide, these colors would be set up in the color table in the computer memory common block as follows:

TABLE 3

| Order of Color Choice | Color Number (0 –63) | Three Bit Code |
|---|---|---|
| 1 | 23 | 000 |
| 2 | 5 | 001 |
| 3 | 32 | 010 |
| 4 | 45 | 011 |
| 5 | 12 | 100 |
| 6 | 0 | 101 |
| 7 | 0 | 110 |
| 8 | 0 | 111 |

The numbers in the center column of Table 3 are cleared to zero, which means there are no colors being used yet at this point.

The third step 354 of INITIALIZATION is to reset the error code to zero. When this step is completed, control is returned to the control program MAIN, which calls the second program module INPUT.

4.4.2 "INPUT"

Figure 36:
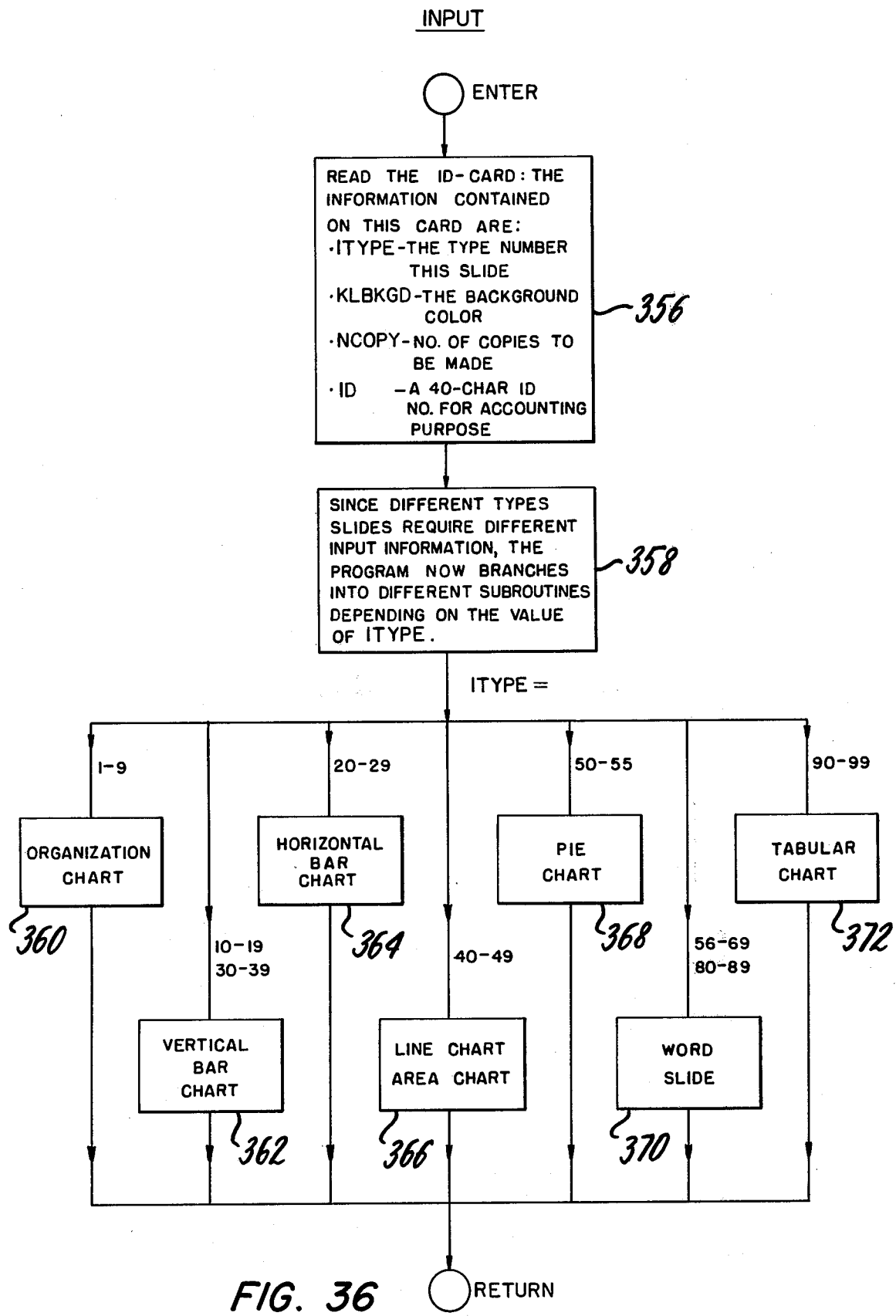
FIG. 36 is a flow chart for the program module "INPUT"

The steps executed by the program module INPUT are set forth in FIG. 36. In the first step 356 the first slide input card image—namely, the ID card image—is read and the slide type number, the background color, the number of copies and the accounting information are stored in the computer memory common block. As indicated in step 358, since different types of slides have different input information, the program branches into one of eight subroutines, depending upon the type number ITYPE of this slide. As may be seen from Table 2, if ITYPE is a number from 1 to 9, the slide will be a box chart requiring subroutine 360. If ITYPE falls in the ranges 10 to 19 and 30 to 39, the slide is a vertical bar chart requiring the subroutine 362. The subroutines 364, 366, 368, 370 and 372 are similarly called if ITYPE falls within the ranges indicated. When the respective subroutine has ended, control is returned to the program MAIN which calls TYPE-SET.

Figure 37:
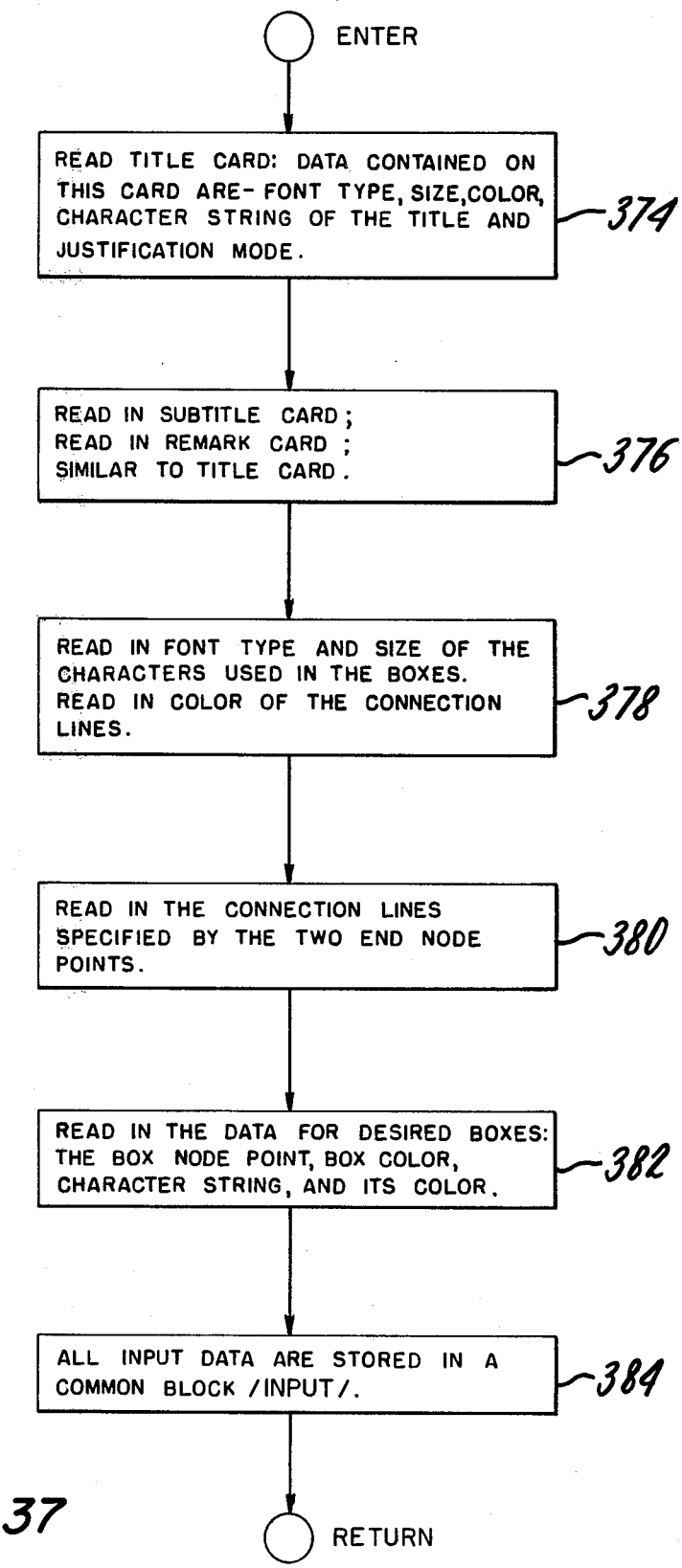
FIG. 37 is a flow chart of a representative subroutine of the program module "INPUT"

The subroutine 360 for a box chart is shown as an example in FIG. 37. In the first step 374 this subroutine reads the card image with the title information; namely, the font type, size, color and justification mode (left, center or right justified) as well as the character string of the title. Thereafter, in step 376, the next two card images containing the subtitle and remark information, respectively, are read. This information is similar to that on the title card. For the specific information read by this subroutine, reference is made to the slide specification format set forth in section 3.1.2, above.

Thereafter, in step 378, the subroutine reads the fourth card image containing the type of font, size of the characters used in the boxes, as well as the color of the connection lines and box border lines. In step 380, the subroutine reads the fifth card image containing the information about the connection lines; that is, the starting and ending node points for each line. For example, these node points may be 15, 55; 52, 58; 52, 82; etc. Following this, in step 382, the subroutine reads the card images for each box (one card image per box). Included in this data are the box node number, the box color, the box text and the color of this text. When a blank card image is read, the subroutine knows it has come to the end of the data.

Finally, in step 384, the subroutine stores all the data read in by the program module INPUT $\phi$ in the computer memory common block, i.e., /INPUT/. The next program module "type-set", i.e., TYPESET, will use this data.

4.43 "TYPE-SET"

Figure 38:
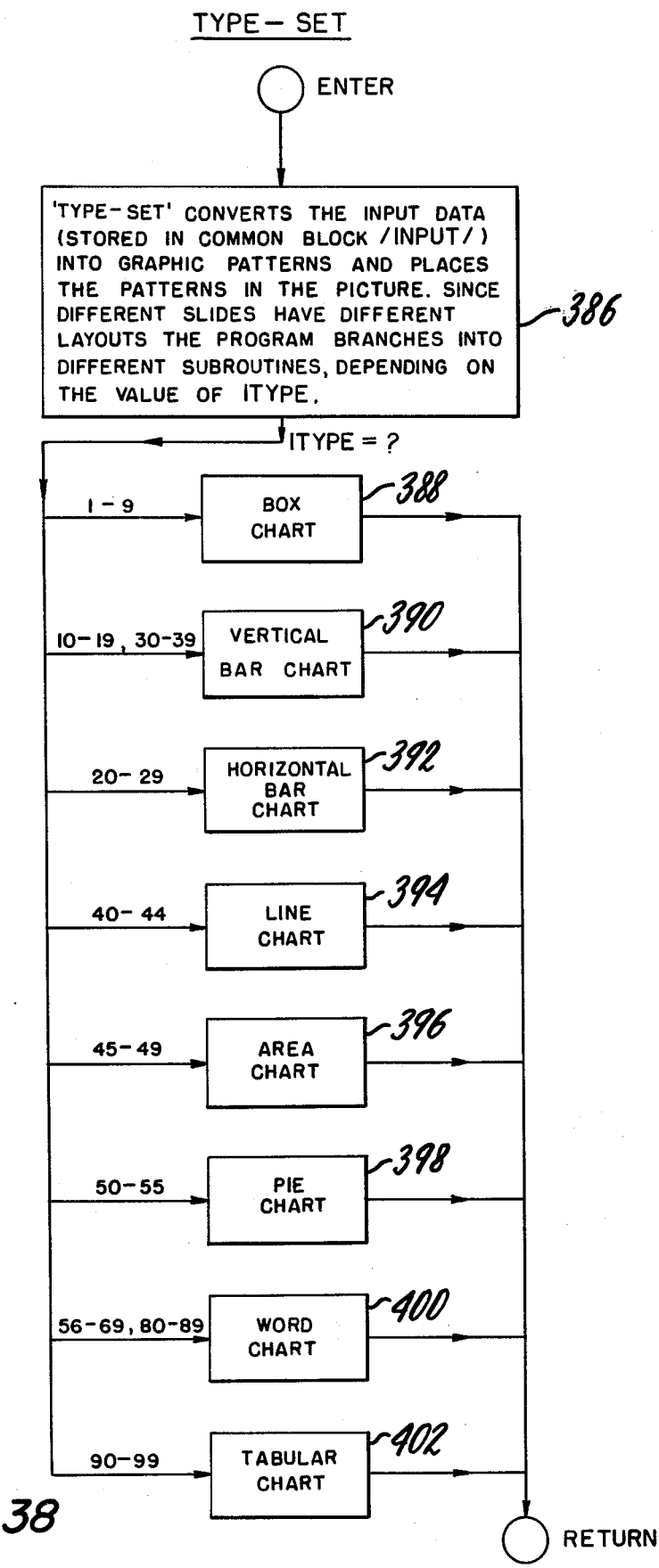
FIG. 38 is a flow chart for the program module "TYPE-SET"

The steps executed by the program module "type-set" are set forth in FIG. 38. The word "type-set" is used in the general sense, meaning to convert the input data stored in the common block /INPUT/ into graphic patterns which, in turn, are properly positioned in the picture raster. Again, since different slides have different layouts, TYPESET branches into one of eight subroutines depending upon the type of slide. Consequently, in the first step 386 TYPESET checks the number ITYPE and calls the appropriate one of the subroutines 388–402.

Figure 39A:
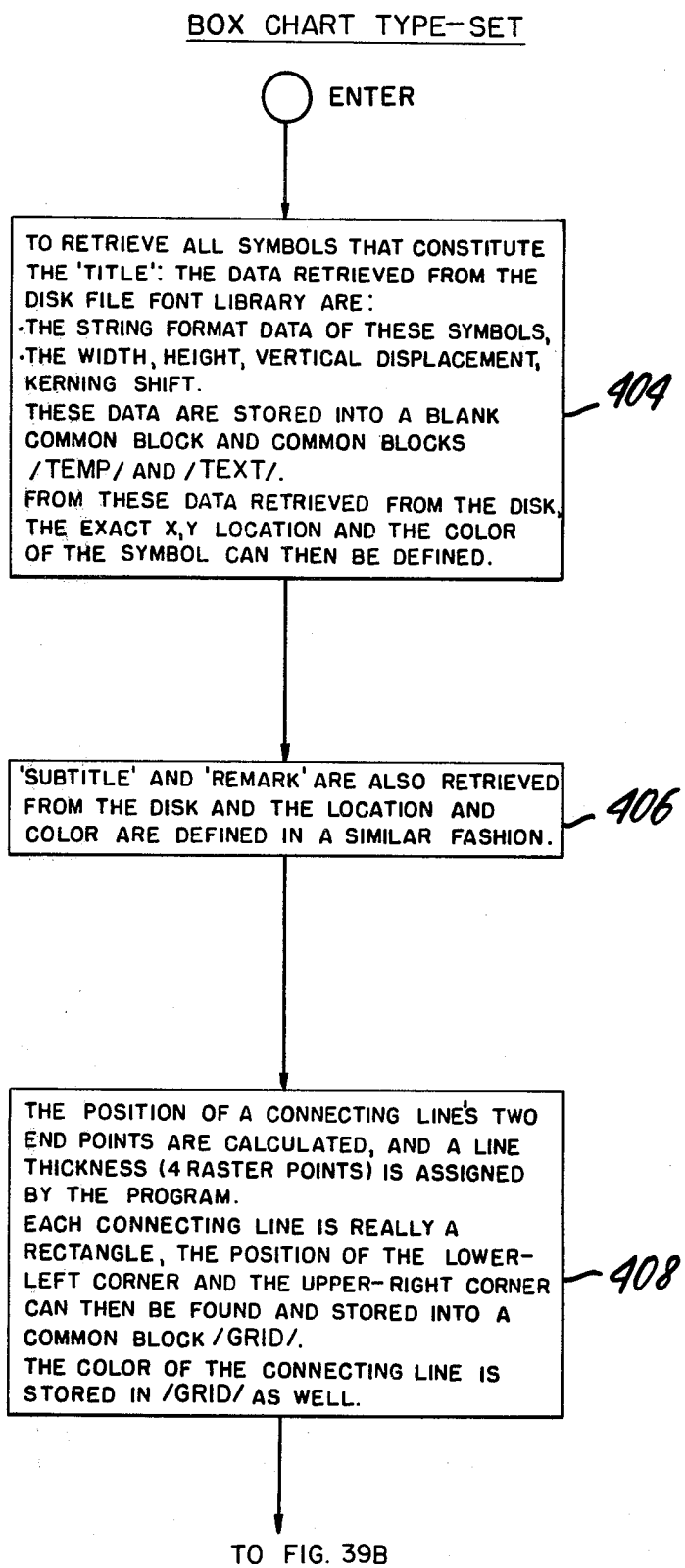
FIGS. 39A and 39B are representative subroutines of the program module "TYPE-SET"
Figure 39B:
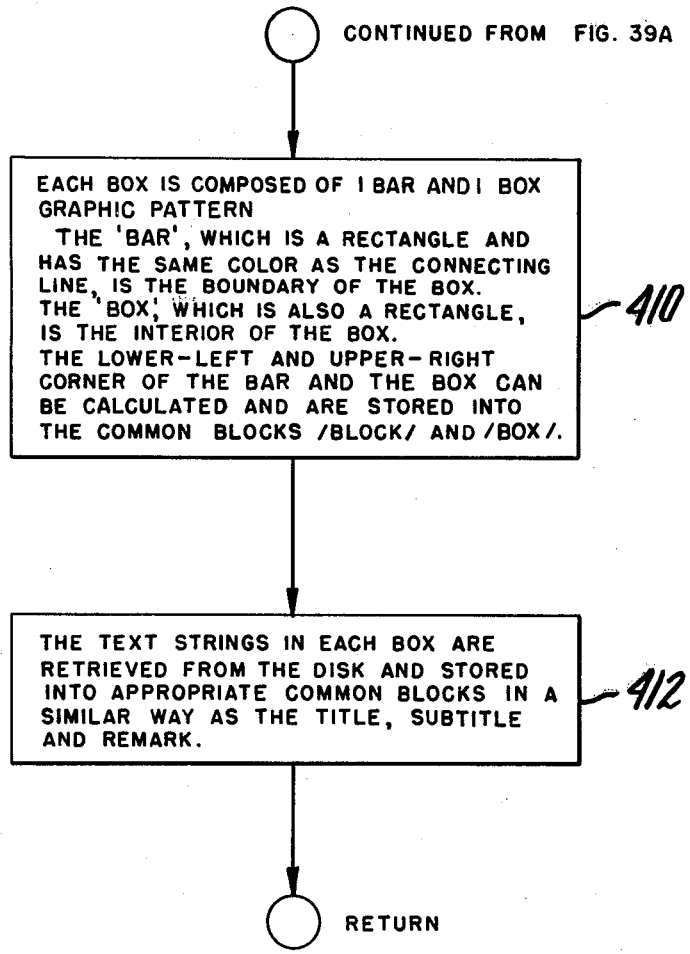

As an example, FIGS. 39A and 39B show the steps of the subroutine for a box chart. The first step 404 in this routine is to retrieve from the disk file symbol library the data defining each of the symbols that constitute the title of the slide. If two or more symbols appear two or more times, as in "bookkeeping" for example, the data for each symbol is retrieved only once. Thus, in this example, the letters b,o,k,e,p,i,n,g would be retrieved from the disk.

The symbol data is stored in the common block in the following fashion: First of all, an area called /TEMP/ is established for storage of the identity, font and size of each of the characters retrieved from the disk. This section of the common block is used to determine whether the next text symbol has been previously retrieved from the font library and placed in memory. The parameters stored in /TEMP/, therefore, are:

ID( )—An array listing the identity of each symbol stored in the common block.

IFONT( )—An array defining the font of each symbol identified in ID( ).

ISIZE( )—An array defining the size of each symbol identified in ID( ).

The notation ( ) means that the given parameter has an array of data (in this case a different number for each of the different symbols).

In addition to /TEMP/, further data about the symbols retrieved from the symbol library are stored in the common block in an area called /TEXT/. The information stored in this area includes the following parameters:

NTLINES—The number of text lines in the box chart. For example, a chart having a title, subtitle, four boxes and a remark may have seven text lines.

LOCMEM( )—An array containing the location in the common block of the RLE data for each symbol. This array is thus a "pointer" for each symbol.

NCHAR( )—An array containing the number of symbols in each text line. For example, if there are seven text lines, this array will include seven different numbers, one for each text line.

XCHAR( )—An array containing the "X" or horizontal location of each symbol, in raster point units.

YCHAR( )—An array containing the "Y" or vertical location of each symbol, in raster point units.

COLOR( )—An array containing the color (using the three-bit color code) of every text line.

The RLE data for all the symbols used in the slide are stored elsewhere in the common block. The starting location for this data defining each symbol is stored in LOCMEM( ).

At this point, it is useful to introduce the manner in which the symbol size is handled in the slide computation.

For convenience, the picture raster is divided into "reference units", each of which equals 28 raster point units. Thus, with a slide having 1344×2016 raster point units, the slide will be 48 reference units high and 72 reference units wide.

Consequently, each slide may be viewed as a grid of 48×72 reference units. Some space is always left on each side and on the top and bottom so that the graphic patterns on the slide do not reach the edge of the picture.

There are eight different sizes of symbols available to the user for composition. These may be numbered from 1 to 8 (smallest to largest) with the smallest size being one reference unit high and the largest size eight reference units high. Thus, the size of the smallest symbol is 1/48th of the height of the slide. Sizes 2, 3, 4 ... 7 are not linearly distributed between the smallest and largest sizes. The following table sets forth the size relationships:

TABLE 4

| Size No. | No. of Reference Units | Maximum No. of Lines/Slide | Maximum No. of Char/Line | "Points" on 5.44 × 8.16 PICT. |
|---|---|---|---|---|
| 8 | 8 | 3 | 8 | 96 |
| 7 | 6 | 4 | 11 | 72 |
| 6 | 4 | 7 | 17 | 48 |
| 5 | 2.67 | 10 | 25 | 32 |
| 4 | 2 | 14 | 34 | 24 |
| 3 | 1.6 | 18 | 42 | 19.2 |
| 2 | 1.33 | 22 | 51 | 16 |
| 1 | 1 | 29 | 68 | 12 |

The data format permits a different number of scan lines to be stored for each symbol. Thus, a tall character will result in more data than a short character. For example, the data defining a symbol may be set to assume that the largest letters (e.g., "B" and "W") will fill a square roughly 225 scan lines high and no more than 2048 raster points wide. A relatively short symbol "i" may be only 58 scan lines high, which results in less RLE data than for a larger symbol. By counting the end-of-line flags in bit 11 of the RLE data, it is possible to determine the number of scan lines in a symbol. This information is also contained in the symbol height number "IY".

For symbols to be displayed in the largest size (size 8) the data defining each and every scan line for the symbol is retrieved from the symbol library and stored in the computer common block. Thus, for a "B", for example, 225 lines of data are retrieved and stored. If we assume an average of two segments of symbol for each scan line, each segment requiring the definition of one starting point and one ending point, each point of which is set forth in a two-byte word, the symbol "B" will require approximately 225 (lines) × 2 (segments) × 2 (points per segment) × 2 (bytes per point) or approximately 2K bytes which must be retrieved and stored in the common block.

For sizes smaller than size 8, less than the full amount of RLE data must be retrieved. For size 6 (which is half as large as size 8) every other line is retrieved. For size 7, three lines out of four are retrieved and for size 1

(which is ⅛th as large as size 8) only one line out of eight is retrieved.

While a field of 140K bytes is reserved in the computer memory common block to store the symbol data, less than half of this total space in memory is required for the average slide.

After retrieving each of the symbols that constitute the title, storing the string format data for each different symbol in the space assigned in the common block, and storing the required data in /TEMP/ and /TEXT/, the subroutine determines and stores the exact X,Y location of each symbol. For left justified sumbols, the left edge of the first symbol in the title is positioned two reference units (56 raster point units) from the left-hand side of the slide. For right justified symbols, the right edge of the last symbol in the title is positioned 56 raster point units from the right-hand side of the slide. In this case, since there are 2016 raster point units in a horizontal scan line, the left edge of the first symbol of the title wall be positioned at 2016-56-TW (in raster point units), where TW is the total width of the text line (title). The total width TW of the text line equals the sum of the individual widths of the symbols minus the sum of the kerning distances between the symbols. For example, if the text line is "VAN", the total width is given by:

$$TW = IX_V + IX_A + IX_N - KERN_{VA} - KERN_{AN}.$$

For centered text, the left edge of the first symbol is positioned at (2016-TW)/2. The positions of symbols after the first symbol may be determined by simply adding the width of the previous symbols to the starting position and subtracting the kerning distances between the previous symbols. Thus, in the example given above, the position of "N" is given by:

$$X_N = X_V + IX_V + IX_A - KERN_{VA} - KERN_{AN},$$

where X is the position of the symbol indicated.

After completing the title text, the subroutine repeats the process for the symbols in the subtitle and the remark. This operation is indicated as step 406 in FIG. 39A.

Proceeding to step 408, the subroutine now considers and stores data defining the connection lines in a location in the computer memory common block called /GRID/. /GRID/ contains the following parameters:

NGLINE—The total number of grid lines in a slide. This counter is set to zero by INITIALIZATION.

$X,Y_{ll}( )$—This is the coordinate of the lower left corner of each grid line in raster point units.

$X,Y_{ur}( )$—This is the coordinate of the upper right corner of each grid line in raster point units.

COLOR( )—This is the color of each grid line. While there are eight different colors which may be used for the connection lines, it is assumed that all connection lines are the same color.

The parameters in /GRID/ are determined as follows: Each time a new connection line is processed, NGLINE is increased by "1.". The color of the connection lines are specified in the data in /INPUT/, as are the end points of each line which are designated I1, I2. The subroutine converts the end points I into horizontal and vertical raster point units and calculates the coordinates (X, Y) of the lower left and upper right corners of the grid line.

For example, if I1=15 and I2=55, the subroutine converts these numbers into vertical and horizontal raster point units, respectively, so that I1 becomes 500,1008 and I2 becomes 900,1008. Since I1 and I2 define the end centerpoint of the line, two raster point units must be added to the horizontal address of the upper end point and two raster point units subtracted from the horizontal address of the lower end point. The values X,Y for I1 and I2 are therefore:

$X,Y_{ur} = 500,1010;$ $X,Y_{11} = 900,1006.$

As indicated in step 410 in FIG. 39B, each box of the box chart is formed by a "bar" or rectangle serving as the box outer boundary and a "box", also a rectangle, serving as the box inner boundary. The difference between the bar and the box is therefore the thickness of the box outline. The subroutine calculates and stores the lower left and upper right corners of each bar and box in computer memory common block areas called /BLOCK/ and /BOX/, respectively. The parameters in these two storage locations are nearly identical and, in fact, are similar to the parameters in /GRID/. They are:

NBLOCK—The number of box chart boxes, which is determined by the number of box card images excluding the last blank card.

NBAR—Ditto NBLOCK; that is, the number will be the same.

$X,Y_{ur}( )$—The X and Y coordinates of the upper right corner of each block in the case of /BLOCK/ and each bar in the case of /BOX/.

$X,Y_{ll}( )$—The X and Y coordinates of the lower left corner of each block in the case of /BLOCK/ and each bar in the case of /BOX/.

COLOR( )—The color of the line defining the organization chart box in the case of /BLOCK/ and the color of the area inside the organization chart box in the case of /BOX/.

These parameters are determined and computed in the same way as the parameters for /GRID/. NBLOCK and NBAR are counters, cleared by INITIALIZATION, which are indexed each time a box chart box is processed. The color data is found in /INPUT/ as are the center points of each block and bar. Thus, since the center point of a box is given as numbers I,J where I is the vertical position and J the horizontal position, the vertical and horizontal positions of the box in the raster point units of the center point are given as:

Vertical position = $1344 - (9.5 + 3I) \times 28$; and

Horizontal position = $(1.5 + 7J) \times 28$.

Since the outer boundary of an organization chart box is three reference units high and eleven reference units wide, the vertical position of the top boundary is determined by adding $1.5 \times 28$ to the vertical position of the center point. Similarly, the horizontal position of the right boundary is given by adding $5.5 \times 28$ to the horizontal position of the center point. Proceeding in this manner, it is possible to calculate X,Y for the upper right and lower left corners of each block and bar.

Finally, in step 412, the text strings for each organization chart box are retrieved from the disk and stored into appropriate areas in the computer memory common block using the same procedure as that for the title, subtitle and the remark. Upon completion of this step, the program module TYPE-SET is finished and control is returned to the program MAIN.

4.4.4 "PROCESS"

Figure 40:
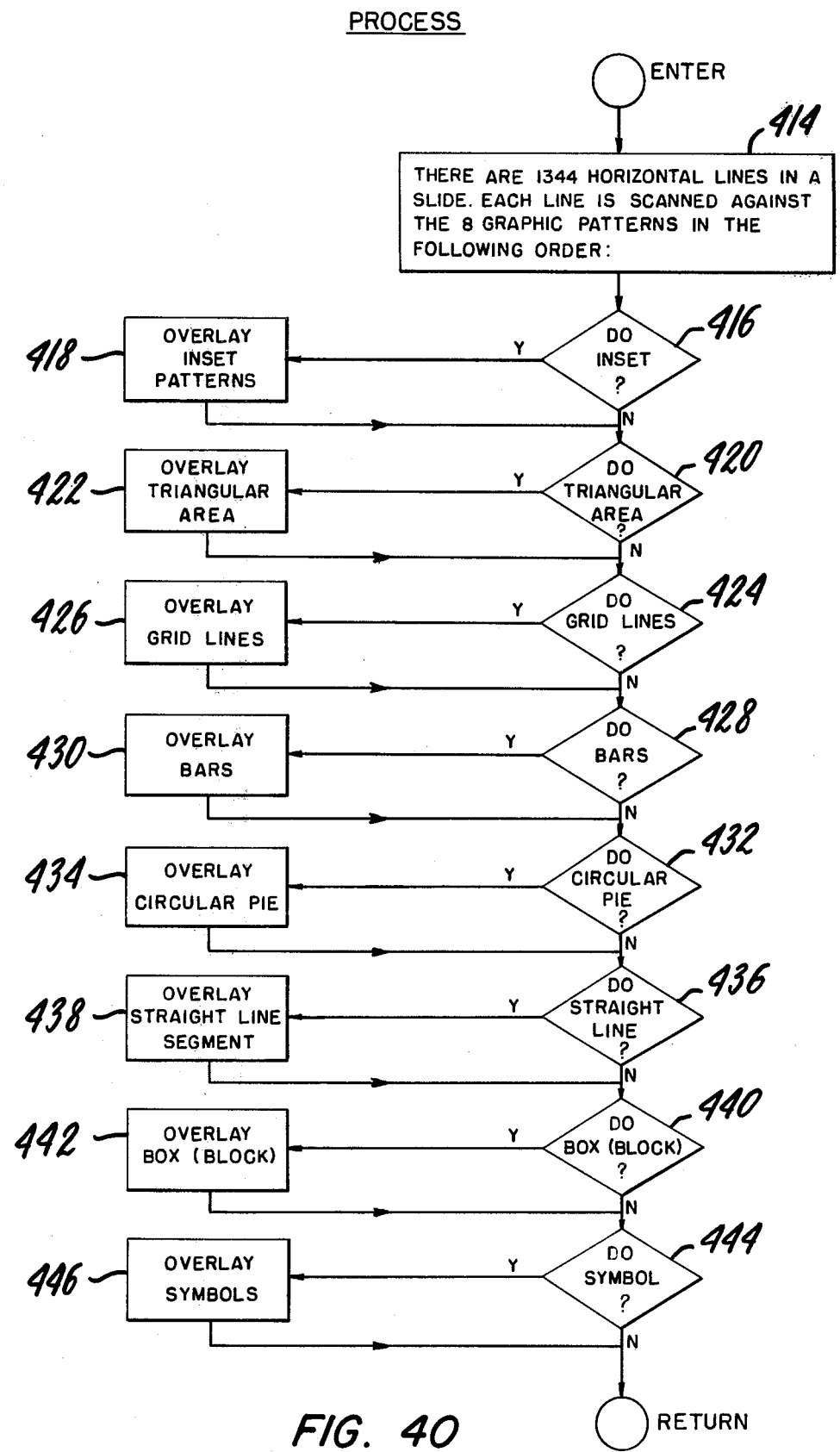
FIG. 40 is a flow chart for the program module "PROCESS"
Figure 41:
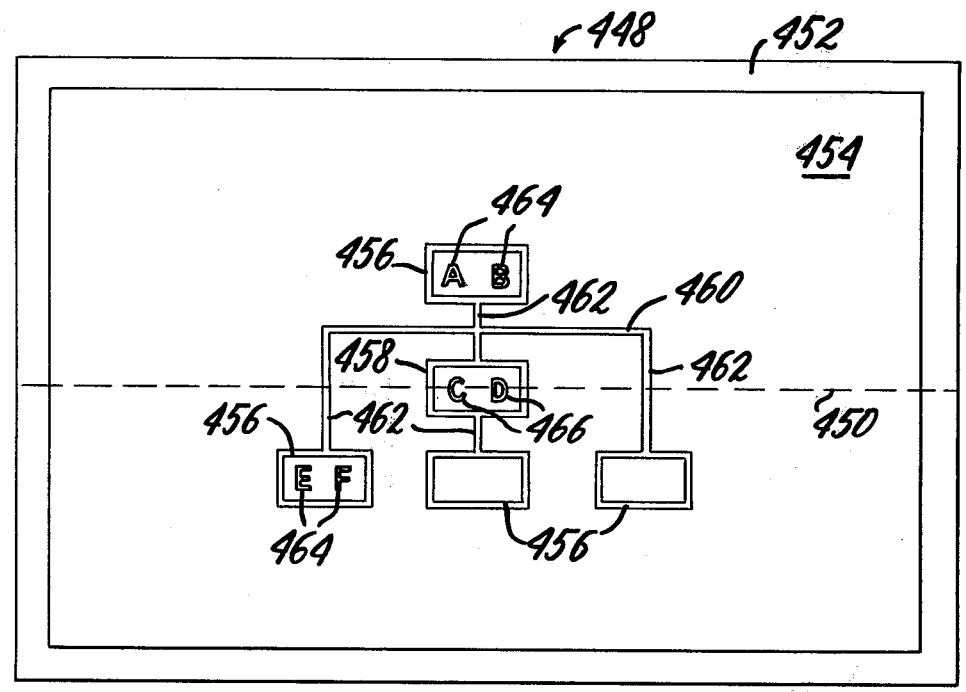
FIG. 41 is a diagram showing how the program module PROCESS composes a scan line.

The steps executed by the program module PROCESS are set forth in FIG. 40.

As noted in step 414, PROCESS determines the color of the 2016 raster points in each of the 1344 horizontal lines in a slide. The process used for each scan line is indicated for steps 416–446 that follow. These steps 416–446 are executed 1344 times before the slide is complete.

Before proceeding to scan each line, all the raster points in the slide are set to the background color. Thereafter, if the "inset" counter was indexed (step 416), after being cleared to zero by INITIALIZATION, the program enters step 418 and, the color of the raster points within the inset field are changed to one overlayed by the inset color. If the inset center was not indexed, the program continues directly to step 420.

Next, the counter for triangular areas is checked at step 420 to determine whether any such areas exist in the slide. If so, the color of the raster points in the current line which fall within the triangular area or areas is changed as required. If not, the program immediately proceeds to step 424 and continues in this manner.

It should be emphasized that no calculation is necessary to carry out this process because all the data required to determine the color of each raster point on a line is stored in the computer memory common block. In essence, PROCESS merely retrieves data from the common block in a prescribed order, updating the color of each of the 2016 raster points in the current scan line, and after proceeding through step 416–446, writes the color data for that line in a prescribed format onto a temporary disk file.

In carrying out the overlay procedure, PROCESS repeatedly updates three parameters:

| | |
|---|---|
| NSEG | -An integer, which can be from 1 to 500, giving the number of "segments" in the current scan or raster line. A "segment" is defined as a portion of the scan line in which all adjacent points have the same color. As an upper limit, a scan line can have 500 segments |
| KOLOR( ) | -An array specifying the color of each scan line segment. There are a maximum of 8 different colors, and a maximum of 500 entries in this array. |
| KOUNT( ) | -An array specifying the number of raster points in each scan line segment. As a maximum, this array can have 500 entries. |

An example of the procedure carried out by PROCESS will now be described with reference to FIG. 41 and FIGS. 41A–41F. Assume that PROCESS, in working on a slide 448, has already scanned half the picture and is now at the raster line 450. This slide is an organization chart comprising a background 452, an inset 454, a number of boxes 456, one box 458 of which is intersected by the scan line. The slide also has a horizontal connecting line 460 and three vertical connecting lines 462. The boxes 456 contain text 464; in particular, the box 458 contains the letters "C" and "D" 466 which are intersected by the scan line 450.

In step 414 of PROCESS, the entire scan line 450 is set to the background color. There is thus one segment of background color having 2016 raster points. Therefore:

NSEG=1

KOLOR(1)=BKGD

KOUNT(1)=2016

Figure 41A:
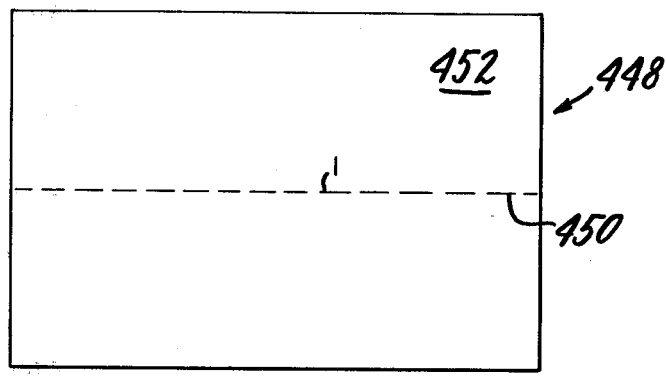
FIGS. 41A–41F are diagrams showing portions of the diagram of FIG. 41.

The scan line 450, with the single segment, is shown in FIG. 41A.

Figure 41B:
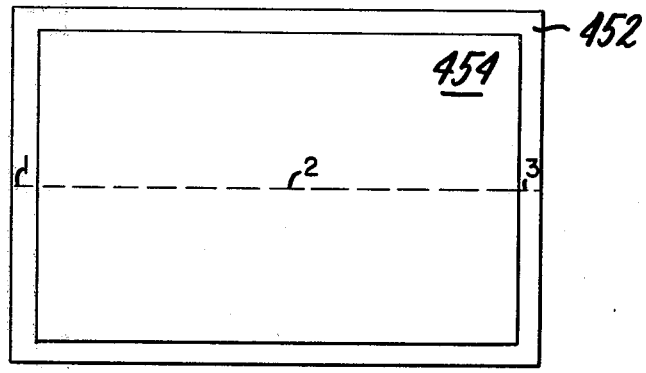

In step 416 PROCESS determines that an inset is present and proceeds to update the description of the scan line in step 418. As shown in FIG. 41B, there are now three line segments of background, inset and background colors, respectively. The parameters are therefore changed to the following:

| | | |
|---|---|---|
| NSEG = 3 | | |
| KOLOR(1) = BKGD | KOUNT(1) | = 100 |
| (2) = INSET | (2) | = 1816 |
| (3) = BKGD | (3) | = 100 |

The information for updating these parameters is found in an area called /INSET/ in the common block which was generated from the data in /INPUT/ by TYPSET. The parameters stored in /INSET/ are:

| | |
|---|---|
| NINSET - | The number of insets in the slide (i.e., 1). |
| $X,Y_{ll}( )$ - | The coordinates of the lower left corner of the inset. |
| $X,Y_{ur}( )$ - | The coordinates of the upper right corner of the inset. |
| KOLOR ( ) - | The color of the inset. |

Because the slide does not have a triangular area, PROCESS moves directly to step 424 and on to step 426. In step 426, PROCESS checks the common block area /GRID/ and determines that there are no horizontal grid lines intersecting the scan line. This test is performed by comparing the upper and lower Y coordinates of the horizontal line 460 with the Y coordinate of the current raster line 450. Since the raster line lies below the range of Y values of the horizontal line 460, this horizontal line is ignored.

PROCESS then determines in a similar manner that the three vertical lines 462 do intersect the scan line 450. From the information contained in /GRID/ the parameters NSEG, KOLOR and KOUNT are updated as follows:

| | | |
|---|---|---|
| NSEG = 9 | | |
| KOLOR (1) = BKGD | KOUNT (1) | = 100 |
| (2) = INSET | (2) | = 500 |
| (3) = GRID | (3) | = 6 |
| (4) = INSET | (4) | = 399 |
| (5) = GRID | (5) | = 6 |
| (6) = INSET | (6) | = 399 |
| (7) = GRID | (7) | = 6 |
| (8) = INSET | (8) | = 500 |
| (9) = BKGD | (9) | = 100 |

Figure 41C:
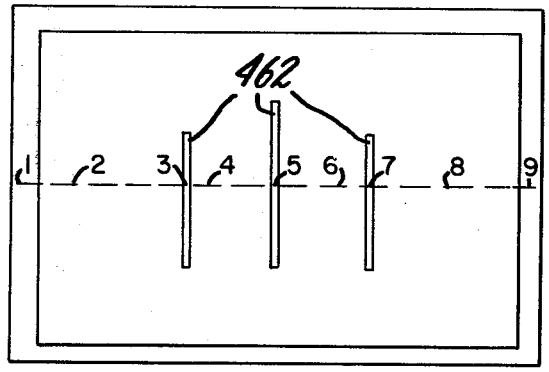

The nine segments determined at this point are shown in FIG. 41C.

Figure 41D:
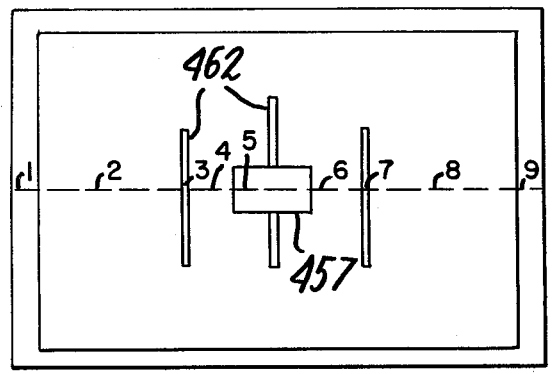

PROCESS next proceeds to step 428 and determines that "bars" are present in the slide. The program therefore turns to step 430 which updates the parameters NSEG, KOLOR and KOUNT from the information contained in the common block area /BAR/. As shown in FIG. 41D, there is only one bar 457 which intersects the scan line. Although there are still only nine segments in the scan line, the PROCESS parameters are changed to the following:

| NSEG = 9 | | | |
|---|---|---|---|
| KOLOR (1) | = BKDG | KOUNT(1) | = 100 |
| (2) | = INSET | (2) | = 500 |
| (3) | = GRID | (3) | = 6 |
| (4) | = INSET | (4) | = 202 |
| (5) | = BAR | (5) | = 400 |
| (6) | = INSET | (6) | = 202 |
| (7) | = GRID | (7) | = 6 |
| (8) | = INSET | (8) | = 500 |
| (9) | = BKGD | (9) | = 100 |

Figure 41E:
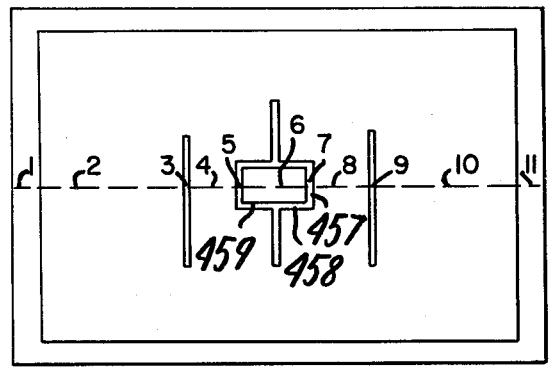

Upon completion of bars, PROCESS determines that there are no circular pies (step 432) or straight lines (step 436) in the slide. However, in step 440 it finds that the slide contains at least one block. Consequently, PROCESS executes step 442 and determines that only block 459 intersects the scan line as shown in FIG. 41E. From the information in the common block area /BLOCK/ (also called /BOX/), the PROCESS parameters are updated as follows:

| NSEG = 11 | | | |
|---|---|---|---|
| KOLOR (1) | = BKGD | KOUNT (1) | = 100 |
| (2) | = INSET | (2) | = 500 |
| (3) | = GRID | (3) | = 6 |
| (4) | = INSET | (4) | = 202 |
| (5) | = BAR | (5) | = 6 |
| (6) | = BLOCK | (6) | = 388 |
| (7) | = BAR | (7) | = 6 |
| (8) | = INSET | (8) | = 202 |
| (9) | = GRID | (9) | = 6 |
| (10) | = INSET | (10) | = 500 |
| (11) | = BKGD | (11) | = 100 |

Figure 41F:
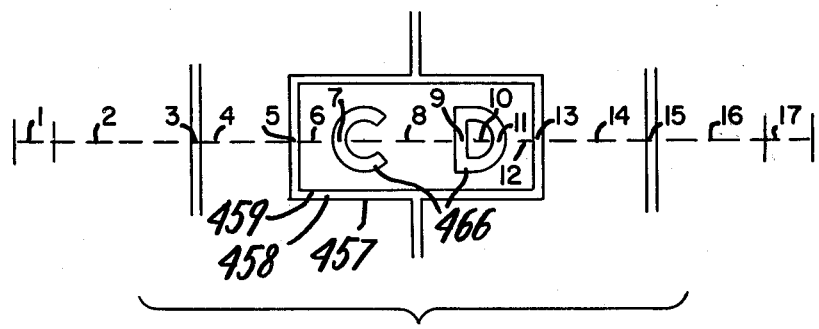

When step 442 is finished, PROCESS determines, in step 444, that symbols are present in the slide. PROCESS therefore proceeds to the final step 446 for this scan line, where it finds that two symbols "C" and "D" intersect the line. As shown in FIG. 41F, which illustrates an enlarged portion of the slide, there are now 17 segments in the scan line with the addition of the symbols 466.

As explained above, the RLE data (FIG. 18) defining the "C" and "D" are stored in a special, unnamed area of the common block. For every "C" and "D" that are used in the slide, there is a separate pointer LOCMEM which is updated as PROCESS proceeds through the 1344 scan lines. Thus, the LOCMEM for each letter "C" and "D" point to the respective locations in the common block containing the words "ISTART" for the current scan line. These words, and the following words for the same scan line are used to determine the positions of the segments defining the letters "C" and "D" on that line.

For example, for the letter "C" the position of the segment 7 is given by:

Starting position: $IXCHAR_C + ISTART_C$, where $LOCMEM(C)$ points to $ISTART_C$ Ending position: $IXCHAR_C + IEND_C$.

After the segment or segments of a character on the current scan line are determined, LOCMEM for that character is updated for the next scan line.

With this procedure for obtaining information, PROCESS updates the process parameters to the following:

| NSEG = 17 | | | |
|---|---|---|---|
| KOLOR (1) | = BKGD | KOUNT (1) | = 100 |
| (2) | = INSET | (2) | = 500 |
| (3) | = GRID | (3) | = 6 |
| (4) | = INSET | (4) | = 202 |
| (5) | = BAR | (5) | = 6 |
| (6) | = BLOCK | (6) | = 40 |
| (7) | = CHARC | (7) | = 20 |
| (8) | = BLOCK | (8) | = 218 |
| (9) | = CHARD | (9) | = 20 |
| (10) | = BLOCK | (10) | = 30 |
| (11) | = CHARD | (11) | = 20 |
| (12) | = BLOCK | (12) | = 40 |
| (13) | = BAR | (13) | = 6 |
| (14) | = INSET | (14) | = 202 |
| (15) | = GRID | (15) | = 6 |
| (16) | = INSET | (16) | = 500 |
| (17) | = BKGD | (17) | = 100 |

When step 446 is finished PROCESS converts the parameters NSEG, KOLOR and KOUNT into output data, and returns to process the next scan line.

Figure 42:
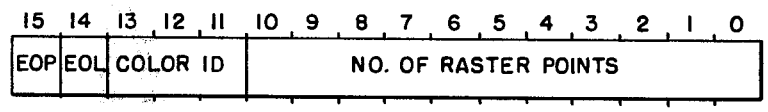
FIG. 42 shows the format of a two-byte word containing raster data in a scan line.
Figure 44:
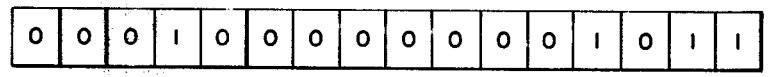
FIG. 44 shows a two-byte word containing ones and zeros in the bit positions indicated in the word of FIG. 42.

The format of the data written onto the disk file is shown in FIG. 42. Each raster line is made up of one or more "segments" of raster points having the same color. For example, points 1-16 may be blue, points 17-2000 red, and points 2001-2016 blue. This line then has three color segments of 16, 1984, and 16 raster points, respectively. If all the raster points in a scan line are the same (background) color, the line consists of one color segment. Note that while it is possible to have up to 500 color segments in a scan line, only eight different colors are permissible.

One sixteen bit word is used to describe each color segment as shown in FIG. 42. The bits in this word are assigned as follows:

Bit 0 to Bit 10—This string of eleven bits define the number of raster points in this color segment; i.e., the length of this color segment.

Bit 11 to Bit 13—These three bits define the color (one of eight colors) of this color segment.

Bit 14—When set, this bit indicates that this color segment is the last segment on this line (end-of-line signal).

Bit 15—When set, this bit indicates that this color segment is the last segment of this picture raster (end-of-slide signal).

4.4.5 "OUTPUT"

Figure 43:
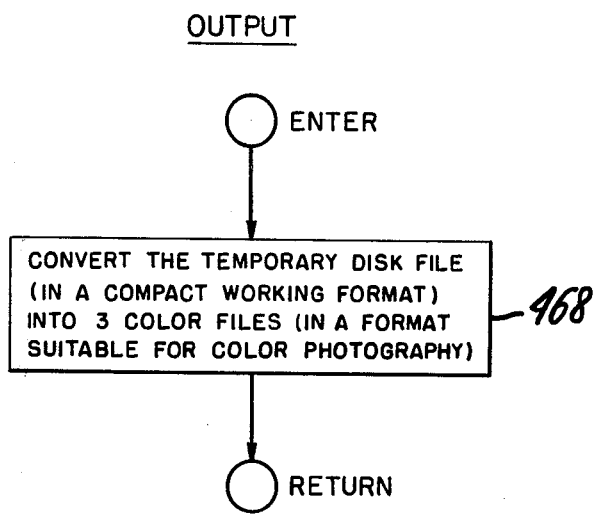
FIG. 43 is a flow chart for the program module "OUTPUT"
Figure 45:
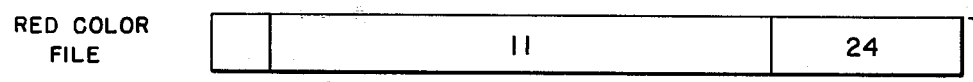
FIG. 45 shows three words containing the red, green and blue color intensity information for the raster points identified in the word of FIG. 44.
Figure 45:
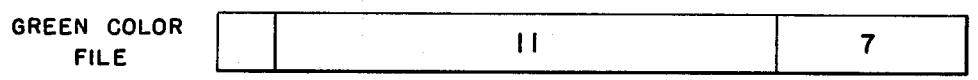
Figure 45:
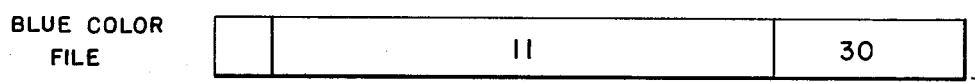

OUTPUT, shown in FIG. 43 merely converts the data in the format shown in FIG. 42 on the temporary disk file into a format more suitable for color photography and writes this new data onto a magnetic tape. The final output format is shown in FIG. 45.

Every color can be represented by the addition of three primary colors, each with a specific intensity. Therefore, each of the eight colors represented in the data on the temporary disk file can be translated into respective intensities of red, green and blue. Because there are a limited number of color possibilities (64 different colors), a table look-up procedure is used to derive the intensities of red, green and blue for each of the colors (up to 8) on a slide.

Therefore, for each 16 bit word on the temporary disk file, OUTPUT creates and writes on magnetic tape three sixteen bit words in step 468 of FIG. 43. This conversion can best be described by an example:

Assume that a word in the format shown in FIG. 42 defines a purple color segment of eleven raster points, and assume also that the purple color is the third color used in this slide. Therefore, the 16-bit word representation of this color segment in the temporary disk file will contain the bits shown in FIG. 44. Bits 0–10 will contain the binary representation of the number eleven, and bits 11–13 will contain the binary representation of two, which is the third number when counting from zero. From the color table, it is known that a purple color has intensities of 24, 7 and 30 of red, green and blue, respectively. Therefore, the word illustrated in FIG. 44 will be translated into the three words shown in FIG. 45.

5. PICTURE DISPLAY AND PHOTOGRAPHY

The final stage of the picture-making procedure according to the present invention is the production of 35 mm slides from the digitized picture information recorded on magnetic tape. The magnetic tape containing the picture information is played back through a picture imaging and photography device which decodes the information, and displays the picture on a high-resolution cathode ray tube screen. A camera, mounted in front of the screen, then records the picture on film. Color pictures are taken by exposing a single frame of the camera film to three separate black and white images—each representing the intensity of one of the primary colors—through red, green and blue filters, respectively.

5.1 General Description of Hardware

Figure 46:
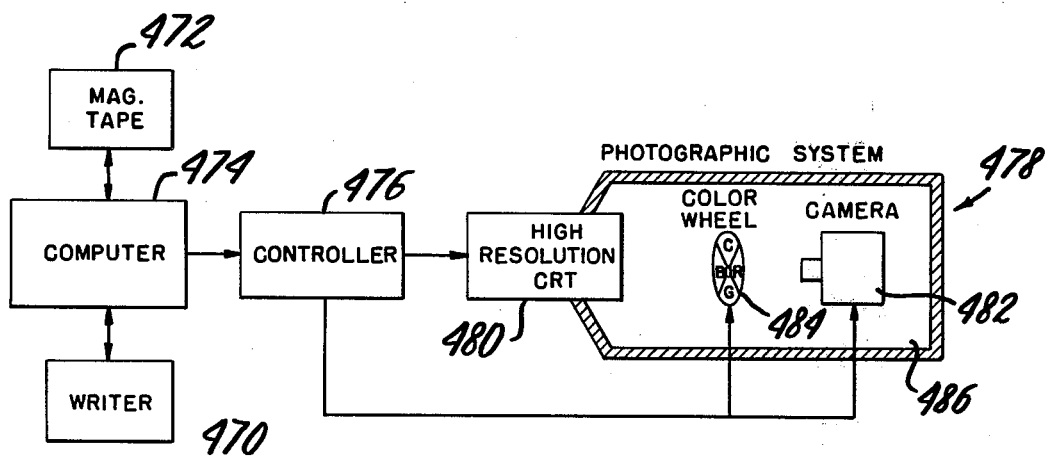
FIG. 46 is a block diagram of a color film recorder.

The device used for displaying and photographing the computer generated pictures is shown in FIG. 46.

The device includes a keyboard input unit 470 for supplying control information typed in by an operator and a magnetic tape drive 472 for reading the RLE encoded data for each slide. The control information and slide data are received by a minicomputer 474, such as PDP 11, having a memory of suitable size to store the RLE data for one entire slide.

The computer 474 receives the RLE data from magnetic tape, one slide at a time, converts these data into raster point grey level intensities and outputs these grey levels, one raster point at a time, to a controller 476. Interspersed between the grey levels, the computer also issues commands to the controller for operating a photographic system indicated generally at 478.

The controller 476 accepts the digital intensity grey level data from the computer and converts it into analog line scan and intensity modulation signals to drive a high-resolution cathode ray tube 480. The controller also generates signals to activate a camera 482 and a color wheel 484 in the photographic system 478.

The cathode ray tube 480 has a resolution of 4080×4080 raster points. This CRT has a 5″ diameter flat face to provide a clear image for the photographic system 478.

The photographic system 478 views the CRT screen and records the images displayed. The camera 482 is capable of exposing a single frame at a time with the shutter and film advance under control of the controller 476. The color wheel 484 has disposed thereon red, green, blue and clear photographic filters. This color wheel is used to produce color pictures by primary color addition. Three black and white images are displayed by a CRT, each giving the intensity of one of the primary colors. Each image is passed through an appropriate filter and recorded on color film, the color picture being produced by superimposing the three primary color images on the same film frame. The clear filter is used for black and white photography. The position of the color wheel is changed at the appropriate times by the controller 476. Both the color wheel and the camera are surrounded by a light-tight enclosure 486.

As explained above, picture imaging and photography devices suitable for the use of the system according to the present invention are available commercially. A preferred device is the Celco CFR 2000.

As may be appreciated from the foregoing description, the automatic picture producing system according to the present invention is susceptible to various modifications, changes and adaptations as will occur to those skilled in the art. Although the apparatus has been described with reference to certain preferred embodiments thereof, it is intended that the scope of the present invention is limited only by the following claims.

6. APPENDIX

This appendix contains full statements of the computer programs described above for use in the apparatus according to the present invention.

Section 6.1 sets forth the microcomputer variables and arrays which are used in the microcomputer program to create a box chart. Section 6.2 sets forth a microcomputer program, written in BASIC, for creating the box chart. Section 6.3 sets forth a slide computation program, written in FORTRAN, for producing a slide containing an organization chart. In both sections, 6.2 and 6.3 the subroutines are separately listed following the main, control program.

| 6.1 Box Chart Micro Variables And Arrays | |
|---|---|
| CN$ - | Color names, i.e., "black", "red", ..."white" These are loaded from a data statement ($ arrays are characters) |
| C1 (7) - | Film color numbers corresponding to the ISC color keys. For example CL(0) is used to store the film color to correspond to the black key. Cl(1) for the red key, etc. Input by user. |
| L1$ (5,4) - | Line 1 of box text. For example, L1$(0,0) contains the text of the box in the first column of the first row, and L1$(5,1) contains the text of the box in the second column of the sixth row. |
| L2$ (5,4) - | Line 2 of box text. |
| C1$ (5,4) - | Color of line 1 of box text. |
| C2$ (5,4) - | Color of line 2 of box text. |
| BX (5,4) - | Box flag. If "0" box is not used; if "1", box is used. |
| BC$ (5,4) - | Color of box. |
| P1 (30) - | The endpoints of connecting line sections selected |
| P2 (30) - | by user. For example if P1(6) contained "22" and P2(6) contained "27" that would indicate a horizontal line between "node points" 22 and 27. (See Std. format of BOX Fig. 3) |
| TT$ (3) - | Text of title (1), subtitle (2), remarks (3). |
| F (7) - | F(1): font no. for entire slide F(2): size of title F(3): size of subtitle F(4): size of remarks F(5): justification of title F(6): justification of subtitle F(7): justification of remarks |
| TZ$ (3) - | Not used. |
| KT$ (3) - | Color of title, subtitle, remarks. |
| TY (3) - | Default vertical positions of title, subtitle, remarks. Read from data statement during initialization. |
| Y1 (3,3) - | Vertical positions for surrounding boxes |
| Y2 (3,3) - | of title, subtitle and remarks. |
| CH (100) - | Widths of the characters in the font selected by the user. Read from diskette in a subroutine [18000]. |
| BD (30) - | Not used. |

6.1 Box Chart Micro Variables And Arrays

TV$ (3) - Contains the text strings "TITLE", "SUBTITLE", and "REMARKS". Read from a data statement during initialization.

D$ (3) - Contains the diskette drive numbers chosen by the user for "program" and "data".

BT (2) - Temporary storage of box text color selected by user in the create section 104 of the program (Fig. 2).

Q$ (2) - "Objects" of change commands assigned by "change command parser" (Subroutine at line [20700]). See accompanying discussion of parser routine in the modify section 108 of the program.

6.2 APPENDIX    © 1978 MATHEMATICAL APPLICATIONS GROUP, INC.

```
5 PLOT 12
10 CLEAR 1500
13 VN$="04"
15 DIM CN$(7),CL(7)
20 DIM L1$(5,4),L2$(5,4),C1$(5,4),C2$(5,4)
40 DIM BX(5,4),P1(30),P2(30)
50 DIM BC$(5,4),TT$(3),F(7),TZ$(3),KT$(3),TV(3),Y1(3,3),Y2(3,3)
55 DIM CH(100),BD$(30),TV$(3)
57 DIM D$(2),BT$(2)
58 DIM Q$(2),Q(2),NN(2),QQ$(5,5),PP$(5),NQ(5)
60 PLOT 27:PLOT 11
80 DC=19:SC=18:UC=19:TC=19
81 BT$(1)=CHR$(23):BT$(2)=CHR$(23)
82 BD$=CHR$(20)
84 RESTORE
86 FOR I=1 TO 8:READ TS(I):NEXT I
88 FOR I=1 TO 3:READ TV(I):NEXT I
90 FOR I=0 TO 2:FOR J=0 TO 2:READ Y1(I,J):NEXTJ:NEXTI
92 FOR I=0 TO 2:FOR J=0 TO 2:READ Y2(I,J):NEXTJ:NEXTI
93 FOR I=1 TO 3:READ F(I+1),F(I+4),N:KT$(I)=CHR$(N):NEXT I
94 FOR I=1 TO 3:READ TV$(I):NEXT I
96 FOR I=0 TO 7:READ CN$(I):NEXT I
97 NP=5
98 FOR I=1 TO NP:READ PP$(I):NEXT I
100 FOR I=1 TO NP:READ NQ(I):NEXT I
102 FOR I=1 TO NP:FOR J=1 TO NQ(I):READ QQ$(I,J):NEXT J:NEXT I
110 FOR I=1 TO 8:READ J:SP(I)=I/(28#(S(I))):NEXT I
150 PLOT 30:PLOT 30:PLOT 16:PLOT 29
160 BL$=" ":EM$="\"
170 LP=0
175 MF=3:REM MAX FONT NO
180 IT=0:TO=0:CR=0
182 PLOT 14:PLOT UC:PRINT "MAGI":PLOT SC:PRINT "SLIDES":
184 PLOT 21
186 PRINT " BOX CHART ";VN$:PLOT SC:PLOT 15
187 PLOT 27:PLOT 11
189 PRINT
190 T$="PROGRAM DRIVE NO  (0 OR 1)":GOSUB 20000
192 D$(1)=C$:IF C$<>"0" AND C$<>"1" GOTO 190
194 T$="DATA DRIVE NO  (0 OR 1)":GOSUB 20000
195 PLOT 27:PLOT 11
196 D$(2)=C$:IF C$<>"0" AND C$<>"1" GOTO 194
200 PLOT SC:PRINT
205 PRINT "ENTER A COMMAND  ",:PLOT UC:INPUT " ";C$:PLOT SC
210 C$=LEFT$(C$,3)
222 IF C$="CRE" GOTO 1300
224 IF C$="DIS" GOTO 1945
226 IF C$="GET" GOTO 9000
228 IF C$="MOD" GOTO 4000
230 IF C$="SAV" GOTO 8000
232 IF C$="CAN" GOTO 300
234 IF C$="IDE" GOTO 6000
236 IF C$="TAB" GOTO 7000
249 IF C$="FIN" GOTO 290
250 PRINT:PRINT "TRY AGAIN   COMMANDS ARE:":PRINT
255 LZ=0
262 T$="CREATE A BOX CHART":GOSUB 20400
264 T$="DISPLAY THE CURRENT CHART":GOSUB 20400
266 T$="SAVE THE CURRENT CHART":GOSUB 20400
268 T$="GET A CHART FROM DISK":GOSUB 20400
270 T$="MODIFY THE CURRENT CHART":GOSUB 20400
272 T$="CANCEL THE CURRENT CHART AND RESTART":GOSUB 20400
274 T$="IDENTIFY THE CURRENT CHART":GOSUB 20400
276 T$="TABULATE COLORS":GOSUB 20400
278 T$="FINISHED WITH THIS SESSION":GOSUB 20400
280 GOTO 200
290 PRINT "DOUBLE CHECK: ARE YOU REALLY FINISHED? (Y OR N)";
295 PLOT UC:INPUT " ";C$:PLOT SC
298 IF C$<>"Y" GOTO 200
299 GOTO 65100
300 PRINT "DO YOU REALLY WANT TO CANCEL? (Y OR N):";
302 PLOT UC:INPUT " ";C$:PLOT SC:
304 IF C$<>"Y" GOTO 200
306 GOTO 5
1299 REM
1300 REM CREATE SECTION
1301 REM
1305 PRINT
1306 IF CR=0 GOTO 1310
1308 PRINT "YOU ALREADY HAVE A CHART SPECIFIED":PRINT:GOTO 200
1310 CZ=0:CR=1
1312 NB=0:NL=0
1315 IS=1:IE=3:GOSUB 10000
1395 IF CZ=1 GOTO 5000
1400 FOR I=0 TO 5:FOR J=0 TO 4:BX(I,J)=0:NEXT J:NEXT I
1410 PRINT
1420 PRINT "BOXES USED (INPUT 0 WHEN DONE)"
```

```
1440 REM CALL BOX INPUT ROUTINE
1450 LS=1:LE=30:CZ=0
1460 GOSUB 11000
1770 REM NOW CALL CONNECTING LINE INPUT ROUTINE
1780 LS=1:LE=50:GOSUB 12000
1784 PRINT:PRINT "HIT COLOR KEYS FOR THE FOLLOWING:":PRINT
1786 INPUT "TITLING COLOR: ";C$:PLOT SC
1788 FOR I=1 TO 3:K1$(I)=C$:NEXT I
1790 INPUT "BOX TEXT COLOR, LINE 1: ";C$:PLOT SC
1792 INPUT "                 LINE 2: ";A$:PLOT SC
1794 FOR I=0 TO 5:FOR J=0 TO 4:IF BX(I,J)=0 GOTO 1798
1796 B1$(I,J)=C$:B1$(2)=A$
1795 L1$(I,J)=L1$:L2$(I,J)=A$
1798 NEXT J:NEXT I
1800 INPUT "CONNECTING LINE COLOR: ";LN$:PLOT SC
1802 INPUT "BACKGROUND COLOR: ";BG$:PLOT SC
1820 IF CZ<>0 GOTO 5000
1840 GOTO 200
1842 REM
1843 REM DISPLAY SECTION
1844 REM
1945 PRINT CHR$(27);"X"
1950 PLOT 30:PRINT BG$:PLOT 22:PLOT 12
1952 IF ASC(BG$)<16 GOTO 1960
1954 PLOT123:PLOT2:PLOT253:PLOT0:PLOT242:PLOT159:PLOT0
1956 PLOT159:PLOT159:PLOT0:PLOT159:PLOT0:PLOT0:PLOT255
1958 GOTO 1985
1960 PLOT 16:PLOT 2:PLOT 250:PLOT 0:PLOT 160:PLOT 159
1970 PLOT 161:PLOT 159:PLOT 247
1980 FOR I=1 TO 15:PLOT 34:NEXT I
1982 PLOT 255
1985 IF CR=0 GOTO 3499
1990 REM HERE COME THE BOX OUTLINES
1995 PRINT LN$:PLOT 2
2000 FOR J=0 TO 4:  X0=9+J*30: XM=X0+23
2020 PLOT 250:  PLOT X0
2040 FOR I=0 TO 5: IF BX(I,J)=0 GOTO 2100
2060 Y=128-20*I:PLOT Y:PLOT XM
2080 Y=Y-13:PLOT Y:PLOT XM
2100 NEXT I
2105 NEXT J
2120 FOR I=0 TO 5:Y0=115-20*I:YM=Y0+13
2140 PLOT 246:PLOT Y0
2160 FOR J=0 TO 4:  IF BX(I,J)=0 GOTO 2220
2180 X=9+J*30:PLOT X:PLOTYM
2200 X=X+23:  PLOT X:  PLOT YM
2220 NEXT J:  NEXT I
2290 REM HERE COME THE CONNECTING LINES
2300 IF NL=0 GOTO 2500
2320 FOR L=1 TO NL
2325 IF P1(L)<0 GOTO 2440
2330 PLOT 253
2340 I=INT(P1(L)*.1):Y=131-I*10
2360 J=P1(L)-I*10:X=5+J*15
2380 PLOT X:PLOT Y:PLOT 242
2400 I=INT(P2(L)*.1):Y=131-I*10
2420 J=P2(L)-I*10:X=5+J*15
2430 PLOT X:PLOT Y
2440 NEXT L
2490 REM NOW FILL IN THE BOXES
2500 FOR J=0 TO 4:X0=10+J*30:XM=X0+21
2520 FOR I=0 TO 5:IF BX(I,J)=0 GOTO 2600
2540 PLOT 255:PRINT BC$(I,J):PLOT 2:PLOT 250
2550 PLOT X0
2560 Y=127-20*I
2580 FOR K=1 TO 12:PLOT Y:PLOT XM:Y=Y-1:NEXT K
2600 NEXT I:NEXT J
2990 REM PUT TEXT IN THE BOXES
3000 PLOT 255
3020 FOR I=0 TO 5:FOR J=0 TO 4
3040 IF BX(I,J)=0 GOTO 3260
3060 REM FIRST FIND THE CENTER OF THIS BOX
3080 XC=10+15*J:YC=17+5*I
3090 Y=YC
3100 REM ADJUST FOR THE LENGTH OF L1$
3105 PLOT 30:PRINT BC$(I,J):PLOT 29
3110 IF L1$(I,J)="" GOTO 3200
3120 X=XC-INT(LEN(L1$(I,J))/2)
3122 PRINT C1$(I,J)
3180 PLOT 3:PLOT X:PLOTY:PRINT L1$(I,J)
3200 IF L2$(I,J)="" GOTO 3260
3220 X=XC-INT(LEN(L2$(I,J))/2):Y=YC+1
3222 PRINT C2$(I,J)
3240 PLOT 3:PLOT X:PLOT Y:PRINT L2$(I,J)
3260 NEXT J:NEXT I
3280 REM NOW THE TITLE, SUBTITLE, AND REMARKS
3290 FOR I=1 TO 3:GOSUB 13000:NEXT I
3410 PLOT 30:PLOT 16:PLOT 29:PLOT SC
3424 REM
3425 REM NOW THE COLOR TABLE
3426 REM
3499 IF CT=0 GOTO 3805
3500 PLOT 30:PLOT 16:PLOT 29
3520 FOR I=0 TO 7
3530 PLOT 16+I
3532 PLOT 2
3540 PLOT 250:REM X-BAR MODE
3560 X0=10*I+2:XM=X0+4:PLOT X0
3580 FOR J=0 TO 3
3600 Y=160+J:PLOT Y:PLOT XM
3605 NEXT J:PLOT 255
3620 NEXT I
3625 REM NOW THE COLOR NOS.
```

```
3700 PLOT 23:Y=7
3720 FOR I=0 TO 7
3760 X=I*5+3:PLOT 3:PLOT X:PLOT Y
3770 LZ=2:C$=STR$(CL(I)):GOSUB 20300:PRINT C$
3790 NEXT I
3800 REM AND FINALLY THE ID NO.
3805 PLOT 23:PLOT 30:PLOT 16:PLOT 29
3810 IF ID=0 GOTO 3830
3812 C$=LEFT$(ID$,4)+" "+MID$(ID$,5,3)+" "+MID$(ID$,8,2)+" "
3814 C$=C$+MID$(ID$,10,2)+" "+RIGHT$(ID$,6)
3820 PLOT3:PLOT 54:PLOT7:PRINT C$
3830 PLOT 8
3840 PLOT 27:PLOT 11
3850 GOTO 200
3997 REM
3998 REM MOD SECTION
3999 REM
4000 PRINT
4002 T$="ENTER MODIFICATION":GOSUB 20000
4010 IF C$="BOX" GOTO 5200
4015 IF C$="CON" GOTO 5600
4040 IF C$="DON" OR C$="DONE" OR C$="0" GOTO 200
4045 IF C$="DIS" GOTO 1945
4050 GOSUB 20700
4055 IF Q(0)<>0 GOTO 4070
4060 PRINT "NO SUCH COMMAND !   TRY AGAIN":GOTO 4000
4070 ON Q(0) GOTO 4100,4200,4300,4400,4500
4080 STOP
4100 REM CHANGE COLOR
4102 IF LEN(V$)>1 GOTO 4108
4104 J=0:FOR K=16 TO 23:IF ASC(V$)<>K GOTO 4106
4105 J=K
4106 NEXT K:IF J<>0 GOTO 4109
4108 PRINT "NO SUCH COLOR!   TRY AGAIN":GOTO 4000
4109 ON Q(1) GOTO 4110,4120,4150,4160,4170
4110 IF NN(1)<0 OR NN(1)>3 OR NN(2)<>0 OR Q$(2)<>"" GOTO 4995
4112 I1=NN(1):I2=I1:IF NN(1)=0 THEN I1=1:I2=3
4114 FOR I=I1 TO I2:KT$(I)=V$:NEXT I
4118 GOTO 4000
4120 IF NN(1)=0 AND NN(2)=0 THEN I=0:J=0:GOTO 4132
4121 II=-1
4122 FOR I=1 TO 11 STEP 2:FOR J=1 TO 9 STEP 2
4124 IF 10*I+J<>NN(1) GOTO 4126
4125 II=I:JJ=J
4126 NEXT J:NEXT I:IF II<0 GOTO 4995
4128 I=INT(II/2):J=INT(JJ/2)
4130 IF Q$(2)="L" GOTO 4140
4132 IF Q$(2)<>"" GOTO 4995
4134 IF NN(1)<>0 THEN BC$(I,J)=V$:GOTO 4000
4135 FOR I=0 TO 5:FOR J=0 TO 4:IF BX(I,J)=0 GOTO 4138
4136 BC$(I,J)=V$
4138 NEXT J:NEXT I:GOTO 4000
4140 IF NN(2)=0 THEN C1$(I,J)=V$:C2$(I,J)=V$:GOTO 4000
4142 IF NN(2)=1 THEN C1$(I,J)=V$:GOTO 4000
4144 IF NN(2)=2 THEN C2$(I,J)=V$:GOTO 4000
4148 GOTO 4995
4150 IF NN(1)<0 OR NN(1)>2 OR NN(2)<>0 GOTO 4995
4152 FOR I=0 TO 5:FOR J=0 TO 4:IF BX(I,J)=0 GOTO 4158
4154 IF NN(1)=0 OR NN(1)=1 THEN C1$(I,J)=V$
4156 IF NN(1)=0 OR NN(1)=2 THEN C2$(I,J)=V$
4158 NEXT J:NEXT I
4159 GOTO 4000
4160 IF NN(1)<>0 OR NN(2)<>0 OR Q$(2)<>"" GOTO 4995
4162 LN$=V$:GOTO 4000
4170 IF NN(1)<>0 OR NN(2)<>0 OR Q$(2)<>"" GOTO 4995
4172 BG$=V$:GOTO 4000
4200 REM CHANGE TEXT
4202 C$=V$:GOSUB 20600:IF UU<>0 GOTO 4000
4203 IF V$=" " THEN V$=""
4204 ON Q(1) GOTO 4210,4220
4205 GOTO 4995
4210 IF NN(1)<1 OR NN(1)>3 GOTO 4995
4212 TT$(NN(1))=V$:GOTO 4000
4220 IF NN(2)<1 OR NN(2)>2 OR Q$(2)<>"L" GOTO 4995
4221 II=-1
4222 FOR I=1 TO 11 STEP 2:FOR J=1 TO 9 STEP 2
4224 IF 10*I+J<>NN(1) GOTO 4226
4225 II=I:JJ=J
4226 NEXT J:NEXT I:IF II<0 GOTO 4995
4228 I=INT(II/2):J=INT(JJ/2)
4230 ON NN(2) GOTO 4232,4234
4232 L1$(I,J)=V$:GOTO 4000
4234 L2$(I,J)=V$:GOTO 4000
4300 REM CHANGE FONT
4305 J=VAL(V$):IF J<1 OR J>MF GOTO 4995
4310 IF NN(1)<>0 OR NN(2)<>0 OR Q$(2)<>"" GOTO 4995
4320 F(1)=J:GOTO 4000
4400 REM CHANGE JUST
4405 J=VAL(V$):IF J<1 OR J>3 GOTO 4995
4410 IF NN(2)<>0 OR NN(1)<0 OR NN(1)>3 OR Q$(2)<>"" GOTO 4995
4430 I1=1:I2=3:IF NN(1)<>0 THEN I1=NN(1):I2=I1
4440 FOR I=I1 TO I2:F(I+4)=J:NEXT I
4450 GOTO 4000
4500 REM CHANGE SIZE
4505 J=VAL(V$):I=NN(1)
4510 IF I<1 OR I>3 OR NN(2)<>0 OR Q$(2)<>"" GOTO 4995
4520 IF I=1 AND (J<4 OR J>6) GOTO 4995
4525 IF I>1 AND (J<1 OR J>3) GOTO 4995
4530 F(I+1)=J
4540 GOTO 4000
4995 PRINT "NO SUCH OBJECT !   TRY AGAIN":GOTO 4000
5195 REM BOX INPUT ROUTINE
5200 PRINT
5220 LS=NB+1:LE=30
5230 GOSUB 11000
5240 GOTO 4000
```

```
5600 PRINT "ADD OR DELETE? (A OR D):";:PLOT UC:INPUT " ";C$:PLOT SC
5620 IF C$<>"A" AND C$<>"D" THEN PRINT "TRY AGAIN":GOTO 5600
5640 IF C$="D" GOTO 5700
5670 LS=NL+1:LE=30
5680 GOSUB 12000
5690 GOTO 4000
5700 PRINT "LINES TO BE DELETED (ENTER 0 WHEN DONE)"
5720 PRINT "FROM";:PLOT UC:INPUT " ";Q1:PLOT SC
5730 IF Q1=0 GOTO 4000
5740 PRINT "  TO";:PLOT UC:INPUT " ";Q2:PLOT SC
5745 IF Q2=0 GOTO 4000
5750 REM CHECK TO SEE IF THERE IS ANY SUCH PAIR
5760 FOR L=1 TO NL
5780 IF Q1=P1(L) AND Q2=P2(L) GOTO 5900
5785 IF Q2=P1(L) AND Q1=P2(L) GOTO 5900
5790 NEXT L
5800 PRINT "WHAT? THE LINES YOU HAVE SPECIFIED ARE AS FOLLOWS:"
5805 PRINT "FROM       TO"
5820 FOR L=1 TO NL
5830 IF P1(L)=-1 OR P2(L)=-1 GOTO 5838
5835 PRINT P1(L),P2(L)
5838 NEXT L
5840 PRINT "TRY AGAIN":GOTO 5720
5900 NL=NL-1
5910 FOR M=L TO NL
5920 P1(M)=P1(M+1),P2(M)=P2(M+1)
5930 NEXT M
5935 GOTO 5720
5994 REM
5995 REM HERE WE INPUT THE SLIDE NO.
5996 REM
6000 ID=1
6005 ID$=""
6008 PRINT
6010 LZ=4:T$="CUST(MER ID":GOSUB 20000
6015 IF LEN(C$)>LZ GOTO 6010
6020 GOSUB 20300:ID$=ID$+C$
6030 LZ=3:T$="CUSTOMER SEQ. NO. ":GOSUB 20000
6035 IF LEN(C$)>LZ GOTO 6030
6040 GOSUB 20300:ID$=ID$+C$
6050 LZ=2:T$="SLIDE TYPE NO. ":GOSUB 20000
6055 K=VAL(C$):IF K<1 OR K>7 GOTO 6050
6060 C$=STR$(K):GOSUB 20300:ID$=ID$+C$+VN$
6070 LZ=6:T$="FILENAME":GOSUB 20000
6075 L=LEN(C$):IF L<1 OR L>6 GOTO 6070
6080 K=ASC(LEFT$(C$,1)):IF K<65 OR K>90 GOTO 6070
6085 FM$=C$
6090 IF LEN(C$)<6 THEN C$=C$+" ":GOTO 6090
6095 ID$=ID$+C$
6100 GOTO 200
6995 REM COLOR TABLE INPUT ROUTINE
7000 CT=1
7005 PRINT:T$="STANDARD COLOR SET? (Y OR N)":GOSUB 20000
7010 IF C$="N" GOTO 7020
7012 IF C$<>"Y" GOTO 7005
7015 FOR I=0 TO 7:CL(I)=I+1:NEXT I:GOTO 200
7020 PRINT:PRINT "TYPE IN COLOR NUMBER FOR EACH COLOR KEY:":PRINT
7030 LZ=2
7040 FOR I=0 TO 7
7060 T$=CN$(I):GOSUB 20000:GOSUB 20300:CL(I)=VAL(C$)
7070 NEXT I
7200 GOTO 200
7510 C$=ID$(2)+": "+FM$+".DAT"
7995 REM SAVE SECTION
8000 PRINT
8010 PRINT
8020 IF CT=1 GOTO 8030
8025 PRINT "CANNOT SAVE WITHOUT COLOR TABLE"
8030 IF ID=1 GOTO 8040
8035 PRINT "CANNOT SAVE WITHOUT ID"
8040 IF CR=1 GOTO 8050
8045 PRINT "CANNOT SAVE WITHOUT DATA"
8050 IF ID+CT+CR<3 GOTO 200
8055 REM CALCULATE LENGTH
8060 L=53+24+LEN(TT$(1))+LEN(TT$(2))+LEN(TT$(3))+3+4*NL+8
8065 FOR I=0 TO 5:FOR J=0 TO 4:IF BX(I,J)=0 GOTO 8080
8070 L=L+12+LEN(L1$(I,J))+LEN(L2$(I,J))
8080 NEXT J:NEXT I
8085 L=L+2:FL=L
8090 PRINT "FILE CONTAINS",FL,"CHARACTERS"
8095 GOSUB 65000:J=FA+3
8105 FOR I=1 TO 17:POKE J,ASC(MID$(ID$,I,1)):J=J+1:NEXT I
8109 REM COLOR TABLE
8110 LZ=2
8115 FOR I=0 TO 7:K=INT(CL(I)/10):POKE J,K+48:J=J+1
8120 K=CL(I)-K*10:POKE J,K+48:J=J+1
8125 NEXT I
8130 K=ASC(BG$)+33:POKE J,K:J=J+1
8135 FOR I=1 TO 18:POKE J,32:J=J+1:NEXT I
8140 POKE J,ASC(EM$):J=J+1
8144 REM PREPARE FONT NO. FOR POKING
8145 K=INT(F(1)/10):H1=K+48:H2=F(1)-K*10+48
8149 REM TITLING LOOP
8150 FOR I=1 TO 3
8155 POKE J,F(I+4)+48:J=J+1
8160 POKE J,H1:J=J+1:POKE J,H2:J=J+1
8165 POKEJ,F(I+1)+48:J=J+1
8170 POKEJ,ASC(KT$(I))+33:J=J+1
8195 L=LEN(TT$(I)):K=INT(L/10):POKEJ,K+48:J=J+1
8200 K=L-K*10:POKEJ,K+48:J=J+1
8202 IF L=0 GOTO 8215
8205 FOR N=1 TO L:K=ASC(MID$(TT$(I),N,1))
8210 POKEJ,K:J=J+1:NEXT N
8215 POKEJ,ASC(EM$):J=J+1
8220 NEXT I
8239 REM CONNECTING LINES
8240 POKEJ,ASC(LN$)+33:J=J+1
```

```
8245 K=INT(NL/10):POKEJ,K+48:J=J+1:K=NL-K*10:POKEJ,K+48:J=J+1
8260 FOR I=1 TO NL:FOR N=1 TO 2:ON N GOTO 8262,8264
8262 L=P1(I):GOTO 8265
8264 L=P2(I)
8265 K=INT(L/10):IF K<10 THEN POKE J,K+48:GOTO 8275
8270 POKEJ,K+55
8275 J=J+1:K=L-K*10:POKEJ,K+48:J=J+1
8285 NEXT N:NEXT I
8292 REM BOX PARAMS
8305 POKEJ,50:J=J+1:REM JUSTIFICATION
8310 POKEJ,H1:J=J+1:POKEJ,H2:J=J+1
8315 POKEJ,49:J=J+1:REM TYPE SIZE
8320 POKEJ,ASC(LN$)+33:J=J+1:REM BORDER COLOR
8325 K=INT(NB/10):POKEJ,K+48:J=J+1
8330 K=NB-K*10:POKEJ,K+48:J=J+1
8335 POKEJ,ASC(EM$):J=J+1
8340 FOR I=0 TO 5:FOR M=0 TO 4:IF BX(I,M)=0 GOTO 8435
8345 IF I<5 THEN POKEJ,2*I+49:GOTO 8355
8350 POKE J,66
8355 J=J+1:POKEJ,2*M+49:J=J+1
8360 POKEJ,ASC(BU$(I,M))+33:J=J+1
8370 POKEJ,32:J=J+1:POKEJ,32:J=J+1
8375 POKEJ,ASC(C1$(I,M))+33:J=J+1
8380 POKEJ,ASC(C2$(I,M))+33:J=J+1
8385 FOR N=1 TO 2:ON N GOTO 8386,8388
8386 L1=LEN(L1$(I,M)):L=L1:GOTO 8390
8388 L2=LEN(L2$(I,M)):L=L2
8390 K=INT(L/10):POKEJ,K+48:J=J+1
8400 K=L-K*10:POKEJ,K+48:J=J+1
8405 L=LEN(L2$(I,M))
8410 NEXT N
8412 IF L1=0 GOTO 8422
8420 FOR L=1 TO L1:POKEJ,ASC(MID$(L1$(I,M),L,1)):J=J+1:NEXT L
8422 IF L2=0 GOTO 8430
8425 FOR L=1 TO L2:POKEJ,ASC(MID$(L2$(I,M),L,1)):J=J+1:NEXT L
8430 POKEJ,ASC(EM$):J=J+1
8435 NEXT M:NEXT I
8440 FOR L=1 TO 2:POKEJ,ASC(EM$):J=J+1:NEXT L
8470 SAVE U$(Z)+" "+EM$+",DAT"
8480 GOTO 200
8995 REM GET SECTION
9000 PRINT
9010 REM OPEN THE FILE
9020 I$="FILENAME":GOSUB 20000:A$=C$+",DAT,"
9030 I$="VERSION NO ":GOSUB 20000:A$=A$+C$
9032 A$=U$(Z)+" "+A$
9035 LOAD:PRINT A$
9040 GOSUB 65008:J=FA+3
9045 ID$="":FOR I=1 TO 17:ID$=ID$+CHR$(PEEK(J)):J=J+1:NEXT I
9048 FM$=RIGHT$(ID$,2)
9049 IF RIGHT$(FM$,1)=" " THEN FM$=LEFT$(FM$,LEN(FM$)-1):GOTO 9049
9050 FOR I=0 TO 7:CL(I)=10*(PEEK(J)-48)+PEEK(J+1)-48:J=J+2:NEXT I
9055 BG$=CHR$(PEEK(J)-33):J=J+1
9060 J=J+18
9070 C$=CHR$(PEEK(J)):J=J+1:IF C$=EM$ GOTO 9080
9075 PRINT "NO EM AT 9075":STOP
9080 FOR I=1 TO 3
9085 F(I+4)=PEEK(J)-48:J=J+1
9090 IF I=1 THEN F(I)=10*(PEEK(J)-48)+PEEK(J+1)-48
9095 J=J+2
9100 F(I+1)=PEEK(J)-48:J=J+1
9105 KT$(I)=CHR$(PEEK(J)-33):J=J+1
9110 L=(PEEK(J)-48)*10+PEEK(J+1)-48:J=J+2
9115 C$="":IF L=0 GOTO 9125
9120 FOR N=1 TO L:C$=C$+CHR$(PEEK(J)):J=J+1:NEXT N
9125 IT$(I)=C$
9130 C$=CHR$(PEEK(J)):J=J+1:IF C$=EM$ GOTO 9140
9135 PRINT "NO EM AT 9135":STOP
9140 NEXT I
9149 REM CONN LINES
9150 LN$=CHR$(PEEK(J)-33):J=J+1
9155 NL=10*(PEEK(J)-48)+PEEK(J+1)-48:J=J+2
9160 FOR I=1 TO NL:FOR N=1 TO 2:K=PEEK(J):J=J+1
9165 IF K>64 THEN L=(K-55)*10:GOTO 9175
9170 L=(K-48)*10
9175 L=L+PEEK(J)-48:J=J+1
9180 ON N GOTO 9185,9190
9185 P1(I)=L:GOTO 9195
9190 P2(I)=L
9195 NEXT N:NEXT I
9200 J=J+5
9210 NB=(PEEK(J)-48)*10+PEEK(J+1)-48:J=J+2
9220 C$=CHR$(PEEK(J)):J=J+1:IF C$=EM$ GOTO 9230
9225 PRINT "NO EM AT 9225":STOP
9230 FOR I=0 TO 5:FOR M=0 TO 4:BX(I,M)=0:NEXT M:NEXT I
9235 FOR N=1 TO NB
9240 K=PEEK(J):J=J+1
9245 IF K>64 THEN L=K-55:GOTO 9255
9250 L=K-48
9255 I=INT(L/2):M=INT((PEEK(J)-48)/2):J=J+1
9260 BX(I,M)=1
9270 BU$(I,M)=CHR$(PEEK(J)-33):J=J+1
9275 J=J+2
9280 C1$(I,M)=CHR$(PEEK(J)-33):J=J+1
9285 C2$(I,M)=CHR$(PEEK(J)-33):J=J+1
9290 L1=(PEEK(J)-48)*10+PEEK(J+1)-48:J=J+2
9295 L2=(PEEK(J)-48)*10+PEEK(J+1)-48:J=J+2
9300 C$=""
9305 IF L1=0 GOTO 9315
9310 FOR L=1 TO L1:C$=C$+CHR$(PEEK(J)):J=J+1:NEXT L
9315 L1$(I,M)=C$:C$=""
9317 IF L2=0 GOTO 9325
9320 FOR L=1 TO L2:C$=C$+CHR$(PEEK(J)):J=J+1:NEXT L
9325 L2$(I,M)=C$
9328 C$=CHR$(PEEK(J)):J=J+1
9330 IF C$=EM$ GOTO 9340
9335 PRINT "NO EM AT 9335":STOP
```

```
9340 NEXT N
9470 GOSUB 18000
9472 IF NOT ER GOTO 9480
9474 PRINT:PRINT "FONT";F(1);"NOT FOUND"
9476 T$="ENTER NEW FONT NO. ":GOSUB 20000:F(1)=VAL(C$):GOTO 9470
9480 CT=1:ID=1:CR=1
9490 GOTO 200
9999 REM
10000 REM TITLE INPUT ROUTINE
10001 REM
10015 FOR I=IS TO IE
10020 T$=TV$(I):GOSUB 20000:GOSUB 20600:IF UU<>0 GOTO 10200
10022 TT$(I)=C$
10025 IF TT$(I)<>BL$ GOTO 10030
10027 TT$(I)=""
10030 NEXT I
10040 IF CZ=0 GOTO 10250
10060 FOR I=IS TO IE
10065 IF I=1 GOTO 10075
10070 PRINT TV$(I);" FONT SIZE (1,2 OR 3):";:GOTO 10080
10075 PRINT TV$(I);" FONT SIZE (4,5 OR 6):";
10080 PLOT UC:INPUT " ";F(I+1):PLOT SC
10090 NEXT I
10150 FOR I=IS TO IE
10160 PRINT TV$(I);" JUSTIFICATION (L,C OR R):";
10170 PLOT UC:INPUT " ";C$:PLOT SC
10180 IF C$="L" GOTO 10190
10182 IF C$="C" GOTO 10192
10184 IF C$="R" GOTO 10194
10185 IF C$<>"C" GOTO 10190:F(I+4)=2
10189 GOTO 10160
10190 F(I+4)=1:GOTO 10200
10192 F(I+4)=2:GOTO 10200
10194 F(I+4)=3
10200 NEXT I
10210 FOR I=IS TO IE
10220 PRINT TV$(I);" COLOR:";
10230 PLOT UC:INPUT " ";KT$(I):PLOT SC
10240 NEXT I
10250 PRINT "FONT NO.";:PLOT UC:INPUT " ";F(1):PLOT SC
10255 GOSUB 18000
10262 IF NOT ER GOTO 10400
10264 PRINT:PRINT "FONT";F(1);"NOT FOUND"
10266 T$="ENTER NEW FONT NO. ":GOSUB 20000:F(1)=VAL(C$):GOTO 10255
10400 RETURN
10520 RN=RN+1:RP=0:RB=L-RS
10999 REM
11000 REM BOX INPUT ROUTINE
11001 REM
11200 FOR L=LS TO LE
11205 PRINT
11210 PRINT "BOX NO ";:PLOT UC:INPUT " ";BN:PLOT SC
11215 IF BN=0 GOTO 11550
11220 FOR I=1 TO 11 STEP 2
11230 FOR J=1 TO 9 STEP 2
11240 IF BN=I*10+J GOTO 11280
11250 NEXT J,NEXT I
11260 PRINT "NO SUCH BOX !":GOTO 11210
11280 I=INT(I/2):J=INT(J/2)
11320 PRINT "BOX COLOR (TO DELETE A BOX, TYPE 'D' INSTEAD):";
11340 PLOT UC:INPUT " ";C$:PLOT SC
11345 FOR K=16 TO 23
11347 IF K=ASC(C$) GOTO 11400
11348 NEXT K
11350 IF C$<>"D" GOTO 11380
11360 BX(I,J)=0
11365 NB=NB-1
11370 GOTO 11540
11380 PRINT "TRY AGAIN.":PRINT:GOTO 11320
11400 BT$(I,J)=C$:BX(I,J)=1
11410 NB=NB+1
11420 T$="BOX TEXT, LINE 1":GOSUB 20000:GOSUB 20600:IF UU<>0 GOTO 11420
11425 L1$(I,J)=C$
11430 IF LEN(L1$(I,J))<12 GOTO 11440
11432 PRINT "11 CHARS MAX !":GOTO 11420
11435 IF L1$(I,J)<>" " GOTO 11440
11438 L1$(I,J)=""
11440 T$="BOX TEXT, LINE 2":GOSUB 20000:GOSUB 20600:IF UU<>0 GOTO 11440
11445 L2$(I,J)=C$
11450 IF LEN(L2$(I,J))<12 GOTO 11460
11452 PRINT "11 CHARS MAX !":GOTO 11440
11455 IF L2$(I,J)<>" " GOTO 11460
11458 L2$(I,J)=""
11460 C1$(I,J)=BT$(1):C2$(I,J)=BT$(2)
11540 NEXT L
11550 RETURN
11999 REM
12000 REM CONN. LINE INPUT ROUTINE
12001 REM
12010 PRINT: PRINT "CONNECTING LINES (ENTER 0 WHEN DONE):"
12020 FOR L=LS TO LE
12080 PRINT
12100 T$="FROM":GOSUB 20000:P1(L)=VAL(C$):IF P1(L)=0 GOTO 12240
12120 T$=" TO":GOSUB 20000:P2(L)=VAL(C$):IF P2(L)=0 THEN P1(L)=0:GOTO 12240
12140 IF P1(L)<1 OR P1(L)>119 GOTO 12200
12160 IF P2(L)<1 OR P2(L)>119 GOTO 12200
12164 IF INT(P1(L)*.1)*10=P1(L) GOTO 12200
12166 IF INT(P2(L)*.1)*10=P2(L) GOTO 12200
12170 IF INT(P1(L)*.1)=INT(P2(L)*.1) GOTO 12220
12180 IF P1(L)-INT(P1(L)*.1)*10=P2(L)-INT(P2(L)*.1)*10 GOTO 12220
12190 PRINT "DIAGONAL LINE IS NG!":GOTO 12100
12200 PRINT "NO SUCH POINT!":GOTO 12100
12220 NEXT L
12240 NL=L-1
12260 RETURN
12990 REM THIS POSITIONS AND DISPLAYS ONE OF THE THREE TITLES (T$(I))
13000 IF TT$(I)="" OR TT$(I)=" " GOTO 13240
```

```
13005 REM FIRST THE WIDTH CALCULATION
13008 L=0
13010 FOR J=1 TO 80
13015 IF J=LEN(TT$(I))+1 GOTO 13050
13020 N=ASC(MID$(TT$(I),J,1))
13030 N=N-31:L=L+CH(N)
13035 L=L+SP(F(I+1))
13040 NEXT J
13050 L=L*TS(F(I+1))
13051 IF L<68 GOTO 13058
13052 PLOT 23
13054 PLOT 8:PRINT "SPACE BETWEEN MARGINS IS 68.   ";
13056 PRINT "T";I;" IS";L;" UNITS WIDE":RETURN
13058 L=L*(160/72)
13060 IF F(I+4)<>1 GOTO 13070
13065 X0=2:GOTO 13090
13070 IF F(I+4)<>2 GOTO 13080
13075 X0=72-INT(L/2):GOTO 13090
13080 X0=150-INT(L)
13090 XM=X0+L+2*J=F(I+1)-1:K=I-1
13095 IF I<>1 GOTO 13100
13097 J=J-0
13100 PRINT K$(I)
13103 PLOT 30:PRINT BG$:PLOT 29
13106 PLOT 2
13110 PLOT 25:PLOT X0
13120 PLOT Y1(K,J):PLOT XM:PLOT Y2(K,J):PLOT XM
13130 PLOT 24:PLOT Y1(K,J)
13140 PLOT X0:PLOT Y2(K,J):PLOT XM:PLOT Y2(K,J)
13150 PLOT 27
13170 IF I<>1 GOTO 13200
13195 PLOT 14
13200 IF F(I+4)<>1 GOTO 13210
13205 X=5:GOTO 13230
13210 IF F(I+4)<>2 GOTO 13220
13215 X=40-INT(LEN(TT$(I))/2):GOTO 13230
13220 X=75-LEN(TT$(I))
13230 Y=TV(I):PLOT 3 PLOT X:PLOT Y:PRINT TT$(I):PLOT 15
13240 RETURN
18000 REM
18001 REM FONT DAT INPUTTER
18002 REM
18005 ER=(0=1)
18010 IF CH(0)=F(1) GOTO 18200
18015 IF F(1)<0 OR F(1)>MF THEN ER=(1=1):RETURN
18018 LZ=2:C$=STR$(F(1)):GOSUB 20300
18020 A$=D$(1)+":FNT"+C$+".DAT"
18030 LOADPRINT A$
18040 GOSUB 65008:J=FA+3
18050 FOR II=1 TO 100:CH(II)=PEEK(J)-48+(PEEK(J+1)-48)*.1:J=J+2:NEXT II
18060 CH(0)=F(1)
18200 RETURN
20000 REM
20001 REM TWO-COLOR TEXT INPUTTER
20002 REM
20005 PRINT T$;":";:PLOT UC:INPUT " ";C$:PLOT SC
20010 RETURN
20101 REM NUMBER CHECKER   CHECKS LENGTH OF C$ AGAINST LZ, AND MAKES SURE THAT
20300 REM
20301 REM REMOVES LEADING BLANKS FROM C$ AND INSERTS LEADING 0'S TO MAKE
20302 REM     C$ BE OF LENGTH LZ. IF LZ<=LEN(C$), NO 0'S ARE ADDED.
20303 REM
20310 IF LEFT$(C$,1)<>" " GOTO 20330
20320 C$=RIGHT$(C$,LEN(C$)-1):GOTO 20310
20330 IF LZ<=LEN(C$) GOTO 20360
20340 C$="0"+C$:GOTO 20330
20360 RETURN
20400 REM
20401 REM TWO-COLOR COMMAND DISPLAYER
20402 REM
20405 U$=LEFT$(I$,LZ):I$=RIGHT$(I$,LEN(I$)-LZ)
20410 PLOT UC:PRINT U$:PLOT SC:PRINT I$
20415 RETURN
20600 REM CHECKS FOR ILLEGAL CHAR
20610 UN=LEN(C$)
20615 IF US=0 GOTO 20645
20620 FOR UU=1 TO UN:U=ASC(MID$(C$,UU,1))
20630 IF U<32 OR U>122 OR U=92 OR U=94 OR U=95 OR U=96 GOTO 20650
20632 IF U=34 GOTO 20650
20640 NEXT UU
20645 UU=0:RETURN
20650 PRINT "ILLEGAL CHARACTER.   TRY AGAIN"
20670 RETURN
20700 REM
20706 P$="":V$=""
20708 FOR I=0 TO 2:NN(I)=0:Q(I)=0:Q$(I)="":NEXT I
20709 REM FIND TOTAL LGTH, AND POSITION OF THE "="
20710 LC=LEN(C$):JE=0
20712 FOR J=1 TO LC:IF MID$(C$,J,1)="=" GOTO 20720
20715 NEXT J:RETURN
20720 JE=J
20725 P$=LEFT$(C$,1):V$=RIGHT$(C$,LC-JE)
20728 K=1:KS(1)=2:KS(2)=0:KS(3)=0:KS(4)=0:KS(5)=0
20729 REM NOW PUT FIELD POINTERS INTO KS
20730 FOR J=2 TO JE-1
20732 M=ASC(MID$(C$,J,1))
20734 ON K GOTO 20736,20742,20736,20742
20735 STOP
20736 IF M<48 OR M>57 GOTO 20750
20738 K=K+1:KS(K)=J:GOTO 20750
20742 IF M>47 AND M<58 GOTO 20750
20744 K=K+1:KS(K)=J
20750 NEXT J
20752 K=K+1:KS(K)=JE
20754 Q$(1)=MID$(C$,2,KS(2)-2)
20756 IF KS(3)>0 THEN NN(1)=VAL(MID$(C$,KS(2),KS(3)-KS(2)))
20758 IF KS(4)>0 THEN Q$(2)=MID$(C$,KS(3),KS(4)-KS(3))
```

```
20760 IF KS(5)>0 THEN NN(2)=VAL(MID$(C$,KS(4),KS(5)-KS(4)))
20762 J=0
20766 FOR I=1 TO NP:IF P$<>PP$(I) GOTO 20775
20770 J=I
20775 NEXT I:IF J<>0 GOTO 20780
20777 PRINT P$;"?":RETURN
20780 IS=INT(K/2)
20782 FOR I=1 TO IS:FOR N=1 TO NQ(J)
20784 IF Q$(I)=QQ$(J,N) THEN Q(I)=N
20785 NEXT N
20786 NEXT I:IF Q(1)=0 THEN RETURN
20790 Q(0)=J:RETURN
50000 DATA .125,.1667,.2,.25,.3333,.5,.75,1.
50002 DATA 11,13,45
50003 DATA 143,143,143,135,135,135,7,7,6
50004 DATA 149,151,156,138,139,140,12,12,13
50010 DATA 6,2,19
50012 DATA 3,2,19
50014 DATA 2,2,19
50015 DATA "TITLE","SUBTITLE","REMARKS"
50018 DATA "BLACK","RED","GREEN","YELLOW","BLUE","VIOLET","CYAN","WHITE"
50098 DATA "C","I","F","J","S"
50100 DATA 5,3,1,1,1
50102 DATA "T","BX","L","CL","BG"
50103 DATA "T","BX","L"
50104 DATA "T"
50105 DATA "T"
50106 DATA "T"
50110 DATA 2,3,9,10,12,14,18,24
65000 REM FILE CREATE   FL=CHAR COUNT, FA="FILE ADDRESS"
65002 GOSUB 65008:POKE FA+1,FL-INT(FL/256)*256
65003 POKE FA+2,INT(FL/256)
65004 FOR F1=1 TO FL:POKE FA+F1+2,0:NEXT F1
65005 RETURN END CREATE
65006 REM
65007 REM
65008 FA=2*(8*PEEK(-24985)+PEEK(-24986)-65536:RETURN
65009 END OF GOSUB 65008
READY
```

6.3 APPENDIX     © 1978 MATHEMATICAL APPLICATIONS GROUP, INC.

FORTRAN IV G LEVEL 21      MAIN      DATE = 78144      16/32/35      PAGE 0001

```
0001          COMMON DUM1(35002)                                  00000100
0002          COMMON /COLOR/ DUM2(8)                              00000200
0003          COMMON /LIMIT/ DUM3(6)                              00000300
0004          COMMON /WORK/ DUM4(1503)                            00000400
0005          COMMON /GRID/ DUM5(204)                             00000500
0006          COMMON /BLOCK/ DUM6(153)                            00000600
0007          COMMON /BOX/ DUM15(153)                             00000700
0008          COMMON /PIE/ DUM7(64)                               00000800
0009          COMMON /AREA/ DUM8(104)                             00000900
0010          COMMON /LINE/ DUM9(193)                             00001000
0011          COMMON /TEXT/ DUM10(3092)                           00001100
0012          COMMON /TEMP/ DUM11(1200)                           00001200
0013          COMMON /INPUT/ DUM12(914)                           00001300
0014          COMMON /PROCES/ LO,IER,DUM13,IRES                   00001400
0015          COMMON /IOUNIT/ LUNIN,LUNOUT,LUNDSK,NREC,NBYTE,LOC,SKIP(4),LUNSUM 00001500
0016          COMMON /HEAD/ DUM14(40)                             00001600
0017          COMMON /INSET/ DUM16(53)                            00001700
0018          DATA EOI/4HEND /,KNT/0/                             00001800
0019          DEFINE FILE 2(350,2240,L,LOC)                       00001900
0020          READ(LUNIN,101) IRES                                00002000
0021    101   FORMAT(I10)                                         00002100
0022          END FILE LUNIN                                      00002200
0023    10    CALL INIT                                           00002300
0024          CALL INPUTO(JTYPE)                                  00002400
0025          IF(IER.EQ.2) GO TO 100                              00002500
0026          KNT=KNT+1                                           00002600
0027          IF(IER.NE.0) GO TO 50                               00002700
0028          CALL TYPSET(JTYPE)                                  00002800
0029          IF(IER.NE.0) GO TO 50                               00002900
0030          CALL PROC                                           00003000
0031          IF(IER.NE.0) GO TO 50                               00003100
0032          CALL PRTOUT                                         00003200
0033    50    READ(LUNIN,102,END=100,ERR=100) CHAR                00003300
0034    102   FORMAT(A4)                                          00003400
0035          IF(CHAR.NE.EOI) GO TO 50                            00003500
0036          IF(IER.EQ.1) WRITE(LUNSUM) IER                      00003600
0037          GO TO 10                                            00003700
0038    100   CALL SUMARY(KNT)                                    00003800
0039          STOP                                                00003900
0040          END                                                 00004000
```

FORTRAN IV G LEVEL 21      MAIN      DATE = 78144      16/32/35      PAGE 0002

```
               COMMON BLOCK /        / MAP SIZE  222E8
SYMBOL  LOCATION   SYMBOL  LOCATION  SYMBOL  LOCATION  SYMBOL  LOCATION  SYMBOL  LOCATION
DUM1       0

COMMON BLOCK /COLOR  / MAP SIZE     20
SYMBOL  LOCATION   SYMBOL  LOCATION  SYMBOL  LOCATION  SYMBOL  LOCATION  SYMBOL  LOCATION
DUM2       0

COMMON BLOCK /LIMIT  / MAP SIZE     18
SYMBOL  LOCATION   SYMBOL  LOCATION  SYMBOL  LOCATION  SYMBOL  LOCATION  SYMBOL  LOCATION
DUM3       0
```

COMMON BLOCK /WORK     / MAP SIZE   177C

| SYMBOL | LOCATION | SYMBOL | LOCATION | SYMBOL | LOCATION | SYMBOL | LOCATION | SYMBOL | LOCATION |
|---|---|---|---|---|---|---|---|---|---|
| DUM4 | 0 | | | | | | | | |

COMMON BLOCK /GRID     / MAP SIZE   330

| SYMBOL | LOCATION | SYMBOL | LOCATION | SYMBOL | LOCATION | SYMBOL | LOCATION | SYMBOL | LOCATION |
|---|---|---|---|---|---|---|---|---|---|
| DUM5 | 0 | | | | | | | | |

COMMON BLOCK /BLOCK    / MAP SIZE   264

| SYMBOL | LOCATION | SYMBOL | LOCATION | SYMBOL | LOCATION | SYMBOL | LOCATION | SYMBOL | LOCATION |
|---|---|---|---|---|---|---|---|---|---|
| DUM6 | 0 | | | | | | | | |

COMMON BLOCK /BOX      / MAP SIZE   264

| SYMBOL | LOCATION | SYMBOL | LOCATION | SYMBOL | LOCATION | SYMBOL | LOCATION | SYMBOL | LOCATION |
|---|---|---|---|---|---|---|---|---|---|
| DUM15 | 0 | | | | | | | | |

COMMON BLOCK /PIE      / MAP SIZE   100

| SYMBOL | LOCATION | SYMBOL | LOCATION | SYMBOL | LOCATION | SYMBOL | LOCATION | SYMBOL | LOCATION |
|---|---|---|---|---|---|---|---|---|---|
| DUM7 | 0 | | | | | | | | |

COMMON BLOCK /AREA     / MAP SIZE   1A0

| SYMBOL | LOCATION | SYMBOL | LOCATION | SYMBOL | LOCATION | SYMBOL | LOCATION | SYMBOL | LOCATION |
|---|---|---|---|---|---|---|---|---|---|
| DUM8 | 0 | | | | | | | | |

COMMON BLOCK /LINE     / MAP SIZE   304

| SYMBOL | LOCATION | SYMBOL | LOCATION | SYMBOL | LOCATION | SYMBOL | LOCATION | SYMBOL | LOCATION |
|---|---|---|---|---|---|---|---|---|---|
| DUM9 | 0 | | | | | | | | |

COMMON BLOCK /TEXT     / MAP SIZE   3050

| SYMBOL | LOCATION | SYMBOL | LOCATION | SYMBOL | LOCATION | SYMBOL | LOCATION | SYMBOL | LOCATION |
|---|---|---|---|---|---|---|---|---|---|
| DUM10 | 0 | | | | | | | | |

COMMON BLOCK /TEMP     / MAP SIZE   12C0

| SYMBOL | LOCATION | SYMBOL | LOCATION | SYMBOL | LOCATION | SYMBOL | LOCATION | SYMBOL | LOCATION |
|---|---|---|---|---|---|---|---|---|---|
| DUM11 | 0 | | | | | | | | |

COMMON BLOCK /INPUT    / MAP SIZE   E48

| SYMBOL | LOCATION | SYMBOL | LOCATION | SYMBOL | LOCATION | SYMBOL | LOCATION | SYMBOL | LOCATION |
|---|---|---|---|---|---|---|---|---|---|
| DUM12 | 0 | | | | | | | | |

COMMON BLOCK /PROCES   / MAP SIZE   10

| SYMBOL | LOCATION | SYMBOL | LOCATION | SYMBOL | LOCATION | SYMBOL | LOCATION | SYMBOL | LOCATION |
|---|---|---|---|---|---|---|---|---|---|
| LO | 0 | IER | 4 | DUM13 | 8 | IRES | C | | |

COMMON BLOCK /IOUNIT   / MAP SIZE   2C

| SYMBOL | LOCATION | SYMBOL | LOCATION | SYMBOL | LOCATION | SYMBOL | LOCATION | SYMBOL | LOCATION |
|---|---|---|---|---|---|---|---|---|---|
| LUNIN | 0 | LUNOUT | 4 | LUNDSK | 8 | NREC | C | NBYTE | 10 |
| LOC | 14 | SKIP | 18 | LUNSUM | 28 | | | | |

COMMON BLOCK /HEAD     / MAP SIZE   A0

| SYMBOL | LOCATION | SYMBOL | LOCATION | SYMBOL | LOCATION | SYMBOL | LOCATION | SYMBOL | LOCATION |
|---|---|---|---|---|---|---|---|---|---|
| DUM14 | 0 | | | | | | | | |

COMMON BLOCK /INSET    / MAP SIZE   04

| SYMBOL | LOCATION | SYMBOL | LOCATION | SYMBOL | LOCATION | SYMBOL | LOCATION | SYMBOL | LOCATION |
|---|---|---|---|---|---|---|---|---|---|
| DUM16 | 0 | | | | | | | | |

SUBPROGRAMS CALLED

| SYMBOL | LOCATION | SYMBOL | LOCATION | SYMBOL | LOCATION | SYMBOL | LOCATION | SYMBOL | LOCATION |
|---|---|---|---|---|---|---|---|---|---|
| DIOCS# | 104 | IBCOM# | 108 | INIT | 10C | INPUTO | 110 | TYPSET | 114 |
| PROC | 118 | PRTOUT | 11C | SUMARY | 120 | | | | |

SCALAR MAP

| SYMBOL | LOCATION | SYMBOL | LOCATION | SYMBOL | LOCATION | SYMBOL | LOCATION | SYMBOL | LOCATION |
|---|---|---|---|---|---|---|---|---|---|
| EOI | 130 | KNT | 134 | JTYPE | 138 | CHAR | 13C | | |

FORMAT STATEMENT MAP

| SYMBOL | LOCATION | SYMBOL | LOCATION | SYMBOL | LOCATION | SYMBOL | LOCATION | SYMBOL | LOCATION |
|---|---|---|---|---|---|---|---|---|---|
| 101 | 140 | 102 | 144 | | | | | | |

*OPTIONS IN EFFECT* ID,BCD,SOURCE,NOLIST,NODECK,LOAD,MAP
*OPTIONS IN EFFECT* NAME = MAIN    , LINECNT =      61
*STATISTICS*   SOURCE STATEMENTS =       40,PROGRAM SIZE =      774
*STATISTICS*   NO DIAGNOSTICS GENERATED

FORTRAN IV G LEVEL  21             BLK DATA         DATE = 78144        16/32/35           PAGE 0001

```
0001              BLOCK DATA                                                            00000100
0002              COMMON /LIMIT/ LMTX1,LMTX2,LMTY1,LMTY2,DUM(2)                         00000200
0003              COMMON /IOUNIT/ LUNIN,LUNOUT,LUNDSK,NREC,NBYTE,LOC,MRKEOL,MRKEOS,     00000300
                 *              LUNTAP,LUNTMP,LUNSUM,MRGFIL                             00000400
0004              DATA LUNSUM/4/,    LMTX1,LMTX2,LMTY1,LMTY2/1,2016,1,1344/             00000500
0005              DATA LUNIN,LUNOUT,LUNDSK,NREC,NBYTE,MRKEOL,MRKEOS,LUNTAP,LUNTMP       00000600
                 *   /  5 ,   6  ,   2 , 350, 2240, 2048 , 4096 ,   3  ,   1  /
0006              DATA MRGFIL/0/                                                        00000750
0007              END                                                                   00000800
```

```
FORTRAN IV G LEVEL  21              BLK DATA        DATE = 78144         16/32/35              PAGE 0002

COMMON BLOCK /LIMIT  / MAP SIZE      18
SYMBOL    LOCATION       SYMBOL    LOCATION    SYMBOL    LOCATION    SYMBOL    LOCATION    SYMBOL    LOCATION
LMTX1        0           LMTX2        4        LMTY1        8        LMTY2        C        DUM         10

COMMON BLOCK /IOUNIT / MAP SIZE      30
SYMBOL    LOCATION       SYMBOL    LOCATION    SYMBOL    LOCATION    SYMBOL    LOCATION    SYMBOL    LOCATION
LUNIN        0           LUNOUT       4        LUNDSK       8        NREC         C        NBYTE       10
LOC         14           MRKEOL      18        MRKEOS      1C        LUNTAP      20        LUNTMP      24
LUNSUM      28           MRGFIL      2C

*OPTIONS IN EFFECT*  ID,BCD,SOURCE,NOLIST,NODECK,LOAD,MAP
        *OPTIONS IN EFFECT*  NAME = BLK DATA, LINECNT =     61
        *STATISTICS*  NO DIAGNOSTICS GENERATED

FORTRAN IV G LEVEL  21                 INIT          DATE = 78144        16/32/35             PAGE 0001

0001              SUBROUTINE INIT                                                  00000100
        0002              COMMON MAXMEM,MAXWRD                                             00000200
        0003              COMMON /LIMIT/ LMTX1,LMTX2,LMTY1,LMTY2,IHUNIT,IVUNIT              00000300
        0004              COMMON /PROCES/ LO,IER                                           00000400
        0005              COMMON /TEXT/ NGROUP,IYTXMX(30),IYTXMN(30),NCHAR(30),NTCHAR       00000500
        0006              COMMON /TEMP/ NTEMP                                              00000600
        0007              COMMON /AREA/ NAREA                                              00000700
        0008              COMMON /BLOCK/ NBLOCK                                            00000800
        0009              COMMON /GRID/ NGLINE(2)                                          00000900
        0010              COMMON /LINE/ NLINE                                              00001000
        0011              COMMON / PIE/ NPIE                                               00001100
        0012              COMMON /COLOR/ KLCODE(8)                                         00001200
        0013              COMMON /BOX/ NBOX                                                00001250
        0014              COMMON /INSET/ NINSET,DUM1(50),IYINMX,IYINMN                     00001270
        0015              MAXMEM=70000                                                     00001300
        0016              MAXWRD=0                                                         00001400
        0017              IHUNIT=(LMTX2-LMTX1+1)/72                                        00001500
        0018              IVUNIT=(LMTY2-LMTY1+1)/48                                        00001600
        0019              IER=0                                                            00001700
        0020              NGROUP=0                                                         00001800
        0021              NTCHAR=0                                                         00001900
        0022              NTEMP=0                                                          00002000
        0023              NAREA=0                                                          00002100
        0024              NBLOCK=0                                                         00002200
        0025              NGLINE(1)=0                                                      00002300
        0026              NGLINE(2)=0                                                      00002400
        0027              NLINE=0                                                          00002500
        0028              NPIE=0                                                           00002600
        0029              NBOX=0                                                           00002650
        0030              NINSET=0                                                         00002660
        0031              IYINMX=LMTY1                                                     00002670
        0032              IYINMN=LMTY2                                                     00002680
        0033              DO 10 K=1,8                                                      00002700
        0034       10     KLCODE(K)=0                                                      00002800
        0035              DO 20 K=1,30                                                     00002820
        0036              IYTXMX(K)=LMTY1                                                  00002840
        0037              IYTXMN(K)=LMTY2                                                  00002860
        0038       20     NCHAR(K)=0                                                       00002880
        0039              RETURN                                                           00002900
        0040              END                                                              00003000

FORTRAN IV G LEVEL  21                 INIT          DATE = 78144        16/32/35             PAGE 0002

COMMON BLOCK /       / MAP SIZE       8
SYMBOL    LOCATION       SYMBOL    LOCATION    SYMBOL    LOCATION    SYMBOL    LOCATION    SYMBOL    LOCATION
MAXMEM       0           MAXWRD       4

COMMON BLOCK /LIMIT  / MAP SIZE      18
SYMBOL    LOCATION       SYMBOL    LOCATION    SYMBOL    LOCATION    SYMBOL    LOCATION    SYMBOL    LOCATION
LMTX1        0           LMTX2        4        LMTY1        8        LMTY2        C        IHUNIT      10
IVUNIT      14

COMMON BLOCK /PROCES / MAP SIZE       8
SYMBOL    LOCATION       SYMBOL    LOCATION    SYMBOL    LOCATION    SYMBOL    LOCATION    SYMBOL    LOCATION
LO           0           IER          4

COMMON BLOCK /TEXT   / MAP SIZE     170
SYMBOL    LOCATION       SYMBOL    LOCATION    SYMBOL    LOCATION    SYMBOL    LOCATION    SYMBOL    LOCATION
NGROUP       0           IYTXMX       4        IYTXMN      7C        NCHAR       F4        NTCHAR     16C

COMMON BLOCK /TEMP   / MAP SIZE       4
SYMBOL    LOCATION       SYMBOL    LOCATION    SYMBOL    LOCATION    SYMBOL    LOCATION    SYMBOL    LOCATION
NTEMP        0

COMMON BLOCK /AREA   / MAP SIZE       4
SYMBOL    LOCATION       SYMBOL    LOCATION    SYMBOL    LOCATION    SYMBOL    LOCATION    SYMBOL    LOCATION
NAREA        0

COMMON BLOCK /BLOCK  / MAP SIZE       4
SYMBOL    LOCATION       SYMBOL    LOCATION    SYMBOL    LOCATION    SYMBOL    LOCATION    SYMBOL    LOCATION
NBLOCK       0

COMMON BLOCK /GRID   / MAP SIZE       8
SYMBOL    LOCATION       SYMBOL    LOCATION    SYMBOL    LOCATION    SYMBOL    LOCATION    SYMBOL    LOCATION
NGLINE       0
```

```
                        COMMON BLOCK /LINE    / MAP SIZE        4
SYMBOL    LOCATION    SYMBOL    LOCATION     SYMBOL    LOCATION     SYMBOL    LOCATION     SYMBOL    LOCATION
NLINE         0

COMMON BLOCK /PIE     / MAP SIZE        4
SYMBOL    LOCATION    SYMBOL    LOCATION     SYMBOL    LOCATION     SYMBOL    LOCATION     SYMBOL    LOCATION
NPIE          0

COMMON BLOCK /COLOR   / MAP SIZE       20
SYMBOL    LOCATION    SYMBOL    LOCATION     SYMBOL    LOCATION     SYMBOL    LOCATION     SYMBOL    LOCATION
KLCODE        0

COMMON BLOCK /BOX     / MAP SIZE        4
SYMBOL    LOCATION    SYMBOL    LOCATION     SYMBOL    LOCATION     SYMBOL    LOCATION     SYMBOL    LOCATION
NBOX          0

COMMON BLOCK /INSET   / MAP SIZE       04
SYMBOL    LOCATION    SYMBOL    LOCATION     SYMBOL    LOCATION     SYMBOL    LOCATION     SYMBOL    LOCATION
NINSET        0        DUM1          4       IYINMX          CC     IYINMN          D0

SCALAR MAP
SYMBOL    LOCATION    SYMBOL    LOCATION     SYMBOL    LOCATION     SYMBOL    LOCATION     SYMBOL    LOCATION
K            CC

*OPTIONS IN EFFECT*  ID,BCD,SOURCE,NOLIST,NODECK,LOAD,MAP
   *OPTIONS IN EFFECT*  NAME = INIT    , LINECNT =       61
   *STATISTICS*   SOURCE STATEMENTS =       40,PROGRAM SIZE =     674
   *STATISTICS*   NO DIAGNOSTICS GENERATED

FORTRAN IV G LEVEL  21             INPUT0          DATE = 78144           16/32/35           PAGE 0001

0001            SUBROUTINE INPUT0(ITYPE)                          00000100
0002            COMMON /HEAD/ IHEAD(40)                           00000300
0003            COMMON /PROCES/ LO,IER,NCOPY,IRES                 00000400
0004            COMMON /IOUNIT/ LUNIN,LUNOUT,SKIP(8),LUNSUM       00000500
0005            COMMON /LIMIT/ LMTX1,LMTX2,LMTY1,LMTY2,IHUNIT,IVUNIT   00000550
0006            READ(LUNIN,111,END=200,ERR=95) ITYPE,KLBKGD,NCOPY,JUNK,  00000600
              *    LMTX1,LMTX2,LMTY1,LMTY2,IHEAD                  00000610
0007     111    FORMAT(8I5,40A1)                                  00000700
0008            IF(LMTX1.EQ.0) LMTX1=73                           00000710
0009            IF(LMTY1.EQ.0) LMTY1=49                           00000720
0010            IF(LMTX2.EQ.0) LMTX2=1944                         00000730
0011            IF(LMTY2.EQ.0) LMTY2=1296                         00000740
0012            IHUNIT=(LMTX2-LMTX1+1)/72                         00000750
0013            IVUNIT=(LMTY2-LMTY1+1)/48                         00000760
0014            IF(IHUNIT .LE.0 .OR. IVUNIT.LE.0) GO TO 92        00000770
0015            WRITE(LUNOUT,112) IHEAD                           00000800
0016     112    FORMAT(4H1JOB,2X,40A1)                            00000900
0017            WRITE(LUNOUT,114) LMTX1,LMTX2,LMTY1,LMTY2,IHUNIT,IVUNIT   00000920
0018     114    FORMAT(8H LIMITS ,6I5)                            00000940
0019            IF(NCOPY.EQ.0) NCOPY=1                            00001000
0020            IF(IRES.EQ.0) IRES=1                              00001050
0021            JTYPE=ITYPE/10                                    00001100
0022            IF(JTYPE.LT.0 .OR. JTYPE.GT.9) GO TO 90           00001200
0023            CALL KLCONV(KLBKGD)                               00001300
0024            IF(IER.NE.0) GO TO 100                            00001400
0025            IF(JTYPE.EQ.0) GO TO 70                           00001450
0026            GO TO (20,30,20,40,5,10,50,10,80),JTYPE           00001500
0027     5      IF(ITYPE-55) 60,60,10                             00001550
0028     10     CALL INWORD(ITYPE)                                00001700
0029            GO TO 100                                         00001800
0030     20     CALL INVBAR                                       00001900
0031            GO TO 100                                         00002000
0032     30     CALL INHBAR                                       00002100
0033            GO TO 100                                         00002200
0034     40     CALL INGRAF(ITYPE)                                00002300
0035            GO TO 100                                         00002400
0036     50     CALL INBJUP                                       00002500
0037            GO TO 100                                         00002600
0038     60     CALL INPIE                                        00002700
0039            GO TO 100                                         00002800
0040     70     CALL INORG                                        00002820
0041            GO TO 100                                         00002840
0042     80     CALL INTAB                                        00002860
0043            GO TO 100                                         00002880
0044     90     WRITE(LUNOUT,101) ITYPE                           00002900
0045     101    FORMAT(35H ** INPUT **,NOT AVAILABLE FOR TYPE I3)  00003000
0046            GO TO 95                                          00003010
0047     92     WRITE(LUNOUT,102) LMTX1,LMTX2,LMTY1,LMTY2         00003020
0048     102    FORMAT(28H ** INPUT0 **,ILLEGAL LIMITS,4I5)        00003030
0049     95     IER=1                                             00003100
0050     100    CALL SECOND(T)                                    00003200
0051            WRITE(LUNOUT,113) T                               00003300
0052     113    FORMAT(19H INPUT0 FINISHED AT,F10.2)              00003400
0053            WRITE(LUNSUM) IHEAD,ITYPE,IRES,NCOPY,T            00003450
0054            RETURN                                            00003500
0055     200    IER=2                                             00003550
0056            RETURN                                            00003560
0057            END                                               00003600

FORTRAN IV G LEVEL  21             INPUT0          DATE = 78144           16/32/35           PAGE 0002

COMMON BLOCK /HEAD    / MAP SIZE       A0
SYMBOL    LOCATION    SYMBOL    LOCATION     SYMBOL    LOCATION     SYMBOL    LOCATION     SYMBOL    LOCATION
IHEAD         0
```

| | | | | | | | | | |
|---|---|---|---|---|---|---|---|---|---|
| COMMON BLOCK /PROCES / MAP SIZE 10 | | | | | | | | | |
| SYMBOL | LOCATION | SYMBOL | LOCATION | SYMBOL | LOCATION | SYMBOL | LOCATION | SYMBOL | LOCATION |
| LO | 0 | IER | 4 | NCOPY | 8 | IRES | C | | |

| | | | | | | | | | |
|---|---|---|---|---|---|---|---|---|---|
| COMMON BLOCK /IOUNIT / MAP SIZE 2C | | | | | | | | | |
| SYMBOL | LOCATION | SYMBOL | LOCATION | SYMBOL | LOCATION | SYMBOL | LOCATION | SYMBOL | LOCATION |
| LUNIN | 0 | LUNOUT | 4 | SKIP | 8 | LUNSUM | 28 | | |

| | | | | | | | | | |
|---|---|---|---|---|---|---|---|---|---|
| COMMON BLOCK /LIMIT / MAP SIZE 18 | | | | | | | | | |
| SYMBOL | LOCATION | SYMBOL | LOCATION | SYMBOL | LOCATION | SYMBOL | LOCATION | SYMBOL | LOCATION |
| LMTX1 | 0 | LMTX2 | 4 | LMTY1 | 8 | LMTY2 | C | IHUNIT | 10 |
| IVUNIT | 14 | | | | | | | | |

| | | | | | | | | | |
|---|---|---|---|---|---|---|---|---|---|
| SUBPROGRAMS CALLED | | | | | | | | | |
| SYMBOL | LOCATION | SYMBOL | LOCATION | SYMBOL | LOCATION | SYMBOL | LOCATION | SYMBOL | LOCATION |
| IBCOM# | 13B | KLCONV | 13C | INWORD | 140 | INVBAR | 144 | INHBAR | 148 |
| INGRAF | 14C | INBQUP | 150 | INPIE | 154 | INORG | 158 | INTAB | 15C |
| SECOND | 160 | | | | | | | | |

| | | | | | | | | | |
|---|---|---|---|---|---|---|---|---|---|
| SCALAR MAP | | | | | | | | | |
| SYMBOL | LOCATION | SYMBOL | LOCATION | SYMBOL | LOCATION | SYMBOL | LOCATION | SYMBOL | LOCATION |
| ITYPE | 174 | KLBKGD | 178 | JUNK | 17C | JTYPE | 180 | I | 184 |

| | | | | | | | | | |
|---|---|---|---|---|---|---|---|---|---|
| FORMAT STATEMENT MAP | | | | | | | | | |
| SYMBOL | LOCATION | SYMBOL | LOCATION | SYMBOL | LOCATION | SYMBOL | LOCATION | SYMBOL | LOCATION |
| 111 | 188 | 112 | 192 | 114 | 1A0 | 101 | 1B0 | 102 | 1D9 |
| 113 | 1F0 | | | | | | | | |

```
*OPTIONS IN EFFECT* ID,BCD,SOURCE,NOLIST,NODECK,LOAD,MAP
*OPTIONS IN EFFECT* NAME = INPUTO , LINECNT =        61
*STATISTICS*   SOURCE STATEMENTS =      57,PROGRAM SIZE =    1764
*STATISTICS* NO DIAGNOSTICS GENERATED
```

```
FORTRAN IV G LEVEL  21              RDTXT           DATE = 78144       16/32/35              PAGE 0001

0001            SUBROUTINE RDTXT(   MFNT,MSIZ,MKOLOR,   IFNT,ISIZ,NSTRNG,    00000100
              *  NCH2,KLCH2,ITEXT2,LMT1,LMT2)                                00000200
0002            COMMON /PROCES/ LO,IER                                       00000300
0003            COMMON /IOUNIT/ LUNIN,LUNOUT                                 00000400
0004            COMMON /INPUT/ DUM(123),MCLR                                 00000500
0005            DIMENSION ITEXT(62)                                          00000600
0006            DIMENSION NCH2(LMT2),KLCH2(LMT1,LMT2),ITEXT2(LMT1,LMT2)      00000700
0007            READ(LUNIN,101,END=200,ERR=95) ICLR,IFNT,ISIZ,KOLOR,NSTRNG,ITEXT 00000800
0008       101  FORMAT(5I3,3X,62A1)                                          00000900
0009            IF(ICLR.NE.0) MCLR=ICLR                                      00001000
0010            IF(IFNT.EQ.0) IFNT=MFNT                                      00001100
0011            IF(ISIZ.EQ.0) ISIZ=MSIZ                                      00001200
0012            IF(KOLOR.EQ.0) KOLOR=MKOLOR                                  00001300
0013            CALL KLCONV(KOLOR)                                           00001400
0014            IF(IER.NE.0) GO TO 100                                       00001500
0015            KLCH2(1,1)=KOLOR                                             00001600
0016            DO 10 L=1,LMT2                                               00001700
0017       10   NCH2(L)=0                                                    00001800
0018            IF(NSTRNG.EQ.0) GO TO 100                                    00001900
0019            NST=IABS(NSTRNG)                                             00002000
0020            MARK=ITEXT(1)                                                00002100
0021            IF(NST   .GT.LMT2) GO TO 92                                  00002200
0022            I1=2                                                         00002300
0023            N=1                                                          00002400
0024            J=0                                                          00002500
0025       30   DO 50 I=I1,62                                                00002600
0026            IF(ITEXT(I).EQ.MARK) GO TO 40                                00002700
0027            J=J+1                                                        00002800
0028            IF(J.GT.LMT1) GO TO 92                                       00002900
0029            KLCH2(J,N)=KOLOR                                             00003000
0030            ITEXT2(J,N)=ITEXT(I)                                         00003100
0031            GO TO 50                                                     00003200
0032       40   NCH2(N)=J                                                    00003300
0033            IF(N.EQ.NST) GO TO 100                                       00003400
0034            N=N+1                                                        00003500
0035            J=0                                                          00003600
0036       50   CONTINUE                                                     00003700
0037            READ(LUNIN,103,END=200,ERR=95) ITEXT                         00003800
0038       103  FORMAT(18X,62A1)                                             00003900
0039            I1=1                                                         00004000
0040            GO TO 30                                                     00004100
0041       92   WRITE(LUNOUT,102) J,NSTRNG,LMT1,LMT2                         00004200
0042       102  FORMAT(38H ** RDTXT **,EXCEEDS MEMORY ALLOCATION4I10)        00004300
0043       95   IER=1                                                        00004400
0044       100  RETURN                                                       00004500
0045       200  STOP 200                                                     00004550
0046            END                                                          00004600
```

```
FORTRAN IV G LEVEL  21              RDTXT           DATE = 78144       16/32/35              PAGE 0002
```

| | | | | | | | | | |
|---|---|---|---|---|---|---|---|---|---|
| COMMON BLOCK /PROCES / MAP SIZE 8 | | | | | | | | | |
| SYMBOL | LOCATION | SYMBOL | LOCATION | SYMBOL | LOCATION | SYMBOL | LOCATION | SYMBOL | LOCATION |
| LO | 0 | IER | 4 | | | | | | |

| | | | | | | | | | |
|---|---|---|---|---|---|---|---|---|---|
| COMMON BLOCK /IOUNIT / MAP SIZE 8 | | | | | | | | | |
| SYMBOL | LOCATION | SYMBOL | LOCATION | SYMBOL | LOCATION | SYMBOL | LOCATION | SYMBOL | LOCATION |
| LUNIN | 0 | LUNOUT | 4 | | | | | | |

COMMON BLOCK /INPUT / MAP SIZE 1F0

| SYMBOL | LOCATION | SYMBOL | LOCATION | SYMBOL | LOCATION | SYMBOL | LOCATION | SYMBOL | LOCATION |
|---|---|---|---|---|---|---|---|---|---|
| DUM | 0 | MCLR | 1EC | | | | | | |

SUBPROGRAMS CALLED

| SYMBOL | LOCATION | SYMBOL | LOCATION | SYMBOL | LOCATION | SYMBOL | LOCATION | SYMBOL | LOCATION |
|---|---|---|---|---|---|---|---|---|---|
| IBCOM# | 104 | KLCONV | 108 | | | | | | |

SCALAR MAP

| SYMBOL | LOCATION | SYMBOL | LOCATION | SYMBOL | LOCATION | SYMBOL | LOCATION | SYMBOL | LOCATION |
|---|---|---|---|---|---|---|---|---|---|
| LMT2 | 114 | LMT1 | 118 | ICLR | 11C | IFNT | 120 | ISIZ | 124 |
| KOLOR | 128 | NSTRNG | 12C | MFNT | 130 | MSIZ | 134 | MKOLOR | 138 |
| L | 13C | NST | 140 | MARK | 144 | I1 | 148 | N | 14C |
| J | 150 | I | 154 | | | | | | |

ARRAY MAP

| SYMBOL | LOCATION | SYMBOL | LOCATION | SYMBOL | LOCATION | SYMBOL | LOCATION | SYMBOL | LOCATION |
|---|---|---|---|---|---|---|---|---|---|
| ITEXT | 15B | NCH2 | 250 | KLCH2 | 254 | ITEXT2 | 258 | | |

FORMAT STATEMENT MAP

| SYMBOL | LOCATION | SYMBOL | LOCATION | SYMBOL | LOCATION | SYMBOL | LOCATION | SYMBOL | LOCATION |
|---|---|---|---|---|---|---|---|---|---|
| 101 | 25C | 103 | 268 | 102 | 270 | | | | |

```
*OPTIONS IN EFFECT* ID,BCD,SOURCE,NOLIST,NODECK,LOAD,MAP
*OPTIONS IN EFFECT* NAME = KOTXT   , LINECNT =     61
*STATISTICS*   SOURCE STATEMENTS =     46,PROGRAM SIZE =    1790
*STATISTICS*   NO DIAGNOSTICS GENERATED
```

---

FORTRAN IV G LEVEL 21          KLCONV          DATE = 78144          16/32/35          PAGE 0001

```
0001            SUBROUTINE KLCONV(KL)                             00000100
        C...TO CONVERT COLOR ID(KL) TO A NUMBER FROM 1 TO 8 ...   00000200
0002            COMMON /COLOR/ KLCODE(8)                          00000300
0003            COMMON /PROCES/ LO,IER                            00000400
0004            COMMON /IOUNIT/ LUNIN,LUNOUT                      00000500
0005            IF(KL.GE.0 .AND. KL.LE.64) GO TO 5                00000600
0006            WRITE(LUNOUT,100) KL                              00000700
0007      100   FORMAT(32H ** KLCONV **,COLOR OUT OF RANGE16)     00000800
0008            IER=1                                             00000900
0009            GO TO 30                                          00001000
0010      5     DO 10 K=1,8                                       00001100
0011            IF(KLCODE(K).EQ.KL) GO TO 20                      00001200
0012            IF(KLCODE(K).EQ.0) GO TO 15                       00001300
0013      10    CONTINUE                                          00001400
0014            WRITE(LUNOUT,101) KLCODE                          00001500
0015      101   FORMAT(37H ** KLCONV **,MORE THAN 8 COLORS USED,8I10)  00001600
0016            IER=1                                             00001700
0017            GO TO 30                                          00001800
0018      15    KLCODE(K)=KL                                      00001900
0019      20    KL=K                                              00002000
0020            IF(KLCODE(K).EQ.0) KLCODE(K)=8*K                  00002100
0021      30    RETURN                                            00002200
0022            END                                               00002300
```

---

FORTRAN IV G LEVEL 21          KLCONV          DATE = 78144          16/32/35          PAGE 0002

COMMON BLOCK /COLOR / MAP SIZE 20

| SYMBOL | LOCATION | SYMBOL | LOCATION | SYMBOL | LOCATION | SYMBOL | LOCATION | SYMBOL | LOCATION |
|---|---|---|---|---|---|---|---|---|---|
| KLCODE | 0 | | | | | | | | |

COMMON BLOCK /PROCES / MAP SIZE 8

| SYMBOL | LOCATION | SYMBOL | LOCATION | SYMBOL | LOCATION | SYMBOL | LOCATION | SYMBOL | LOCATION |
|---|---|---|---|---|---|---|---|---|---|
| LO | 0 | IER | 4 | | | | | | |

COMMON BLOCK /IOUNIT / MAP SIZE 8

| SYMBOL | LOCATION | SYMBOL | LOCATION | SYMBOL | LOCATION | SYMBOL | LOCATION | SYMBOL | LOCATION |
|---|---|---|---|---|---|---|---|---|---|
| LUNIN | 0 | LUNOUT | 4 | | | | | | |

SUBPROGRAMS CALLED

| SYMBOL | LOCATION | SYMBOL | LOCATION | SYMBOL | LOCATION | SYMBOL | LOCATION | SYMBOL | LOCATION |
|---|---|---|---|---|---|---|---|---|---|
| IBCOM# | D0 | | | | | | | | |

SCALAR MAP

| SYMBOL | LOCATION | SYMBOL | LOCATION | SYMBOL | LOCATION | SYMBOL | LOCATION | SYMBOL | LOCATION |
|---|---|---|---|---|---|---|---|---|---|
| KL | D4 | K | D8 | | | | | | |

FORMAT STATEMENT MAP

| SYMBOL | LOCATION | SYMBOL | LOCATION | SYMBOL | LOCATION | SYMBOL | LOCATION | SYMBOL | LOCATION |
|---|---|---|---|---|---|---|---|---|---|
| 100 | DC | 101 | 102 | | | | | | |

```
*OPTIONS IN EFFECT* ID,BCD,SOURCE,NOLIST,NODECK,LOAD,MAP
*OPTIONS IN EFFECT* NAME = KLCONV  , LINECNT =     61
*STATISTICS*   SOURCE STATEMENTS =     22,PROGRAM SIZE =     736
*STATISTICS*   NO DIAGNOSTICS GENERATED
```

```
FORTRAN IV G LEVEL  21              INORG           DATE = 78144          16/32/35           PAGE 0001

0001              SUBROUTINE INORG                                            00000100
0002              INTEGER*2 ITEXT,MARK,IBOX,IDBOX,ITMP                        00000200
0003              COMMON /INPUT/ IFNT,ISIZ,NCTTL,KLTTL(60),ITTL(60),ICLR,     00000300
                 *               JFNT,JSIZ,NCSTTL,KLSTTL(60),ISTTL(60),       00000400
                 *               KFNT,KSIZ,NCRMK,KLRMK(60),IRMK(60),          00000500
                 *               LFNT,LSIZ,LCOL,NHLINE,NVLINE,                00000600
                 *               NOD(2,20,2),NBOX,IDBOX(30),KLBOX(30),NCBOX(2,30), 00000700
                 *               KLIBOX(2,30),IBOX(11,2,30)                   00000800
0004              COMMON /PROCES/ LO,IER                                      00000900
0005              COMMON /COLOR/ KLCODE(8)                                    00001000
0006              COMMON /IOUNIT/ LUNIN,LUNOUT                                00001100
0007              DIMENSION KLINE(2,4),ITEXT(25)                              00001200
0008              DIMENSION NCTMP(2),KLITMP(2),ITMP(11,2)                     00001300
0009              ICLR=2                                                      00001400
0010              CALL RDTXT(1,6,0,IFNT,ISIZ,NDUM,NCTTL,KLTTL,ITTL,60,1)      00001500
0011              ISAV=ICLR                                                   00001600
0012              IF(IER.NE.0) GO TO 100                                      00001700
0013              CALL RDTXT(IFNT,4,KLCODE(KLTTL(1)),JFNT,JSIZ,NDUM,NCSTTL,KLSTTL, 00001800
                 *           ISTTL,60,1)                                      00001900
0014              IF(IER.NE.0) GO TO 100                                      00002000
0015              CALL RDTXT(JFNT,1,KLCODE(KLSTTL(1)),KFNT,KSIZ,NDUM,NCRMK,KLRMK, 00002100
                 *           IRMK,60,1)                                       00002200
0016              IF(IER.NE.0) GO TO 100                                      00002300
          C...FONT,SIZE OF BOX TEXTS,COLOR OF CONNECTION LINES AND BORDER LINES...00002400
0017              READ(LUNIN,101,ERR=91,END=200) LFNT,LSIZ,LCOL               00002500
0018        101   FORMAT(8I10)                                                00002600
0019              IF(LFNT.EQ.0) LFNT=KFNT                                     00002700
0020              IF(LSIZ.EQ.0) LSIZ=1                                        00002800
0021              IF(LCOL.EQ.0) LCOL=KLCODE(KLRMK(1))                         00002900
0022              CALL KLCONV(LCOL)                                           00003000
0023              IF(IER.NE.0) GO TO 100                                      00003100
0024              NHLINE=0                                                    00003200
0025              NVLINE=0                                                    00003300
          C...READ AND PROCESS CONNECTING LINES,4 LINES EACH CARD...          00003400
0026              DO 30 I=1,11                                                00003500
0027              READ(LUNIN,102,ERR=91,END=200) (KLINE(1,K),KLINE(2,K),K=1,4) 00003600
0028        102   FORMAT(8Z10)                                                00003700
0029              DO 30 K=1,4                                                 00003800
0030              IF(KLINE(1,K)*KLINE(2,K).EQ.0) GO TO 40                     00003900
0031              IF(KLINE(1,K).EQ.KLINE(2,K)) GO TO 91                       00004000
0032              K11=KLINE(1,K)/16                                           00004100
0033              K10=KLINE(1,K)-16*K11                                       00004200
0034              K21=KLINE(2,K)/16                                           00004300
0035              K20=KLINE(2,K)-16*K21                                       00004400
0036              IF(K11.EQ.K21) GO TO 10                                     00004500
0037              IF(K10.EQ.K20) GO TO 20                                     00004600
0038              GO TO 91                                                    00004700
          C...HORIZONTAL LINES...                                             00004800
0039         10   NHLINE=NHLINE+1                                             00004900
0040              IF(NHLINE.GT.20) GO TO 92                                   00005000
0041              NOD(1,NHLINE,1)=MINO(KLINE(1,K),KLINE(2,K))                 00005100
0042              NOD(2,NHLINE,1)=MAXO(KLINE(1,K),KLINE(2,K))                 00005200
0043              GO TO 30                                                    00005300
          C...VERTICAL LINES...                                               00005400
0044         20   NVLINE=NVLINE+1                                             00005500
0045              IF(NVLINE.GT.20) GO TO 92                                   00005600
0046              NOD(1,NVLINE,2)=MINO(KLINE(1,K),KLINE(2,K))                 00005700
0047              NOD(2,NVLINE,2)=MAXO(KLINE(1,K),KLINE(2,K))                 00005800
0048         30   CONTINUE                                                    00005900
0049              GO TO 92                                                    00006000
0050         40   IF(NHLINE.GT.1) CALL SRTCMP(NOD(1,1,1),NHLINE)              00006100
0051              IF(NVLINE.GT.1) CALL SRTCMP(NOD(1,1,2),NVLINE)              00006200
          C...READ BOXES,FOR EACH BOX SPECIFY COLOR,TEXT...                   00006300
0052              DO 70 N=1,30                                                00006400
0053              READ(LUNIN,103,END=200,ERR=95)                              00006500
                 *        IDBOX(N),KLBOX(N),NLINE,(KLIBOX(I,N),I=1,2),ITEXT   00006550
0054        103   FORMAT(Z3,4I3,3X,25A1)                                      00006600
0055              IF(IDBOX(N).EQ.0) GO TO 80                                  00006700
0056              K11=IDBOX(N)/16                                             00006800
0057              K10=IDBOX(N)-16*K11                                         00006900
0058              IF(MOD(K11,2)*MOD(K10,2).EQ.0) GO TO 91                     00007000
0058              IF(KLBOX(N).NE.0) CALL KLCONV(KLBOX(N))                     00007100
0059              IF(IER.NE.0) GO TO 100                                      00007200
0060              IF(KLBOX(N).EQ.0) KLBOX(N)=1                                00007300
0061              IF(NLINE.GT.2 .OR. NLINE.LT.0) GO TO 91                     00007400
0062              IF(NLINE.EQ.0) NLINE=1                                      00007500
0063              DO 62 NL=1,NLINE                                            00007600
0064              IF(KLIBOX(NL,N).NE.0) CALL KLCONV(KLIBOX(NL,N))             00007700
0065              IF(IER.NE.0) GO TO 91                                       00007800
0066              IF(KLIBOX(NL,N).EQ.0 .AND. NL.EQ.1) KLIBOX(NL,N)=LCOL       00007900
0067              IF(KLIBOX(NL,N).EQ.0 .AND. NL.EQ.2) KLIBOX(2,N)=KLIBOX(1,N) 00008000
0068         62   CONTINUE                                                    00008100
0069              NCBOX(1,N)=0                                                00008200
0070              NCBOX(2,N)=0                                                00008300
0071              MARK=ITEXT(1)                                               00008400
0072              NL=1                                                        00008500
0073              DO 65 I=2,25                                                00008600
0074              IF(ITEXT(I).EQ.MARK) GO TO 63                               00008700
0075              NCBOX(NL,N)=NCBOX(NL,N)+1                                   00008800
0076              IF(NCBOX(NL,N).GT.11) GO TO 91                              00008900
0077              IBOX(NCBOX(NL,N),NL,N)=ITEXT(I)                             00009000
0078              GO TO 65                                                    00009100
0079         63   NL=NL+1                                                     00009200
0080              IF(NL.GT.NLINE) GO TO 70                                    00009300
0081         65   CONTINUE                                                    00009400
0082         70   CONTINUE                                                    00009500
0083              READ(LUNIN,103)                                             00009600
0084              N=31                                                        00009700
0085         80   NBOX=N-1                                                    00009800
0086              IF(NBOX.LE.1) GO TO 100                                     00009900
0087              DO 90 I=2,NBOX                                              00010000
0088              NN=I-1                                                      00010100
0089              DO 90 N=1,NN                                                00010200
0090              IF(IDBOX(I).EQ.IDBOX(N)) GO TO 91                           00010300
0091              K1=IDBOX(I)-IDBOX(I)/16*16                                  00010320
```

```
0092            KN=IDBOX(N)-IDBOX(N)/16*16                                00010340
0093            IF(KI.GT.KN) GO TO 90                                     00010360
0094      82    IDTMP=IDBOX(I)                                            00010400
0095            KLTMP=KLBOX(I)                                            00010500
0096            DO 83 II=1,2                                              00010600
0097            NCTMP(II)=NCBOX(II,I)                                     00010700
0098            KLITMP(II)=KLIBOX(II,I)                                   00010800
0099            DO 83 K=1,11                                              00010900
0100      83    ITMP(K,II)=IBOX(K,II,I)                                   00011000
0101            DO 85 IO=N,NN                                             00011100
0102            II=NN-IO+N+1                                              00011200
0103            IDBOX(II)=IDBOX(II-1)                                     00011300
0104            KLBOX(II)=KLBOX(II-1)                                     00011400
0105            DO 85 II=1,2                                              00011500
0106            NCBOX(II,II)=NCBOX(II,II-1)                               00011600
0107            KLIBOX(II,II)=KLIBOX(II,II-1)                             00011700
0108            DO 85 K=1,11                                              00011800
0109      85    IBOX(K,II,II)=IBOX(K,II,II-1)                             00011900
0110            IDBOX(N)=IDTMP                                            00012000
0111            KLBOX(N)=KLTMP                                            00012100
0112            DO 87 II=1,2                                              00012200
0113            NCBOX(II,N)=NCTMP(II)                                     00012300
0114            KLIBOX(II,N)=KLITMP(II)                                   00012400
0115            DO 87 K=1,11                                              00012500
0116      87    IBOX(K,II,N)=ITMP(K,II)                                   00012600
0117      90    CONTINUE                                                  00012700
0118            GO TO 100                                                 00012750
0119      91    WRITE(LUNOUT,111)                                         00012800
0120      111   FORMAT(23H **INORG **,INPUT ERROR)                        00012900
0121            GO TO 95                                                  00013000
0122      92    WRITE(LUNOUT,112)                                         00013100
0123      112   FORMAT(35H **INORG **,TOO MANY H- OR V- LINES)            00013200
0124      95    IER=1                                                     00013300
0125      100   ICLR=ISAV                                                 00013400
0126            RETURN                                                    00013500
0127      200   STOP 200                                                  00013550
0128            END                                                       00013600
```

FORTRAN IV G LEVEL 21        INORG        DATE = 78144        16/32/35        PAGE 0004

COMMON BLOCK /INPUT / MAP SIZE    EDC

| SYMBOL | LOCATION | SYMBOL | LOCATION | SYMBOL | LOCATION | SYMBOL | LOCATION | SYMBOL | LOCATION |
|---|---|---|---|---|---|---|---|---|---|
| IFNT | 0 | ISIZ | 4 | NCTTL | 8 | KLTTL | C | ITTL | FC |
| ICLR | 1EC | JFNT | 1F0 | JSIZ | 1F4 | NCSTTL | 1F8 | KLSTTL | 1FC |
| ISTTL | 2EC | KFNT | 30C | KSIZ | 3E0 | NCRMK | 3E4 | KLRMK | 3E8 |
| IRMK | 4D8 | LFNT | 5C8 | LSIZ | 5CC | LCOL | 5D0 | NHLINE | 5D4 |
| NVLINE | 5D8 | NOD | 5DC | NBOX | 71C | IDBOX | 720 | KLBOX | 75C |
| NCBOX | 7D4 | KLIBOX | 8C4 | IBOX | 9B4 | | | | |

COMMON BLOCK /PROCES / MAP SIZE    8

| SYMBOL | LOCATION | SYMBOL | LOCATION | SYMBOL | LOCATION | SYMBOL | LOCATION | SYMBOL | LOCATION |
|---|---|---|---|---|---|---|---|---|---|
| LO | 0 | IER | 4 | | | | | | |

COMMON BLOCK /COLOR / MAP SIZE    20

| SYMBOL | LOCATION | SYMBOL | LOCATION | SYMBOL | LOCATION | SYMBOL | LOCATION | SYMBOL | LOCATION |
|---|---|---|---|---|---|---|---|---|---|
| KLCODE | 0 | | | | | | | | |

COMMON BLOCK /IOUNIT / MAP SIZE    8

| SYMBOL | LOCATION | SYMBOL | LOCATION | SYMBOL | LOCATION | SYMBOL | LOCATION | SYMBOL | LOCATION |
|---|---|---|---|---|---|---|---|---|---|
| LUNIN | 0 | LUNOUT | 4 | | | | | | |

SUBPROGRAMS CALLED

| SYMBOL | LOCATION | SYMBOL | LOCATION | SYMBOL | LOCATION | SYMBOL | LOCATION | SYMBOL | LOCATION |
|---|---|---|---|---|---|---|---|---|---|
| ROTXI | 1CC | IBCOMP | 1D0 | KLCONV | 1D4 | SRTCMP | 1D8 | MINO | 1DC |
| MAXO | 1E0 | | | | | | | | |

SCALAR MAP

| SYMBOL | LOCATION | SYMBOL | LOCATION | SYMBOL | LOCATION | SYMBOL | LOCATION | SYMBOL | LOCATION |
|---|---|---|---|---|---|---|---|---|---|
| NDUM | 2A4 | ISAV | 2A8 | I | 2AC | K | 2B0 | K11 | 2B4 |
| K10 | 2B8 | K21 | 2BC | K20 | 2C0 | N | 2C4 | NLINE | 2C8 |
| NL | 2CC | NN | 2D0 | KI | 2D4 | KN | 2D8 | IDTMP | 2DC |
| KLTMP | 2E0 | II | 2E4 | IO | 2E8 | II | 2EC | MARK | 2F0 |

ARRAY MAP

| SYMBOL | LOCATION | SYMBOL | LOCATION | SYMBOL | LOCATION | SYMBOL | LOCATION | SYMBOL | LOCATION |
|---|---|---|---|---|---|---|---|---|---|
| KLINE | 2F4 | ITEXT | 314 | NCTMP | 348 | KLITMP | 350 | ITMP | 358 |

FORMAT STATEMENT MAP

| SYMBOL | LOCATION | SYMBOL | LOCATION | SYMBOL | LOCATION | SYMBOL | LOCATION | SYMBOL | LOCATION |
|---|---|---|---|---|---|---|---|---|---|
| 101 | 384 | 102 | 38A | 103 | 390 | 111 | 39E | 112 | 3B9 |

*OPTIONS IN EFFECT* ID,BCD,SOURCE,NOLIST,NODECK,LOAD,MAP
*OPTIONS IN EFFECT* NAME = INORG , LINECNT =    61
*STATISTICS*  SOURCE STATEMENTS =    128,PROGRAM SIZE =    4226
*STATISTICS* NO DIAGNOSTICS GENERATED

FORTRAN IV G LEVEL 21        SRTCMP        DATE = 78144        16/32/35        PAGE 0001

```
0001            SUBROUTINE SRTCMP(IARRAY,NENTRY)                          00000100
         C...TO SORT AND COMPRESS THE 2-DIM ARRAY IARRAY...               00000200
0002            COMMON /PROCES/ LO,IER                                    00000300
0003            COMMON /IOUNIT/ LUNIN,LUNOUT                              00000400
0004            DIMENSION IARRAY(2,20),ITMP(2,20)                         00000500
         C...SORT...                                                      00000600
```

```
0005            ITMP(1,1)=IARRAY(1,1)                                   00000700
0006            ITMP(2,1)=IARRAY(2,1)                                   00000800
0007            IF(ITMP(1,1)/16 .EQ. ITMP(2,1)/16) MODE = 1             00000820
0008            IF(MOD(ITMP(1,1),16) .EQ. MOD(ITMP(2,1),16)) MODE = 2   00000840
          C...TO TAKE CARE OVERLAPPING LINES...                         00000850
0009            KOUNT=1                                                 00000852
0010      3     IF(KOUNT.GT.20) GO TO 91                                00000854
0011            DO 5 I=2,NENTRY                                         00000856
0012            NN=I-1                                                  00000858
0013            DO 5 N=1,NN                                             00000860
0014            IF(MODE.EQ.1 .AND. IARRAY(1,I)/16.NE.IARRAY(1,N)/16) GO TO 5    00000862
0015            IF(MODE.EQ.2 .AND. MOD(IARRAY(1,I),16).NE.MOD(IARRAY(1,N),16))  00000864
               *    GO TO 5                                             00000866
0016            IF(IARRAY(1,I).GT.IARRAY(2,N) .OR. IARRAY(2,I).LT.IARRAY(1,N))  00000868
               *    GO TO 5                                             00000870
0017            GO TO 6                                                 00000872
0018      5     CONTINUE                                                00000874
0019            GO TO 9                                                 00000876
0020      6     IARRAY(1,N)=MIN0(IARRAY(1,N),IARRAY(1,I))               00000878
0021            IARRAY(2,N)=MAX0(IARRAY(2,N),IARRAY(2,I))               00000880
0022            IF(I.EQ.NENTRY) GO TO 8                                 00000882
0023            DO 7 I1=I,NENTRY                                        00000884
0024            I2=I1+1                                                 00000886
0025            IARRAY(1,I1)=IARRAY(1,I2)                               00000888
0026      7     IARRAY(2,I1)=IARRAY(2,I2)                               00000890
0027      8     NENTRY=NENTRY-1                                         00000892
0028            KOUNT=KOUNT+1                                           00000894
0029            GO TO 3                                                 00000896
0030      9     ITMP(1,1)=IARRAY(1,1)                                   00000897
0031            ITMP(2,1)=IARRAY(2,1)                                   00000898
0032            DO 40 I=2,NENTRY                                        00000900
0033            NN=I-1                                                  00001000
0034            DO 10 N=1,NN                                            00001100
0035            IF(MODE.EQ.1 .AND. IARRAY(1,I)/16.NE.ITMP(1,N)/16) GO TO 10     00001120
0036            IF(MODE.EQ.2 .AND. MOD(IARRAY(1,I),16).GT.MOD(ITMP(1,N),16))    00001130
               *    GO TO 10                                            00001140
0037            IF(MODE.EQ.2 .AND. MOD(IARRAY(1,I),16).LT.MOD(ITMP(1,N),16))    00001150
               *    GO TO 20                                            00001160
0038            IF(IARRAY(1,I).GE.ITMP(2,N)) GO TO 10                   00001200
0039            IF(IARRAY(2,I).GT.ITMP(1,N)) GO TO 91                   00001300
0040            GO TO 20                                                00001400
0041      10    CONTINUE                                                00001500
0042            ITMP(1,I)=IARRAY(1,I)                                   00001600
0043            ITMP(2,I)=IARRAY(2,I)                                   00001700
0044            GO TO 40                                                00001800
0045      20    DO 30 I1=N,NN                                           00001900
0046            I0=NN-I1+N+1                                            00002000
0047            ITMP(1,I0)=ITMP(1,I0-1)                                 00002100
0048      30    ITMP(2,I0)=ITMP(2,I0-1)                                 00002200
0049            ITMP(1,N)=IARRAY(1,I)                                   00002300
0050            ITMP(2,N)=IARRAY(2,I)                                   00002400
0051      40    CONTINUE                                                00002500
          C...COMPRESS...                                                00002600
0052            NN=NN+1                                                 00002700
0053            NENTRY=1                                                00002800
0054            IARRAY(1,1)=ITMP(1,1)                                   00002900
0055            IARRAY(2,1)=ITMP(2,1)                                   00003000
0056            DO 60 N=2,NN                                            00003100
0057            IF(MODE.EQ.1 .AND. ITMP(1,N)/16.NE.IARRAY(1,NENTRY)/16) GO TO 55  00003120
0058            IF(MODE.EQ.2 .AND. MOD(ITMP(1,N),16).NE.MOD(IARRAY(1,NENTRY),16)) 00003130
               *    GO TO 55                                            00003140
0059            IF(ITMP(1,N)-IARRAY(2,NENTRY)) 92,50,55                 00003200
0060      50    IARRAY(2,NENTRY)=ITMP(2,N)                              00003300
0061            GO TO 60                                                00003400
0062      55    NENTRY=NENTRY+1                                         00003500
0063            IARRAY(1,NENTRY)=ITMP(1,N)                              00003600
0064            IARRAY(2,NENTRY)=ITMP(2,N)                              00003700
0065      60    CONTINUE                                                00003800
0066            GO TO 100                                               00003900
0067      91    WRITE(LUNOUT,101)                                       00004000
0068      101   FORMAT(39H SRTCMP,OVERLAPING CONNECTION LINES)      00004100
0069            GO TO 95                                                00004200
0070      92    WRITE(LUNOUT,102)                                       00004300
0071      102   FORMAT(28H SRTCMP,IMPROPER SORTING)                 00004400
0072      95    IER=1                                                   00004500
0073      100   RETURN                                                  00004600
0074            END                                                     00004700
```

FORTRAN IV G LEVEL 21          SRTCMP          DATE = 78144     16/32/35          PAGE 0003

COMMON BLOCK /PROCES / MAP SIZE    8

| SYMBOL | LOCATION | SYMBOL | LOCATION | SYMBOL | LOCATION | SYMBOL | LOCATION | SYMBOL | LOCATION |
|---|---|---|---|---|---|---|---|---|---|
| L0 | 0 | IER | 4 | | | | | | |

COMMON BLOCK /IOUNIT / MAP SIZE    8

| SYMBOL | LOCATION | SYMBOL | LOCATION | SYMBOL | LOCATION | SYMBOL | LOCATION | SYMBOL | LOCATION |
|---|---|---|---|---|---|---|---|---|---|
| LUNIN | 0 | LUNOUT | 4 | | | | | | |

SUBPROGRAMS CALLED

| SYMBOL | LOCATION | SYMBOL | LOCATION | SYMBOL | LOCATION | SYMBOL | LOCATION | SYMBOL | LOCATION |
|---|---|---|---|---|---|---|---|---|---|
| IBCOM# | 164 | MIN0 | 168 | MAX0 | 16C | | | | |

SCALAR MAP

| SYMBOL | LOCATION | SYMBOL | LOCATION | SYMBOL | LOCATION | SYMBOL | LOCATION | SYMBOL | LOCATION |
|---|---|---|---|---|---|---|---|---|---|
| MODE | 100 | KOUNT | 104 | I | 108 | NENTRY | 10C | NN | 1E0 |
| N | 1E4 | I1 | 1E8 | I2 | 1EC | I1 | 1F0 | I0 | 1F4 |

ARRAY MAP

| SYMBOL | LOCATION | SYMBOL | LOCATION | SYMBOL | LOCATION | SYMBOL | LOCATION | SYMBOL | LOCATION |
|---|---|---|---|---|---|---|---|---|---|
| IARRAY | 1F8 | ITMP | 1FC | | | | | | |

FORMAT STATEMENT MAP

| SYMBOL | LOCATION | SYMBOL | LOCATION | SYMBOL | LOCATION | SYMBOL | LOCATION | SYMBOL | LOCATION |
|---|---|---|---|---|---|---|---|---|---|
| 101 | 29C | 102 | 2C7 | | | | | | |

```
*OPTIONS IN EFFECT* ID,BCD,SOURCE,NOLIST,NODECK,LOAD,MAP
*OPTIONS IN EFFECT* NAME = SRTCMP , LINECNT =    61
*STATISTICS*    SOURCE STATEMENTS =        74,PROGRAM SIZE =     2916
*STATISTICS* NO DIAGNOSTICS GENERATED
```

FORTRAN IV G LEVEL  21              TYPSET          DATE = 78144       16/32/35           PAGE 0001

```
0001              SUBROUTINE TYPSET(ITYPE)                              00000100
0002              COMMON /PROCES/ LO,IER                                00000200
0003              COMMON /IOUNIT/ LUNIN,LUNOUT                          00000300
0004              JTYPE=ITYPE/10                                        00000350
0005              IF(JTYPE.EQ.0) GO TO 70                               00000370
0006              GO TO (20,30,20,4,5,10,80,10,90),JTYPE                00000400
0007        4     IF(ITYPE-45) 50,40,40                                 00000420
0008        5     IF(ITYPE-55) 60,60,10                                 00000440
0009       10     CALL TSWORD                                           00000500
0010              GO TO 100                                             00000600
0011       20     CALL TSVBAR                                           00000700
0012              GO TO 100                                             00000800
0013       30     CALL TSHBAR                                           00000900
0014              GO TO 100                                             00001000
0015       40     CALL TSAREA                                           00001100
0016              GO TO 100                                             00001200
0017       50     CALL TSLINE                                           00001300
0018              GO TO 100                                             00001400
0019       60     CALL TSPIE                                            00001500
0020              GO TO 100                                             00001600
0021       70     CALL TSORG                                            00001700
0022              GO TO 100                                             00001750
0023       80     CALL TSBDUP                                           00001800
0024              GO TO 100                                             00001850
0025       90     CALL TSTAB                                            00001900
0026      100     CALL TSPXID                                           00001950
0027              CALL SECOND(T)                                        00002000
0028              WRITE(LUNOUT,111) T                                   00002100
0029      111     FORMAT(19H TYPSET FINISHED AT,F10.2)                  00002200
0030              RETURN                                                00002300
0031              END                                                   00002400
```

FORTRAN IV G LEVEL  21              TYPSET          DATE = 78144       16/32/35           PAGE 0002

COMMON BLOCK /PROCES / MAP SIZE   8

| SYMBOL | LOCATION | SYMBOL | LOCATION | SYMBOL | LOCATION | SYMBOL | LOCATION | SYMBOL | LOCATION |
|---|---|---|---|---|---|---|---|---|---|
| LO | 0 | IER | 4 | | | | | | |

COMMON BLOCK /IOUNIT / MAP SIZE   8

| SYMBOL | LOCATION | SYMBOL | LOCATION | SYMBOL | LOCATION | SYMBOL | LOCATION | SYMBOL | LOCATION |
|---|---|---|---|---|---|---|---|---|---|
| LUNIN | 0 | LUNOUT | 4 | | | | | | |

SUBPROGRAMS CALLED

| SYMBOL | LOCATION | SYMBOL | LOCATION | SYMBOL | LOCATION | SYMBOL | LOCATION | SYMBOL | LOCATION |
|---|---|---|---|---|---|---|---|---|---|
| TSWORD | FC | TSVBAR | 100 | TSHBAR | 104 | TSAREA | 108 | TSLINE | 10C |
| TSPIE | 110 | TSORG | 114 | TSBDUP | 118 | TSTAB | 11C | TSPXID | 120 |
| SECOND | 124 | IBCOM# | 128 | | | | | | |

SCALAR MAP

| SYMBOL | LOCATION | SYMBOL | LOCATION | SYMBOL | LOCATION | SYMBOL | LOCATION | SYMBOL | LOCATION |
|---|---|---|---|---|---|---|---|---|---|
| JTYPE | 130 | ITYPE | 134 | T | 138 | | | | |

FORMAT STATEMENT MAP

| SYMBOL | LOCATION | SYMBOL | LOCATION | SYMBOL | LOCATION | SYMBOL | LOCATION | SYMBOL | LOCATION |
|---|---|---|---|---|---|---|---|---|---|
| 111 | 13C | | | | | | | | |

```
*OPTIONS IN EFFECT* ID,BCD,SOURCE,NOLIST,NODECK,LOAD,MAP
*OPTIONS IN EFFECT* NAME = TYPSET , LINECNT =    61
*STATISTICS*    SOURCE STATEMENTS =        31,PROGRAM SIZE =      852
*STATISTICS* NO DIAGNOSTICS GENERATED
```

FORTRAN IV G LEVEL  21              COMPAR          DATE = 78144       16/32/35           PAGE 0001

```
0001              SUBROUTINE COMPAR(ID,ISIZ,ITEMP)                      00000100
0002              COMMON /TEMP/ NTEMP,IDTEMP(200),ISTEMP(200)           00000200
0003              IF(NTEMP.EQ.0) GO TO 30                               00000300
0004              DO 10 N=1,NTEMP                                       00000400
0005              IF(ID.EQ.IDTEMP(N) .AND. ISIZ.EQ.ISTEMP(N)) GO TO 20  00000500
0006       10     CONTINUE                                              00000600
0007              GO TO 30                                              00000700
0008       20     ITEMP=N                                               00000800
0009              GO TO 40                                              00000900
0010       30     ITEMP=0                                               00001000
0011       40     RETURN                                                00001100
0012              END                                                   00001200
```

```
FORTRAN IV G LEVEL  21                    COMPAR           DATE = 78144        16/32/35              PAGE 0002

COMMON BLOCK /TEMP  / MAP SIZE    644
SYMBOL    LOCATION     SYMBOL    LOCATION      SYMBOL    LOCATION      SYMBOL    LOCATION      SYMBOL    LOCATION
NTEMP        0         IDTEMP       4          ISTEMP       324

SCALAR MAP
SYMBOL    LOCATION     SYMBOL    LOCATION      SYMBOL    LOCATION      SYMBOL    LOCATION      SYMBOL    LOCATION
N            B8        ID           BC         ISIZ         C0         ITEMP        C4

*OPTIONS IN EFFECT*  ID,BCD,SOURCE,NOLIST,NODECK,LOAD,MAP
    *OPTIONS IN EFFECT*  NAME = COMPAR  , LINECNT =    61
    *STATISTICS*   SOURCE STATEMENTS =     12,PROGRAM SIZE =     512
    *STATISTICS*   NO DIAGNOSTICS GENERATED

FORTRAN IV G LEVEL  21                    FINDID           DATE = 78144        16/32/35              PAGE 0001

0001             SUBROUTINE FINDID(ICHAR,IFNT,ID)                      00000100
 0002             INTEGER EBCDIC(150)                                   00000200
         C...DECIMAL VALUES FOR UPPER AND LOWER CASE A-Z...             00000300
         C...0-9 AND SPECIAL SYMBOLS...                                 00000350
 0003             DATA EBCDIC/193,194,195,196,197,198,199,200,201,      00000400
                *             209,210,211,212,213,214,215,216,217,     00000500
                *             226,227,228,229,230,231,232,233,         00000600
                *             129,130,131,132,133,134,135,136,137,     00000700
                *             145,146,147,148,149,150,151,152,153,     00000800
                *             162,163,164,165,166,167,168,169,         00000900
                *         240,241,242,243,244,245,246,247,248,249,     00001000
                *          90,123, 91,108, 80, 77, 93, 96,127,125,     00001010
                *         126,173,189,124, 94,122, 78, 92, 97,111,     00001020
                *          75,107, 76,110,                             00001030
                *          64*64/                                      00001040
 0004             DATA IBLANK/64/                                      00001100
 0005             ITMP=ICHAR/(2**24)                                   00001200
 0006             IF(ITMP.LT.0) ITMP=ITMP+2**8-1                       00001300
 0007             IF(ITMP .EQ.IBLANK) GO TO 45                         00001400
 0008             DO 10 I=1,150                                        00001500
 0009             IF(ITMP .EQ.EBCDIC(I)) GO TO 40                      00001600
 0010     10      CONTINUE                                             00001700
 0011             GO TO 45                                             00001800
 0012     40      IF(IFNT.LE.3 .AND. I.LE.86) ID=I+(IFNT-1)*100         00001900
 0013             IF(IFNT.GT.3 .AND. I.LE.86) ID=I                      00001920
 0014             IF(IFNT.EQ.51 .AND. I.LE.52) ID=300+I                 00001940
 0015             GO TO 50                                              00002000
 0016     45      ID=(IFNT-1)*100                                       00002100
 0017             IF(ID.GT.200) ID=0                                    00002110
 0018     50      RETURN                                                00002200
 0019             END                                                   00002300

FORTRAN IV G LEVEL  21                    FINDID           DATE = 78144        16/32/35              PAGE 0002

SUBPROGRAMS CALLED
SYMBOL    LOCATION     SYMBOL    LOCATION      SYMBOL    LOCATION      SYMBOL    LOCATION      SYMBOL    LOCATION
FIXPI#       C8

SCALAR MAP
SYMBOL    LOCATION     SYMBOL    LOCATION      SYMBOL    LOCATION      SYMBOL    LOCATION      SYMBOL    LOCATION
IBLANK       DC        ITMP         E0         ICHAR        E4         I            E8         IFNT         EC
ID           F0

ARRAY MAP
SYMBOL    LOCATION     SYMBOL    LOCATION      SYMBOL    LOCATION      SYMBOL    LOCATION      SYMBOL    LOCATION
EBCDIC       F4

*OPTIONS IN EFFECT*  ID,BCD,SOURCE,NOLIST,NODECK,LOAD,MAP
    *OPTIONS IN EFFECT*  NAME = FINDID  , LINECNT =    61
    *STATISTICS*   SOURCE STATEMENTS =     19,PROGRAM SIZE =    1448
    *STATISTICS*   NO DIAGNOSTICS GENERATED

FORTRAN IV G LEVEL  21                    RETRIV           DATE = 78144        16/32/35              PAGE 0001

0001             SUBROUTINE RETRIV(MODE,IDO,ID,IKEEP,ISKIP,IX,IY,IYD,IGAP)    00000100
         C************************************************************ 00000200
         C*  TO RETRIEVE THE 'RUN-LENGTH STRUCTURE' OF A SYMBOL FROM DISK TO  *00000300
         C*  MEMORY                                                     *00000400
         C*  ID # ID NUMBER OF THE SYMBOL TO BE RETRIVED                *00000500
         C*  IKEEP,ISKIP # NUMBER OF LINES TO BE KEPT AND SKIPPED       *00000600
         C*  IX # SYMBOL WIDTH                                          *00000700
         C*  IY # NUMBER OF RASTER LINES FOR SYMBOL ID                  *00000800
         C*  IYD # SYMBOL DISPLACEMENT WITH RESPECT TO THE BASE LINE    *00000900
         C*  THE DISK FILE IS A DIRECT-ACCESS FILE,WHICH SHOULD BE DEFINED BY *00001000
         C*  THE CALLING ROUTINE AS :                                   *00001100
         C*      DEFINE FILE LUNDSK(NREC,NBYTE,L,LOC<                   *00001200
         C*  WHERE -  LUNDSK # LOGICAL UNIT NUMBER OF THE FILE          *00001300
         C*           NREC # NUMBER OF RECORDS IN THE FILE              *00001400
         C*           NBYTE # NUMBER OF BYTES IN EACH RECORD            *00001500
         C*           LOC # FILE POINTER                                *00001600
         C*  FOR EACH 2-BYTE WORD -  BIT#1<-BIT#11< DATA                *00001700
         C*                          BIT#12<        MRKEOL %END-OF-LINE MARK< *00001800
```

```
C*                        BIT%13<          MRKEOS %END-OF-SYMBOL MARK<*00001900
C*   FOR EACH SYMBOL ,  WORD 1,2  : TITLE                          *00002000
C*                      WORD 3    : NUMBER OF BYTES FOR RUN-LENGTH CODE*00002100
C*                      WORD 4    : FULL SIZE WIDTH                 *00002200
C*                      WORD 5    : FULL SIZE HEIGHT                *00002300
C*                      WORD 6    : FULL SIZE HEIGHT DISPLACEMENT   *00002400
C*                      WORD 7-10 : UNUSED                          *00002500
C*                      WORD 11-  : RUN LENGTH CODING DATA          *00002600
C************************************************************************00002700
      INTEGER*2 MASTER,IBUF                                          00002800
      INTEGER*2 IX,IY,IYD                                            00002850
      COMMON MAXMEM,MAXWRD,MASTER(1)                                 00002900
      COMMON /WORK/ IBUF(1)                                          00003000
      COMMON /IOUNIT/ LUNIN,LUNOUT,LUNDSK,NREC,NBYTE,LOC,MRKEOL,MRKEOS 00003100
      COMMON /PROCES/ LO,IER                                         00003200
      DIMENSION LOCDSK(300),IWSPC(3)                                 00003300
      DIMENSION IFNT1(100),IFNT2(100),IFNT3(100),IFNT51(40)          00003310
      EQUIVALENCE (IFNT1(1),LOCDSK(1)),(IFNT2(1),LOCDSK(101)),       00003360
     *            (IFNT3(1),LOCDSK(201)),(IFNT51(1),LOCDSK(301))     00003361
      DATA NSYM/350/,IWSPC/169,151,180/                              00003400
      DATA IFNT1                                                     00003510
     *    /   1,   2,   3,   4,   5,   6,   7,   8,   9,  10,  11,  12,00003511
     *       13,  15,  17,  18,  19,  20,  21,  22,  23,  24,  25,  27,00003512
     *       28,  29,  30,  31,  32,  33,  34,  35,  36,  37,  38,  39,00003513
     *       40,  41,  42,  43,  44,  45,  46,  47,  48,  49,  50,  51,00003514
     *       52,  53,  54,  55,  56,  57,  58,  59,  60,  61,  62,  63,00003515
     *       64,  65,  66,  67,  68,  69,  71,  72,  73,  74,  75,  76,00003516
     *       77,  78,  79,  80,  82,  83,  84,  85,  86,  87,  88,  89,00003517
     *       90,  91,                                           14*0/ 00003518
      DATA IFNT2                                                     00003520
     *    / 101, 102, 103, 104, 105, 106, 107, 108, 109, 110, 111, 112,00003521
     *      113, 115, 117, 118, 119, 120, 121, 122, 123, 124, 125, 127,00003522
     *      128, 129, 130, 131, 132, 133, 134, 135, 136, 137, 138, 139,00003523
     *      140, 141, 142, 143, 144, 145, 146, 147, 148, 149, 150, 151,00003524
     *      152, 154, 155, 156, 157, 158, 159, 160, 161, 162, 163, 164,00003525
     *      165, 166, 167, 168, 169, 170, 172, 173, 174, 175, 176, 177,00003526
     *      178, 179, 180, 181, 183, 184, 185, 186, 187, 188, 189, 190,00003527
     *      191, 192,                                          14*0/ 00003528
      DATA IFNT3                                                     00003530
     *    / 201, 202, 203, 204, 205, 206, 207, 208, 209, 210, 211, 212,00003531
     *      213, 215, 216, 217, 218, 219, 220, 221, 222, 223, 224, 226,00003532
     *      227, 228, 229, 230, 231, 232, 233, 234, 235, 236, 237, 238,00003533
     *      239, 240, 241, 242, 243, 244, 245, 246, 247, 248, 249, 250,00003534
     *      251, 252, 253, 254, 255, 256, 257, 258, 259, 260, 261, 262,00003535
     *      263, 264, 265, 266, 267, 268, 270, 271, 272, 273, 274, 275,00003536
     *      276, 277, 278, 279, 281, 282, 283, 284, 285, 286, 287, 288,00003537
     *      289, 290,                                          14*0/ 00003538
      DATA IFNT51                                                    00003590
     *    / 301, 302, 303, 304, 305, 306, 307, 309, 310, 311, 312, 313,00003591
     *      314, 315, 316,                                     25*0/ 00003592
      DATA ISPACE/24/                                                00004000
      NWORD=NBYTE/2                                                  00004100
      IF(ID/100*100 .EQ. ID) GO TO 85                                00004200
      IF(ID.GT.NSYM .OR. ID.LT.1) GO TO 93                           00004300
      LOC=LOCDSK(ID)                                                 00004400
      IF(LOC.EQ.0) GO TO 93                                          00004500
      READ(LUNDSK'LOC) (IBUF(I),I=1,NWORD)                           00004600
      ITOTAL=IKEEP+ISKIP                                             00004700
      FRACT=FLOAT(IKEEP)/ITOTAL                                      00004800
      LENTH=IBUF(3)/2                                                00004900
      IF(MODE.EQ.2) GO TO 15                                         00005000
C...TO RETRIV GAP ONLY...                                            00005100
      IF(IDO.EQ.0) GO TO 10                                          00005200
      IF((IDO-1)/100 .EQ. 3) GO TO 10                                00005210
      IF((IDO-1)/100 .NE. (ID-1)/100) GO TO 10                       00005220
      IF(MOD(IDO,100) .GT. 52 .OR. MOD(IDO,100) .LT. 1) GO TO 10     00005230
      IF(MOD(ID,100) .GT. 52 .OR. MOD(ID,100) .LT. 1) GO TO 10       00005240
      GO TO 11                                                       00005280
10    IGAP=0                                                         00005300
      GO TO 100                                                      00005400
11    LOOP=(LENTH+9)/NWORD+1                                         00005500
      IDO=MOD(IDO,100)                                               00005540
      IF(LOOP.LE.1) GO TO 13                                         00005550
      DO 12 NL=2,LOOP                                                00005600
12    READ(LUNDSK'LOC) (IBUF(I),I=1,NWORD)                           00005700
13    IF((LENTH+10+IDO).LE.LOOP*NWORD) GO TO 14                      00005800
      READ(LUNDSK'LOC) (IBUF(I),I=1,NWORD)                           00005900
14    IGAP=IBUF(MOD(LENTH+10+IDO,NWORD))*FRACT                       00006000
      GO TO 100                                                      00006100
C...TO RETRIV RUN-LENGTH DATA AND GAP...                             00006200
15    IF((MAXWRD+LENTH*IKEEP/ITOTAL).GT.MAXMEM) GO TO 92             00006300
      MAXOLD=MAXWRD                                                  00006400
      IX=IBUF(4)*FRACT                                               00006500
      IYD=IBUF(6)*FRACT                                              00006600
      IXD=0                                                          00006700
      IF(MOD(ID,100).GE.53 .AND. MOD(ID,100).LE.62) IXD=IBUF(9)      00006740
      LINE=1                                                         00006800
      IY=0                                                           00006900
      L1=11                                                          00007000
      L2=MIN0(NWORD,10+LENTH)                                        00007100
      LOOP=(LENTH+9)/NWORD+1                                         00007200
      DO 40 NL=1,LOOP                                                00007300
      DO 30 L=L1,L2,2                                                00007400
      MRK=IBUF(L+1)/MRKEOL*MRKEOL                                    00007500
      LOGIC=MOD(LINE,ITOTAL)                                         00007600
      IF(LOGIC.EQ.0) LOGIC=ITOTAL                                    00007700
      IF(LOGIC.GT.IKEEP) GO TO 20                                    00007800
      MASTER(MAXWRD+1)=(IBUF(L)+IXD-1)*FRACT+1                       00007900
      MASTER(MAXWRD+2)=(IBUF(L+1)-MRK+IXD-1)*FRACT+1+MRK             00008000
      MASTER(MAXWRD+2)=MASTER(MAXWRD+2)-MASTER(MAXWRD+1)+1           00008100
      IF(MRK.GE.MRKEOL) IY=IY+1                                      00008200
      MAXWRD=MAXWRD+2                                                00008300
20    IF(MRK.GE.MRKEOL) LINE=LINE+1                                  00008400
30    CONTINUE                                                       00008500
      IF(NL.EQ.LOOP) GO TO 42                                        00008550
      LENTH=LENTH-(L2-L1+1)                                          00008600
      L1=1                                                           00008700
```

```
0071            L2=MIN0(LENTH,NWORD)                                    00008800
0072            READ(LUNDSK'LOC) (IBUF(I),I=1,NWORD)                    00008900
0073   40       CONTINUE                                                00009000
0074   42       IF(MRK.LT.MRKEOS) GO TO 91                              00009100
0075            NWRD=MAXWRD-MAXOLD                                      00009200
0076            IF(IDO.EQ.0) GO TO 43                                   00009300
0077            IF((IDO-1)/100 .EQ. 3) GO TO 43                         00009310
0078            IF((IDO-1)/100 .NE. (ID-1)/100) GO TO 43                00009320
0079            IF(MOD(IDO,100).GT.52 .OR. MOD(IDO,100).LT.1) GO TO 43  00009340
0080            IF(MOD(ID,100).GT.52 .OR. MOD(ID,100).LT.1) GO TO 43    00009360
0081            GO TO 44                                                00009380
0082   43       IGAP=0                                                  00009400
0083            GO TO 80                                                00009500
0084   44       IDO=MOD(IDO,100)                                        00009550
0085   45       IF(L2+IDO.LE.NWORD) GO TO 48                            00009600
0086            READ(LUNDSK'LOC) (IBUF(I),I=1,NWORD)                    00009700
0087            IGAP=IBUF(L2+IDO-NWORD)*FRACT                           00009800
0088            GO TO 80                                                00009900
0089   48       IGAP=IBUF(L2+IDO)*FRACT                                 00010000
0090   80       MTEMP=MAXOLD+1                                          00010050
0091            WRITE(LUNOUT,81) ID,IKEEP,ISKIP,NWRD,MTEMP,MAXWRD       00010100
0092   81       FORMAT(10H ** SYMBOLI4,14H FOUND, SCALE=2I4,16H LENTH=2-BYTE<#I6,00010200
                * 6H FROMI6,4H TOI6)                                    00010300
0093            GO TO 100                                               00010400
0094   85       MTEMP=ID/100+1                                          00010500
0095            IX=IWSPC(MTEMP)*IKEEP/(IKEEP+ISKIP)                     00010550
0096            IY=1                                                    00010600
0097            IYD=0                                                   00010700
0098            IGAP=0                                                  00010800
0099            MASTER(MAXWRD+1)=1                                      00010900
0100            MASTER(MAXWRD+2)=MRKEOL+MRKEOS                          00011000
0101            MAXWRD=MAXWRD+2                                         00011100
0102            GO TO 100                                               00011200
0103   91       WRITE(LUNOUT,101) ID                                    00011300
0104   101      FORMAT(35H ** RETRIV **,BAD RECORD FOR SYMBOLI4)        00011400
0105            GO TO 95                                                00011500
0106   92       WRITE(LUNOUT,102) MAXMEM                                00011600
0107   102      FORMAT(43H ** EXCEEDS MAX. MEMORY ALLOCATION %2-BYTE<,I6) 00011700
0108            GO TO 95                                                00011800
0109   93       WRITE(LUNOUT,103) ID                                    00011900
0110   103      FORMAT(33H ** RETRIV **,UNRECOGNIZED SYMBOLI4)          00012000
0111   95       IER=1                                                   00012100
0112   100      RETURN                                                  00012200
0113            END                                                     00012300
```

FORTRAN IV G LEVEL 21              RETRIV              DATE = 78144              16/32/35              PAGE 0004

COMMON BLOCK /        / MAP SIZE     A
SYMBOL   LOCATION    SYMBOL   LOCATION    SYMBOL   LOCATION    SYMBOL   LOCATION    SYMBOL   LOCATION
MAXMEM      0        MAXWRD      4        MASTER      8

COMMON BLOCK /WORK   / MAP SIZE     2
SYMBOL   LOCATION    SYMBOL   LOCATION    SYMBOL   LOCATION    SYMBOL   LOCATION    SYMBOL   LOCATION
IBUF        0

COMMON BLOCK /IOUNIT / MAP SIZE    20
SYMBOL   LOCATION    SYMBOL   LOCATION    SYMBOL   LOCATION    SYMBOL   LOCATION    SYMBOL   LOCATION
LUNIN       0        LUNOUT      4        LUNDSK      8        NREC        C        NBYTE      10
LOC        14        MRKEOL     18        MRKEOS     1C

COMMON BLOCK /PROCES / MAP SIZE     8
SYMBOL   LOCATION    SYMBOL   LOCATION    SYMBOL   LOCATION    SYMBOL   LOCATION    SYMBOL   LOCATION
LO          0        IER         4

SUBPROGRAMS CALLED
SYMBOL   LOCATION    SYMBOL   LOCATION    SYMBOL   LOCATION    SYMBOL   LOCATION    SYMBOL   LOCATION
IBCOM#     1AC       MIN0       180

EQUIVALENCE DATA MAP
SYMBOL   LOCATION    SYMBOL   LOCATION    SYMBOL   LOCATION    SYMBOL   LOCATION    SYMBOL   LOCATION
IFNT1      238       LOCDSK     238       IFNT2      3C8       IFNT3      558       IFNT51     6E8

SCALAR MAP
SYMBOL   LOCATION    SYMBOL   LOCATION    SYMBOL   LOCATION    SYMBOL   LOCATION    SYMBOL   LOCATION
NSYM       788       ISPACE     78C       NWORD      790       ID         794       I          798
ITOTAL     79C       IKEEP      7A0       ISKIP      7A4       FRACT      7A8       LENTH      7AC
MODE       7B0       IDO        7B4       IGAP       7B8       LOOP       7BC       NL         7C0
MAXOLD     7C4       IXD        7C8       LINE       7CC       L1         7D0       L2         7D4
L          7D8       MRK        7DC       LOGIC      7E0       NWRD       7E4       MTEMP      7E8
IX         7EC       IYD        7EE       IY         7F0

ARRAY MAP
SYMBOL   LOCATION    SYMBOL   LOCATION    SYMBOL   LOCATION    SYMBOL   LOCATION    SYMBOL   LOCATION
IWSPC      7F4

FORMAT STATEMENT MAP
SYMBOL   LOCATION    SYMBOL   LOCATION    SYMBOL   LOCATION    SYMBOL   LOCATION    SYMBOL   LOCATION
81         800       101        84A       102        873       103        8A4

*OPTIONS IN EFFECT* ID,BCD,SOURCE,NOLIST,NODECK,LOAD,MAP
*OPTIONS IN EFFECT* NAME = RETRIV , LINECNT =   61
*STATISTICS*    SOURCE STATEMENTS =    113,PROGRAM SIZE =    5536
*STATISTICS* NO DIAGNOSTICS GENERATED

```
FORTRAN IV G LEVEL  21              TSCHAR           DATE = 78144       16/32/35              PAGE 0001

0001            SUBROUTINE TSCHAR(NCH,ICHAR,IFNT,ISIZ,KLCHR,IWD,ISPC)              00000100
0002            INTEGER*2 MASTER,IXCHAR,IYCHR1,IYCHR2,KLCHAR                       00000200
0003            INTEGER*2 IXTEMP,IYTEMP,IYDISP                                     00000300
0004            COMMON MAXMEM,MAXWRD,MASTER(1)                                     00000400
0005            COMMON /TEMP/ NTEMP,IDTEMP(200),ISTEMP(200),LTEMP(200),            00000500
     *                        IXTEMP(200),IYTEMP(200),IYDISP(200),IGAP(60)         00000600
0006            COMMON /IOUNIT/ LUNIN,LUNOUT                                       00000700
0007            COMMON /TEXT/ NGROUP,IYTXMX(30),IYTXMN(30),NCHAR(30),NTCHAR,       00000800
     *                        LOCMEM(1000),IXCHAR(1000),IYCHR1(1000),IYCHR2(1000), 00000900
     *                        KLCHAR(1000)                                         00001000
0008            COMMON /PROCES/ LO,IER                                             00001100
0009            DIMENSION IKEEP(8),ISKIP(8),ICHAR(60),KLCHR(60),ILSPC(8)           00001200
0010            DATA ISPACE/24/,IKEEP/1,1,1,1,1,3,1/,ISKIP/7,5,4,3,2,1,1,0/        00001300
0011            DATA ILSPC/6,8,9,10,12,14,18,24/                                   00001350
0012            NGROUP=NGROUP+1                                                    00001400
0013            IF(NGROUP.GT.30) GO TO 91                                          00001500
0014            NCHAR(NGROUP)=NCH+NCHAR(NGROUP)                                    00001600
0015            ISPC=ILSPC(ISIZ)                                                   00001700
0016            ID=0                                                               00001800
0017            IWD=0                                                              00001900
0018            DO 30 NC=1,NCH                                                     00002000
0019            IDL=ID                                                             00002100
0020            CALL FINDID(ICHAR(NC),IFNT,ID)                                     00002200
0021            NTCHAR=NTCHAR+1                                                    00002300
0022            IF(NTCHAR.GT.1000) GO TO 92                                        00002400
0023            KLCHAR(NTCHAR)=KLCHR(NC)                                           00002500
0024            CALL COMPAR(ID,ISIZ,ITEMP)                                         00002600
0025            IF(ITEMP.EQ.0) GO TO 10                                            00002700
      C...CHARACTER ALREADY IN TEMP ARRAY...                                       00002800
0026            LOCMEM(NTCHAR)=LTEMP(ITEMP)                                        00002900
0027            IXCHAR(NTCHAR)=IXTEMP(ITEMP)                                       00003000
0028            IYCHR1(NTCHAR)=IYTEMP(ITEMP)                                       00003100
0029            IYCHR2(NTCHAR)=IYDISP(ITEMP)                                       00003200
0030            CALL RETRIV(1,IDL,ID,IKEEP(ISIZ),ISKIP(ISIZ),IX,IY,IYD,IGAP(NC))   00003300
0031            GO TO 20                                                           00003400
      C...UPDATE TEMP ARRAY, ADD NEWLY FOUND CHARACTER...                          00003500
0032     10     LOCMEM(NTCHAR)=MAXWRD+1                                            00003600
0033            CALL RETRIV(2,IDL,ID,IKEEP(ISIZ),ISKIP(ISIZ),IXCHAR(NTCHAR),       00003700
     *                     IYCHR1(NTCHAR),IYCHR2(NTCHAR),IGAP(NC))                 00003800
0034            IF(IER.NE.0) GO TO 100                                             00003900
0035            NTEMP=NTEMP+1                                                      00004000
0036            IF(NTEMP.GT.200) GO TO 93                                          00004100
0037            IDTEMP(NTEMP)=ID                                                   00004200
0038            ISTEMP(NTEMP)=ISIZ                                                 00004300
0039            LTEMP(NTEMP)=LOCMEM(NTCHAR)                                        00004400
0040            IXTEMP(NTEMP)=IXCHAR(NTCHAR)                                       00004500
0041            IYTEMP(NTEMP)=IYCHR1(NTCHAR)                                       00004600
0042            IYDISP(NTEMP)=IYCHR2(NTCHAR)                                       00004700
0043     20     IWD=IWD+IXCHAR(NTCHAR)+ISPC-IGAP(NC)                               00004800
0044     30     CONTINUE                                                           00004900
0045            IWD=IWD-ISPC                                                       00005000
0046            GO TO 100                                                          00005100
0047     91     WRITE(LUNOUT,101)                                                  00005200
0048    101     FORMAT(29H ** TSCHAR **,TOO MANY GROUPS)                           00005300
0049            GO TO 95                                                           00005400
0050     92     WRITE(LUNOUT,102)                                                  00005500
0051    102     FORMAT(33H ** TSCHAR **,TOO MANY CHARACTERS)                       00005600
0052            GO TO 95                                                           00005700
0053     93     WRITE(LUNOUT,103)                                                  00005800
0054    103     FORMAT(30H ** TSCHAR **,TOO MANY SYMBOLS)                          00005900
0055     95     IER=1                                                              00006000
0056    100     RETURN                                                             00006100
0057            END                                                                00006200
```

FORTRAN IV G LEVEL 21              TSCHAR           DATE = 78144       16/32/35              PAGE 0003

COMMON BLOCK /        / MAP SIZE       A

| SYMBOL | LOCATION | SYMBOL | LOCATION | SYMBOL | LOCATION | SYMBOL | LOCATION | SYMBOL | LOCATION |
|---|---|---|---|---|---|---|---|---|---|
| MAXMEM | 0 | MAXWRD | 4 | MASTER | 8 | | | | |

COMMON BLOCK /TEMP    / MAP SIZE     F04

| SYMBOL | LOCATION | SYMBOL | LOCATION | SYMBOL | LOCATION | SYMBOL | LOCATION | SYMBOL | LOCATION |
|---|---|---|---|---|---|---|---|---|---|
| NTEMP | 0 | IDTEMP | 4 | ISTEMP | 324 | LTEMP | 644 | IXTEMP | 964 |
| IYTEMP | AF4 | IYDISP | C84 | IGAP | E14 | | | | |

COMMON BLOCK /IOUNIT  / MAP SIZE       8

| SYMBOL | LOCATION | SYMBOL | LOCATION | SYMBOL | LOCATION | SYMBOL | LOCATION | SYMBOL | LOCATION |
|---|---|---|---|---|---|---|---|---|---|
| LUNIN | 0 | LUNOUT | 4 | | | | | | |

COMMON BLOCK /TEXT    / MAP SIZE    3050

| SYMBOL | LOCATION | SYMBOL | LOCATION | SYMBOL | LOCATION | SYMBOL | LOCATION | SYMBOL | LOCATION |
|---|---|---|---|---|---|---|---|---|---|
| NGROUP | 0 | IYTXMX | 4 | IYTXMN | 7C | NCHAR | F4 | NTCHAR | 16C |
| LOCMEM | 170 | IXCHAR | 1110 | IYCHR1 | 18E0 | IYCHR2 | 2080 | KLCHAR | 2880 |

COMMON BLOCK /PROCES  / MAP SIZE       8

| SYMBOL | LOCATION | SYMBOL | LOCATION | SYMBOL | LOCATION | SYMBOL | LOCATION | SYMBOL | LOCATION |
|---|---|---|---|---|---|---|---|---|---|
| LO | 0 | IER | 4 | | | | | | |

SUBPROGRAMS CALLED

| SYMBOL | LOCATION | SYMBOL | LOCATION | SYMBOL | LOCATION | SYMBOL | LOCATION | SYMBOL | LOCATION |
|---|---|---|---|---|---|---|---|---|---|
| FINDID | FC | COMPAR | 100 | RETRIV | 104 | IBCOM# | 108 | | |

SCALAR MAP

| SYMBOL | LOCATION | SYMBOL | LOCATION | SYMBOL | LOCATION | SYMBOL | LOCATION | SYMBOL | LOCATION |
|---|---|---|---|---|---|---|---|---|---|
| ISPACE | 16C | NCH | 170 | ISPC | 174 | ISIZ | 178 | ID | 17C |
| IWD | 180 | NC | 184 | IDL | 188 | IFNT | 18C | ITEMP | 190 |
| IX | 194 | IY | 198 | IYD | 19C | | | | |

ARRAY MAP

| SYMBOL | LOCATION | SYMBOL | LOCATION | SYMBOL | LOCATION | SYMBOL | LOCATION | SYMBOL | LOCATION |
|---|---|---|---|---|---|---|---|---|---|
| IKEEP | 1A0 | ISKIP | 1C0 | ICHAR | 1E0 | KLCHR | 1E4 | ILSPC | 1E8 |

FORMAT STATEMENT MAP

| SYMBOL | LOCATION | SYMBOL | LOCATION | SYMBOL | LOCATION | SYMBOL | LOCATION | SYMBOL | LOCATION |
|---|---|---|---|---|---|---|---|---|---|
| 101 | 208 | 102 | 229 | 103 | 24E | | | | |

```
*OPTIONS IN EFFECT*  ID,BCD,SOURCE,NOLIST,NODECK,LOAD,MAP
*OPTIONS IN EFFECT*  NAME = ISCHAR , LINECNT =     61
*STATISTICS*    SOURCE STATEMENTS =      57,PROGRAM SIZE =    1760
*STATISTICS*  NO DIAGNOSTICS GENERATED
```

FORTRAN IV G LEVEL  21          XYCHAR          DATE = 78144          16/32/35          PAGE 0001

```
0001            SUBROUTINE XYCHAR(ICLR,IXBASE,IYBASE,IWD,ISPC,ICH1,ICH2)          00000100
0002            REAL*4 IXO,IXTMP                                                  00000150
0003            INTEGER*2 MASTER,IXCHAR,IYCHR1,IYCHR2,KLCHAR                      00000200
0004            COMMON /TEXT/ NGROUP,IYTXMX(30),IYTXMN(30),NCHAR(30),NTCHAR,      00000300
               *          LOCMEM(1000),IXCHAR(1000),IYCHR1(1000),IYCHR2(1000),   00000400
               *          KLCHAR(1000)                                            00000500
0005            COMMON /TEMP/ JDUM(901),IGAP(60)                                  00000600
0006            DATA FACTOR/1.0/,FACMAX/1.5/                                      00000700
0007            IGROUP=NGROUP                                                     00000800
0008            IF(ICLR.NE.4) GO TO 5                                             00001200
0009            IWD4=2016-2*IXBASE                                                00001220
0010            FACTOR=FLOAT(IWD4-IWD)/((ICH2-ICH1)*ISPC)+1.0                     00001240
0011            IF(FACTOR.LE.FACMAX) GO TO 5                                      00001260
0012            KWSPC=0                                                           00001262
0013            REM=IWD4-IWD-(ICH2-ICH1)*ISPC*(FACMAX-1)                          00001266
0014            DO 1 ICH=ICH1,ICH2                                                00001268
0015            IF(IYCHR1(ICH).NE.1) GO TO 1                                      00001270
0016            KWSPC=KWSPC+1                                                     00001272
0017       1    CONTINUE                                                          00001274
0018            IF(KWSPC.EQ.0) GO TO 5                                            00001276
0019            WSPC=REM/KWSPC                                                    00001278
0020            DO 2 ICH=ICH1,ICH2                                                00001280
0021            IF(IYCHR1(ICH).NE.1) GO TO 2                                      00001282
0022            IXCHAR(ICH)=IXCHAR(ICH)+WSPC                                      00001284
0023       2    CONTINUE                                                          00001286
0024            FACTOR=FACMAX                                                     00001288
0025       5    GO TO (10,20,30,10),ICLR                                          00001300
0026      10    IXO=IXBASE                                                        00001400
0027            GO TO 40                                                          00001500
0028      20    IXO=IXBASE-IWD/2                                                  00001600
0029            GO TO 40                                                          00001700
0030      30    IXO=IXBASE-IWD                                                    00001800
0031      40    DO 50 ICH=ICH1,ICH2                                               00001900
0032            IXTMP=IXCHAR(ICH)                                                 00002000
0033            XTMP=IXO-IGAP(ICH+1-ICH1)                                         00002100
0034            IXCHAR(ICH)=XTMP+0.5                                              00002150
0035            IXO=XTMP+IXTMP+ISPC*FACTOR                                        00002200
0036            IYCHR2(ICH)=IYBASE+IYCHR1(ICH)+IYCHR2(ICH)-1                      00002300
0037            IYCHR1(ICH)=IYCHR2(ICH)-IYCHR1(ICH)+1                             00002400
0038            IYTMP=IYCHR2(ICH)                                                 00002500
0039            IYTXMX(IGROUP)=MAX0(IYTXMX(IGROUP),IYTMP)                         00002600
0040            IYTMP=IYCHR1(ICH)                                                 00002700
0041      50    IYTXMN(IGROUP)=MIN0(IYTXMN(IGROUP),IYTMP)                         00002800
0042            IF(ICLR.NE.4) FACTOR=1.0                                          00002850
0043            RETURN                                                            00002900
0044            END                                                               00003000
```

FORTRAN IV G LEVEL  21          XYCHAR          DATE = 78144          16/32/35          PAGE 0002

COMMON BLOCK /TEXT  / MAP SIZE  3050

| SYMBOL | LOCATION | SYMBOL | LOCATION | SYMBOL | LOCATION | SYMBOL | LOCATION | SYMBOL | LOCATION |
|---|---|---|---|---|---|---|---|---|---|
| NGROUP | 0 | IYTXMX | 4 | IYTXMN | 7C | NCHAR | F4 | NTCHAR | 16C |
| LOCMEM | 170 | IXCHAR | 1110 | IYCHR1 | 18E0 | IYCHR2 | 2080 | KLCHAR | 2880 |

COMMON BLOCK /TEMP  / MAP SIZE  F04

| SYMBOL | LOCATION | SYMBOL | LOCATION | SYMBOL | LOCATION | SYMBOL | LOCATION | SYMBOL | LOCATION |
|---|---|---|---|---|---|---|---|---|---|
| JDUM | 0 | IGAP | E14 | | | | | | |

SUBPROGRAMS CALLED

| SYMBOL | LOCATION | SYMBOL | LOCATION | SYMBOL | LOCATION | SYMBOL | LOCATION | SYMBOL | LOCATION |
|---|---|---|---|---|---|---|---|---|---|
| MAX0 | FC | MIN0 | 100 | | | | | | |

SCALAR MAP

| SYMBOL | LOCATION | SYMBOL | LOCATION | SYMBOL | LOCATION | SYMBOL | LOCATION | SYMBOL | LOCATION |
|---|---|---|---|---|---|---|---|---|---|
| FACTOR | 118 | FACMAX | 11C | IGROUP | 120 | ICLR | 124 | IWD4 | 128 |
| IXBASE | 12C | IWD | 130 | ICH2 | 134 | ICH1 | 138 | ISPC | 13C |
| KWSPC | 140 | REM | 144 | ICH | 148 | WSPC | 14C | IXO | 150 |
| IXTMP | 154 | XTMP | 158 | IYBASE | 15C | IYTMP | 160 | | |

```
*OPTIONS IN EFFECT*  ID,BCD,SOURCE,NOLIST,NODECK,LOAD,MAP
*OPTIONS IN EFFECT*  NAME = XYCHAR , LINECNT =     61
*STATISTICS*    SOURCE STATEMENTS =      44,PROGRAM SIZE =    1680
*STATISTICS*  NO DIAGNOSTICS GENERATED
```

```
FORTRAN IV G LEVEL  21              TSPXID          DATE = 78144        16/32/35           PAGE 0001

0001            SUBROUTINE TSPXID                                       00000100
0002            COMMON /HEAD/ IHEAD(40)                                 00000300
0003            COMMON /PROCES/ LO,IER                                  00000400
        CC      COMMON /LIMIT/ LMTX1,LMTX2,LMTY1,LMTY2                  00000500
0004            COMMON /TEXT/ NDUM(91),NTCHAR                           00000550
0005            DIMENSION LKLR(40)                                      00000600
0006            DO 20 I=1,40                                            00000700
0007    20      LKLR(I)=2                                               00001300
0008            NTOLD=NTCHAR                                            00001400
0009            CALL TSCHAR(40,IHEAD,1,1,LKLR,IWD,ISPC)                 00001500
0010            IF(IER.NE.0) GO TO 100                                  00001600
0011            CALL XYCHAR(2,1008      ,1344 ,IWD,ISPC,NTOLD+1,NTOLD+40) 00001700
0012    100     RETURN                                                  00001800
0013            END                                                     00001900
```

```
FORTRAN IV G LEVEL  21              TSPXID          DATE = 78144        16/32/35           PAGE 0002

COMMON BLOCK /HEAD    / MAP SIZE      A0
SYMBOL    LOCATION    SYMBOL    LOCATION     SYMBOL    LOCATION     SYMBOL    LOCATION     SYMBOL    LOCATION
IHEAD        0

COMMON BLOCK /PROCES  / MAP SIZE      8
SYMBOL    LOCATION    SYMBOL    LOCATION     SYMBOL    LOCATION     SYMBOL    LOCATION     SYMBOL    LOCATION
LO           0        IER          4

COMMON BLOCK /TEXT    / MAP SIZE      170
SYMBOL    LOCATION    SYMBOL    LOCATION     SYMBOL    LOCATION     SYMBOL    LOCATION     SYMBOL    LOCATION
NDUM         0        NTCHAR      16C

SUBPROGRAMS CALLED
SYMBOL    LOCATION    SYMBOL    LOCATION     SYMBOL    LOCATION     SYMBOL    LOCATION     SYMBOL    LOCATION
TSCHAR       AC       XYCHAR       B0

SCALAR MAP
SYMBOL    LOCATION    SYMBOL    LOCATION     SYMBOL    LOCATION     SYMBOL    LOCATION     SYMBOL    LOCATION
I            EC       NTOLD       F0         IWD         F4         ISPC        F8

ARRAY MAP
SYMBOL    LOCATION    SYMBOL    LOCATION     SYMBOL    LOCATION     SYMBOL    LOCATION     SYMBOL    LOCATION
LKLR         FC

*OPTIONS IN EFFECT* ID,BCD,SOURCE,NOLIST,NODECK,LOAD,MAP
*OPTIONS IN EFFECT* NAME = TSPXID  , LINECNT =    61
*STATISTICS*    SOURCE STATEMENTS =    13,PROGRAM SIZE =       680
*STATISTICS* NO DIAGNOSTICS GENERATED
```

```
FORTRAN IV G LEVEL  21              TSORG           DATE = 78144        16/32/35           PAGE 0001

0001            SUBROUTINE TSORG                                        00000100
0002            INTEGER*2 MASTER,IXCHAR,IYCHR1,IYCHR2,KLCHAR            00000200
0003            INTEGER*2 IXTEMP,IYTEMP,IYDISP,IBOX,IOBOX               00000300
0004            COMMON MAXMEM,MAXWRD,MASTER(1)                          00000400
0005            COMMON /PROCES/ LO,IER                                  00000500
0006            COMMON /TEXT/ NGROUP,IYTXMX(30),IYTXMN(30),NCHAR(30),NTCHAR, 00000600
               *         LOCMEM(1000),IXCHAR(1000),IYCHR1(1000),IYCHR2(1000),00000700
               *         KLCHAR(1000)                                   00000800
0007            COMMON /TEMP/ NTEMP,IDTEMP(200),ISTEMP(200),LTEMP(200), 00000900
               *         IXTEMP(200),IYTEMP(200),IYDISP(200)            00001000
0008            COMMON /INPUT/ IFNT,ISIZ,NCTTL,KLTTL(60),ITTL(60),ICLR, 00001100
               *         JFNT,JSIZ,NCSTTL,KLSTTL(60),ISTTL(60),         00001200
               *         KFNT,KSIZ,NCRMK,KLRMK(60),IRMK(60),            00001300
               *         LFNT,LSIZ,LCOL,NHLINE,NVLINE,NOD(2,20,2),NNBOX,00001400
               *         IOBOX(30),KLBOX(30),NCBOX(2,30),KLIBOX(2,30),  00001500
               *         IBOX(11,2,30)                                  00001600
0009            COMMON /BLOCK/ NBLOCK,IXBLK1(30),IYBLK1(30),IXBLK2(30),IYBLK2(30),00001700
               *         KLBLK(30),IYBKMX,IYBKMN                        00001800
0010            COMMON /BOX/ NBOX,IXBOX1(30),IYBOX1(30),IXBOX2(30),IYBOX2(30), 00001900
               *         KKLBOX,IYBKMX,IYBXMN                           00002000
0011            COMMON /LIMIT/ LMTX1,L4TX2,LMTY1,LMTY2,IHUNIT,IVUNIT    00002100
0012            COMMON /GRID/ NGLINE(2),IXGL1(20,2),IYGL1(20,2),IXGL2(20,2), 00002200
               *         IYGL2(20,2),KLGL(20,2),IYGLMX,IYGLMN           00002300
0013            DIMENSION ITMP(11),KLTMP(11)                            00002400
0014            NBOX=NNBOX                                              00002500
0015            NBLOCK=NBOX                                             00002600
        C...TITLE...                                                    00002700
0016            IF(ICLR.EQ.2) IXBASE=(LMTX1+LMTX2)/2                    00002800
0017            IF(ICLR.EQ.3) IXBASE=LMTX2-3*IHUNIT                     00002900
0018            IF(ICLR.EQ.1 .OR. ICLR.EQ.4) IXBASE=LMTX1+3*IHUNIT      00003000
0019            IF(NCTTL.LE.0) GO TO 10                                 00003100
0020            NTOLD=NTCHAR                                            00003200
0021            CALL TSCHAR(NCTTL,ITTL,IFNT,ISIZ,KLTTL,IWD,ISPC)        00003300
0022            IF(IER.NE.0) GO TO 100                                  00003400
0023            IYBASE=LMTY2-6*IVUNIT                                   00003500
0024            CALL XYCHAR(ICLR,IXBASE,IYBASE,IWD,ISPC,NTOLD+1,NTOLD+NCTTL) 00003600
        C...SUBTITLE...                                                 00003700
0025    10      IF(NCSTTL.LE.0) GO TO 20                                00003800
0026            NTOLD=NTCHAR                                            00003900
0027            CALL TSCHAR(NCSTTL,ISTTL,JFNT,JSIZ,KLSTTL,IWD,ISPC)     00004000
0028            IF(IER.NE.0) GO TO 100                                  00004100
0029            IYBASE=LMTY2-8.75*IVUNIT                                00004200
0030            CALL XYCHAR(ICLR,IXBASE,IYBASE,IWD,ISPC,NTOLD+1,NTOLD+NCSTTL) 00004300
        C...REMARK...                                                   00004400
0031    20      IF(NCRMK.LE.0) GO TO 30                                 00004500
0032            NTOLD=NTCHAR                                            00004600
0033            CALL TSCHAR(NCRMK,IRMK,KFNT,KSIZ,KLRMK,IWD,ISPC)        00004700
```

FORTRAN IV G LEVEL 21            TSORG            DATE = 78144        16/32/35           PAGE 0002

```
0034            IF(IER.NE.0) GO TO 100                                              00004800
0035            IYBASE=LMTY1+IVUNIT*1.5                                             00004900
0036            CALL XYCHAR(ICLR,IXBASE,IYBASE,IWD,ISPC,NTOLD+1,NTOLD+NCRMK)        00005000
          C...CONNECTION LINES...                                                   00005100
0037   30       NGLINE(1)=NHLINE                                                    00005200
0038            NGLINE(2)=NVLINE                                                    00005300
0039            IYGLMX=LMTY1                                                        00005400
0040            IYGLMN=LMTY2                                                        00005500
0041            DO 40 NHV=1,2                                                       00005600
0042            IF(NGLINE(NHV).LE.0) GO TO 40                                       00005700
0043            NLINE=NGLINE(NHV)                                                   00005800
0044            DO 35 NL=1,NLINE                                                    00005900
0045            IY1=NOD(1,NL,NHV)/16                                                00006000
0046            IX1=NOD(1,NL,NHV)-16*IY1                                            00006100
0047            IY2=NOD(2,NL,NHV)/16                                                00006200
0048            IX2=NOD(2,NL,NHV)-16*IY2                                            00006300
0049            IXGL1(NL,NHV)=LMTX1+(1.5+7*IX1-0.1)*IHUNIT                          00006400
0050            IYGL1(NL,NHV)=LMTY2-(9.5+3*IY1+0.1)*IVUNIT                          00006500
0051            IXGL2(NL,NHV)=LMTX1+(1.5+7*IX2+0.1)*IHUNIT                          00006600
0052            IYGL2(NL,NHV)=LMTY2-(9.5+3*IY2-0.1)*IVUNIT                          00006700
0053            KLGL(NL,NHV)=LCOL                                                   00006800
0054            IYGLMX=MAXO(IYGLMX,IYGL1(NL,NHV),IYGL2(NL,NHV))                     00006900
0055   35       IYGLMN=MINO(IYGLMN,IYGL1(NL,NHV),IYGL2(NL,NHV))                     00007000
0056   40       CONTINUE                                                            00007100
          C...BOXES...                                                              00007200
0057            IF(NBOX.LE.0) GO TO 100                                             00007300
0058            IYBKMX=LMTY1                                                        00007400
0059            IYBKMN=LMTY2                                                        00007500
0060            IYBXMX=LMTY1                                                        00007600
0061            IYBXMN=LMTY2                                                        00007700
0062            DO 60 NB=1,NBOX                                                     00007800
0063            IY1=IDBOX(NB)/16                                                    00007900
0064            IX1=IDBOX(NB)-16*IY1                                                00008000
0065            IXBLK1(NB)=LMTX1+(7*IX1-4)*IHUNIT                                   00008100
0066            IYBLK1(NB)=LMTY2-(9.5+3*IY1+1.5)*IVUNIT                             00008200
0067            IXBLK2(NB)=IXBLK1(NB)+11*IHUNIT                                     00008300
0068            IYBLK2(NB)=IYBLK1(NB)+3*IVUNIT                                      00008400
0069            KLBLK(NB)=LCOL                                                      00008500
0070            IYBKMX=MAXO(IYBKMX,IYBLK2(NB))                                      00008600
0071            IYBKMN=MINO(IYBKMN,IYBLK1(NB))                                      00008700
0072            IXBOX1(NB)=IXBLK1(NB)+0.2*IHUNIT                                    00008800
0073            IYBOX1(NB)=IYBLK1(NB)+0.2*IVUNIT                                    00008900
0074            IXBOX2(NB)=IXBLK2(NB)-0.2*IHUNIT                                    00009000
0075            IYBOX2(NB)=IYBLK2(NB)-0.2*IVUNIT                                    00009100
0076            KKLBOX(NB)=KLBOX(NB)                                                00009200
0077            IYBXMX=MAXO(IYBXMX,IYBOX2(NB))                                      00009300
0078            IYBXMN=MINO(IYBXMN,IYBOX1(NB))                                      00009400
0079            DO 60 NL=1,2                                                        00009500
0080            IF(NCBOX(NL,NB).LE.0) GO TO 60                                      00009600
0081            NTOLD=NTCHAR                                                        00009700
0082            NCB=NCBOX(NL,NB)                                                    00009800
0083            DO 50 NC=1,NCB                                                      00009900
0084            KLTMP(NC)=KLIBOX(NL,NB)                                             00010000
0085   50       ITMP(NC)=IBOX(NC,NL,NB)*65536                                       00010100
0086            IF(NL.EQ.2) NGROUP=NGROUP-1                                         00010150
0087            CALL TSCHAR(NCB,ITMP,LFNT,LSIZ,KLTMP,IWD,ISPC)                      00010200
0088            IF(IER.NE.0) GO TO 100                                              00010300
0089            IXBASE=LMTX1+(1.5+7*IX1)*IHUNIT                                     00010400
0090            IYBASE=LMTY2-(8.5+3*IY1+NL)*IVUNIT+18-12*NL                         00010500
0091            IF(NCBOX(2,NB).EQ.0) IYBASE=IYBASE-0.5*IVUNIT-6                     00010600
0092            CALL XYCHAR(2,IXBASE,IYBASE,IWD,ISPC,NTOLD+1,NTOLD+NCB)             00010700
0093   60       CONTINUE                                                            00010800
0094   100      RETURN                                                              00010900
0095            END                                                                 00011000
```

FORTRAN IV G LEVEL 21            TSORG            DATE = 78144        16/32/35           PAGE 0003

COMMON BLOCK /         / MAP SIZE    A

| SYMBOL | LOCATION | SYMBOL | LOCATION | SYMBOL | LOCATION | SYMBOL | LOCATION | SYMBOL | LOCATION |
|---|---|---|---|---|---|---|---|---|---|
| MAXMEM | 0 | MAXWRD | 4 | MASTER | 8 | | | | |

COMMON BLOCK /PROCES / MAP SIZE    8

| SYMBOL | LOCATION | SYMBOL | LOCATION | SYMBOL | LOCATION | SYMBOL | LOCATION | SYMBOL | LOCATION |
|---|---|---|---|---|---|---|---|---|---|
| LO | 0 | IER | 4 | | | | | | |

COMMON BLOCK /TEXT   / MAP SIZE    3050

| SYMBOL | LOCATION | SYMBOL | LOCATION | SYMBOL | LOCATION | SYMBOL | LOCATION | SYMBOL | LOCATION |
|---|---|---|---|---|---|---|---|---|---|
| NGROUP | 0 | IYTXMX | 4 | IYTXMN | 7C | NCHAR | F4 | NTCHAR | 16C |
| LOCMEM | 170 | IXCHAR | 1110 | IYCHR1 | 18E0 | IYCHR2 | 2080 | KLCHAR | 2880 |

COMMON BLOCK /TEMP   / MAP SIZE    E14

| SYMBOL | LOCATION | SYMBOL | LOCATION | SYMBOL | LOCATION | SYMBOL | LOCATION | SYMBOL | LOCATION |
|---|---|---|---|---|---|---|---|---|---|
| NTEMP | 0 | IDTEMP | 4 | ISTEMP | 324 | LTEMP | 644 | IXTEMP | 964 |
| IYTEMP | AF4 | IYDISP | C84 | | | | | | |

COMMON BLOCK /INPUT  / MAP SIZE    E0C

| SYMBOL | LOCATION | SYMBOL | LOCATION | SYMBOL | LOCATION | SYMBOL | LOCATION | SYMBOL | LOCATION |
|---|---|---|---|---|---|---|---|---|---|
| IFNT | 0 | ISIZ | 4 | NCTTL | 8 | KLTTL | C | ITTL | FC |
| ICLR | 1EC | JFNT | 1F0 | JSIZ | 1F4 | NCSTTL | 1F8 | KLSTTL | 1FC |
| ISTTL | 2EC | KFNT | 3DC | KSIZ | 3E0 | NCRMK | 3E4 | KLRMK | 3E8 |
| IRMK | 4D8 | LFNT | 5C8 | LSIZ | 5CC | LCOL | 500 | NHLINE | 504 |
| NVLINE | 508 | NOD | 50C | NNBOX | 71C | IDBOX | 720 | KLBOX | 75C |
| NCBOX | 7D4 | KLIBOX | 8C4 | IBOX | 9B4 | | | | |

COMMON BLOCK /BLOCK  / MAP SIZE    264

| SYMBOL | LOCATION | SYMBOL | LOCATION | SYMBOL | LOCATION | SYMBOL | LOCATION | SYMBOL | LOCATION |
|---|---|---|---|---|---|---|---|---|---|
| NBLCK | 0 | IXBLK1 | 4 | IYBLK1 | 7C | IXBLK2 | F4 | IYBLK2 | 16C |
| KLBLK | 1E4 | IYBKMX | 25C | IYBKMN | 260 | | | | |

```
FORTRAN IV G LEVEL  21                TSORG            DATE = 78144       16/32/35           PAGE 0004

COMMON BLOCK /BOX   / MAP SIZE      264
SYMBOL    LOCATION    SYMBOL    LOCATION     SYMBOL    LOCATION     SYMBOL    LOCATION     SYMBOL    LOCATION
NBOX        0         IXBOX1      4          IYBOX1      7C         IXBOX2      F4         IYBOX2      16C
KKLBOX      1E4       IYBXMX      25C        IYBXMN      260

COMMON BLOCK /LIMIT / MAP SIZE       18
SYMBOL    LOCATION    SYMBOL    LOCATION     SYMBOL    LOCATION     SYMBOL    LOCATION     SYMBOL    LOCATION
LMTX1       0         LMTX2       4          LMTY1       8          LMTY2       C          IHUNIT      10
IVUNIT      14

COMMON BLOCK /GRID  / MAP SIZE      330
SYMBOL    LOCATION    SYMBOL    LOCATION     SYMBOL    LOCATION     SYMBOL    LOCATION     SYMBOL    LOCATION
NGLINE      0         IXGL1       8          IYGL1       A8         IXGL2       148        IYGL2       1E8
KLGL        288       IYGLMX      328        IYGLMN      32C

SUBPROGRAMS CALLED
SYMBOL    LOCATION    SYMBOL    LOCATION     SYMBOL    LOCATION     SYMBOL    LOCATION     SYMBOL    LOCATION
TSCHAR      13C       XYCHAR      140        MAXO        144        MINO        148

SCALAR MAP
SYMBOL    LOCATION    SYMBOL    LOCATION     SYMBOL    LOCATION     SYMBOL    LOCATION     SYMBOL    LOCATION
IXBASE      264       NTOLD       268        IWD         26C        ISPC        270        IYBASE      274
NHV         278       NLINE       27C        NL          280        IY1         284        IX1         288
IY2         28C       IX2         290        NB          294        NCB         298        NC          29C

ARRAY MAP
SYMBOL    LOCATION    SYMBOL    LOCATION     SYMBOL    LOCATION     SYMBOL    LOCATION     SYMBOL    LOCATION
ITMP        2A0       KLTMP       2CC

*OPTIONS IN EFFECT*  ID,BCD,SOURCE,NOLIST,NODECK,LOAD,MAP
         *OPTIONS IN EFFECT*  NAME = TSORG   , LINECNT =     61
         *STATISTICS*   SOURCE STATEMENTS =       95,PROGRAM SIZE =      4402
         *STATISTICS*   NO DIAGNOSTICS GENERATED

FORTRAN IV G LEVEL  21                PROC             DATE = 78144       16/32/35           PAGE 0001

0001                  SUBROUTINE PROC                                                  00000100
   0002                  INTEGER*2 KOLOR1,KOUNT1,IBUF,IBIT12,IBIT15                        00000200
   0003                  COMMON /HEAD/ IHEAD(30)                                           00000300
   0004                  COMMON /COLOR/ KLCODE(8)                                          00000400
   0005                  COMMON /PROCES/ LO,IER,NCOPY                                      00000500
   0006                  COMMON /LIMIT/ LMTX1,LMTX2,LMTY1,LMTY2,LMTSEG                     00000600
   0007                  COMMON /WORK/ NSEG1,KOLOR1(500),KOUNT1(500)                       00000700
   0008                  COMMON /GRID/ NGLINE(2)                                           00000800
   0009                  COMMON /BLOCK/ NBLOCK                                             00000900
   0010                  COMMON /PIE/ NPIE                                                 00001000
   0011                  COMMON /AREA/ NAREA                                               00001100
   0012                  COMMON /LINE/ NLINE                                               00001200
   0013                  COMMON /TEXT/ NGROUP                                              00001300
   0014                  COMMON /BOX/ NBOX                                                 00001400
   0015                  COMMON /TEMP/ IBUF(2400)                                          00001500
   0016                  COMMON /IOUNIT/ LUNIN,LUNOUT,LUNDSK,NREC,NBYTE,LOC,MRKEOL,MRKEOS, 00001600
                         *               LUNTAP,LUNTMP                                    00001700
   0017                  COMMON /INSET/ NINSET                                             00001750
   0018                  DATA IBIT12,IBIT15/2048,16384/,NTWRD/2400/                        00001800
   0019                  LMTSEG=500                                                        00001900
   0020                  LMTX1=1                                                           00001910
   0021                  LMTX2=2016                                                        00001920
   0022                  LMTY1=1                                                           00001930
   0023                  LMTY2=1344                                                        00001940
   0024                  REWIND LUNTMP                                                     00002000
   0025                  NTREC=0                                                           00002100
   0026                  DO 3 K=1,30                                                       00002200
   0027        3         IBUF(K)=IHEAD(K)/65536                                            00002300
   0028                  DO 5 K=1,8                                                        00002400
   0029        5         IBUF(K+30)=KLCODE(K)                                              00002500
   0030                  NWRD=38                                                           00002600
   0031                  LMTYY=LMTY2+30                                                    00002700
   0032                  DO 70 L=LMTY1,LMTYY                                               00002800
   0033                  LO=LMTYY-L+LMTY1                                                  00002900
                 C...DEFINE BACKGROUND COLOR...                                            00003000
   0034                  NSEG1=1                                                           00003100
   0035                  KOLOR1(NSEG1)=1                                                   00003200
   0036                  KOUNT1(NSEG1)=LMTX2-LMTX1+1                                       00003300
                 C...INSET...                                                              00003320
   0037                  IF(NINSET.GT.0) CALL PRINS                                        00003340
   0038                  IF(IER.NE.0) GO TO 72                                             00003360
                 C...AREAS...                                                              00003400
   0039                  IF(NAREA.GT.0) CALL PRAREA                                        00003500
   0040                  IF(IER.NE.0) GO TO 72                                             00003600
                 C...GRID LINES...                                                         00003700
   0041                  IF(NGLINE(1).GT.0 .OR. NGLINE(2).GT.0) CALL PRGLIN                00003800
   0042                  IF(IER.NE.0) GO TO 72                                             00003900
                 C...COLUMNS OR BARS...                                                    00004000
   0043                  IF(NBLOCK.GT.0) CALL PRBLOK                                       00004100
   0044                  IF(IER.NE.0) GO TO 72                                             00004200
                 C...PIES...                                                               00004300
   0045                  IF(NPIE.GT.0) CALL PRPIE                                          00004400
   0046                  IF(IER.NE.0) GO TO 72                                             00004500
                 C...LINES...                                                              00004600
   0047                  IF(NLINE.GT.0) CALL PRLINE                                        00004700
   0048                  IF(IER.NE.0) GO TO 72                                             00004800
                 C...BOXES...                                                              00004900
   0049                  IF(NBOX.GT.0) CALL PRBOX                                          00005000
   0050                  IF(IER.NE.0) GO TO 72                                             00005100
```

```
FORTRAN IV G LEVEL  21                  PROC            DATE = 78144         16/32/35            PAGE 0002
            C...CHARACTERS...                                                     00005200
0051              IF(NGROUP.GT.0) CALL PRCHAR                                     00005300
0052              IF(IER.NE.0) GO TO 72                                           00005400
            C...OUTPUT...                                                         00005500
0053    60    DO 70 N=1,NSEG1                                                     00005600
0054          NWRD=NWRD+1                                                         00005700
0055          IF(NWRD.LE.NTWRD) GO TO 65                                           00005800
0056          WRITE(LUNTMP) IBUF                                                  00005900
0057          NTREC=NTREC+1                                                       00006000
0058          NWRD=1                                                              00006100
0059    65    IBUF(NWRD)=KOUNT1(N)+(KOLOR1(N)-1)*IBIT12                           00006200
0060          IF(N.EQ.NSEG1) IBUF(NWRD)=IBUF(NWRD)+IBIT15                         00006300
0061    70    CONTINUE                                                            00006400
0062    72    NWRD=NWRD+1                                                         00006500
0063          IF(NWRD.LE.NTWRD) GO TO 75                                          00006600
0064          WRITE(LUNTMP) IBUF                                                  00006700
0065          NTREC=NTREC+1                                                       00006800
0066          NWRD=1                                                              00006900
0067    75    IBUF(NWRD)=-1                                                       00007000
0068          WRITE(LUNTMP) IBUF                                                  00007100
0069          NWRD=NTREC*NTWRD+NWRD                                               00007200
0070          WRITE(LUNOUT,101) NWRD                                              00007300
0071   101    FORMAT(//45H TOTAL NUMBER OF 2-BYTE WORDS WRITTEN TO TAPE,I10)      00007400
0072   100    CALL SECOND(T)                                                     00007500
0073          WRITE(LUNOUT,111) T                                                 00007600
0074   111    FORMAT(19H PROC   FINISHED AT,F10.2)                                00007700
0075          RETURN                                                              00007800
0076          END                                                                 00007900
```

FORTRAN IV G LEVEL 21    PROC    DATE = 78144    16/32/35    PAGE 0003

COMMON BLOCK /HEAD / MAP SIZE 78

| SYMBOL | LOCATION | SYMBOL | LOCATION | SYMBOL | LOCATION | SYMBOL | LOCATION | SYMBOL | LOCATION |
|---|---|---|---|---|---|---|---|---|---|
| IHEAD | 0 | | | | | | | | |

COMMON BLOCK /COLOR / MAP SIZE 20

| SYMBOL | LOCATION | SYMBOL | LOCATION | SYMBOL | LOCATION | SYMBOL | LOCATION | SYMBOL | LOCATION |
|---|---|---|---|---|---|---|---|---|---|
| KLCODE | 0 | | | | | | | | |

COMMON BLOCK /PROCES / MAP SIZE C

| SYMBOL | LOCATION | SYMBOL | LOCATION | SYMBOL | LOCATION | SYMBOL | LOCATION | SYMBOL | LOCATION |
|---|---|---|---|---|---|---|---|---|---|
| LO | 0 | IER | 4 | NCOPY | 8 | | | | |

COMMON BLOCK /LIMIT / MAP SIZE 14

| SYMBOL | LOCATION | SYMBOL | LOCATION | SYMBOL | LOCATION | SYMBOL | LOCATION | SYMBOL | LOCATION |
|---|---|---|---|---|---|---|---|---|---|
| LMTX1 | 0 | LMTX2 | 4 | LMTY1 | 8 | LMTY2 | C | LMTSEG | 10 |

COMMON BLOCK /WORK / MAP SIZE 704

| SYMBOL | LOCATION | SYMBOL | LOCATION | SYMBOL | LOCATION | SYMBOL | LOCATION | SYMBOL | LOCATION |
|---|---|---|---|---|---|---|---|---|---|
| NSEG1 | 0 | KOLOR1 | 4 | KOUNT1 | 3EC | | | | |

COMMON BLOCK /GRID / MAP SIZE 8

| SYMBOL | LOCATION | SYMBOL | LOCATION | SYMBOL | LOCATION | SYMBOL | LOCATION | SYMBOL | LOCATION |
|---|---|---|---|---|---|---|---|---|---|
| NGLINE | 0 | | | | | | | | |

COMMON BLOCK /BLOCK / MAP SIZE 4

| SYMBOL | LOCATION | SYMBOL | LOCATION | SYMBOL | LOCATION | SYMBOL | LOCATION | SYMBOL | LOCATION |
|---|---|---|---|---|---|---|---|---|---|
| NBLOCK | 0 | | | | | | | | |

COMMON BLOCK /PIE / MAP SIZE 4

| SYMBOL | LOCATION | SYMBOL | LOCATION | SYMBOL | LOCATION | SYMBOL | LOCATION | SYMBOL | LOCATION |
|---|---|---|---|---|---|---|---|---|---|
| NPIE | 0 | | | | | | | | |

COMMON BLOCK /AREA / MAP SIZE 4

| SYMBOL | LOCATION | SYMBOL | LOCATION | SYMBOL | LOCATION | SYMBOL | LOCATION | SYMBOL | LOCATION |
|---|---|---|---|---|---|---|---|---|---|
| NAREA | 0 | | | | | | | | |

COMMON BLOCK /LINE / MAP SIZE 4

| SYMBOL | LOCATION | SYMBOL | LOCATION | SYMBOL | LOCATION | SYMBOL | LOCATION | SYMBOL | LOCATION |
|---|---|---|---|---|---|---|---|---|---|
| NLINE | 0 | | | | | | | | |

COMMON BLOCK /TEXT / MAP SIZE 4

| SYMBOL | LOCATION | SYMBOL | LOCATION | SYMBOL | LOCATION | SYMBOL | LOCATION | SYMBOL | LOCATION |
|---|---|---|---|---|---|---|---|---|---|
| NGROUP | 0 | | | | | | | | |

COMMON BLOCK /BOX / MAP SIZE 4

| SYMBOL | LOCATION | SYMBOL | LOCATION | SYMBOL | LOCATION | SYMBOL | LOCATION | SYMBOL | LOCATION |
|---|---|---|---|---|---|---|---|---|---|
| NBOX | 0 | | | | | | | | |

COMMON BLOCK /TEMP / MAP SIZE 12C0

| SYMBOL | LOCATION | SYMBOL | LOCATION | SYMBOL | LOCATION | SYMBOL | LOCATION | SYMBOL | LOCATION |
|---|---|---|---|---|---|---|---|---|---|
| IBUF | 0 | | | | | | | | |

COMMON BLOCK /IOUNIT / MAP SIZE 28

| SYMBOL | LOCATION | SYMBOL | LOCATION | SYMBOL | LOCATION | SYMBOL | LOCATION | SYMBOL | LOCATION |
|---|---|---|---|---|---|---|---|---|---|
| LUNIN | 0 | LUNOUT | 4 | LUNDSK | 8 | NREC | C | NBYTE | 10 |
| LOC | 14 | MRKEOL | 18 | MRKEOS | 1C | LUNTAP | 20 | LUNTMP | 24 |

```
FORTRAN IV G LEVEL  21                    PROC              DATE = 78144          16/32/35              PAGE 0004
```

COMMON BLOCK /INSET  / MAP SIZE   4

| SYMBOL | LOCATION | SYMBOL | LOCATION | SYMBOL | LOCATION | SYMBOL | LOCATION | SYMBOL | LOCATION |
|---|---|---|---|---|---|---|---|---|---|
| NINSET | 0 | | | | | | | | |

SUBPROGRAMS CALLED

| SYMBOL | LOCATION | SYMBOL | LOCATION | SYMBOL | LOCATION | SYMBOL | LOCATION | SYMBOL | LOCATION |
|---|---|---|---|---|---|---|---|---|---|
| IBCOM# | 140 | PRINS | 144 | PRAREA | 148 | PRGLIN | 14C | PRBLOK | 150 |
| PRPIE | 154 | PRLINE | 158 | PRBOX | 15C | PRCHAR | 160 | SECOND | 164 |

SCALAR MAP

| SYMBOL | LOCATION | SYMBOL | LOCATION | SYMBOL | LOCATION | SYMBOL | LOCATION | SYMBOL | LOCATION |
|---|---|---|---|---|---|---|---|---|---|
| NTRD | 16C | NTREC | 170 | K | 174 | NWRD | 178 | LMTYY | 17C |
| L | 180 | N | 184 | T | 188 | IBIT12 | 18C | IBIT15 | 18E |

FORMAT STATEMENT MAP

| SYMBOL | LOCATION | SYMBOL | LOCATION | SYMBOL | LOCATION | SYMBOL | LOCATION | SYMBOL | LOCATION |
|---|---|---|---|---|---|---|---|---|---|
| 101 | 190 | 111 | 1C5 | | | | | | |

```
*OPTIONS IN EFFECT*  ID,BCD,SOURCE,NOLIST,NODECK,LOAD,MAP
*OPTIONS IN EFFECT*  NAME = PROC   , LINECNT =    61
*STATISTICS*  SOURCE STATEMENTS =     76,PROGRAM SIZE =     1800
*STATISTICS*  NO DIAGNOSTICS GENERATED

FORTRAN IV G LEVEL  21                    OVRLAY            DATE = 78144          16/32/35              PAGE 0001

0001          SUBROUTINE OVRLAY                                        00000100
          C*****************************************************************00000200
          C*  TO OVERLAY 'RUN-LENGTH STRUCTURE' STRING NO.2 O-V-E-R NO.1, THE 00000300
          C*  FINAL STRING IS STORED IN NO.3                                00000400
          C*  EACH STRING IS DEFINED BY :                                   00000500
          C*    NSEG # NUMBER OF SEGMENTS IN THIS STRING; NO MORE THAN 500 <00000600
          C*    KOLOR#I<,I=1,NSEG # COLOR CODE OF THE I-TH SEGMENT          00000700
          C*    KOUNT#I<,I=1,NSEG # NUMBER OF RASTER POINTS OF THE I-TH SEGMENT 00000800
          C*  IER # 0, NORMAL RETURN                                        00000900
          C*  IER # 1, ERROR RETURN                                         00001000
          C*****************************************************************00001100
    0002          INTEGER*2 KOLOR1,KOLOR2,KOLOR3,KOUNT1,KOUNT2,KOUNT3       00001200
    0003          COMMON /WORK/ NSEG1,KOLOR1(500),KOUNT1(500),NSEG2,KOLOR2(500),00001300
                 *              KOUNT2(500),NSEG3,KOLOR3(500),KOUNT3(500)   00001400
    0004          COMMON /IOUNIT/ LUNIN,LUNOUT                              00001500
    0005          COMMON /PROCES/ LO,IER                                    00001600
    0006          COMMON /LIMIT/ LMTX1,LMTX2,LMTY1,LMTY2,LMTSEG             00001700
    0007          KB1=0                                                     00001800
    0008          KB2=0                                                     00001900
    0009          N11=1                                                     00002000
    0010          NSEG3=0                                                   00002100
    0011          DO 50 N2=1,NSEG2                                          00002200
    0012          KA2=KB2+1                                                 00002300
    0013          KB2=KB2+KOUNT2(N2)                                        00002400
    0014          IF(KOLOR2(N2).NE.0) GO TO 30                              00002500
          C---FOREGROUND COLOR UNDEFINED,COPY BACKGROUND COLOR---           00002600
    0015          DO 10 N1=N11,NSEG1                                        00002700
    0016          KA1=KB1+1                                                 00002800
    0017          KB1=KB1+KOUNT1(N1)                                        00002900
    0018          IF(KA1.GT.KB2) GO TO 20                                   00003000
    0019          IF(KB1.LT.KA2) GO TO 10                                   00003100
    0020          NSEG3=NSEG3+1                                             00003200
    0021          IF(NSEG3.GT.LMTSEG) GO TO 60                              00003300
    0022          KOLOR3(NSEG3)=KOLOR1(N1)                                  00003400
    0023          KOUNT3(NSEG3)=MIN0(KB2,KB1)-MAX0(KA2,KA1)+1                00003500
    0024    10    CONTINUE                                                  00003600
    0025          N11=NSEG1                                                 00003700
    0026          KB1=KB1-KOUNT1(NSEG1)                                     00003800
    0027          GO TO 50                                                  00003900
    0028    20    N11=N1-1                                                  00004000
    0029          KB1=KB1-KOUNT1(N1)-KOUNT1(N1-1)                           00004100
    0030          GO TO 50                                                  00004200
          C---COPY FOREGROUND COLOR---                                      00004300
    0031    30    NSEG3=NSEG3+1                                             00004400
    0032          IF(NSEG3.GT.LMTSEG) GO TO 60                              00004500
    0033          KOLOR3(NSEG3)=KOLOR2(N2)                                  00004600
    0034          KOUNT3(NSEG3)=KOUNT2(N2)                                  00004700
    0035    50    CONTINUE                                                  00004800
    0036          RETURN                                                    00004900
    0037    60    IER=1                                                     00005000
    0038          WRITE(LUNOUT,101)                                         00005100
    0039    101   FORMAT(39H ** OVRLAY **,EXCEEDS MEMORY ALLOCATION)        00005200
    0040          RETURN                                                    00005300
    0041          END                                                       00005400
```

COMMON BLOCK /WORK   / MAP SIZE   177C

| SYMBOL | LOCATION | SYMBOL | LOCATION | SYMBOL | LOCATION | SYMBOL | LOCATION | SYMBOL | LOCATION |
|---|---|---|---|---|---|---|---|---|---|
| NSEG1 | 0 | KOLOR1 | 4 | KOUNT1 | 3EC | NSEG2 | 704 | KOLOR2 | 708 |
| KOUNT2 | 8C0 | NSEG3 | FA8 | KOLOR3 | FAC | KOUNT3 | 1394 | | |

COMMON BLOCK /IOUNIT / MAP SIZE   8

| SYMBOL | LOCATION | SYMBOL | LOCATION | SYMBOL | LOCATION | SYMBOL | LOCATION | SYMBOL | LOCATION |
|---|---|---|---|---|---|---|---|---|---|
| LUNIN | 0 | LUNOUT | 4 | | | | | | |

COMMON BLOCK /PROCES / MAP SIZE   8

| SYMBOL | LOCATION | SYMBOL | LOCATION | SYMBOL | LOCATION | SYMBOL | LOCATION | SYMBOL | LOCATION |
|---|---|---|---|---|---|---|---|---|---|
| LO | 0 | IER | 4 | | | | | | |

FORTRAN IV G LEVEL 21                OVRLAY           DATE = 78144         16/32/35                PAGE 0002

COMMON BLOCK /LIMIT  / MAP SIZE    14
SYMBOL     LOCATION        SYMBOL    LOCATION       SYMBOL    LOCATION      SYMBOL    LOCATION      SYMBOL    LOCATION
LMTX1         0            LMTX2        4           LMTY1        8          LMTY2        C          LMTSEG       10

SUBPROGRAMS CALLED
SYMBOL     LOCATION        SYMBOL    LOCATION       SYMBOL    LOCATION      SYMBOL    LOCATION      SYMBOL    LOCATION
IBCOM#        E8           MINO         EC          MAXO         F0

SCALAR MAP
SYMBOL     LOCATION        SYMBOL    LOCATION       SYMBOL    LOCATION      SYMBOL    LOCATION      SYMBOL    LOCATION
KB1          104           KB2         108          N11         10C         N2          110         KA2          114
N1           118           KA1         11C

FORMAT STATEMENT MAP
SYMBOL     LOCATION        SYMBOL    LOCATION       SYMBOL    LOCATION      SYMBOL    LOCATION      SYMBOL    LOCATION
 101         120

*OPTIONS IN EFFECT*  ID,BCD,SOURCE,NOLIST,NODECK,LOAD,MAP
       *OPTIONS IN EFFECT*  NAME = OVRLAY , LINECNT =    61
       *STATISTICS*   SOURCE STATEMENTS =     41,PROGRAM SIZE =      992
       *STATISTICS* NO DIAGNOSTICS GENERATED

FORTRAN IV G LEVEL 21                PRGLIN           DATE = 78144         16/32/35                PAGE 0001

0001            SUBROUTINE PRGLIN                                              00000100
        C***************************************************************00000200
        C*   TO PROCESS GRID LINES %LINES EITHER HORIZONTAL OR VERTICAL TO THE *00000300
        C*                         SLIDE EDGES<                                *00000400
        C*   EACH GRID LINE IS DEFINED BY : IXGL1,IYGL1 , THE LOWER-LEFT CORNER*00000500
        C*                                  IXGL2,IYGL2 , THE UPPER-RIGHT CORNER00000600
        C*                                  KLGL         , THE COLOR           *00000700
        C*   NGLINE%1< # NUMBER OF HORIZONTAL LINES                            *00000800
        C*   NGLINE%2< # NUMBER OF VERTICAL LINES                              *00000900
        C*   IYGLMX,IYGLMN ARE UPPER AND LOWER LIMIT OF ALL GRID LINES         *00001000
        C*   ALL GRID LINES ARE ASSUMED TO BE LEFT-TO-RIGHT PRESORTED,         *00001100
        C*   I.E. AT CERTAIN RASTER LINE LO, IXGL1%M< IS GREATER THAN IXGL2%N< *00001200
        C*       IF AND ONLY IF M IS GREATER THAN N.                           *00001300
        C*   THE GRID LINE 'RUN-LENGTH STRUCTURE' IS STORED IN STRING NO.2,    *00001400
        C*   PRGLIN THEN CALLS OVRLAY TO OVERLAY STRING NO.2 OVER STRING NO.1  *00001500
        C*   %PREVIOUSLY DEFINED<, AND FORM STRING NO.3. FINALLY STRING NO.3   *00001600
        C*   IS REDEFINED AS STRING NO.1                                       *00001700
        C***************************************************************00001800
0002            INTEGER*2 KOLOR1,KOLOR2,KOLOR3,KOUNT1,KOUNT2,KOUNT3             00001900
0003            COMMON /WORK/ NSEG1,KOLOR1(500),KOUNT1(500),NSEG2,KOLOR2(500),  00002000
               *              KOUNT2(500),NSEG3,KOLOR3(500),KOUNT3(500)         00002100
0004            COMMON /IOUNIT/ LUNIN,LUNOUT                                    00002200
0005            COMMON /LIMIT/ LMTX1,LMTX2,LMTY1,LMTY2,LMTSEG                   00002300
0006            COMMON /PROCES/ LO,IER                                          00002400
0007            COMMON /GRID/ NGLINE(2),IXGL1(20,2),IYGL1(20,2),IXGL2(20,2),    00002500
               *              IYGL2(20,2),KLGL(20,2),IYGLMX,IYGLMN              00002600
0008            IF(LO.GT.IYGLMX .OR. LO.LT.IYGLMN) GO TO 70                     00002700
0009            DO 50 IHV=1,2                                                   00002800
0010            LAST=LMTX1-1                                                    00002900
0011            NSEG2=0                                                         00003000
0012            NGL=NGLINE(IHV)                                                 00003100
0013            IF(NGL.EQ.0) GO TO 50                                           00003200
0014            DO 20 N=1,NGL                                                   00003300
0015            IF((LO-IYGL1(N,IHV))*(LO-IYGL2(N,IHV)).GT.0) GO TO 20           00003400
0016            IF(IXGL1(N,IHV)-LAST-1) 60,10,5                                 00003500
0017       5    NSEG2=NSEG2+1                                                   00003600
0018            IF(NSEG2.GT.LMTSEG) GO TO 55                                    00003700
0019            KOLOR2(NSEG2)=0                                                 00003800
0020            KOUNT2(NSEG2)=IXGL1(N,IHV)-LAST-1                               00003900
0021       10   NSEG2=NSEG2+1                                                   00004000
0022            IF(NSEG2.GT.LMTSEG) GO TO 55                                    00004100
0023            KOLOR2(NSEG2)=KLGL(N,IHV)                                       00004200
0024            KOUNT2(NSEG2)=IXGL2(N,IHV)-IXGL1(N,IHV)+1                       00004300
0025            LAST=IXGL2(N,IHV)                                               00004400
0026       20   CONTINUE                                                        00004500
0027            IF(NSEG2.EQ.0) GO TO 50                                         00004600
0028            NSEG2=NSEG2+1                                                   00004700
0029            IF(NSEG2.GT.LMTSEG) GO TO 55                                    00004800
0030            KOLOR2(NSEG2)=0                                                 00004900
0031            KOUNT2(NSEG2)=LMTX2-LAST                                        00005000
0032            CALL OVRLAY                                                     00005100
0033            IF(IER.NE.0) GO TO 70                                           00005200
0034            NSEG1=NSEG3                                                     00005300
0035            DO 30 N=1,NSEG3                                                 00005400
0036            KOLOR1(N)=KOLOR3(N)                                             00005500
0037       30   KOUNT1(N)=KOUNT3(N)                                             00005600
0038       50   CONTINUE                                                        00005700
0039            GO TO 70                                                        00005800
0040       55   WRITE(LUNOUT,100)                                               00005900
0041       100  FORMAT(39H  PRGLIN ,EXCEEDS MEMORY ALLOCATION)               00006000
0042            GO TO 65                                                        00006100
0043       60   WRITE(LUNOUT,101) LO,NGLINE,IXGL1,IYGL1,IXGL2,IYGL2              00006200
0044       101  FORMAT(37H  PRGLIN ,GRID LINES NOT IN ORDER/(T10,10I10))     00006300
0045       65   IER=1                                                           00006400
0046       70   RETURN                                                          00006500
0047            END                                                             00006600

FORTRAN IV G LEVEL 21               PRGLIN               DATE = 78144        16/32/35              PAGE 0003

```
                       COMMON BLOCK /WORK   / MAP SIZE    177C
SYMBOL   LOCATION     SYMBOL   LOCATION     SYMBOL   LOCATION     SYMBOL   LOCATION     SYMBOL   LOCATION
NSEG1       0         KOLOR1      4         KOUNT1      3EC       NSEG2      704        KOLOR2     708
KOUNT2      8C0       NSEG3       FA8       KOLOR3      FAC       KOUNT3     1394

COMMON BLOCK /IOUNIT / MAP SIZE    8
SYMBOL   LOCATION     SYMBOL   LOCATION     SYMBOL   LOCATION     SYMBOL   LOCATION     SYMBOL   LOCATION
LUNIN       0         LUNOUT      4

COMMON BLOCK /LIMIT  / MAP SIZE    14
SYMBOL   LOCATION     SYMBOL   LOCATION     SYMBOL   LOCATION     SYMBOL   LOCATION     SYMBOL   LOCATION
LMTX1       0         LMTX2       4         LMTY1       8         LMTY2       C         LMTSEG      10

COMMON BLOCK /PROCES / MAP SIZE    8
SYMBOL   LOCATION     SYMBOL   LOCATION     SYMBOL   LOCATION     SYMBOL   LOCATION     SYMBOL   LOCATION
LO          0         IER         4

COMMON BLOCK /GRID   / MAP SIZE    330
SYMBOL   LOCATION     SYMBOL   LOCATION     SYMBOL   LOCATION     SYMBOL   LOCATION     SYMBOL   LOCATION
NGLINE      0         IXGL1       8         IYGL1       A8        IXGL2      148        IYGL2      1E8
KLGL        288       IYGLMX      328       IYGLMN      32C

SUBPROGRAMS CALLED
SYMBOL   LOCATION     SYMBOL   LOCATION     SYMBOL   LOCATION     SYMBOL   LOCATION     SYMBOL   LOCATION
OVRLAY      114       IBCOM#      118

SCALAR MAP
SYMBOL   LOCATION     SYMBOL   LOCATION     SYMBOL   LOCATION     SYMBOL   LOCATION     SYMBOL   LOCATION
IHV         11C       LAST        120       NGL         124       N           128

FORMAT STATEMENT MAP
SYMBOL   LOCATION     SYMBOL   LOCATION     SYMBOL   LOCATION     SYMBOL   LOCATION     SYMBOL   LOCATION
100         12C       101         157

*OPTIONS IN EFFECT*  ID,BCD,SOURCE,NOLIST,NODECK,LOAD,MAP
*OPTIONS IN EFFECT*  NAME = PRGLIN , LINECNT =      61
*STATISTICS*     SOURCE STATEMENTS =       47,PROGRAM SIZE =      1336
*STATISTICS*  NO DIAGNOSTICS GENERATED
```

FORTRAN IV G LEVEL 21               PRBOX               DATE = 78144        16/32/35              PAGE 0001

```
0001            SUBROUTINE PRBOX                                                 00000100
0002            INTEGER*2 KOLOR1,KOLOR2,KOLOR3,KOUNT1,KOUNT2,KOUNT3               00000200
0003            COMMON /WORK/ NSEG1,KOLOR1(500),KOUNT1(500),NSEG2,KOLOR2(500),    00000300
               *              KOUNT2(500),NSEG3,KOLOR3(500),KOUNT3(500)           00000400
0004            COMMON /IOUNIT/ LUNIN,LUNOUT                                      00000500
0005            COMMON /LIMIT/ LMTX1,LMTX2,LMTY1,LMTY2,LMTSEG                     00000600
0006            COMMON /PROCES/ LO,IER                                            00000700
0007            COMMON /BOX  / NBLOCK,IXBLK1(30),IYBLK1(30),IXBLK2(30),IYBLK2(30),00000800
               *              KLBLK(30),IYBKMX,IYBKMN                             00000900
0008            LAST=LMTX1-1                                                      00001000
0009            NSEG2=0                                                           00001100
0010            IF((LO-IYBKMX)*(LO-IYBKMN).GT.0) GO TO 70                         00001200
0011            DO 20 N=1,NBLOCK                                                  00001300
0012            IF((LO-IYBLK1(N))*(LO-IYBLK2(N)).GT.0) GO TO 20                   00001400
0013            IF(IXBLK1(N)-LAST-1) 60,10,5                                      00001500
0014      5     NSEG2=NSEG2+1                                                     00001600
0015            IF(NSEG2.GT.LMTSEG) GO TO 55                                      00001700
0016            KOLOR2(NSEG2)=0                                                   00001800
0017            KOUNT2(NSEG2)=IXBLK1(N)-LAST-1                                    00001900
0018     10     NSEG2=NSEG2+1                                                     00002000
0019            IF(NSEG2.GT.LMTSEG) GO TO 55                                      00002100
0020            KOLOR2(NSEG2)=KLBLK(N)                                            00002200
0021            KOUNT2(NSEG2)=IXBLK2(N)-IXBLK1(N)+1                               00002300
0022            LAST=IXBLK2(N)                                                    00002400
0023     20     CONTINUE                                                          00002500
0024            IF(NSEG2.EQ.0) GO TO 70                                           00002600
0025            NSEG2=NSEG2+1                                                     00002700
0026            IF(NSEG2.GT.LMTSEG) GO TO 55                                      00002800
0027            KOLOR2(NSEG2)=0                                                   00002900
0028            KOUNT2(NSEG2)=LMTX2-LAST                                          00003000
0029            CALL OVRLAY                                                       00003100
0030            IF(IER.NE.0) GO TO 70                                             00003200
0031            NSEG1=NSEG3                                                       00003300
0032            DO 30 N=1,NSEG3                                                   00003400
0033            KOLOR1(N)=KOLOR3(N)                                               00003500
0034     30     KOUNT1(N)=KOUNT3(N)                                               00003600
0035            GO TO 70                                                          00003700
0036     55     WRITE(LUNOUT,100)                                                 00003800
0037    100     FORMAT(39H ** PRBOX  **,EXCEEDS MEMORY ALLOCATION)                00003900
0038            GO TO 65                                                          00004000
0039     60     WRITE(LUNOUT,101)                                                 00004100
0040    101     FORMAT(37H ** PRBOX  **,BLOCKS ARE NOT IN ORDER)                  00004200
0041     65     IER=1                                                             00004300
0042     70     RETURN                                                            00004400
0043            END                                                               00004500
```

```
FORTRAN IV G LEVEL  21                       PRBOX           DATE = 78144          16/32/35              PAGE 0002

COMMON BLOCK /WORK   / MAP SIZE   177C
SYMBOL    LOCATION       SYMBOL    LOCATION       SYMBOL    LOCATION       SYMBOL    LOCATION       SYMBOL    LOCATION
NSEG1        0           KOLOR1        4          KOUNT1        3EC        NSEG2        704         KOLOR2       708
KOUNT2       8C0         NSEG3        FA8         KOLOR3        FAC        KOUNT3       1394

COMMON BLOCK /IOUNIT / MAP SIZE     8
SYMBOL    LOCATION       SYMBOL    LOCATION       SYMBOL    LOCATION       SYMBOL    LOCATION       SYMBOL    LOCATION
LUNIN        0           LUNOUT        4

COMMON BLOCK /LIMIT  / MAP SIZE    14
SYMBOL    LOCATION       SYMBOL    LOCATION       SYMBOL    LOCATION       SYMBOL    LOCATION       SYMBOL    LOCATION
LMTX1        0           LMTX2         4          LMTY1         8          LMTY2         C          LMTSEG       10

COMMON BLOCK /PROCES / MAP SIZE     8
SYMBOL    LOCATION       SYMBOL    LOCATION       SYMBOL    LOCATION       SYMBOL    LOCATION       SYMBOL    LOCATION
LO           0           IER           4

COMMON BLOCK /BOX    / MAP SIZE   264
SYMBOL    LOCATION       SYMBOL    LOCATION       SYMBOL    LOCATION       SYMBOL    LOCATION       SYMBOL    LOCATION
NBLOCK       0           IXBLK1        4          IYBLK1        7C         IXBLK2        F4         IYBLK2       16C
KLBLK        1E4         IYBKMX        25C        IYBKMN        260

SUBPROGRAMS CALLED
SYMBOL    LOCATION       SYMBOL    LOCATION       SYMBOL    LOCATION       SYMBOL    LOCATION       SYMBOL    LOCATION
OVRLAY       104         IBCOM#        108

SCALAR MAP
SYMBOL    LOCATION       SYMBOL    LOCATION       SYMBOL    LOCATION       SYMBOL    LOCATION       SYMBOL    LOCATION
LAST         10C         N             110

FORMAT STATEMENT MAP
SYMBOL    LOCATION       SYMBOL    LOCATION       SYMBOL    LOCATION       SYMBOL    LOCATION       SYMBOL    LOCATION
100          114         101          13F

*OPTIONS IN EFFECT*  ID,BCD,SOURCE,NOLIST,NODECK,LOAD,MAP
     *OPTIONS IN EFFECT*  NAME = PRBOX  , LINECNT =      61
     *STATISTICS*   SOURCE STATEMENTS =     43,PROGRAM SIZE =    1072
     *STATISTICS*  NO DIAGNOSTICS GENERATED

FORTRAN IV G LEVEL  21                       PRBLOK          DATE = 78144          16/32/35              PAGE 0001

0001             SUBROUTINE PRBLOK                                         00000100
           C*********************************************************       *00000200
           C*   TO PROCESS BLOCKS  >COLUMN OR BAR CHARTS<                    *00000300
           C*   EACH BLOCK IS DEFINED BY : IXBLK1,IYBLK1 , THE LOWER-LEFT CORNER  *00000400
           C*                              IXBLK2,IYBLK2 , THE UPPER-RIGHT CORNER *00000500
           C*                              KLBLK          , THE BLOCK COLOR     *00000600
           C*   NBLOCK # NUMBER OF BLOCKS >NO MORE THAN 30<                  *00000700
           C*   IYBKMX,IYBKMN ARE UPPER AND LOWER LIMIT OF ALL BLOCKS        *00000800
           C*   ALL BLOCKS ARE ORDERED FROM LEFT-TO-RIGHT                   *00000900
           C*********************************************************       *00001000
  0002             INTEGER*2 KOLOR1,KOLOR2,KOLOR3,KOUNT1,KOUNT2,KOUNT3        00001100
  0003             COMMON /WORK/ NSEG1,KOLOR1(500),KOUNT1(500),NSEG2,KOLOR2(500), 00001200
                  *              KOUNT2(500),NSEG3,KOLOR3(500),KOUNT3(500)    00001300
  0004             COMMON /IOUNIT/ LUNIN,LUNOUT                               00001400
  0005             COMMON /LIMIT/ LMTX1,LMTX2,LMTY1,LMTY2,LMTSEG              00001500
  0006             COMMON /PROCES/ LO,IER                                     00001600
  0007             COMMON /BLOCK/ NBLOCK,IXBLK1(30),IYBLK1(30),IXBLK2(30),IYBLK2(30), 00001700
                  *              KLBLK(30),IYBKMX,IYBKMN                     00001800
  0008             LAST=LMTX1-1                                               00001900
  0009             NSEG2=0                                                    00002000
  0010             IF((LO-IYBKMX)*(LO-IYBKMN).GT.0) GO TO 70                   00002100
  0011             DO 20 N=1,NBLOCK                                           00002200
  0012             IF((LO-IYBLK1(N))*(LO-IYBLK2(N)).GT.0) GO TO 20            00002300
  0013             IF(IXBLK1(N)-LAST-1) 10,10,5                               00002400
  0014       5     NSEG2=NSEG2+1                                              00002500
  0015             IF(NSEG2.GT.LMTSEG) GO TO 55                               00002600
  0016             KOLOR2(NSEG2)=0                                            00002700
  0017             KOUNT2(NSEG2)=IXBLK1(N)-LAST-1                             00002800
  0018      10     NSEG2=NSEG2+1                                              00002900
  0019             IF(NSEG2.GT.LMTSEG) GO TO 55                               00003000
  0020             KOLOR2(NSEG2)=KLBLK(N)                                     00003100
  0021             KOUNT2(NSEG2)=IXBLK2(N)-IXBLK1(N)+1                        00003200
  0022             LAST=IXBLK2(N)                                             00003300
  0023      20     CONTINUE                                                   00003400
  0024             IF(NSEG2.EQ.0) GO TO 70                                    00003500
  0025             NSEG2=NSEG2+1                                              00003600
  0026             IF(NSEG2.GT.LMTSEG) GO TO 55                               00003700
  0027             KOLOR2(NSEG2)=0                                            00003800
  0028             KOUNT2(NSEG2)=LMTX2-LAST                                   00003900
  0029             CALL OVRLAY                                                00004000
  0030             IF(IER.NE.0) GO TO 70                                      00004100
  0031             NSEG1=NSEG3                                                00004200
  0032             DO 30 N=1,NSEG3                                            00004300
  0033             KOLOR1(N)=KOLOR3(N)                                        00004400
  0034      30     KOUNT1(N)=KOUNT3(N)                                        00004500
  0035             GO TO 70                                                   00004600
  0036      55     WRITE(LUNOUT,100)                                          00004700
  0037     100     FORMAT(39H ** PRBLOK **,EXCEEDS MEMORY ALLOCATION)         00004800
  0038             GO TO 65                                                   00004900
  0039      60     WRITE(LUNOUT,101)                                          00005000
  0040     101     FORMAT(37H ** PRBLOK **,BLOCKS ARE NOT IN ORDER)           00005100
  0041      65     IER=1                                                      00005200
  0042      70     RETURN                                                     00005300
  0043             END                                                        00005400
```

```
FORTRAN IV G LEVEL  21                   PRBLOK                DATE = 78144         16/32/35              PAGE 0002

COMMON BLOCK /WORK    / MAP SIZE    177C
SYMBOL     LOCATION      SYMBOL    LOCATION      SYMBOL    LOCATION      SYMBOL    LOCATION      SYMBOL    LOCATION
NSEG1         0          KOLOR1       4          KOUNT1       3EC        NSEG2       704         KOLOR2      708
KOUNT2       8C0         NSEG3       FA8         KOLOR3      FAC        KOUNT3      1394

COMMON BLOCK /IOUNIT  / MAP SIZE      8
SYMBOL     LOCATION      SYMBOL    LOCATION      SYMBOL    LOCATION      SYMBOL    LOCATION      SYMBOL    LOCATION
LUNIN         0          LUNOUT       4

COMMON BLOCK /LIMIT   / MAP SIZE     14
SYMBOL     LOCATION      SYMBOL    LOCATION      SYMBOL    LOCATION      SYMBOL    LOCATION      SYMBOL    LOCATION
LMTX1         0          LMTX2        4          LMTY1        8          LMTY2       C           LMTSEG      10

COMMON BLOCK /PROCES  / MAP SIZE      8
SYMBOL     LOCATION      SYMBOL    LOCATION      SYMBOL    LOCATION      SYMBOL    LOCATION      SYMBOL    LOCATION
LO            0          IER          4

COMMON BLOCK /BLOCK   / MAP SIZE    264
SYMBOL     LOCATION      SYMBOL    LOCATION      SYMBOL    LOCATION      SYMBOL    LOCATION      SYMBOL    LOCATION
NBLOCK        0          IXBLK1       4          IYBLK1      7C          IXBLK2      F4          IYBLK2      16C
KLBLK        1E4         IYBKMX      25C         IYBKMN      260

SUBPROGRAMS CALLED
SYMBOL     LOCATION      SYMBOL    LOCATION      SYMBOL    LOCATION      SYMBOL    LOCATION      SYMBOL    LOCATION
OVRLAY       FC          IBCOM#      100

SCALAR MAP
SYMBOL     LOCATION      SYMBOL    LOCATION      SYMBOL    LOCATION      SYMBOL    LOCATION      SYMBOL    LOCATION
LAST        104          N           108

FORMAT STATEMENT MAP
SYMBOL     LOCATION      SYMBOL    LOCATION      SYMBOL    LOCATION      SYMBOL    LOCATION      SYMBOL    LOCATION
100         10C          101         137

*OPTIONS IN EFFECT*  ID,BCD,SOURCE,NOLIST,NODECK,LOAD,MAP
*OPTIONS IN EFFECT*  NAME = PRBLOK  , LINECNT =       61
*STATISTICS*   SOURCE STATEMENTS =       43,PROGRAM SIZE =     1056
*STATISTICS*  NO DIAGNOSTICS GENERATED

FORTRAN IV G LEVEL  21                   PRCHAR                DATE = 78144         16/32/35              PAGE 0001

0001            SUBROUTINE PRCHAR                                            00000100
        C*****************************************************************00000200
        C*      TO PROCESS CHARACTERS                                       *00000300
        C*      ALL CHARACTERS ARE DIVIDED INTO GROUPS %E.G. A LINE OF TEXT IS A *00000400
        C*      GROUP<  EACH GROUP IS DEFINED BY :                          *00000500
        C*      IYTXMX,IYTXMN - THE UPPER AND LOWER LIMITS OF THIS GROUP    *00000600
        C*      NCHAR         - NUMBER OF CHARACTERS IN THIS GROUP          *00000700
        C*      NGROUP # NUMBER OF GROUPS %NO MORE THAN 20<                 *00000800
        C*      FOR EACH CHARACTER :                                        *00000900
        C*      IXCHAR,IYCHR1 - X,Y-COORDINATES OF THE LOWER-LEFT CORNER    *00001000
        C*      IYCHR2        - UPPER LIMIT                                 *00001100
        C*      KLCHAR        - COLOR                                       *00001200
        C*      LOCMEM        - LOCATION IN MASTER ARRAY,WHERE THE RUN-LENGTH *00001300
        C*                      STRUCTURE OF THE CHARACTER IS STORED        *00001400
        C*****************************************************************00001500
0002            INTEGER*2 MASTER,IXCHAR,IYCHR1,IYCHR2,KLCHAR                 00001600
0003            INTEGER*2 KOLOR1,KOLOR2,KOLOR3,KOUNT1,KOUNT2,KOUNT3          00001700
0004            COMMON MAXMEM,MAXWKD,MASTER(1)                               00001800
0005            COMMON /WORK/ NSEG1,KOLOR1(500),KOUNT1(500),NSEG2,KOLOR2(500), 00001900
              *       KOUNT2(500),NSEG3,KOLOR3(500),KOUNT3(500)              00002000
0006            COMMON /LIMIT/ LMTX1,LMTX2,LMTY1,LMTY2,LMTSEG                00002100
0007            COMMON /IOUNIT/ LUNIN,LUNOUT,LUNDSK,NREC,NBYTE,LOC,MRKEOL,MRKEOS 00002200
0008            COMMON /PROCES/ LO,IER                                       00002300
0009            COMMON /TEXT/ NGROUP,IYTXMX(30),IYTXMN(30),NCHAR(30),NTCHAR, 00002400
              *       LOCMEM(1000),IXCHAR(1000),IYCHR1(1000),IYCHR2(1000),   00002500
              *       KLCHAR(1000)                                           00002600
0010            DO 60 NG=1,NGROUP                                            00002700
0011            IF((LO-IYTXMX(NG))*(LO-IYTXMN(NG)).GT.0) GO TO 60             00002800
0012            IO=0                                                         00002900
0013            IF(NG.EQ.1) GO TO 10                                         00003000
0014            NG1=NG-1                                                     00003100
0015            DO 5 NGG=1,NG1                                               00003200
0016     5      IO=IO+NCHAR(NGG)                                             00003300
0017    10      NCH=NCHAR(NG)                                                00003400
0018            LAST=LMTX1-1                                                 00003500
0019            NSEG2=0                                                      00003600
0020            DO 50 NC=1,NCH                                               00003700
0021            ICHAR=IO+NC                                                  00003800
0022            IF((LO-IYCHR1(ICHAR))*(LO-IYCHR2(ICHAR)).GT.0) GO TO 30       00003900
0023            DO 40 IT=1,10                                                00004000
0024            LOCM=LOCMEM(ICHAR)                                           00004100
0025            IXTMP=MASTER(LOCM)+IXCHAR(ICHAR)-1                           00004200
0026            KOUNT=MASTER(LOCM+1)                                         00004300
0027            IF(KOUNT.GE.MRKEOL) KOUNT=MOD(KOUNT,MRKEOL)                  00004400
0028            LOCMEM(ICHAR)=LOCM+2                                         00004500
0029            IF(KOUNT.EQ.0) GO TO 35                                      00004600
0030            IF(IXTMP-LAST-1) 30,30,20                                    00004700
0031    20      NSEG2=NSEG2+1                                                00004800
0032            IF(NSEG2.GT.LMTSEG) GO TO 81                                 00004900
0033            KOLOR2(NSEG2)=0                                              00005000
0034            KOUNT2(NSEG2)=IXTMP-LAST-1                                   00005100
0035    30      NSEG2=NSEG2+1                                                00005200
```

```
FORTRAN IV G LEVEL  21                PRCHAR             DATE = 78144         16/32/35              PAGE 0002

0036                    IF(NSEG2.GT.LMTSEG) GO TO 81                  00005300
0037                    KOLOR2(NSEG2)=KLCHAR(ICHAR)                   00005400
0038                    KOUNT2(NSEG2)=KOUNT-MAX0(0,LAST+1-IXTMP)      00005500
0039                    LAST=IXTMP+KOUNT-1                            00005600
0040        35          IF(MASTER(LOCM+1).GE.MRKEOL) GO TO 50         00005700
0041        40          CONTINUE                                      00005800
0042                    GO TO 83                                      00005900
0043        50          CONTINUE                                      00006000
0044                    IF(NSEG2.EQ.0) GO TO 60                       00006100
0045                    NSEG2=NSEG2+1                                 00006200
0046                    IF(NSEG2.GT.LMTSEG) GO TO 81                  00006300
0047                    KOLOR2(NSEG2)=0                               00006400
0048                    KOUNT2(NSEG2)=LMTX2-LAST                      00006500
0049                    CALL OVRLAY                                   00006600
0050                    IF(IER.NE.0) GO TO 100                        00006700
0051                    NSEG1=NSEG3                                   00006800
0052                    DO 55 N=1,NSEG3                               00006900
0053                    KOLOR1(N)=KOLOR3(N)                           00007000
0054        55          KOUNT1(N)=KOUNT3(N)                           00007100
0055        60          CONTINUE                                      00007200
0056                    GO TO 100                                     00007300
0057        81          WRITE(LUNOUT,101)                             00007400
0058       101          FORMAT(39H ** PRCHAR **,EXCEEDS MEMORY ALLOCATION)  00007500
0059                    GO TO 95                                      00007600
0060        82          WRITE(LUNOUT,102) LO,ICHAR                    00007700
0061       102          FORMAT(37H ** PRCHAR **,CHARACTERS NOT IN ORDER,2I10) 00007800
0062                    GO TO 95                                      00007900
0063        83          WRITE(LUNOUT,103) ICHAR                       00008000
0064       103          FORMAT(46H ** PRCHAR **,SYMBOL HAS MORE THAN 10 SECTIONS,I2)  00008100
0065        95          IER=1                                         00008200
0066       100          RETURN                                        00008300
0067                    END                                           00008400
```

```
FORTRAN IV G LEVEL  21                PRCHAR             DATE = 78144         16/32/35              PAGE 0003

COMMON BLOCK /        / MAP SIZE       A
SYMBOL    LOCATION     SYMBOL    LOCATION    SYMBOL    LOCATION    SYMBOL    LOCATION    SYMBOL    LOCATION
MAXMEM       0         MAXWRD       4        MASTER       8

COMMON BLOCK /WORK   / MAP SIZE    177C
SYMBOL    LOCATION     SYMBOL    LOCATION    SYMBOL    LOCATION    SYMBOL    LOCATION    SYMBOL    LOCATION
NSEG1        0         KOLOR1       4        KOUNT1      3EC       NSEG2       704       KOLOR2      708
KOUNT2      BC0        NSEG3       FA8       KOLOR3      FAC       KOUNT3     1394

COMMON BLOCK /LIMIT  / MAP SIZE      14
SYMBOL    LOCATION     SYMBOL    LOCATION    SYMBOL    LOCATION    SYMBOL    LOCATION    SYMBOL    LOCATION
LMTX1        0         LMTX2        4        LMTY1        8        LMTY2        C        LMTSEG      10

COMMON BLOCK /IOUNIT / MAP SIZE      20
SYMBOL    LOCATION     SYMBOL    LOCATION    SYMBOL    LOCATION    SYMBOL    LOCATION    SYMBOL    LOCATION
LUNIN        0         LUNOUT       4        LUNDSK       8        NREC         C        NBYTE       10
LOC         14         MRKEOL      18        MRKEOS      1C

COMMON BLOCK /PROCES / MAP SIZE       8
SYMBOL    LOCATION     SYMBOL    LOCATION    SYMBOL    LOCATION    SYMBOL    LOCATION    SYMBOL    LOCATION
LO           0         IER          4

COMMON BLOCK /TEXT   / MAP SIZE    3050
SYMBOL    LOCATION     SYMBOL    LOCATION    SYMBOL    LOCATION    SYMBOL    LOCATION    SYMBOL    LOCATION
NGROUP       0         IYTXMX       4        IYTXMN      7C        NCHAR       F4        NTCHAR      16C
LOCHLM      170        IXCHAR     1110       IYCHR1     18E0       IYCHR2     2080       KLCHAR     2380

SUBPROGRAMS CALLED
SYMBOL    LOCATION     SYMBOL    LOCATION    SYMBOL    LOCATION    SYMBOL    LOCATION    SYMBOL    LOCATION
OVRLAY      144        IBCOMP      148       MAX0        14C

SCALAR MAP
SYMBOL    LOCATION     SYMBOL    LOCATION    SYMBOL    LOCATION    SYMBOL    LOCATION    SYMBOL    LOCATION
NG          160        IG          164       NG1         168       NG0         16C       NCH         170
LAST        174        NC          178       ICHAR       17C       IT          180       LOCM        184
IXTMP       188        KOUNT       18C       N           190

FORMAT STATEMENT MAP
SYMBOL    LOCATION     SYMBOL    LOCATION    SYMBOL    LOCATION    SYMBOL    LOCATION    SYMBOL    LOCATION
101         194        102         1BF       103         1EC

*OPTIONS IN EFFECT* ID,BCD,SOURCE,NOLIST,NODECK,LOAD,MAP
*OPTIONS IN EFFECT* NAME = PRCHAR , LINECNT =      61
*STATISTICS*    SOURCE STATEMENTS =      67,PROGRAM SIZE =      1712
*STATISTICS*  NO DIAGNOSTICS GENERATED
```

```
FORTRAN IV G LEVEL  21                    PRTOUT              DATE = 78144         16/32/35          PAGE 0001

0001            SUBROUTINE PRTOUT                                              00000100
0002            INTEGER*2 IBUF,IBUF2,IBUF3,KSYM                                00000200
0003            COMMON /HEAD/ IHEAD(40)                                        00000250
0004            COMMON /PROCES/ LO,IER                                         00000300
0005            COMMON /LIMIT/ LMTX1,LMTX2,LMTY1,LMTY2                         00000400
0006            COMMON /IOUNIT/ LUNIN,LUNOUT,DUM1(7),LUNTMP,LUNSUM,MRGFIL      00000500
0007            COMMON /TEMP/ IBUF(2400)                                       00000600
0008            COMMON /WORK/ IBUF2(2048),IBUF3(96)                            00000700
0009            DIMENSION KSYM(8)                                              00000800
0010            DATA KSYM/1H ,1H2,1H3,1H4,1H5,1H6,1H7,1H8/                     00000900
0011            DATA IBIT11/2048/,IBIT14/16384/                                00001000
0012            DATA IFOUR/4/,IBLNK/4H    /,ISTAR/4H*   /                      00001010
0013            LMTYY=LMTY2+30                                                 00001050
0014       5    REWIND LUNTMP                                                  00001100
0015            READ(LUNIN,101,END=200,ERR=95) IX1,IX2,IY1,IY2                 00001200
0016       101  FORMAT(8I10)                                                   00001300
0017            IF(IX1.EQ.0 .AND. IX2.EQ.0) GO TO 100                          00001400
0018            IF(IX1.LT.LMTX1 .OR. IX1.GT.LMTX2) GO TO 91                    00001500
0019            IF(IX2.LT.LMTX1 .OR. IX2.GT.LMTX2) GO TO 91                    00001600
0020            IF(IY1.LT.LMTY1 .OR. IY1.GT.LMTYY) GO TO 91                    00001700
0021            IF(IY2.LT.LMTY1 .OR. IY2.GT.LMTYY) GO TO 91                    00001800
0022            IF(IX1.GT.IX2) GO TO 91                                        00001900
0023            IF(IY1.GT.IY2) GO TO 91                                        00002000
0024            WRITE(LUNOUT,102) IX1,IX2,IY1,IY2                              00002100
0025       102  FORMAT(23H1REQUESTED VIEWING AREA,4I10)                        00002200
0026            IXSCAL=1                                                       00002300
0027            IYSCAL=1                                                       00002400
0028            IF((IX2-IX1).GT.95) IXSCAL=(IX2-IX1)/96+1                      00002500
0029            IF((IY2-IY1).GT.63) IYSCAL=(IY2-IY1)/64+1                      00002600
0030            ISCALE=MAX0(IXSCAL,IYSCAL)                                     00002700
0031            IX2=IX1+(IX2-IX1)/ISCALE*ISCALE                                00002800
0032            IY2=IY1+(IY2-IY1)/ISCALE*ISCALE                                00002900
0033            WRITE(LUNOUT,103) IX1,IX2,IY1,IY2,ISCALE                       00003000
0034       103  FORMAT(23H   ACTUAL VIEWING AREA,4I10,10H    SCALE #I4///)     00003100
0035            READ(LUNTMP) IBUF                                              00003200
0036            DO 10 K=31,38                                                  00003300
0037            IF(IBUF(K).EQ.0) GO TO 15                                      00003400
0038            K1=K-30                                                        00003500
0039       10   WRITE(LUNOUT,104) K1,IBUF(K)                                   00003600
0040       104  FORMAT(6H COLORI3,4H  # I3)                                    00003700
0041       15   LINE=LMTYY                                                     00003800
0042            KNEW=0                                                         00003900
0043            K1=39                                                          00004000
0044            WRITE(LUNOUT,107)                                              00004100
0045       107  FORMAT(1H )                                                    00004200
0046            GO TO 25                                                       00004300
0047       20   READ(LUNTMP) IBUF                                              00004400
0048            K1=1                                                           00004500
0049       25   DO 40 K=K1,2400                                                00004600
0050            IWRD=IBUF(K)                                                   00004700
0051            IF(IWRD.LT.0) GO TO 5                                          00004800
0052            IF(LINE.LT.IY1 .OR. LINE.GT.IY2) GO TO 35                      00004900
0053            IF(MOD(LINE,ISCALE).NE.0) GO TO 35                             00005000
0054            KOUNT=MOD(IWRD,IBIT11)                                         00005100
0055            KOLOR=MOD(IWRD/IBIT11,8)+1                                     00005200
0056            DO 30 KT=1,KOUNT                                               00005300
0057       30   IBUF2(KNEW+KT)=KSYM(KOLOR)                                     00005400
0058            KNEW=KNEW+KOUNT                                                00005500
0059            IF(IWRD.LT.IBIT14) GO TO 40                                    00005600
0060            I=0                                                            00005700
0061            DO 32 IX=IX1,IX2,ISCALE                                        00005800
0062            I=I+1                                                          00005900
0063       32   IBUF3(I)=IBUF2(IX)                                             00006000
0064            WRITE(LUNOUT,105) LINE,(IBUF3(IO),IO=1,I)                      00006100
0065       105  FORMAT(I6,4X,96A1)                                             00006200
0066            GO TO 37                                                       00006300
0067       35   IF(IWRD.LT.IBIT14) GO TO 40                                    00006400
0068       37   LINE=LINE-1                                                    00006500
0069            KNEW=0                                                         00006600
0070       40   CONTINUE                                                       00006700
0071            GO TO 20                                                       00006800
0072       91   WRITE(LUNOUT,106) IX1,IX2,IY1,IY2                              00006900
0073       106  FORMAT(27H ** PRTOUT **,IMPROPER DATA4I10)                     00007000
0074            GO TO 5                                                        00007100
0075       95   IER=1                                                          00007200
0076       100  CALL SECOND(T)                                                 00007300
0077            WRITE(LUNOUT,111) T                                            00007400
0078       111  FORMAT(19H PRTOUT FINISHED AT,F10.2)                           00007500
0079            IF(IHEAD(37).EQ.IBLNK) GO TO 140                               00007510
0080            CALL MERGE(MRGFIL)                                             00007520
0081            IF(IER.NE.0) GO TO 150                                         00007530
0082            IF(IHEAD(37).NE.ISTAR) WRITE(LUNSUM) IFOUR                     00007535
0083            IF(IHEAD(37).NE.ISTAR) GO TO 150                               00007540
0084            REWIND MRGFIL                                                  00007550
0085            REWIND LUNTMP                                                  00007560
0086       130  READ(MRGFIL,END=135) IBUF                                      00007570
0087            WRITE(LUNTMP) IBUF                                             00007580
0088            GO TO 130                                                      00007590
0089       135  MRGFIL=0                                                       00007600
0090       140  CALL OUTPUT                                                    00007610
0091       150  RETURN                                                         00007620
0092       200  STOP 200                                                       00007650
0093            END                                                            00007700
```

FORTRAN IV G LEVEL  21                    PRTOUT              DATE = 78144         16/32/35          PAGE 0003

COMMON BLOCK /HEAD    / MAP SIZE     A0

| SYMBOL | LOCATION | SYMBOL | LOCATION | SYMBOL | LOCATION | SYMBOL | LOCATION | SYMBOL | LOCATION |
|---|---|---|---|---|---|---|---|---|---|
| IHEAD | 0 | | | | | | | | |

COMMON BLOCK /PROCES  / MAP SIZE     8

| SYMBOL | LOCATION | SYMBOL | LOCATION | SYMBOL | LOCATION | SYMBOL | LOCATION | SYMBOL | LOCATION |
|---|---|---|---|---|---|---|---|---|---|
| LO | 0 | IER | 4 | | | | | | |

FORTRAN IV G LEVEL 21                PRTOUT              DATE = 78144           16/32/35

COMMON BLOCK /LIMIT / MAP SIZE 10

| SYMBOL | LOCATION | SYMBOL | LOCATION | SYMBOL | LOCATION | SYMBOL | LOCATION | SYMBOL | LOCATION |
|---|---|---|---|---|---|---|---|---|---|
| LMTX1 | 0 | LMTX2 | 4 | LMTY1 | 8 | LMTY2 | C | | |

COMMON BLOCK /IOUNIT / MAP SIZE 30

| SYMBOL | LOCATION | SYMBOL | LOCATION | SYMBOL | LOCATION | SYMBOL | LOCATION | SYMBOL | LOCATION |
|---|---|---|---|---|---|---|---|---|---|
| LUNIN | 0 | LUNOUT | 4 | DUM1 | 8 | LUNTMP | 24 | LUNSUM | 28 |
| MRGFIL | 2C | | | | | | | | |

COMMON BLOCK /TEMP / MAP SIZE 12C0

| SYMBOL | LOCATION | SYMBOL | LOCATION | SYMBOL | LOCATION | SYMBOL | LOCATION | SYMBOL | LOCATION |
|---|---|---|---|---|---|---|---|---|---|
| IBUF | 0 | | | | | | | | |

COMMON BLOCK /WORK / MAP SIZE 10C0

| SYMBOL | LOCATION | SYMBOL | LOCATION | SYMBOL | LOCATION | SYMBOL | LOCATION | SYMBOL | LOCATION |
|---|---|---|---|---|---|---|---|---|---|
| IBUF2 | 0 | IBUF3 | 1000 | | | | | | |

SUBPROGRAMS CALLED

| SYMBOL | LOCATION | SYMBOL | LOCATION | SYMBOL | LOCATION | SYMBOL | LOCATION | SYMBOL | LOCATION |
|---|---|---|---|---|---|---|---|---|---|
| IBCOM# | 184 | SECOND | 188 | MERGE | 18C | OUTPUT | 190 | MAXO | 194 |

SCALAR MAP

| SYMBOL | LOCATION | SYMBOL | LOCATION | SYMBOL | LOCATION | SYMBOL | LOCATION | SYMBOL | LOCATION |
|---|---|---|---|---|---|---|---|---|---|
| IBIT11 | 1C0 | IBIT14 | 1C4 | IFOUR | 1C8 | IBLNK | 1CC | ISTAR | 1D0 |
| LMTYY | 1D4 | IX1 | 1D8 | IX2 | 1DC | IY1 | 1E0 | IY2 | 1E4 |
| IXSCAL | 1E8 | IYSCAL | 1EC | ISCALE | 1F0 | K | 1F4 | K1 | 1F8 |
| LINE | 1FC | KNEW | 200 | IWRD | 204 | KOUNT | 208 | KOLOR | 20C |
| KT | 210 | I | 214 | IX | 218 | IO | 21C | T | 220 |

ARRAY MAP

| SYMBOL | LOCATION | SYMBOL | LOCATION | SYMBOL | LOCATION | SYMBOL | LOCATION | SYMBOL | LOCATION |
|---|---|---|---|---|---|---|---|---|---|
| KSYM | 224 | | | | | | | | |

FORMAT STATEMENT MAP

| SYMBOL | LOCATION | SYMBOL | LOCATION | SYMBOL | LOCATION | SYMBOL | LOCATION | SYMBOL | LOCATION |
|---|---|---|---|---|---|---|---|---|---|
| 101 | 234 | 102 | 23A | 103 | 259 | 104 | 289 | 107 | 290 |
| 105 | 2A2 | 106 | 2AC | 111 | 2CF | | | | |

*OPTIONS IN EFFECT* ID,BCD,SOURCE,NOLIST,NODECK,LOAD,MAP
*OPTIONS IN EFFECT* NAME = PRTOUT , LINECNT =    61
*STATISTICS*   SOURCE STATEMENTS =      93,PROGRAM SIZE =    2678
*STATISTICS*   NO DIAGNOSTICS GENERATED

FORTRAN IV G LEVEL 21                OUTPUT              DATE = 78144           16/32/35            PAGE 0001

```
0001            SUBROUTINE OUTPUT                                              00000100
0002            INTEGER*2 IBUF,JBUF                                            00000200
0003            COMMON /PROCES/ LO,IER,NCOPY,IRES                              00000300
0004            COMMON /IOUNIT/ LUNIN,LUNOUT,SKIP(6),LUNTAP,LUNTMP,LUNSUM      00000400
0005            COMMON /TEMP/ IBUF(2400)                                       00000500
0006            COMMON /COLOR/ KLCODE(8)                                       00000600
0007            DIMENSION JBUF(1008), INTEN(3,64)                              00000700
0008            DATA ISF/32793/,IEF/32792/,IEL/32788/                          00000800
0009            DATA INTEN/00,00,00,31,00,00,08,30,08,31,26,00,                00000850
                200,00,18,24,07,30,12,31,30,31,28,31,                          00000900
                321,19,23,14,14,16,11,12,13,07,09,10,                          00000950
                431,17,31,30,13,27,29,10,23,28,06,20,                          00001000
                531,20,12,28,17,11,26,15,10,24,13,09,                          00001050
                631,26,14,30,23,12,28,20,10,26,17,08,                          00001100
                718,28,18,14,28,13,11,28,11,05,28,05,                          00001150
                818,20,30,15,18,30,11,15,30,07,12,30,                          00001200
                931,00,00,24,00,00,19,00,00,15,00,00,                          00001250
                A31,12,00,25,10,00,20,08,00,15,06,00,                          00001300
                B31,18,00,25,15,00,20,12,00,15,08,00,                          00001350
                C31,25,00,25,20,00,18,15,00,13,11,00,                          00001400
                D00,31,00,00,20,00,00,15,00,00,12,00,                          00001450
                E00,28,18,00,20,14,00,15,11,00,11,09,                          00001500
                F09,14,31,06,11,25,04,08,17,02,04,11,                          00001550
                G12,10,31,08,08,24,06,06,18,04,04,12/                          00001600
         C                                                                     00001700
                                                                               00001770
0010            DO 100 NC=1,NCOPY                                              00001780
0011            DO 100 NS=1,3                                                  00001800
0012            REWIND LUNTMP                                                  00001900
0013            READ(LUNTMP) IBUF                                              00001910
0014            DO 5 L=31,38                                                   00001920
0015       5    KLCODE(L-30)=IBUF(L)                                           00002000
0016            LENTH=0                                                        00002100
0017            NREC=0                                                         00002200
0018            LINE=0                                                         00002250
0019            LFTOVR=0                                                       00002300
0020            LO=39                                                          00002400
0021            JBUF(1)=ISF                                                    00002700
0022            NR=1                                                           00002800
0023            GO TO 20                                                       00002900
0024       10   READ(LUNTMP) IBUF                                              00003000
0025            LO=1                                                           00003100
0026       20   DO 50 L=LO,2400                                                00003200
0027            IF(IBUF(L).LT.0) GO TO 60                                      00003220
0028            IF(MOD(LINE,IRES).EQ.0) GO TO 22                               00003240
0029            IF(IBUF(L).GE.16384) LINE=LINE+1                               00003260
0030            GO TO 50
```

```
0031        22      KOLOR=(IBUF(L)-IBUF(L)/16384*16384)/2048           00003300
0032                LENORG=IBUF(L)-IBUF(L)/2048*2048+LFTOVR             00003400
0033                LEN=LENORG/IRES                                     00003420
0034                LFTOVR=LENORG-LEN*IRES                              00003440
0035                LENTH=LENTH+LEN                                     00003500
0036                IF(LENTH.LE.2016/IRES) GO TO 25                     00003600
0037                LEN=2016/IRES-(LENTH-LEN)                           00003700
0038                LENTH=LENTH+LEN                                     00003800
0039                IER=3                                               00003900
0040        25      IF(LEN.LE.0) GO TO 41                               00004200
0041                NR=NR+1                                             00004250
0042                IF(NR.LE.1008) GO TO 35                             00004300
0043                WRITE(LUNTAP,101) JBUF                              00004500
0044        101     FORMAT(4(252A2))                                    00004600
0045                NREC=NREC+1                                         00004700
0046                NR=1                                                00004800
0047        35      IF(LEN.LT.1024) GO TO 38                            00004820
0048                JBUF(NR)   =1023*32+INTEN(NS  ,KLCODE(KOLOR+1))     00004860
0049                LEN=LEN-1023                                        00004870
0050                NR=NR+1                                             00004880
0051                IF(NR.LE.1008) GO TO 38                             00004900
0052                WRITE(LUNTAP,101) JBUF                              00004940
0053                NREC=NREC+1                                         00004960
0054                NR=1                                                00004980
0055        38      JBUF(NR)   =LEN*32+INTEN(NS  ,KLCODE(KOLOR+1))      00005020
0056        41      IF(IBUF(L).LT.16384) GO TO 50                       00005100
0057                NR=NR+1                                             00005200
0058                IF(NR.LE.1008) GO TO 45                             00005300
0059                WRITE(LUNTAP,101) JBUF                              00005500
0060                NREC=NREC+1                                         00005600
0061                NR=1                                                00005700
0062        45      JBUF(NR)=IEL                                        00005900
0063                LENTH=0                                             00006000
0064                LFTOVR=0                                            00006020
0065                LINE=LINE+1                                         00006050
0066        50      CONTINUE                                            00006100
0067                GO TO 10                                            00006200
0068        60      NR=NR+1                                             00006300
0069                IF(NR.LE.1008) GO TO 70                             00006400
0070                WRITE(LUNTAP,101) JBUF                              00006600
0071                NREC=NREC+1                                         00006700
0072                NR=1                                                00006800
0073        70      DO 80 N=NR,1008                                     00007000
0074        80      JBUF(N)=IEF                                         00007100
0075                WRITE(LUNTAP,101) JBUF                              00007300
0076                NREC=NREC+1                                         00007400
0077        100     CONTINUE                                            00008020
0078                CALL SECOND(T)                                      00008100
0079                WRITE(LUNOUT,102) T,NCOPY,NREC                      00008200
0080        102     FORMAT(20H OUTPUT FINISHED AT,F10.2,I6,7H COPIES,I6,00008300
                   *  31H RECORDS FOR EACH COLOR SECTION)               00008400
0081                WRITE(LUNSUM) IER                                   00008420
0082                WRITE(LUNSUM) T,NREC                                00008440
0083                RETURN                                              00008500
0084                END                                                 00008600
```

```
FORTRAN IV G LEVEL  21              MERGE           DATE = 78144      16/32/35           PAGE 0001

0001            SUBROUTINE MERGE(MRG)                                   00000100
0002            INTEGER*2 IBUF,MBUF,NBUF,KOLOR1,KOLOR2,KOLOR3,KOUNT1,KOUNT2, 00000200
               *   KOUNT3                                               00000300
0003            COMMON IDUM(2),MBUF(2400),NBUF(2400),KLNEW(8)            00000400
0004            COMMON /PROCES/ LO,IER                                  00000500
0005            COMMON /IOUNIT/ LUNIN,LUNOUT,DUM(7),LUNTMP              00000600
0006            COMMON /TEMP/ IBUF(2400)                                00000700
0007            COMMON /WORK/ NSEG1,KOLOR1(500),KOUNT1(500),NSEG2,KOLOR2(500), 00000800
               *   KOUNT2(500),NSEG3,KOLOR3(500),KOUNT3(500)            00000900
0008            DATA MRG1/8/,MRG2/9/,IBIT11/2048/,IBIT14/16384/,NTWRD/2400/ 00001000
0009            REWIND LUNTMP                                           00001100
0010            IF(MRG.NE.0) GO TO 20                                   00001200
0011            MRG=MRG1                                                00001300
0012            REWIND MRG                                              00001400
0013         10 READ(LUNTMP,END=100) IBUF                               00001500
0014            WRITE(MRG) IBUF                                         00001600
0015            GO TO 10                                                00001700
0016         20 MRGIN=MRG                                               00001800
0017            MRGOUT=MRG1+MRG2-MRG                                    00001900
0018            MRG=MRGOUT                                              00002000
0019            REWIND MRGIN                                            00002100
0020            REWIND MRGOUT                                           00002200
0021            READ(MRGIN) IBUF                                        00002300
0022            READ(LUNTMP) MBUF                                       00002400
          C...COMBINE COLOR TABLE...                                    00002500
0023            DO 25 IW=31,38                                          00002600
0024            IF(IBUF(IW).EQ.0) GO TO 30                              00002700
0025         25 NBUF(IW)=IBUF(IW)                                       00002800
0026            IW=39                                                   00002900
0027         30 IW=IW-1                                                 00003000
0028            LAST=IW-30                                              00003100
0029            KLNEW(1)=0                                              00003200
0030            DO 40 M=32,38                                           00003300
0031            IF(MBUF(M).EQ.0) GO TO 50                               00003400
0032            DO 35 I=31,IW                                           00003500
0033            IF(MBUF(M).EQ.IBUF(I)) GO TO 37                         00003600
0034         35 CONTINUE                                                00003700
0035            LAST=LAST+1                                             00003800
0036            IF(LAST.GT.8) GO TO 95                                  00003900
0037            KLNEW(M-30)=LAST                                        00004000
0038            NBUF(LAST+30)=MBUF(M)                                   00004100
0039            GO TO 40                                                00004200
0040         37 KLNEW(M-30)=I-30                                        00004300
0041         40 CONTINUE                                                00004400
          C...COMBINE STRING BY STRING...                               00004500
0042         50 IO=39                                                   00004600
0043            MO=39                                                   00004700
0044            NWRD=38                                                 00004800
0045         52 NSEG1=0                                                 00004900
0046         55 DO 60 I=IO,NTWRD                                        00005000
0047            IWRD=IBUF(I)                                            00005100
0048            IF(IWRD.LT.0) GO TO 90                                  00005200
0049            NSEG1=NSEG1+1                                           00005300
0050            IF(NSEG1.GT.500) GO TO 96                               00005400
0051            KOUNT1(NSEG1)=MOD(IWRD,IBIT11)                          00005500
0052            KOLOR1(NSEG1)=MOD(IWRD/IBIT11,8)+1                      00005600
0053            IF(IWRD.GE.IBIT14) GO TO 62                             00005700
0054         60 CONTINUE                                                00005800
0055            READ(MRGIN) IBUF                                        00005900
0056            IO=1                                                    00006000
0057            GO TO 55                                                00006100
0058         62 IO=I+1                                                  00006200
0059            IF(IO.LE.NTWRD) GO TO 63                                00006300
0060            READ(MRGIN) IBUF                                        00006400
0061            IO=1                                                    00006500
0062         63 NSEG2=0                                                 00006600
0063         65 DO 70 M=MO,NTWRD                                        00006700
0064            MWRD=MBUF(M)                                            00006800
0065            IF(MWRD.LT.0) GO TO 90                                  00006900
0066            NSEG2=NSEG2+1                                           00007000
0067            IF(NSEG2.GT.500) GO TO 96                               00007100
0068            KOUNT2(NSEG2)=MOD(MWRD,IBIT11)                          00007200
0069            KOLOR2(NSEG2)=KLNEW(MOD(MWRD/IBIT11,8)+1)               00007300
0070            IF(MWRD.GE.IBIT14) GO TO 75                             00007400
0071         70 CONTINUE                                                00007500
0072            READ(LUNTMP) MBUF                                       00007600
0073            MO=1                                                    00007700
0074            GO TO 65                                                00007800
0075         75 MO=M+1                                                  00007900
0076            IF(MO.LE.NTWRD) GO TO 80                                00008000
0077            READ(LUNTMP) MBUF                                       00008100
0078            MO=1                                                    00008200
0079         80 CALL OVRLAY                                             00008300
0080            IF(IER.NE.0) GO TO 99                                   00008400
0081            DO 85 N=1,NSEG3                                         00008500
0082            NWRD=NWRD+1                                             00008600
0083            IF(NWRD.LE.NTWRD) GO TO 83                              00008700
0084            WRITE(MRGOUT) NBUF                                      00008800
0085            NWRD=1                                                  00008900
0086         83 NBUF(NWRD)=KOUNT3(N)+(KOLOR3(N)-1)*IBIT11               00009000
0087         85 CONTINUE                                                00009100
0088            NBUF(NWRD)=NBUF(NWRD)+IBIT14                            00009200
0089            GO TO 52                                                00009300
0090         90 NWRD=NWRD+1                                             00009400
0091            IF(NWRD.LE.NTWRD) GO TO 92                              00009500
0092            WRITE(MRGOUT) NBUF                                      00009600
0093            NWRD=1                                                  00009700
0094         92 NBUF(NWRD)=-1                                           00009800
0095            WRITE(MRGOUT) NBUF                                      00009900
0096            GO TO 100                                               00010000
0097         95 WRITE(LUNOUT,101)                                       00010100
0098        101 FORMAT(28H ** MERGE **,TOO MANY COLORS)                 00010200
0099            GO TO 99                                                00010300
0100         96 WRITE(LUNOUT,102)                                       00010400
```

FORTRAN IV G LEVEL 21          MERGE          DATE = 78144          16/32/35          PAGE 0002

```
0101        102 FORMAT(30H ** MERGE **,TOO MANY SEGMENTS)              00010500
0102         99 IER=1                                                   00010600
0103            MRG=0                                                   00010700
0104        100 RETURN                                                  00010800
0105            END                                                     00010900
```

```
                    COMMON BLOCK /        / MAP SIZE    25A8
SYMBOL   LOCATION   SYMBOL   LOCATION   SYMBOL   LOCATION   SYMBOL   LOCATION   SYMBOL   LOCATION
IDUM        0       MBUF        8       NBUF       12C8     KLNEW      2588

COMMON BLOCK /PROCES / MAP SIZE     8
SYMBOL   LOCATION   SYMBOL   LOCATION   SYMBOL   LOCATION   SYMBOL   LOCATION   SYMBOL   LOCATION
LO          0       IER         4

COMMON BLOCK /IOUNIT / MAP SIZE    28
SYMBOL   LOCATION   SYMBOL   LOCATION   SYMBOL   LOCATION   SYMBOL   LOCATION   SYMBOL   LOCATION
LUNIN       0       LUNOUT      4       DUM         8       LUNTMP     24

COMMON BLOCK /TEMP   / MAP SIZE   12C0
SYMBOL   LOCATION   SYMBOL   LOCATION   SYMBOL   LOCATION   SYMBOL   LOCATION   SYMBOL   LOCATION
IBUF        0

COMMON BLOCK /WORK   / MAP SIZE   177C
SYMBOL   LOCATION   SYMBOL   LOCATION   SYMBOL   LOCATION   SYMBOL   LOCATION   SYMBOL   LOCATION
NSEG1       0       KOLOR1      4       KOUNT1     3EC     NSEG2       704     KOLOR2      708
KOUNT2     8C0      NSEG3      FA8      KOLOR3     FAC     KOUNT3     1394

SUBPROGRAMS CALLED
SYMBOL   LOCATION   SYMBOL   LOCATION   SYMBOL   LOCATION   SYMBOL   LOCATION   SYMBOL   LOCATION
IBCOM#     1A8      OVRLAY     1AC

SCALAR MAP
SYMBOL   LOCATION   SYMBOL   LOCATION   SYMBOL   LOCATION   SYMBOL   LOCATION   SYMBOL   LOCATION
MRG1       100      MRG2       104      IBIT11     108     IBIT14     10C      NTWRD      1E0
MRG        1E4      MRGIN      1E8      MRGOUT     1EC     IW         1F0      LAST       1F4
M          1F8      I          1FC      IO         200     MO         204      NWRD       208
IWRD       20C      MWRD       210      N          214

FORMAT STATEMENT MAP
SYMBOL   LOCATION   SYMBOL   LOCATION   SYMBOL   LOCATION   SYMBOL   LOCATION   SYMBOL   LOCATION
101        218      102        238
```

```
*OPTIONS IN EFFECT*  ID,BCD,SOURCE,NOLIST,NODECK,LOAD,MAP
*OPTIONS IN EFFECT*  NAME = MERGE  , LINECNT =      61
*STATISTICS*  SOURCE STATEMENTS =      105,PROGRAM SIZE =     2404
*STATISTICS*  NO DIAGNOSTICS GENERATED
```

FORTRAN IV G LEVEL 21          SUMARY          DATE = 78144          16/32/35          PAGE 0001

```
0001            SUBROUTINE SUMARY(KNT)                                  00000100
0002            REAL*8 OK,YECH,STAT,MAYBE,MRG                           00000200
0003            COMMON /HEAD/ IHEAD(40)                                 00000300
0004            COMMON /PROCES/ LO,IER,NCOPY,IRES                       00000400
0005            COMMON /IOUNIT/ LUNIN,LUNOUT,SKIP(8),LUNSUM             00000500
0006            DIMENSION STYPE(8)                                      00000600
0007            DATA STYPE/4HORG ,4HVBAR,4HHBAR,4HLINE,4HAREA,4HPIE ,4HWORD,4HTAB 00000700
               *        /                                               00000800
0008            DATA OK/8H   OK   /,YECH/8HYEEEEECH/,MAYBE/8H MAYBE /   00000900
0009            DATA MRG/8H MERGED /                                    00000950
0010            REWIND LUNSUM                                           00001000
0011            WRITE(LUNOUT,101)                                       00001100
0012        101 FORMAT(1H1,T43,5H*****,5X,26HS U M M A R Y    T A B L E,5X,5H*****00001200
               *   ///T2,6HSEQ.NO,T24,8HSLIDE ID,T48,10HSLIDE TYPE,T60, 00001300
               *       10HRESOLUTION,T72,12HNO. OF COPIES,T86,7HTIME IN,T95, 00001400
               *    6HSTATUS,T105,8HTIME OUT,T115,14HOUTPUT RECORDS///) 00001500
0013            IF(KNT.LE.0) GO TO 100                                  00001600
0014            DO 80 K=1,KNT                                           00001700
0015            READ(LUNSUM) IHEAD,ITYPE,IRES,NCOPY,TIN                 00001800
0016            TYPE=STYPE(8)                                           00001900
0017            IF((ITYPE.LT.90) TYPE=STYPE(7)                          00002000
0018            IF((ITYPE.LT.56) TYPE=STYPE(6)                          00002100
0019            IF((ITYPE.LT.50) TYPE=STYPE(5)                          00002200
0020            IF((ITYPE.LT.45) TYPE=STYPE(4)                          00002300
0021            IF((ITYPE.LT.40) TYPE=STYPE(2)                          00002400
0022            IF((ITYPE.LT.30) TYPE=STYPE(3)                          00002500
0023            IF((ITYPE.LT.20) TYPE=STYPE(2)                          00002600
0024            IF((ITYPE.LT.10) TYPE=STYPE(1)                          00002700
0025            READ(LUNSUM) IER                                        00002800
0026            IF(IER.EQ.1) STAT=YECH                                  00002900
0027            IF(IER.EQ.4) STAT=MRG                                   00002910
0028            IF(IER.EQ.1 .OR. IER.EQ.4) GO TO 50                     00002920
0029            STAT=OK                                                 00003000
0030            IF(IER.EQ.3) STAT=MAYBE                                 00003100
0031            READ(LUNSUM) TOUT,NREC                                  00003200
0032            WRITE(LUNOUT,102) K,IHEAD,TYPE,IRES,NCOPY,TIN,STAT,TOUT,NREC 00003300
0033        102 FORMAT(I6,1X,40A1,T51,A4,T64,I2,T77,I3,T86,F7.1,T94,A8,T106,F7.1, 00003400
               *   T120,I6)                                             00003500
0034            GO TO 80                                                00003600
0035         50 WRITE(LUNOUT,102) K,IHEAD,TYPE,IRES,NCOPY,TIN,STAT      00003700
0036         80 CONTINUE                                                00003800
0037        100 RETURN                                                  00003900
0038            END                                                     00004000
```

```
FORTRAN IV G LEVEL  21              SUMARY          DATE = 78144      16/32/35           PAGE 0002

COMMON BLOCK /HEAD    / MAP SIZE     ' A0
SYMBOL    LOCATION    SYMBOL   LOCATION    SYMBOL   LOCATION     SYMBOL   LOCATION    SYMBOL   LOCATION
IHEAD        0

COMMON BLOCK /PROCES  / MAP SIZE     10
SYMBOL    LOCATION    SYMBOL   LOCATION    SYMBOL   LOCATION     SYMBOL   LOCATION    SYMBOL   LOCATION
LO           0        IER         4        NCOPY       8        IRES        C

COMMON BLOCK /IOUNIT  / MAP SIZE     2C
SYMBOL    LOCATION    SYMBOL   LOCATION    SYMBOL   LOCATION     SYMBOL   LOCATION    SYMBOL   LOCATION
LUNIN        0        LUNOUT      4        SKIP        8        LUNSUM      28

SUBPROGRAMS CALLED
SYMBOL    LOCATION    SYMBOL   LOCATION    SYMBOL   LOCATION     SYMBOL   LOCATION    SYMBOL   LOCATION
IBLUM#       EC

SCALAR MAP
SYMBOL    LOCATION    SYMBOL   LOCATION    SYMBOL   LOCATION     SYMBOL   LOCATION    SYMBOL   LOCATION
OK          F0        YECH        F8       MAYBE      100        MRG        108       STAT       110
KNT         118       K           11C      ITYPE      120        TIN        124       TYPE       128
IOUT        12C       NREC        130

ARRAY MAP
SYMBOL    LOCATION    SYMBOL   LOCATION    SYMBOL   LOCATION     SYMBOL   LOCATION    SYMBOL   LOCATION
STYPE       134

FORMAT STATEMENT MAP
SYMBOL    LOCATION    SYMBOL   LOCATION    SYMBOL   LOCATION     SYMBOL   LOCATION    SYMBOL   LOCATION
101         154       102         204

*OPTIONS IN EFFECT*  ID,BCD,SOURCE,NOLIST,NODECK,LOAD,MAP
*OPTIONS IN EFFECT*  NAME = SUMARY  , LINECNT =     61
*STATISTICS*   SOURCE STATEMENTS =      38,PROGRAM SIZE =      1444
*STATISTICS*  NO DIAGNOSTICS GENERATED

*STATISTICS*  NO DIAGNOSTICS THIS STEP
```

We claim:

1. Apparatus for automatically generating photographic pictures, such as 35 mm slides, comprising:
    a plurality of micro-computer terminals, each with a color display and input means for enabling the user to enter data, said terminals being programmed to generate information defining a plurality of standard graphical representations having certain variable characteristics, a particular one of said standard graphical representations including its characteristics being entered by users through the input means as answers to questions presented by the terminals, the color displays being capable of creating terminal color pictures of the particular graphical representations based on the user's answers, the terminals also being capable of modifying the variable characteristics of the particular graphical representations in response to user entries which change the answers to said questions so as to create final answers;
    means for transmitting data representing the final answers from said terminals to a location remote from said terminals;
    a central computer at a location remote from said terminals and receiving the data from said means for transmitting data, said central computer being programmed to generate data defining the raster points for computer pictures of the particular graphical representations based on the data representing the final answers, said computer pictures having enhanced resolution over the terminal pictures generated and displayed by the terminals, and
    picture producing means for creating photographic pictures from the higher resolution raster point data generated by the central computer.

2. The apparatus defined in claim 1, wherein said enhanced resolution of the computer picture includes a greater number of raster points than the terminal pictures displayed by said terminals.

3. The apparatus defined in claim 2, wherein the computer pictures are at least 1000 raster points high and 1500 raster points wide.

4. The apparatus defined in claim 2, wherein the computer pictures are up to 1344 raster points high and 2016 raster points wide.

5. The apparatus defined in claim 2, wherein the resolution displayed by said terminals is no greater than a standard television raster.

6. The apparatus defined in claim 5, wherein the terminal pictures are up to 160 raster points high and 192 raster points wide.

7. The apparatus defined in claim 1, wherein said enhanced resolution of the computer pictures includes a greater selection of colors than that displayed by said terminals.

8. The apparatus defined in claim 7, wherein the computer pictures are generated from a selection of 64 different colors.

9. The apparatus defined in claim 7, wherein the terminal pictures are generated from a selection of 8 different colors.

10. The apparatus defined in claim 1, wherein said standard graphical representations include text composed of a plurality of symbols and wherein said variable characteristics include the identity of said symbols.

11. The apparatus defined in claim 10, wherein said variable characteristics include the size of said symbols.

12. The apparatus defined in claim 11, wherein said variable characteristics include a selection of one of eight different sizes.

13. The apparatus defined in claim 10, wherein said variable characteristics include the font type of said symbols.

14. The apparatus defined in claim 10, wherein said variable characteristics include the position of said symbols.

15. The apparatus defined in claim 14, wherein said position is given by one of three justification modes selected from the class consisting of left justification, centered and right justification.

16. The apparatus defined in claim 1, wherein the plurality of standard graphical representations include at least one of the group consisting of a box chart, text chart, vertical bar chart, horizontal bar chart, line graph, tabular text chart and pie chart.

17. The apparatus defined in claim 10, wherein the data representing the user's final answers includes the symbols of the text selected, the size of the symbols, the color of the symbols, the font of the symbols and the location of the symbols.

18. The apparatus defined in claim 1, wherein the data representing the user's final answers includes the color of the background of the graphic representation.

19. The apparatus defined in claim 1, wherein the data representing the user's final answers includes a selection of graphical features associated with the particular representation.

20. The apparatus defined in claim 19, wherein the data representing the user's final answers includes the colors of the features, the color of borders for the features and the location of the features.

21. The apparatus defined in claim 1, wherein the user additionally enters identifying information through the input means in answer to questions, and wherein the data representing the user's final answers includes the identifying information.

22. The apparatus defined in claim 7, wherein the user additionally enters a selection of colors available at the central computer to correspond to the colors available at the terminal, said selection of colors being entered through the input means in answer to questions, and wherein the data representing the user's final answers includes the selection of colors.

23. The apparatus defined in claim 1, wherein said data transmitting means includes a time-sharing network.

24. The apparatus defined in claim 1, wherein the variable characteristics of said standard graphical representations include text composed of a plurality of symbols; wherein said central computer includes a font storage system having digital information stored thereon defining a plurality of symbols of graphic arts quality; and wherein said central computer is programmed to include selected ones of said symbols in the graphical representation defined by said raster points in response to the data representing the user's final answers.

25. The apparatus defined in claim 24, wherein said font storage system includes a disk file connected on line with said central computer.

26. The apparatus defined in claim 24, wherein said digital information defining each symbol in said font storage system includes for each scan line a first digital number defining the number of space raster points from the beginning of the symbol raster to the point at which the first segment of the symbol commences, and a second digital number defining the number of symbol raster points in said first segment.

27. The apparatus defined in claim 24, wherein said digital information includes digital numbers defining the run length of each successive space and segment in a plurality of symbol scan lines.

28. The apparatus defined in claim 24, wherein said digital information includes digital numbers defining the minimum distance of each symbol of a font from all other symbols of the font, and wherein said central computer is programmed to space a symbol to the right of the previous symbol in text in accordance with said distance.

29. The apparatus defined in claim 1, wherein said central computer is programmed to overlay successive ones of prescribed graphic patterns in a prescribed sequence.

30. The apparatus defined in claim 29, wherein said central computer is programmed to set the raster points of a given scan line to the background color before proceeding to overlay said graphic patterns.

31. The apparatus defined in claim 29, wherein one graphic pattern is an inset.

32. The apparatus defined in claim 29, wherein one graphic pattern is a triangular area.

33. The apparatus defined in claim 29, wherein one graphic pattern is a grid line.

34. The apparatus defined in claim 29, wherein one graphic pattern is a bar.

35. The apparatus defined in claim 29, wherein one graphic pattern is a circular pie.

36. The apparatus defined in claim 29, wherein one graphic pattern is a straight line segment.

37. The apparatus defined in claim 29, wherein one graphic pattern is a box.

38. The apparatus defined in claim 29, wherein one graphic pattern is a symbol.

39. The apparatus defined in claim 29 wherein said graphic patterns include at least two of the following: an inset, a triangular area, a grid line, a bar, a circular pie, a straight line segment, a box, and a symbol; and wherein said graphic patterns are overlaid in the following sequence: inset, triangular areas, grid lines, bars, circular pie, straight line segments, boxes, symbols.

40. The apparatus defined in claim 1, wherein said central computer is programmed to return to the beginning of the picture data generation for the next subsequent picture when an error condition is encountered during the picture data generation.

41. The apparatus defined in claim 1, wherein said central computer is programmed to execute a plurality of program modules in a prescribed sequence to compute the raster data for each picture.

42. The apparatus defined in claim 41, wherein said program modules are swapped in and out of the computer memory under control of a main program.

43. The apparatus defined in claim 41, wherein one of said program modules initializes all counters, codes and tables used by the other program modules prior to the execution of said other program modules.

44. The apparatus defined in claim 41, wherein one of said program modules reads in the input data defining the user's final answers and stores such input data in prescribed locations in the computer memory common block.

45. The apparatus defined in claim 41, wherein one of said program modules converts the input data defining the user's final answers into data defining the identity, location and color of a plurality of graphic patterns in the picture raster.

46. The apparatus defined in claim 45, wherein one of said graphic patterns is an inset.

47. The apparatus defined in claim 45, wherein one graphic pattern is a triangular area.

48. The apparatus defined in claim 45, wherein one graphic pattern is a grid line.

49. The apparatus defined in claim 45, wherein one graphic pattern is a bar.

50. The apparatus defined in claim 45, wherein one graphic pattern is a circular pie.

51. The apparatus defined in claim 45, wherein one graphic pattern is a straight line segment.

52. The apparatus defined in claim 45, wherein one graphic pattern is a box.

53. The apparatus defined in claim 45, wherein one graphic pattern is a symbol.

54. The apparatus defined in claim 45, wherein another one of said program modules superimposes successive ones of said plurality of graphic patterns in a prescribed sequence to form said picture.

55. The apparatus defined in claim 54, wherein said one of said program modules determines the color of each raster point in an entire raster scan line, stores the color information for that line and repeats the process for the next, and each following scan line of the picture.

56. The apparatus defined in claim 55, wherein the data defining the raster points of a picture having a graphical representation includes, for each successive raster line segment in which all the raster points have the same color: a first digital number defining the color of the raster points and a second digital number defining the number of raster points in the segment.

57. The apparatus defined in claim 56, wherein said central computer is programmed to convert said first digital number into three digital numbers defining the intensities of three primary colors which produce the color of said raster points by color addition.

58. Apparatus for automatically generating photographic pictures such as 35 mm slides, comprising: a plurality of micro-computer terminals, each with a display and input means for enabling the user to enter data, said terminals being programmed to generate information defining a plurality of standard graphical representations having certain variable characteristics, a particular one of said standard graphical representations including its characteristics being entered by users through the input means as answers to questions presented by the terminals, the displays being capable of creating terminal pictures of the particularly graphical representations based on the users answers, the terminals also being capable of modifying the variable characteristics of the particular graphical representations in response to user entries which change the answers to said questions so as to create final answers;

means for transmitting data representing the final answers from said terminals to a location remote from said terminals;

a central computer at a location remote from said terminals and receiving the data from said means for transmitting data, said central computer being programmed to generate data defining the raster points for computer pictures of the particular graphical representations based on the data representing the final answers, said computer pictures having enhanced resolution over the terminal pictures generated and displayed by the terminals; and picture producing means for creating photographic pictures from the higher resolution raster point data generated by the central computer.

* * * * *